(12) United States Patent
Robertson et al.

(10) Patent No.: US 9,671,922 B1
(45) Date of Patent: Jun. 6, 2017

(54) SCALING OF DISPLAYED OBJECTS WITH SHIFTS TO THE PERIPHERY

(75) Inventors: George G. Robertson, Seattle, WA (US); Dugald R. Hutchings, Atlanta, GA (US); Brian R. Meyers, Issaquah, WA (US); Gregory R. Smith, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 200 days.

(21) Appl. No.: 13/548,571

(22) Filed: Jul. 13, 2012

Related U.S. Application Data

(63) Continuation of application No. 10/851,569, filed on May 21, 2004, now Pat. No. 8,225,224, which is a continuation-in-part of application No. 10/374,351, filed on Feb. 25, 2003, now Pat. No. 8,230,359.

(51) Int. Cl.
*G06F 3/048* (2013.01)
*G06F 3/0481* (2013.01)
*G06F 9/44* (2006.01)

(52) U.S. Cl.
CPC .......... *G06F 3/0481* (2013.01); *G06F 9/4443* (2013.01)

(58) Field of Classification Search
CPC .............................. G06F 3/0481; G06F 9/4443
USPC .......................... 715/766, 767, 796, 800, 802
See application file for complete search history.

(56) References Cited

U.S. PATENT DOCUMENTS

| 3,582,961 A | 6/1971 | Shindo |
| 5,305,435 A | 4/1994 | Bronson |
| 5,377,317 A | 12/1994 | Bates et al. |
| 5,381,523 A | 1/1995 | Hayashi |
| 5,423,043 A | 6/1995 | Fitzpatrick et al. |

(Continued)

FOREIGN PATENT DOCUMENTS

| EP | 0570083 | 11/1993 |
| EP | 1207449 A2 | 5/2002 |

(Continued)

OTHER PUBLICATIONS

"F-Secure Announces World's First Anti-Virus Product for Wireless Information Devices", Aug. 15, 2000, Internet Citation, <<http://www.europe.f-secure.com/news/20>>, pp. 1-2, XP-002220984.

(Continued)

*Primary Examiner* — Tadeese Hailu

(57) ABSTRACT

Some examples relate to facilitating multi-tasking in a computing environment. A focus area component defines a focus area within a display space—the focus area occupying a subset area of the display space area. A scaling component scales display objects as a function of proximity to the focus area, and a behavior modification component modifies respective behavior of the display objects as a function their location of the display space. Some implementations provide for interaction technique(s) and user interface(s) in connection with managing display objects on a display surface. Further, some examples define a central focus area, such that the display objects are displayed and behave as usual. Also included is a periphery outside the focus area where the display objects are reduced in size based on their location, getting smaller as the display objects near an edge of the display surface with many more objects visible.

20 Claims, 105 Drawing Sheets

(56) References Cited

U.S. PATENT DOCUMENTS

| | | |
|---|---|---|
| 5,493,692 A | 2/1996 | Theimer et al. |
| 5,495,567 A | 2/1996 | Iizawa et al. |
| 5,513,342 A | 4/1996 | Leong et al. |
| 5,544,321 A | 8/1996 | Theimer et al. |
| 5,555,376 A | 9/1996 | Theimer et al. |
| 5,592,602 A | 1/1997 | Edmunds et al. |
| 5,599,191 A | 2/1997 | Delara |
| 5,603,054 A | 2/1997 | Theimer et al. |
| 5,611,050 A | 3/1997 | Theimer et al. |
| 5,652,850 A | 7/1997 | Hollander |
| 5,799,292 A | 8/1998 | Hekmatpour |
| 5,802,220 A | 9/1998 | Black et al. |
| 5,812,128 A | 9/1998 | Sterling, IV |
| 5,812,865 A | 9/1998 | Theimer et al. |
| 5,825,360 A | 10/1998 | Odam et al. |
| 5,838,318 A | 11/1998 | Porter et al. |
| 5,838,326 A | 11/1998 | Card et al. |
| 5,844,559 A | 12/1998 | Guha |
| 5,874,962 A | 2/1999 | de Judicibus et al. |
| 5,880,733 A | 3/1999 | Horvitz et al. |
| 5,892,511 A * | 4/1999 | Gelsinger et al. ............ 715/794 |
| 5,920,315 A | 7/1999 | Santos-Gomez |
| 5,920,316 A * | 7/1999 | Oran et al. ..................... 715/779 |
| 6,016,145 A | 1/2000 | Horvitz et al. |
| 6,025,841 A | 2/2000 | Finkelstein et al. |
| 6,043,817 A | 3/2000 | Bolnick et al. |
| 6,104,359 A | 8/2000 | Endres et al. |
| 6,134,566 A | 10/2000 | Berman et al. |
| 6,157,379 A * | 12/2000 | Singh ............................ 715/866 |
| 6,160,553 A | 12/2000 | Robertson et al. |
| 6,188,405 B1 | 2/2001 | Czerwinski et al. |
| 6,243,452 B1 * | 6/2001 | O'Shaughnessey et al. ........................ 379/201.01 |
| 6,256,648 B1 | 7/2001 | Hill et al. |
| 6,263,352 B1 | 7/2001 | Cohen |
| 6,266,064 B1 | 7/2001 | Snyder |
| 6,275,858 B1 | 8/2001 | Bates et al. |
| 6,286,043 B1 | 9/2001 | Cuomo et al. |
| 6,342,908 B1 | 1/2002 | Bates et al. |
| 6,369,827 B1 | 4/2002 | Pan et al. |
| 6,369,837 B1 | 4/2002 | Schirmer |
| 6,374,200 B1 | 4/2002 | Nakagawa |
| 6,411,292 B1 | 6/2002 | Cook et al. |
| 6,414,677 B1 | 7/2002 | Robertson et al. |
| 6,462,759 B1 | 10/2002 | Kurtzberg et al. |
| 6,464,759 B1 | 10/2002 | Bossard et al. |
| 6,466,232 B1 | 10/2002 | Newell et al. |
| 6,466,237 B1 | 10/2002 | Miyao et al. |
| 6,513,046 B1 | 1/2003 | Abbott, III et al. |
| 6,545,660 B1 | 4/2003 | Shen et al. |
| 6,549,218 B1 | 4/2003 | Gershony et al. |
| 6,549,915 B2 | 4/2003 | Abbott, III et al. |
| 6,570,590 B1 | 5/2003 | Dubrow et al. |
| 6,590,593 B1 | 7/2003 | Robertson et al. |
| 6,590,594 B2 * | 7/2003 | Bates et al. ................... 715/784 |
| 6,613,100 B2 | 9/2003 | Miller |
| 6,629,097 B1 | 9/2003 | Keith |
| 6,684,177 B2 | 1/2004 | Mishra et al. |
| 6,747,675 B1 | 6/2004 | Abbott et al. |
| 6,791,530 B2 | 9/2004 | Vernier et al. |
| 6,791,580 B1 | 9/2004 | Abbott et al. |
| 6,801,223 B1 | 10/2004 | Abbott et al. |
| 6,812,937 B1 | 11/2004 | Abbott et al. |
| 6,826,727 B1 | 11/2004 | Mohr et al. |
| 6,842,877 B2 | 1/2005 | Robarts et al. |
| 6,868,441 B2 | 3/2005 | Greene et al. |
| 6,894,703 B2 * | 5/2005 | Vernier et al. ................ 345/619 |
| 6,909,443 B1 | 6/2005 | Robertson et al. |
| 6,957,395 B1 * | 10/2005 | Jobs et al. ..................... 715/765 |
| 6,959,425 B1 | 10/2005 | Krauklis |
| 6,964,025 B2 | 11/2005 | Angiulo et al. |
| 6,999,955 B1 | 2/2006 | Horvitz |
| 7,015,910 B2 | 3/2006 | Card et al. |
| 7,051,291 B2 | 5/2006 | Sciammarella et al. |
| 7,068,288 B1 | 6/2006 | Good et al. |
| 7,111,231 B1 | 9/2006 | Huck et al. |
| 7,386,801 B1 | 6/2008 | Horvitz et al. |
| 7,536,650 B1 | 5/2009 | Robertson et al. |
| 8,225,224 B1 | 7/2012 | Robertson et al. |
| 2001/0040590 A1 | 11/2001 | Abbott et al. |
| 2001/0040591 A1 | 11/2001 | Abbott et al. |
| 2001/0043231 A1 | 11/2001 | Abbott et al. |
| 2001/0043232 A1 | 11/2001 | Abbott et al. |
| 2002/0006222 A1 * | 1/2002 | Inagaki et al. ................ 382/181 |
| 2002/0010718 A1 | 1/2002 | Miller |
| 2002/0032689 A1 | 3/2002 | Abbott et al. |
| 2002/0033779 A1 | 3/2002 | Nakai et al. |
| 2002/0044152 A1 | 4/2002 | Abbott, III et al. |
| 2002/0052930 A1 | 5/2002 | Abbott et al. |
| 2002/0052963 A1 | 5/2002 | Abbott et al. |
| 2002/0054117 A1 | 5/2002 | van Dantzich et al. |
| 2002/0054130 A1 | 5/2002 | Abbott, III et al. |
| 2002/0054174 A1 | 5/2002 | Abbott et al. |
| 2002/0077156 A1 | 6/2002 | Smethers |
| 2002/0078204 A1 | 6/2002 | Newell et al. |
| 2002/0080155 A1 | 6/2002 | Abbott et al. |
| 2002/0080156 A1 | 6/2002 | Abbott et al. |
| 2002/0083025 A1 | 6/2002 | Robarts et al. |
| 2002/0083158 A1 | 6/2002 | Abbott et al. |
| 2002/0087525 A1 | 7/2002 | Abbott et al. |
| 2002/0099817 A1 | 7/2002 | Abbott et al. |
| 2002/0101418 A1 | 8/2002 | Vernier et al. |
| 2002/0109678 A1 | 8/2002 | Marmolin et al. |
| 2002/0112180 A1 | 8/2002 | Land et al. |
| 2002/0154153 A1 * | 10/2002 | Messinger et al. ........... 345/705 |
| 2002/0156806 A1 | 10/2002 | Cox et al. |
| 2002/0184233 A1 | 12/2002 | Schneider |
| 2003/0046401 A1 | 3/2003 | Abbott et al. |
| 2003/0052920 A1 | 3/2003 | Carter |
| 2003/0069892 A1 | 4/2003 | Hind et al. |
| 2003/0081011 A1 * | 5/2003 | Sheldon et al. .............. 345/838 |
| 2003/0132971 A1 | 7/2003 | Billmaier et al. |
| 2003/0154476 A1 | 8/2003 | Abbott, III et al. |
| 2003/0156124 A1 | 8/2003 | Good et al. |
| 2003/0179236 A1 | 9/2003 | Good et al. |
| 2003/0220895 A1 | 11/2003 | Vailaya |
| 2003/0225853 A1 | 12/2003 | Wang et al. |
| 2004/0109006 A1 | 6/2004 | Matthews |
| 2004/0123238 A1 | 6/2004 | Hefetz et al. |
| 2004/0143590 A1 | 7/2004 | Wong et al. |
| 2004/0148573 A1 | 7/2004 | Buice et al. |
| 2004/0165010 A1 | 8/2004 | Robertson et al. |
| 2004/0189695 A1 * | 9/2004 | Kurtz et al. ................... 345/738 |
| 2004/0225986 A1 | 11/2004 | Lin et al. |
| 2005/0021336 A1 * | 1/2005 | Katsuranis .................... 704/246 |
| 2005/0034066 A1 | 2/2005 | Ahlert et al. |
| 2005/0034078 A1 | 2/2005 | Abbott et al. |
| 2005/0086239 A1 | 4/2005 | Swann et al. |
| 2005/0149879 A1 * | 7/2005 | Jobs et al. ..................... 715/796 |
| 2012/0290973 A1 | 11/2012 | Robertson et al. |

FOREIGN PATENT DOCUMENTS

| | | |
|---|---|---|
| EP | 1253510 | 10/2002 |
| EP | 1283483 | 2/2003 |
| JP | 5197509 | 8/1993 |
| JP | 10003375 | 1/1998 |
| JP | 2001024685 | 1/2001 |
| WO | WO 9800787 | 1/1998 |
| WO | WO 9815890 | 4/1998 |
| WO | WO 01/09753 | 2/2001 |
| WO | WO 0133889 | 5/2001 |

OTHER PUBLICATIONS

Bannon et al., "Evaluation and Analysis of Users Activity Organization", Proceedings of the CHI 83, Dec. 1983, pp. 54-57.

Baudisch et al., "Focus Plus Context Screens: Combining Display Technology with Visualization Techniques", Proceedings of UIST 01, ACM May 2002, pp. 31-40.

Bederson et al., "Pad++: A Zooming Graphical Interface for Exploring Alternate Interface Physics", Proceedings of UIST 94, Nov. 2-4, 1994, pp. 17-26.

(56) References Cited

OTHER PUBLICATIONS

Bell et al., "Dynamic Space Management for User Interfaces", Proceedings of UIST 2000, ACM Symposium of User Interface Software and Technology, San Diego, CA, Nov. 5-8, 2000, pp. 238-248.
Billinghurst et al., "Wearable Devices: New Ways to Manage Information", IEEE Computer Society, Jan. 1999, pp. 57-64.
Billinghurst, "An Evaluation of Wearable Information Spaces", Proceedings of the Virtual Reality Annual International Symposium, Aug. 1998, 8 pages.
Billinghurst, "Research Directions in Wearable Computing", University of Washington, May 1998, 48 pages.
Bly et al., "A Comparison of Tiled and Overlapping Windows", Proceedings of CHI 86, Apr. 1986, pp. 101-106.
Booth et al., "On the Parameters of Human Visual Performance An Investigation of the Benefits of Antialiasing." Computer Graphics and Applications, Sep. 1987, 7 pages.
Booth, K.S. et al., "On the Parameters of Human Visual Performance an Investigation of the Benefits of Antialiasing," Computer Graphics Laboratory, University of Waterloo, Waterloo, Ontario, Canada, ACM Apr. 5-9, 1987, 7 pages.
Card et al., "A Multiple, Virtual-Workspace Interface to Support User Task Switching", In Proc. CHI+GI, May 1987, pp. 53-59.
Chen et al., "A Survey of Context-Aware Mobile Computing Research", Dartmouth Computer Science Technical Report, Feb. 2000, 16 pages.
Chinese Notice on Grant of Patent Right to Invention in Application 200410003962.9, mailed Mar. 9, 2007, 4 pgs.
Cutrell et al., "Notification, Disruption, and Memory: Effects of Messaging Interruptions on Memory and Performance", Human-Computer Interaction—Interact 2001, IOS Press, Jul. 2001, pp. 263-269.
Czerwinski et al. "Instant Messaging and Interruption: Influence of Task Type on Performance", Proceedings of OZCHI 2000, Dec. 2000, pp. 356-361.
Czerwinski et al. "The Contribution of Thumbnail Image, Mouseover Text and Spatial Location Memory to Web Page Retrieval in 3D", Interact 1999, Edinburgh, UK, Aug. 30, 1999, 8 pages.
Czerwinski et al., "A Diary Study of Task Switching and Interruptions", Proceedings of the Conference on Human Factors in Computing Systems (CHI 2004), Vienna, Austria, Apr. 24-29, 2004, vol. 6, No. 1, pp. 175-182.
Czerwinski et al., "An Investigation of Memory for Daily Computing Events", Proceedings of HCI 2002, Sep. 2002, pp. 230-245.
Czerwinski et al., "Instant Messaging: Effects of Relevance and Timing", Proceedings of HCI 2000, British Computer Society, Mar. 2000, vol. 2, pp. 71-76.
Czerwinski et al., "Visualizing Implicit Queries for Information Management and Retrieval", Conference on Human Factors and Computing Systems 1999, pp. 560-567, May 1999.
European Notice of Allowance in Application EP04004253.3, mailed Apr. 1, 2010, 4 pgs.
European Office Action in Application EP04004253.3, mailed Jun. 6, 2008, 6 pgs.
European Office Action in Application EP04004253.3, mailed Jul. 13, 2007, 7 pgs.
European Postponement of Summons to Attend Oral Proceedings in Application EP04004253.3, mailed Oct. 7, 2009, 2 pgs.
European Result of Consultation in Application EP04004253.3, mailed Jan. 22, 2010, 4 pgs.
European Search Report for European Application No. EP 04004253.3, mailed Oct. 26, 2006, 3 pages.
European Summons to Attend Oral Proceedings in Application EP04004253.3, mailed Aug. 10, 2009, 8 pgs.
European Written Submissions of proposed claims sets as filed in Application EP04004253.3, mailed Nov. 26, 2009, 35 pgs.
Final Office Action from the U.S. Patent and Trademark Office for U.S. Appl. No. 10/374,351, mailed on Mar. 9, 2011, 24 pgs.
Final Office Action from the U.S. Patent and Trademark Office for U.S. Appl. No. 10/374,351, mailed on Nov. 13, 2006, 20 pgs.
Final Office Action from the U.S. Patent and Trademark Office for U.S. Appl. No. 10/851,569, mailed on Aug. 30, 2007, 9 pgs.
Final Office Action from the U.S. Patent and Trademark Office for U.S. Appl. No. 10/851,569, mailed on Jan. 12, 2010, 13 pgs.
Final Office Action from the U.S. Patent and Trademark Office for U.S. Appl. No. 10/851,569, mailed on Mar. 9, 2011, 15 pgs.
Final Office Action from the U.S. Patent and Trademark Office for U.S. Appl. No. 10/851,569, mailed on Oct. 27, 2008, 13 pgs.
Final Office Action from the U.S. Patent and Trademark Office for U.S. Appl. No. 10/851,928, mailed on Dec. 7, 2007, 15 pgs.
Goldberg, "Smalltalk-80", Views, pp. 292-297, New York: Addison-Wesley, May 1983.
Grudin, "Partitioning Digital Worlds: Focal and Peripheral Awareness in Multiple Monitor Use," SIGGHI'01, ACM Mar. 31-Apr. 5, 2001, Seattle, WA, 8 pages.
Guimbretiere, "Fluid Interaction with High-resolution Wall-size Displays", Symposium on User Interface Software and Technology Nov. 1, 2001, 10 pages.
Harter et al., "A Distributed Location System for the Active Office", IEEE Network, 1994, pp. 62-70.
Henderson, Jr., et al., "Rooms: The Use of Multiple Virtual Workspaces to Reduce Space Contention in a Window-Based Graphical User Interface", ACM Transactions on Graphics, vol. 5, No. 3, Jul. 1986, pp. 211-243.
Horvitz et al., "Attention-Sensitive Alerting in Computing Systems", Microsoft Research, Aug. 1999, 26 pages.
Horvitz et al., "In Pursuit of Effective Handsfree Decision Support: Coupling Bayesian Inference, Speech Understanding, and User Models", Jul. 1995, 8 pages.
Hutchings et al., "Revisiting Display Space Management: Understanding Correct Practice to Inform Next-generation Design", Graphics Interface 2004, May 19, 2004, pp. 127-134, Canadian Human-Computer Communications Society, Ontario.
International Search Report dated Sep. 29, 2003 for PCT Application Serial No. 00/20685, 3 pages.
Japanese Notice of Rejection in Application 2004-016391, mailed Mar. 27, 2009, 2 pgs.
Japanese Office Action in Application 2004-016391, mailed Oct. 10, 2008, 5 pgs.
Joachims, "Text Categorization with Support Vector Machines: Learning with Many Relevant Features", Machine Learning, European Conference on Machine Learning, Apr. 21, 1998, pp. 137-142.
Kandogan et al., "Elastic Windows: Evaluation of Multi-Window Operations", Proceedings of CHI 1997, Mar. 1997, pp. 250-257.
Kaptelinin, "UMEA: Translating Interaction Histories into Project Contexts", Proceedings of CHI 2003, Ft. Lauderdale, Florida, Apr. 5-10, 2003, vol. 5, Issue No. 1, pp. 353-360.
Leung, Y. K. et al., "A Review of Taxonomy of Distortion-Oriented Presentation Techniques," ACM Transactions on Computer-Human Interaction, vol. 1, No. 2, Jun. 1994, pp. 126-160.
Losee, Jr., "Minimizing Information Overload: The Ranking of Electronic Messages", Journal of Information Science 15, Elsevier Science Publishers B.V., Apr. 1989, pp. 179-189.
MacIntyre et al., "Support for Multitasking and Background Awareness Using Interactive Peripheral Displays", Proceedings of UIST 2001, Orlando, Florida, Nov. 11-14, 2001, ACM 2001, vol. 3, No. 2, pp. 41-50.
Malone, "How Do People Organize Their Desks? Implications for the Design of Office Information Systems", ACM Transactions of Office Information Systems, Jan. 1983, vol. 1, No. 1, pp. 99-112.
Myers, "Window Interfaces: A Taxonomy of Window Manager User Interfaces", IEEE Computer Graphics and Applications, Sep. 1988, vol. 8, No. 5, pp. 65-84.
Mynatt et al., "Flatland: New Dimensions in Office Whiteboards", Conference on Human Factors and Computing Systems 1999, pp. 346-353, May 1999.
Office Action from the U.S. Patent and Trademark Office for U.S. Appl. No. 10/851,569, mailed on Apr. 2, 2007, 10 pgs.
Office Action from the U.S. Patent and Trademark Office for U.S. Appl. No. 10/851,569, mailed on Jan. 15, 2008, 9 pgs.
Office Action from the U.S. Patent and Trademark Office for U.S. Appl. No. 10/851,569, mailed on May 12, 2009, 11 pgs.

(56) References Cited

OTHER PUBLICATIONS

Office Action from the U.S. Patent and Trademark Office for U.S. Appl. No. 10/851,569, mailed on May 27, 2008, 11 pgs.
Office Action from the U.S. Patent and Trademark Office for U.S. Appl. No. 10/374,351, mailed on Jul. 5, 2006, 19 pgs.
Office Action from the U.S. Patent and Trademark Office for U.S. Appl. No. 10/374,351, mailed on Sep. 7, 2010, 23 pgs.
Office Action from the U.S. Patent and Trademark Office for U.S. Appl. No. 10/851,459, mailed on Apr. 10, 2007, 10 pgs.
Office Action from the U.S. Patent and Trademark Office for U.S. Appl. No. 10/851,459, mailed on Aug. 28, 2008, 12 pgs.
Office Action from the U.S. Patent and Trademark Office for U.S. Appl. No. 10/851,459, mailed on Sep. 18, 2007, 11 pgs.
Office Action from the U.S. Patent and Trademark Office for U.S. Appl. No. 10/851,569, mailed on Jul. 20, 2010, 14 pgs.
Office Action from the U.S. Patent and Trademark Office for U.S. Appl. No. 10/851,928, mailed on Jun. 26, 2007, 12 pgs.
Pattison et al., "Information Visualisation using Composable Layouts and Visual Sets," Dec. 2011, Conference in Research and Practice in Information Technology, vol. 9, Commonwealth of Australia, 10 pages.
Rekimoto, "Time-Machine Computing: A Time-centric Approach for the Information Environment", Proceedings of UIST 99, Feb. 1999, pp. 45-54.
Rhodes et al., "Remembrance Agent: A continuously running automated information retrieval system", The Proceedings of The First International conference on The Practical Application of Intelligent Agents and Multi Agent Technology, Aug. 1996, pp. 487-495.
Rhodes et al., "The Wearable Remembrance Agent: A System for Augmented Memory", The Proceedings of The First International Symposium on Wearable Computers, Oct. 1997, pp. 123-128.
Robertson et al., "Data Mountain: Using Spatial Memory for Document Management", Symposium on User Interface Software and Technology 1998, pp. 153-162, Nov. 1998.
Robertson et al., "Scalable Fabric: Flexible Task Management", AVI 04, May 2004, pp. 85-89, ACM, Atlanta, GA.
Robertson et al., "The Task Gallery: A 3D Window Manager", Proceedings of CHI 2000, Apr. 1-6, 2000, vol. 2, Issue 1, pp. 494-501.
Roussel, "Ametista: a mini-toolkit for exploring new window management techniques", Latin American Conference on Human-Computer Interaction, Aug. 2003, pp. 117-124, ACM, Rio de Janeiro, Brazil.
Ruggier, Mario, "Guide for Using the Software Documentation Layout Template," accessible from http://engineeringsoftware.web.cern.ch/engineering-software/Products/Framemaker/Docsys/www/distribution/CERN-ONLY/sdlt/SDLT/ doc/ugSDLT.pdf, Jul. 5, 1999, 56 pages.
Schilit et al., "Context-Aware Computing Applications", In Proceedings of the Workshop on Mobile Computing Systems and Applications, Dec. 1994, pp. 85-90.
Schilit et al., "Customizing Mobile Applications", Proceedings USENIX Symposium on Mobile and Location Independent Computing, Aug. 1993, 9 pages.
Schilit et al., "Disseminating Active Map Information to Mobile Hosts", IEEE Network, Sep.-Oct. 1994, pp. 22-32, vol. 8—No. 5.
Schilit et al., "The PARCTAB Mobile Computing System", IEEE WWOS-IV, Oct. 1993, 4 pages.
Schilit, "A System Architecture for Context-Aware Mobile Computing", Columbia University, Jun. 1995, 153 pages.
Smith, et al., "GroupBar: The TaskBar Evolved", Proceedings of OZCHI 2003, Jan. 2003, 10 pages.
Spreitzer et al., "Architectural Considerations for Scalable, Secure, Mobile Computing with Location Information", In The 14th International Conference on Distributed Computing Systems, Jun. 1994, pp. 29-38.
Spreitzer et al., "Providing Location Information in a Ubiquitous Computing Environment", SIGOPS 1993, Dec. 1993, pp. 270-283.
Spreitzer et al., "Scalable, Secure, Mobile Computing with Location Information", Communications of the ACM, Jul. 1993, 1 page, vol. 36—No. 7.
St. Amant et al., "Balancing Efficiency and Interpretability in an Interactive Statistical Assistant", International Conference on Intelligent User Interface 2003, pp. 181-188, Jan. 2003.
Starner, "Wearable Computing and Contextual Awareness", MIT, Jun. 1999, 248 pages.
Tan et al., "WinCuts: Manipulating Arbitrary Window Regions for More Effective Use of Screen Space", CHI 2004, Apr. 2004, pp. 1525-1528, ACM, Vienna, Austria.
Teitelman, "Ten Years of Window Systems—A Retrospective View", in F. Hopgood, et al., (Eds), Methodology of Window Management, Berlin: Springer-Verlag, Apr. 1986, pp. 35-46.
Theimer et al., "Operating System Issues for PDA's", In Fourth Workshop on Workstation Operating Systems, Oct. 1993, 7 pages.
U.S. Appl. No. 10/374,351, Advisory Action mailed Feb. 13, 2007, 4 pgs.
U.S. Appl. No. 10/374,351, Amendment and Response filed Jan. 10, 2012, 22 pgs.
U.S. Appl. No. 10/374,351, Amendment and Response filed Jan. 15, 2007, 5 pgs.
U.S. Appl. No. 10/374,351, Amendment and Response filed Dec. 27, 2010, 26 pgs.
U.S. Appl. No. 10/374,351, Amendment and Response filed Jun. 1, 2012, 20 pgs.
U.S. Appl. No. 10/374,351, Amendment and Response filed Jul. 6, 2011, 30 pgs.
U.S. Appl. No. 10/374,351, Amendment and Response filed Aug. 20, 2010, 26 pgs.
U.S. Appl. No. 10/374,351, Amendment and Response filed Sep. 11, 2006, 16 pgs.
U.S. Appl. No. 10/374,351, Appeal Brief filed Jan. 22, 2008, 19 pages.
U.S. Appl. No. 10/374,351, Appeal Brief filed Oct. 1, 2007, 19 pages.
U.S. Appl. No. 10/374,351, Appeal Brief filed Jun. 12, 2007, 19 pages.
U.S. Appl. No. 10/374,351, Examiners Answer to Appeal Brief, mailed Apr. 18, 2008, 17 pgs.
U.S. Appl. No. 10/374,351, Notice of Allowance mailed Oct. 18, 2011, 7 pgs.
U.S. Appl. No. 10/374,351, Notice of Allowance mailed Mar. 2, 2012, 5 pgs.
U.S. Appl. No. 10/374,351, Patent Board Decision mailed Jul. 13, 2010, 9 pgs.
U.S. Appl. No. 10/374,351, Reply Brief filed Jun. 18, 2008, 5 pages.
U.S. Appl. No. 10/851,459, Advisory Action mailed Nov. 4, 2008, 3 pgs.
U.S. Appl. No. 10/851,459, Amendment and Response filed Oct. 14, 2008, 12 pgs.
U.S. Appl. No. 10/851,459, Amendment and Response filed Dec. 18, 2007, 11 pgs.
U.S. Appl. No. 10/851,459, Amendment and Response filed Dec. 18, 2008, 12 pgs.
U.S. Appl. No. 10/851,459, Amendment and Response filed Feb. 27, 2009, 7 pgs.
U.S. Appl. No. 10/851,459, Amendment and Response filed Apr. 2, 2008, 9 pgs.
U.S. Appl. No. 10/851,459, Amendment and Response filed Jul. 6, 2007, 9 pgs.
U.S. Appl. No. 10/851,459, Notice of Allowance mailed Feb. 19, 2009, 11 pgs.
U.S. Appl. No. 10/851,459, Notice regarding non-compliant amendment, mailed Mar. 4, 2008, 3 pgs.
U.S. Appl. No. 10/851,569, Advisory Action mailed Jan. 5, 2009, 3 pgs.
U.S. Appl. No. 10/851,569, Amendment and Response filed Oct. 15, 2009, 18 pgs.
U.S. Appl. No. 10/851,569, Amendment and Response filed Oct. 22, 2008, 14 pgs.
U.S. Appl. No. 10/851,569, Amendment and Response filed Oct. 30, 2007, 10 pgs.

(56) References Cited

OTHER PUBLICATIONS

U.S. Appl. No. 10/851,569, Amendment and Response filed Dec. 16, 2010, 21 pgs.
U.S. Appl. No. 10/851,569, Amendment and Response filed Feb. 27, 2009, 13 pgs.
U.S. Appl. No. 10/851,569, Amendment and Response filed Mar. 25, 2008, 5 pgs.
U.S. Appl. No. 10/851,569, Amendment and Response filed Apr. 12, 2010, 18 pgs.
U.S. Appl. No. 10/851,569, Amendment and Response filed Jul. 11, 2011, 25 pgs.
U.S. Appl. No. 10/851,569, Amendment and Response filed Jul. 2, 2007, 19 pgs.
U.S. Appl. No. 10/851,569, Amendment and Response filed Jul. 29, 2008, 11 pgs.
U.S. Appl. No. 10/851,569, Amendment and Response filed Jul. 7, 2009, 16 pgs.
U.S. Appl. No. 10/851,569, Notice of Allowance mailed Mar. 12, 2012, 7 pgs.
U.S. Appl. No. 10/851,569, Notice regarding non-compliant amendment mailed Sep. 15, 2009, 3 pgs.
U.S. Appl. No. 10/851,928, Advisory Action mailed Feb. 11, 2008, 3 pgs.
U.S. Appl. No. 10/851,928, Amendment and Response filed Jan. 18, 2008, 15 pgs.
U.S. Appl. No. 10/851,928, Amendment and Response filed Sep. 26, 2007, 20 pgs.
U.S. Appl. No. 10/851,928, Notice of Allowance mailed Apr. 11, 2008, 8 pgs.
Want et al., "The Active Badge Location System", ACM Transactions on Information Systems, Jan. 1992, pp. 91-102, vol. 10—No. 1.
Want et al., "Active Badges and Personal Interactive Computing Objects", IEEE Transactions on Consumer Electronics, Feb. 1992, 11 pages, vol. 38, No. 1.
Weiser, "Some Computer Science Issues in Ubiquitous Computing", Communications of the ACM, Jul. 1993, pp. 75-84, vol. 36—No. 7.
Weiser, "The Computer for the 21st Century", Scientific American, Sep. 1991, 8 pages.
Workshop on Wearable Computing Systems, (Schedule and Breakout Session Info) Aug. 19-21, 1996.
XDESK Software, "About Virtual Desktop Managers", retrieved on 5117/06 at <<http://www.virtual-desktop.info/>>, last accessed on May 17, 2006, 3 pgs.
U.S. Appl. No. 13/553,266, Office Action mailed Aug. 27, 2014, 11 pgs.
U.S. Appl. No. 13/553,266, Office Action mailed Feb. 4, 2015, 12 pgs.
U.S. Appl. No. 13/553,266, Amendment and Response filed Apr. 22, 2015, 8 pgs.
U.S. Appl. No. 13/553,266, Office Action mailed Jun. 1, 2015, 12 pgs.
U.S. Appl. No. 13/553,266, Amendment and Response filed Aug. 31, 2015, 10 pgs.
U.S. Appl. No. 13/553,266, Office Action mailed Nov. 12, 2015, 8 pgs.
Brazilian Office Action in Application PI0400315-2, mailed Mar. 13, 2016, 4 pgs.
U.S. Appl. No. 13/553,266, Amendment and Response filed Nov. 17, 2014, 9 pgs.

\* cited by examiner

SCALING OF DISPLAYED OBJECTS WITH SHIFTS TO THE PERIPHERY

CROSS-REFERENCE TO RELATED APPLICATIONS

This application is a continuation application of U.S. Pat. No. 8,225,224, entitled COMPUTER DESKTOP USE VIA SCALING OF DISPLAYED OBJECTS WITH SHIFTS TO THE PERIPHERY, and filed on May 21, 2004, which is a continuation-in-part application of U.S. Pat. No. 8,230,359, entitled SYSTEM AND METHOD THAT FACILITATES COMPUTER DESKTOP USE VIA SCALING OF DISPLAYED OBJECTS WITH SHIFTS TO THE PERIPHERY, and filed on Feb. 25, 2003, which are incorporated herein by reference in their entirety.

BACKGROUND

Various graphical user interfaces have been developed to provide a rich experience for computer users. Computer programs typically provide a graphical user interface (GUI) to facilitate data entry, to enable viewing output on a display screen, as well as to manipulate or rearrange data. A graphical user interface can be associated with an application program or operating system shell, which may be running on a user's local machine and/or remotely, such as in a distributing computing system or over the Internet.

In view of continuing technological developments and increasing use of the Internet, people are using computers to access information to an ever-increasing extent. Such information can reside locally on the person's computer or within a local network or be global in scope, such as over the Internet.

Users of window-based graphical user interfaces face difficult problems when they employ a same machine for multiple tasks or activities. They often have a large number of windows to manage, with one or more windows for each task. Switching among tasks is difficult because the windows often may be scattered around the display surface. Moreover, if windows are minimized while not in use, they are typically not organized together. If not minimized, a user can be faced with a difficult task of locating all relevant obscured windows and bringing them to a top of a display.

When users begin employing large display configurations (e.g., multiple monitors), managing windows and tasks becomes an ever more difficult problem, because minimized windows are kept in a location that may be significantly distant from where they will be used. Managing many display objects on small displays (e.g., PDA's) is also difficult—in such case, oftentimes sufficient screen space is not available to display objects of interest.

Although various attempts have been made via conventional user interface schemes to address some of the aforementioned concerns, there is still a substantial unmet need for a system and/or methodology that facilitates efficient use of valuable computer desktop real estate in a multi-task working environment.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates to a system and/or method that provides for interaction technique(s) and user interface(s) in connection with managing display objects on a display surface. The inventors of the subject invention have found that as displays become larger, users leave more windows open for easy multitasking. A larger number of windows, however, may increase the time that users spend arranging and switching between tasks. The subject invention relates to a task management system that mitigates problems associated with proliferation of open windows on a personal computer (PC) desktop. The invention couples a flexible visual representation with window management to provide a focus-plus-context solution to desktop complexity. Users interact with windows in a central focus region of a display in a normal manner, but when a user moves window(s) into a periphery region, the window(s) shrinks down in size, getting smaller as they near an edge of the display. The Window "minimize" action is redefined to return the window to its preferred location in the periphery, allowing windows to remain visible when not in use. Windows in the periphery can be grouped together into named tasks, and task switching can be accomplished with a single mouse click. The spatial arrangement of tasks in accordance with the present invention leverages human spatial memory to make task switching easier.

The subject invention enhances windows and task management by affording for the handling of large numbers of concurrent windows, potentially clustered by task, a fundamentally more natural and effective experience. More particularly, a windows management system/methodology in accordance with the invention assists users in managing tasks for example on a Windows® desktop, allocating screen real estate in accordance with a user's attention, using a focus-plus-context display. The periphery of the screen is used to hold scaled down live windows rather than hiding them with traditional windows minimization. In order to facilitate task switching, the invention allows users to group collections of windows that are used together (e.g., tasks refer to groups of windows that are used together).

Although conventional virtual desktop managers typically impose strict separation between tasks, the subject invention provides for users to simultaneously display substantially any subset of windows, even if they should be assigned to different tasks. The invention makes use of the periphery of the display for spatial layout of tasks, in addition to leveraging users' efficient visual recognition memory for images. Moreover, the invention allows users to leave windows and clusters of windows open and visible at all times via a process of scaling down and moving the windows and clusters to the periphery.

One aspect of the invention defines one or more central focus area(s) where the display objects are displayed and behave as usual, and a periphery outside the focus area(s) where the display objects are reduced in size based on their location, getting smaller as they near an edge of the display surface so that many more objects can remain visible. In addition or alternatively, the objects can be diminished along dimensions defined by other properties of visual salience such as opacity, luminosity, and saturation as they move away from a focus region. Thus objects may fade and/or become increasingly transparent as they move toward an edge—e.g., fading increasing as a function of distance from the focus area and/or use of the object and/or priority of the object. Objects in the periphery can also be modified to have different interaction behavior (e.g., lower refresh rate, fading, reconfigured to display sub-objects based on relevance and/or visibility, static, etc.) since they may be too small for standard techniques.

The invention can be implemented in connection with any suitable display area (e.g., large display surfaces, standard display surfaces and small, for example PDA, displays as well). The invention has wide applicability to window and task management in a multi-task computing environment, for example. In such cases, display objects are typically windows although they can be objects (e.g., icons, documents, presentations, media, pictures, audio files, video files etc.) as well. In the focus area, the windows can have a standard appearance and behavior. When the display objects cross into a periphery of the focus area, the objects reduce in size and the behavior can change to a much simpler set of interactions. For example, refresh rate of the windows can be made a function of size and/or distance from the focus area. In addition or alternatively, the windows outside of the periphery can become static until repositioned into the focus area.

By grouping windows in the periphery into clusters, and supporting cluster operations (e.g., move all cluster windows into the focus area, or move windows in the focus area back to their peripheral location), the invention significantly facilitates task management, allowing user(s) to easily swap from one task (or activity) to another.

Another aspect of the invention provides for employing computer-based intelligence (e.g., inference, probabilistic determination, statistical determination, machine learning etc.) that can move the display objects as a function of activity and/or priority associated therewith. For example, display objects that have not been used for a predetermined period of time can be made to drift from the focus area to the edge of the display space—alternatively, windows requiring notification attention can move toward the focus region. Likewise, size of the display object can also be automatically adjusted as a function of various pre-defined and/or learned metrics. Moreover, based on computer-based inference as to a user desired display of object(s), object(s) can automatically be moved to the focus area for interaction therewith based at least upon predetermined and/or learned metrics associated with user use and inferred intentions. Finally, notifications or other objects determined based on a computer-based inference as to be related to objects in the focus or peripheral areas, could be automatically clustered with similar items in the appropriate spatial location.

It is to be appreciated that the subject invention is not limited to window and/or task management, but can work for any suitable kind of display objects. For example, the invention can be employed in connection with photo management.

One particular aspect of the invention relates to a notion of automated, patterned, canonical display object (e.g., window) motion given enlargement or opening of indicia at a center of focus. A concept behind such notion is the idea that the invention can include flexible policies for effecting shifts of multiple display objects so as to automatically move older, less active objects into a periphery.

Another particular aspect of the invention relates to a notion of fundamental transitions or phases of transition that can be discontinuous, also to maintain, in a substantially continuous manner scaling properties associated therewith. In such case, a minimum density or resolution of an object can be established as a threshold and the object can be rendered into a different, potentially less visually accessible representation—and the object(s) can be re-rendered when other object(s) are closed. Thus, the subject invention can provide for several multilevel transitions, including continuous and potentially discontinuous transitions.

Yet another aspect of the invention provides for continuously adding more objects and a mechanism for automatically shifting and moving off and on objects, in a manner that keeps the respective objects on a screen usable (e.g., above a particular resolution). The invention also provides a means for implicitly returning to similar state(s) as newer objects are closed.

Another aspect of the invention relates to display object occlusion avoidance within a display area (e.g., focus area, periphery or progressive shrink area)—such aspect of the invention mitigates objects from obscuring one another. An extension of this aspect relates to cluster occlusion avoidance which mitigates clusters from obscuring other clusters as well as mitigating merging (e.g., since clustering can be proximity based) of clusters as a result of moving clusters.

Thus, the subject invention mitigates many of the aforementioned windows and task management problems by keeping windows open but making them much smaller when they are not in use. By doing so, it becomes possible to maintain a large number of windows around the periphery of the display. Task management is supported by placing windows into clusters that represent tasks and adding some simple mechanisms for task switching. Human spatial memory can be used to facilitate locating a desired window or task. The invention also mitigates a display object management problem for small displays, because the objects in the periphery take so little space.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION

Figure 1:
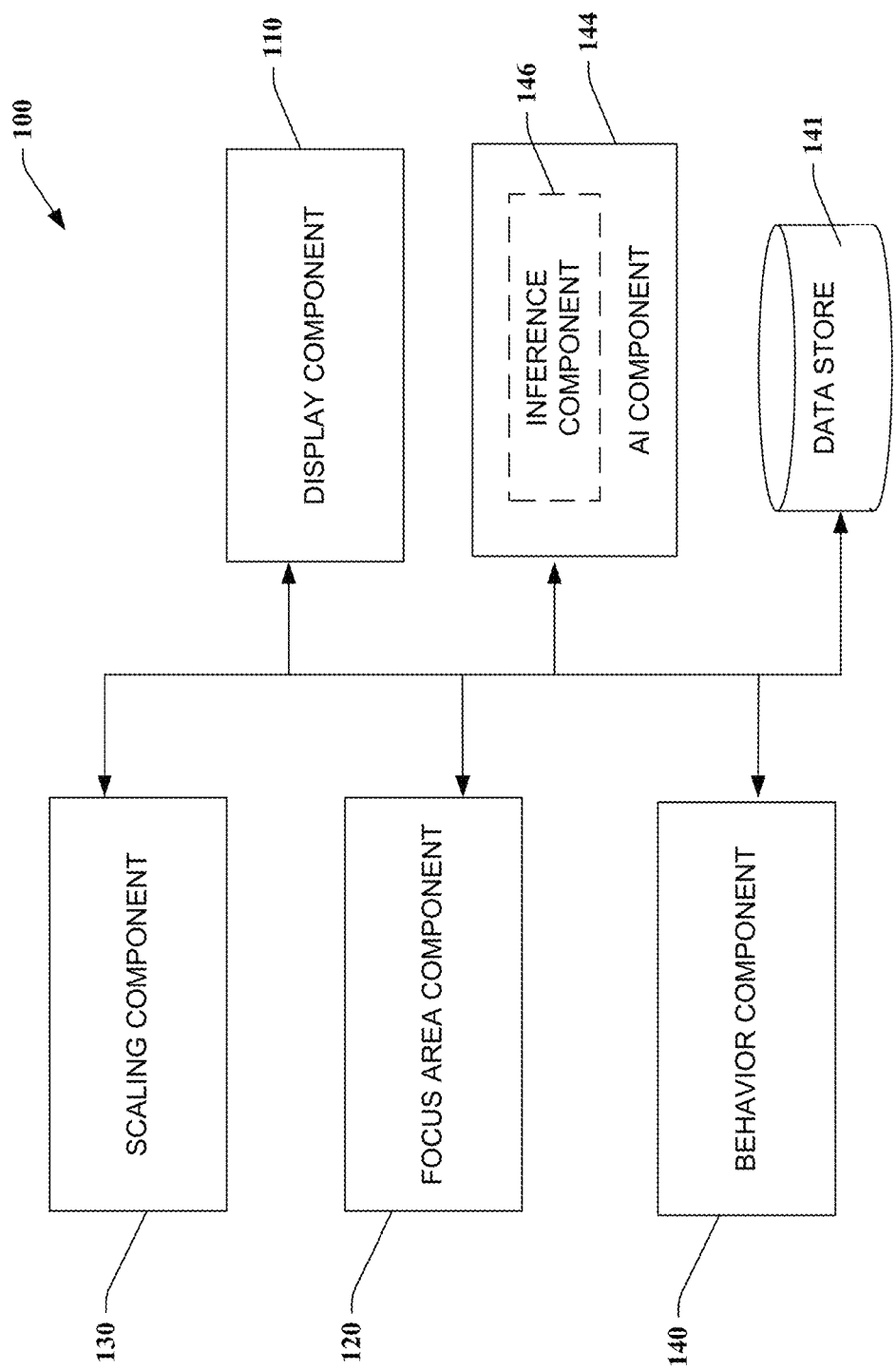
FIG. 1 illustrates a general block diagram of a display system in accordance with the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The subject invention can incorporate various inference schemes and/or techniques in connection with scaling and/or modifying behavior of display objects. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events, or decision theoretic, building upon probabilistic inference, and considering display actions of highest expected utility, in the context of uncertainty in user goals and intentions. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 2:
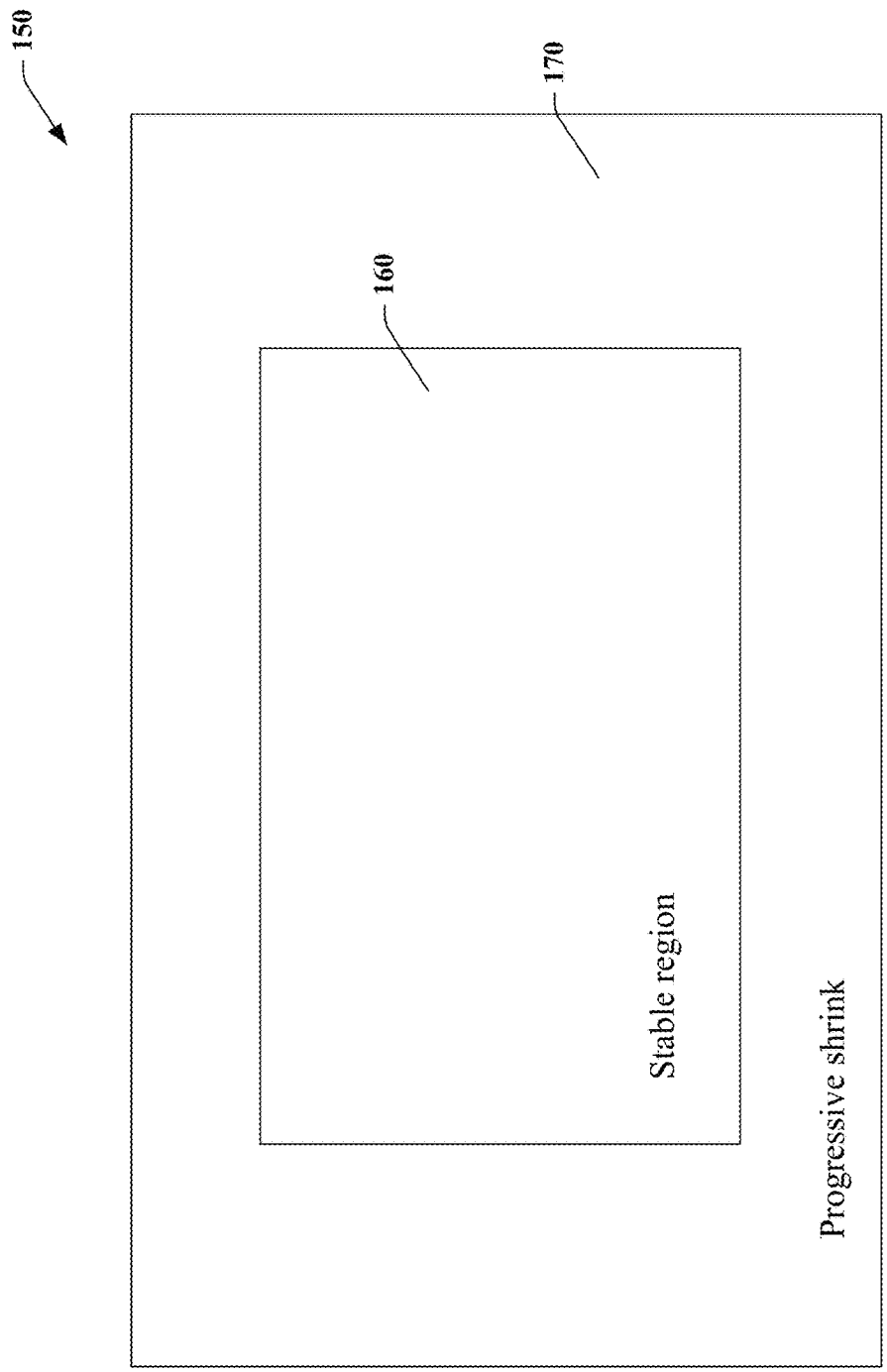
FIGS. 2-4 illustrate a display space having a stable region (e.g., focus area) and a progressive shrink region in accordance with the subject invention.
Figure 3:
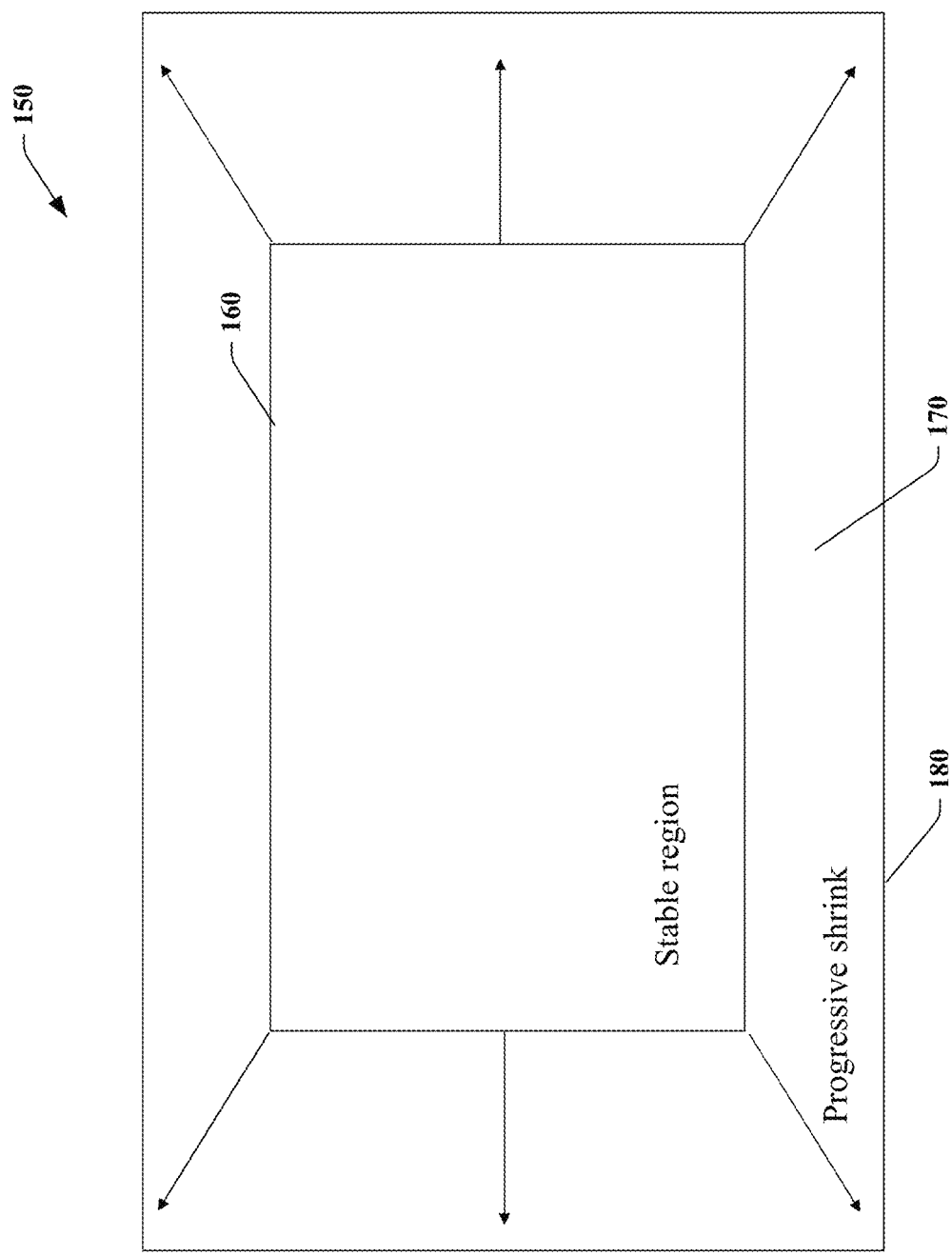

FIG. 1 illustrates a schematic representation of an aspect of a system 100 that facilitates controlling display object behavior in accordance with the subject invention. A display component 110 effects rendering of display objects on a display space (not shown). The display space is typically a screen in connection with a computing system or device (e.g., desktop computer, laptop computer, personal data assistant, wireless telephone, television etc.). It is to be appreciated that the invention can be employed in connection with multiple displays, multiple focus regions and/or multiple peripheral areas. The system 100 further comprises a focus area component 120, a scaling component 130 and a behavior component 140. It is to be appreciated that some or all of these components can be part of a single component and/or comprise a plurality of sub-components to implement various aspects of the subject invention. The focus area component 120 provides for defining a stable region or focus area (see e.g., reference number 160 at FIG. 2). The focus area component 120 can also define a progressive shrink area (see e.g., reference number 170 at FIG. 2) which is typically located on an outside periphery of the focus area.

The scaling component 130 provides for selectively scaling attributes of a display object as a function of location of the display object within the display space. For example, when display object(s) are within the focus area 160 the display objects are displayed and behave as usual. When display objects are moved outside of the focus area 160 into the progressive shrink region 170, the display objects can be reduced in size based on their location, getting smaller as they near an edge of the display surface so that many more objects can remain visible. It is to be appreciated the display object(s) can be moved outside of and into the focus area manually (e.g., via a user employing a mouse), and it is contemplated that display object(s) can be automatically moved outside of and into the focus area by the system 100. Automatic action (e.g., relocating of objects) can be taken as a function of the system 100 inferring a user's intentions with respect to manipulating display object(s). With respect to taking automatic action, machine learning techniques can be implemented to facilitate performing automatic action. Moreover, utility based analyses (e.g., factoring benefit of taking correct automatic action versus costs of taking incorrect action) can be incorporated into performing the automatic action.

The behavior component 140 can provide for modifying behavior of display objects in accordance with the subject invention. For example, display object(s) located within the focus area 160 can behave in a standard manner with full functionality. When display object(s) are located outside of the focus area 160, functionality associated with the display object(s) can be modified. For example, refresh rates of the display object(s) can be modified as a function of proximity to the focus area 160 and/or to an edge of the display space. In other words, objects in the periphery can also be modified to have different interaction behavior (e.g., lower refresh rate, static etc.) since they may be too small for standard techniques. In addition or alternatively, the objects can fade as they move toward an edge—fading increasing as a function of distance from the focus area and/or use of the object and/or priority of the object.

Beyond smooth manipulation of such aforementioned homogenous graphical properties with moves to the periphery, the subject invention can also facilitate richer notions of compression with the diminishing size of objects, including compression with selective elision of unimportant components of an object and the selective sizing of multiple components, so as to maximize likelihood that the object would still be recognizable in its reduced formulation. For example, key headings and distinctive figures might be reduced proportionally less than lesser distinctive objects with the decreasing size of objects. Moreover, the number of display object(s) within the display space as well as within the respective sections (e.g., focus area, and progressive shrink area) can be factored into modifying behavior of the display object(s). The behavior component 140 can apply any suitable number of and/or combination of metrics (e.g., processing overhead, display space, number of display objects, relative location of display objects, similarity to or priority associated with respective display objects, time of day, user state, etc.) in connection with modifying display object behavior in accordance with the subject invention.

As noted above, the invention also can provide for object occlusion avoidance within a display area (e.g., focus area, periphery or progressive shrink area)—such aspect of the invention mitigates objects from obscuring one another. An extension of this aspect relates to cluster occlusion avoidance which mitigates clusters from obscuring other clusters as well as mitigating merging (e.g., since clustering can be proximity based) of clusters as a result of moving clusters. These features are discussed in greater detail infra.

The system 100 also includes a data store 141 that can be employed to store information (e.g., historical data, user profile data, display object data, system data, state information, algorithms, databases, display object current and/or previous state data, user current and/or previous state info. multiple user info., task-related data, etc.) in connection with the subject invention.

The system 100 can optionally include a reasoning component employing principles of artificial intelligence (AI) 144 to facilitate automatically performing various aspects (e.g., modifying behavior of display object(s), scaling of display object(s), changing size and/or location of focus areas, changing size and/or location of progressive shrink areas, changing geometries of respective focus areas, changing geometries of respective progressive shrink areas, turning on and off functionalities associated with display objects, focus areas, progressive shrink areas, side bars, etc.) of the subject invention as described herein. The AI component can optionally include an inference component that can further enhance automated aspects of the AI component utilizing in part inference based schemes to facilitate inferring intended actions to be performed at a given time and state. The AI-based aspects of the invention can be effected via any suitable machine-learning based technique and/or statistical-based techniques and/or probabilistic-based techniques. For example, the use of expert systems, fuzzy logic, support vector machines, greedy search algorithms, rule-based systems, Bayesian models (e.g., Bayesian networks), neural networks, other non-linear training techniques, data fusion, utility-based analytical systems, systems employing Bayesian models, etc. are contemplated and are intended to fall within the scope of the hereto appended claims.

Although for ease of understanding, only a single focus area, progressive shrink area and display area are shown, it is to be appreciated that multiples of any and all of these areas is contemplated and intended to fall within the scope of the hereto appended claims. For example, more than one focus area can exist with a display space, and locations of such focus areas can be defined as desired. Moreover, functionality of respective focus areas can differ respectively (e.g., so as to optimize multi-tasking). Likewise, multiple progressive shrink areas can be defined, and functionality (e.g., with respect to modifying display object behavior) can be varied as desired.

Figure 18:
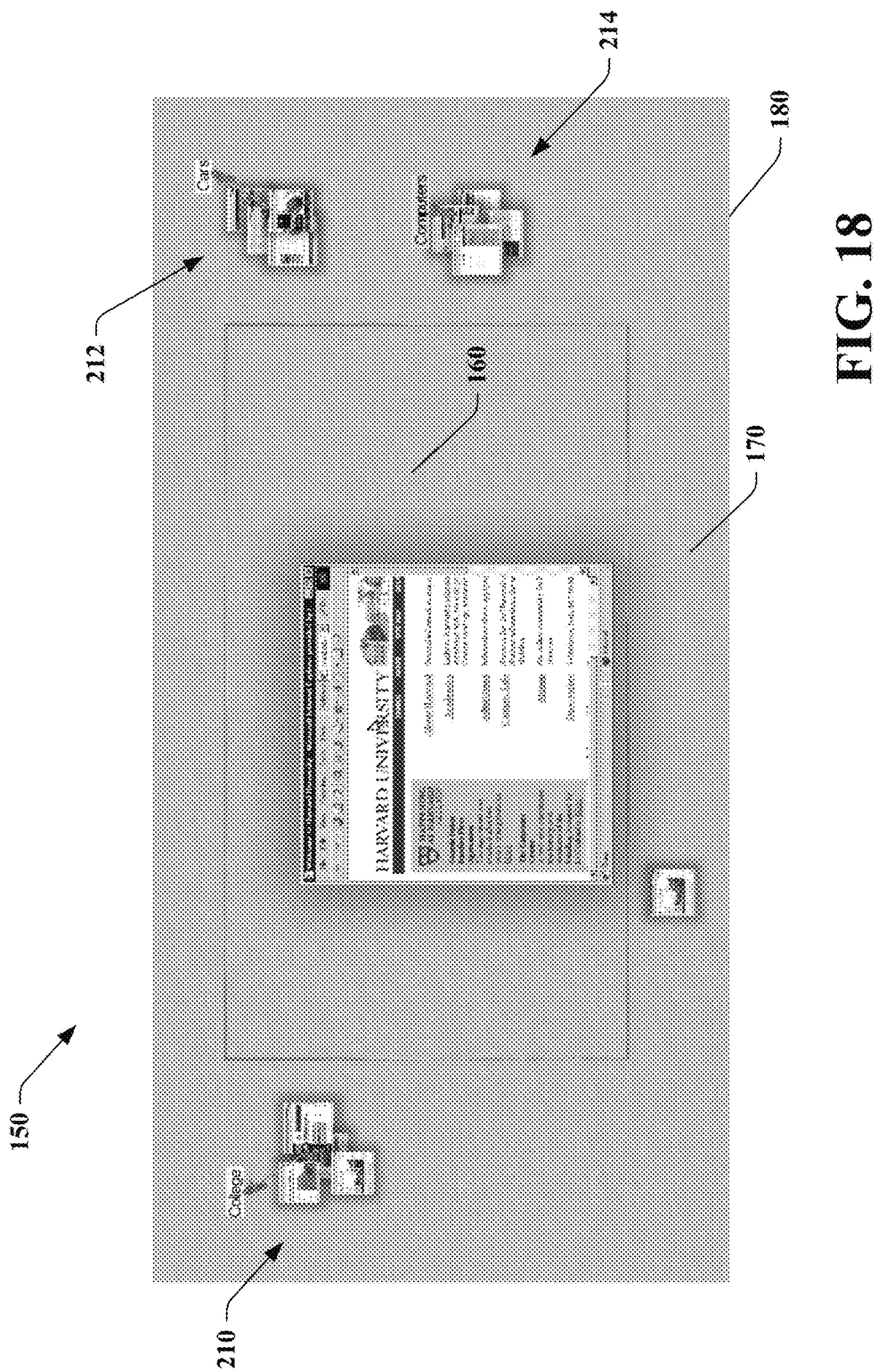
FIG. 18 illustrates a plurality of display objects and behavior thereof in accordance with the subject invention.

Thus in accordance with the subject invention a user defines a central focus area on a display surface by moving periphery boundary markers to desired locations. As shown in FIG. 18, these boundary markers are visible, but users usually hide the boundary markers unless they are changing the size or shape of the focus area, in which case the markers serve as resize handles. Within the focus area, windows behave as they normally do in the Windows® desktop. The periphery contains windows and collections of windows (or tasks) that are not currently in use, but may be put to use at any moment. Windows in the periphery are smaller so that more tasks can be held there when the user is focusing on something else. With this metaphor, users will rarely need to close or minimize windows in a traditional sense. Users typically want to take advantage of extra screen real estate, especially on larger displays, to allow the peripheral windows to always be visible. When a user moves a window into the periphery, it shrinks monotonically with distance from the focus periphery boundary, getting smaller as it nears the edge of the screen. For example, with respect to one particular manner in which to implement such aspect of the invention, there can be a user defined maximum scale factor which is used just as an object enters the periphery (e.g., 50%). There can be a user defined minimum scale factor which is employed when the object is at a display edge (e.g., 10%). One function between these two can be a linear interpolation, but could also be any suitable function. For example, it could decrease slowly at first, then decrease rapidly, then decrease slowly at the end. This would provide what animators deem "slow-in, slow-out" behavior. Also, when the object is first dragged into the periphery, a short transition animation (e.g., 0.5 second) is initiated, which limits the scale factor to the greater of the function's output and a linear interpolation between 100% and the maximum scale factor, for example. So, such animation can run concurrently with the user dragging the object, which provides for an appearance of a smooth adjustment across the boundary. Without this animation, the transition might be an abrupt jump from 100% to whatever the maximum scale factor is (e.g., 50%).

When the user clicks on a window in the periphery, it returns to its last focus position; this is a "restore" behavior, and can accomplished with an animation (e.g., one second) of the window moving from one location to the other. When the user "minimizes" a window in the focus area, e.g., by clicking the window's 'minimize' button, it returns to its last peripheral position. When a window is moved around in the periphery, other windows temporarily move out of the way, which mitigates obscuring one peripheral window with another. The invention employs natural metaphors and gestures that allow users to define, access, and switch among tasks. To define tasks, windows in the periphery are grouped into clusters associated with a colored banner showing which cluster they are in. Moving a window near a cluster marker makes it part of that cluster. When clusters are moved around, they avoid each other similar to the way windows avoid one another. Such behavior makes it easy for users to construct task clusters by dragging and dropping windows onto groups of windows.

To create a new task, the user simply moves a window near another that is not in a task. The new task is then created implicitly. The user can return later and rename the task. Until the task is named, it is ephemeral. That is, if the last window is moved out of an ephemeral task, the task will be un-created (e.g., the task marker will disappear).

Natural gestures are also provided to allow users to access and toggle among tasks efficiently. When a user clicks on a task marker, the entire task is selected, restoring its windows to their focus positions. If the user clicks on a task marker when all of its windows are currently in the focus area, each window returns to its peripheral position. If one task is selected and the user clicks on a different task marker, a task switch occurs, e.g., all windows of the current task move to their peripheral positions, and the windows comprising the task being selected in the periphery move to their previous configuration in the focus area.

The user's choice of focus area location and size is often influenced by configuration and capabilities of respective physical displays. For example, on a triple-monitor display, some users may prefer to define a central monitor as the focus area, with no upper or lower peripheral regions and the side monitors as the side peripheral regions. The information in the periphery may be occasionally obscured by open windows (e.g., a maximized window). This can be resolved with two mechanisms. First, any interaction that involves the periphery should make all periphery windows and task markers visible. Second, there should be some way to make the periphery visible on demand. A solution in connection with the subject invention is that any time the user bumps the cursor into any screen edge and holds it there briefly (e.g., 250 milliseconds), the periphery auto reveals itself. If the user interacts with any window not in the periphery, the periphery will drop to the bottom of the window z-order.

The subject invention is a focus-plus-context display in the sense that it smoothly integrates user focus of attention with context of other work (e.g., competing or potentially related tasks) displayed in the user's periphery. For moving and scaling windows and groups of windows in accordance with the subject invention, windows are rectangles rather than points, it is important to identify a point about which scaling occurs. One particular aspect of the invention uses cursor location (e.g., the drag point) as the scale point. When moving a group, simply scaling the windows in the group is not sufficient. In the present invention, by scaling distances from the window centers to the center of the group results in a user pleasing effect—that is, as the group gets smaller, the windows move closer together. When a window moves across the scaling boundary, an abrupt change in scale is disconcerting. The invention applies a predetermined (e.g., half-second) transition animation to the new scale, which results in more graceful solution as compared to conventional approach (e.g., ramp-zone).

The subject invention will now be described with respect to many figures that are intended to emphasize various generalizable aspects of the subject invention—it is to be noted that these figures are not intended to be exhaustive of the novel features of the subject invention but rather are meant to be examples of a set of generalizations in accordance with the subject invention. One particular aspect of the invention relates to a notion of automated, patterned, canonical display object (e.g., window) motion given enlargement or opening of indicia at a center of focus. A concept behind such notion is the idea that the invention can serve as a "scalable fabric," to reconfigure one or more objects on a display surface, based on automatic or semi-automatic reconfiguration of the sizing and or position of multiple displayed objects, in reaction to the addition, deletion, and movement of objects (e.g., windows) by users or automated processes. Display surfaces that gracefully scale to hold increasing numbers of items, while still providing detail to users about important objects, can be supported by flexible policies for effecting shifts of multiple display objects so as to automatically move older, less active objects into a periphery, and to bring back objects moved off the display when room becomes available through the closing or minimization of other windows. Some of the following discussed figures capture a physical "pressure model" but it is to be appreciated that other suitable models can be employed and are intended to fall within the scope of the hereto appended claims.

Another concept is a notion of fundamental transitions or phases of transition that can be discontinuous, also to maintain, in a substantially continuous manner scaling properties associated therewith. In such case, a minimum density or resolution of an object can be established as a threshold and the object can be rendered into a different, potentially less visually accessible representation—and the object(s) can be re-rendered when other object(s) are closed. Thus, the subject invention can provide for several multilevel transitions, including continuous and potentially discontinuous transitions.

The subject invention provides for continuously adding more objects and a mechanism for automatically shifting and moving off and on objects, in a manner that keeps the respective objects on a screen usable (e.g., above a particular resolution). The invention also provides a means for implicitly returning to similar state(s) as newer objects are closed.

Figure 4:
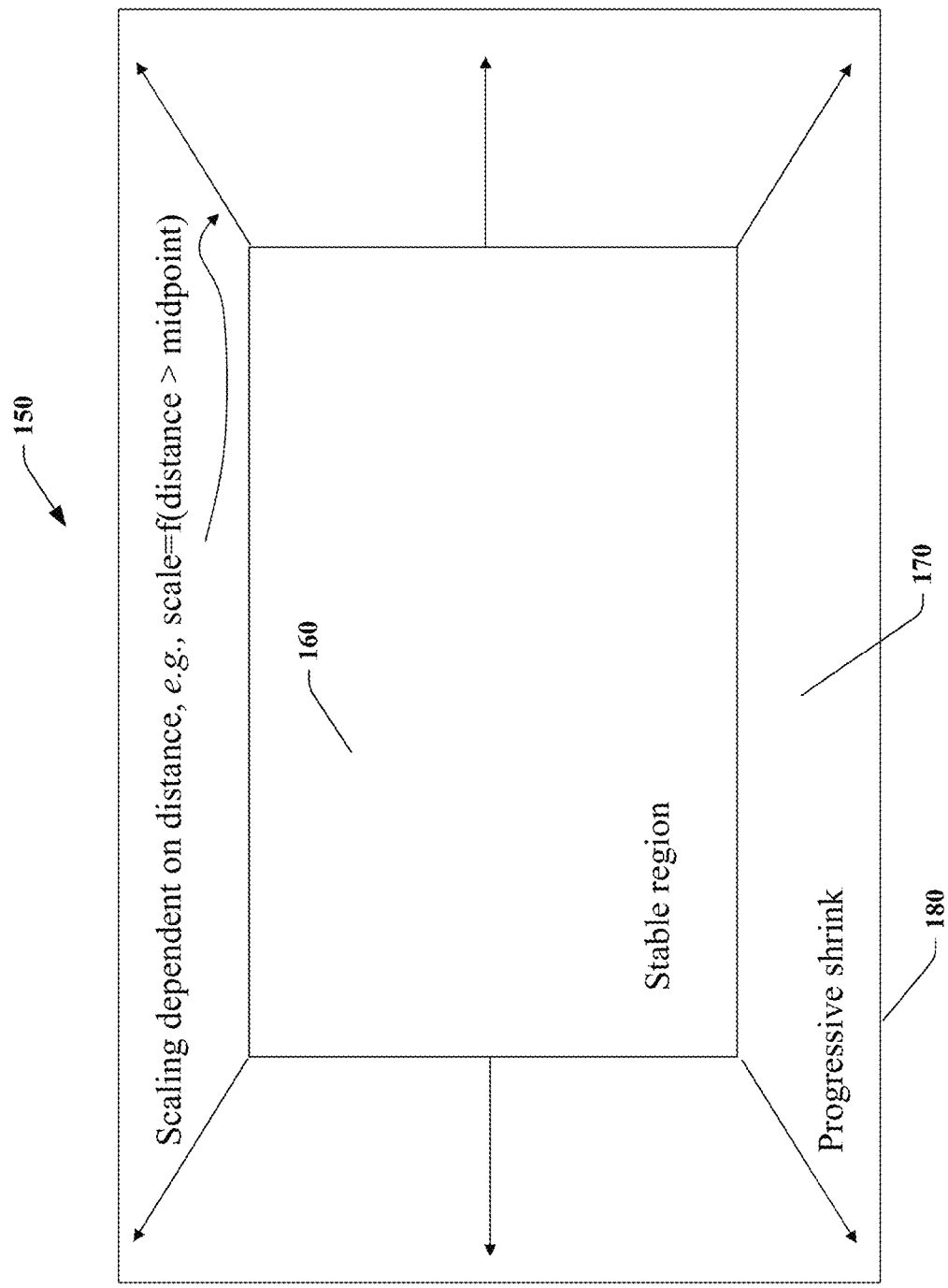
Figure 5:
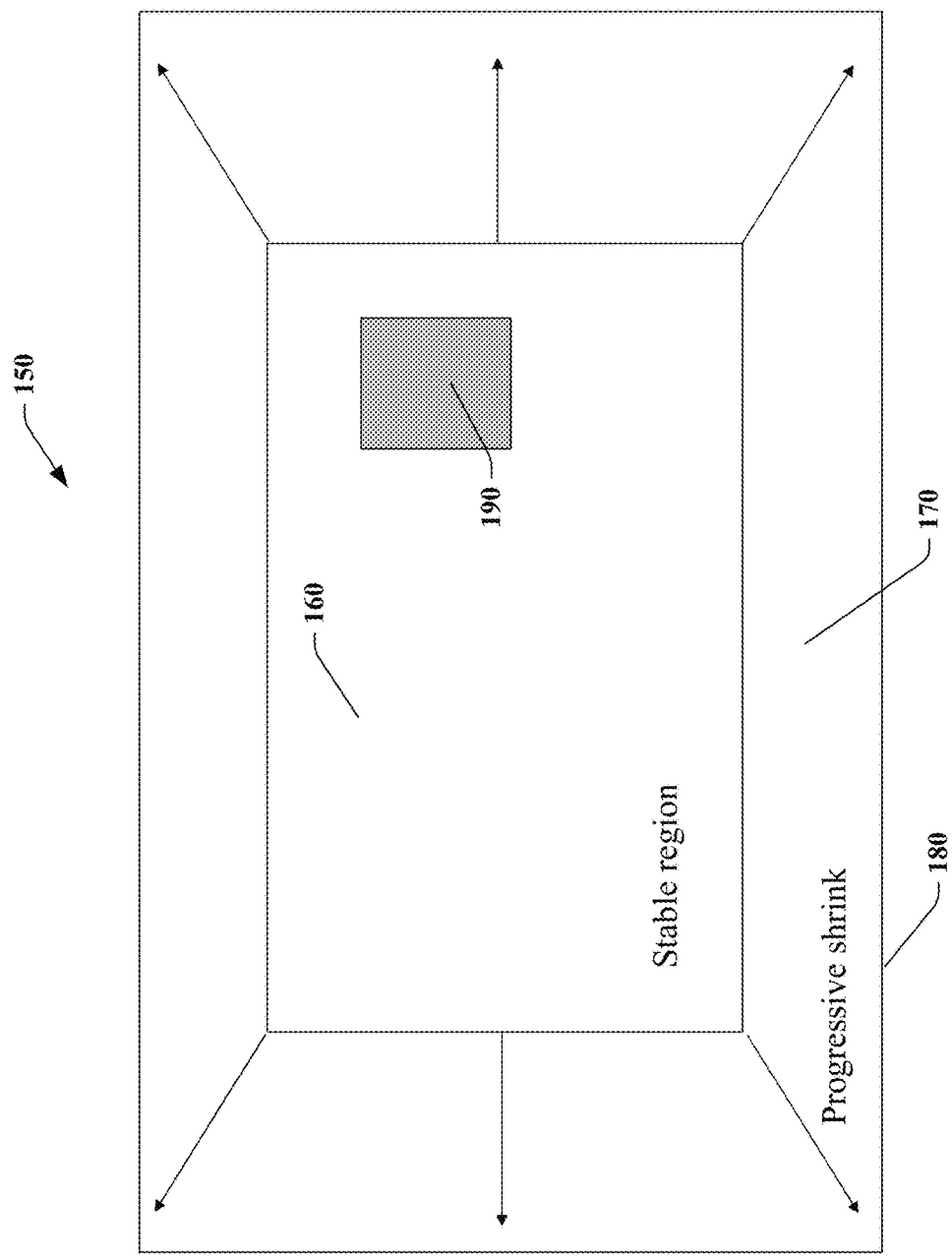
FIGS. 5-13 illustrate a display object changing behavior in accordance with the subject invention.
Figure 6:
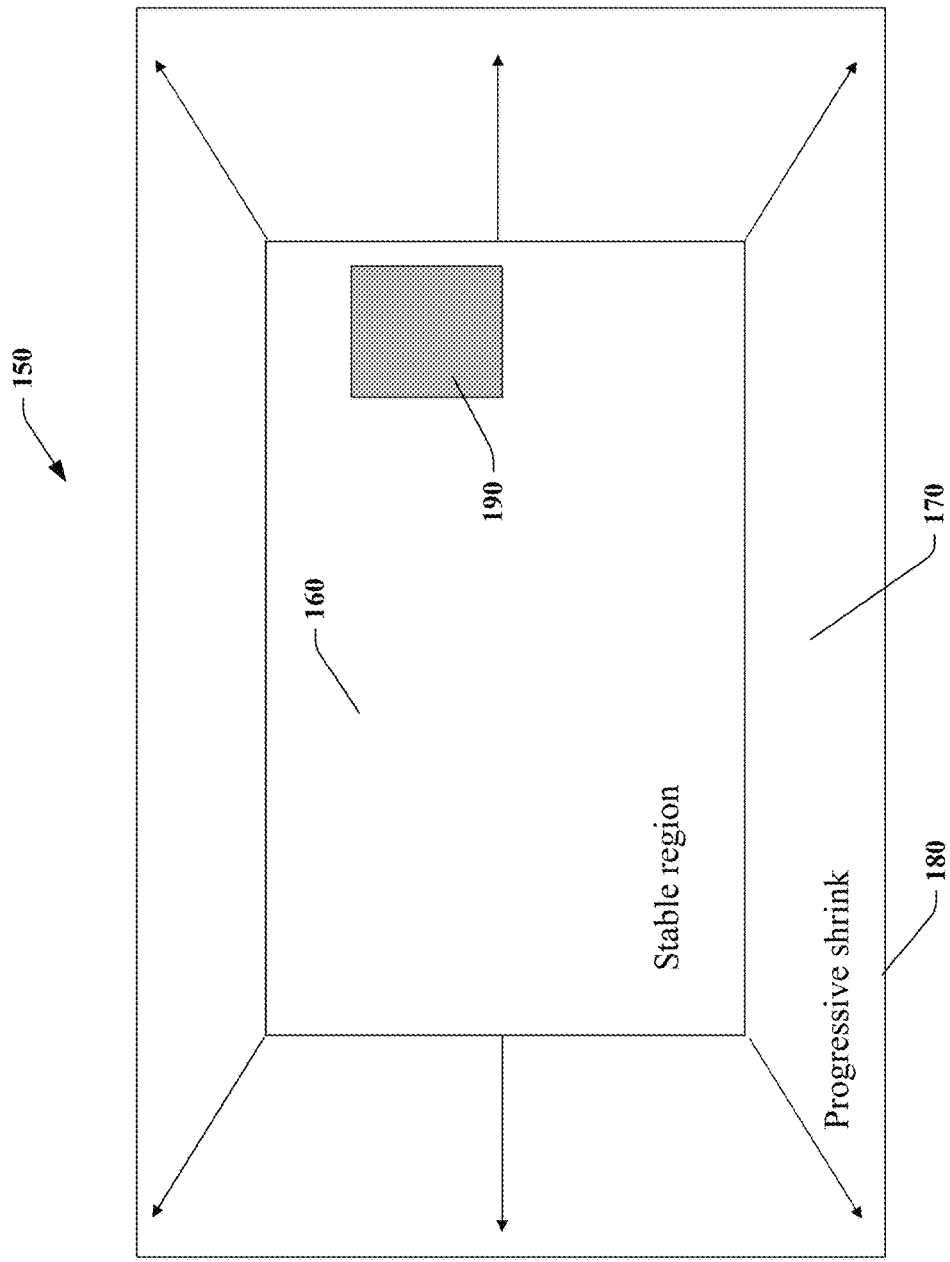

FIGS. 2-13 illustrate a stable region (focus region) 160 and a periphery region (e.g., progressive shrink region) 170 and a display object 190 changing behavior based on at least location within a display space 150 in accordance with the subject invention. It is to be appreciated that the periphery of the stable region 160 can be demarcated with an outline (e.g., dashed line) or made invisible based upon user preference. Moreover, if desired the stable region 160 can have a different background or wallpaper than that of the progressive shrink region 170. As shown in FIG. 4, scaling of display objects can be based on a function of distance from the focus area 160 and/or an edge 180 of the display area. Moreover, the scaling can be a function of a variety of predetermined and/or learned metrics as discussed in part supra. It is to be appreciated that initiation of scaling of display objects can be implemented as a function of a variety of physical parameters with respect to display object(s) and relative proximity to the focus area 160 and/or edge 180. For example, scaling can be initiated as soon as any portion of a display object crosses a periphery of the focus area 160. Alternatively, scaling can be effected as a function of distance from a midpoint (or other reference point) of the focus area 160. Scaling could also be effected as a function of speed of movement of display object(s) and/or relative center of mass. Scaling could also be initiated as a function of size of display object(s) and display area constraints so as to facilitate optimization of valuable display space real estate.

Scaling can also be initiated when the cursor (being used for the object drag movement) crosses a periphery boundary as discussed in greater detail below. Moreover, it is to be appreciated that scaling and/or behavior modification in accordance with the subject invention can be based on linear and/or non-linear functions. For example, scaling can be based on a linear function relating to proximity to the focus area and/or an edge of the display space. To avoid appearance of abruptness, non-linear based techniques can be employed to effect smoother transitioning from one state to another. Regarding display space corners, a variety of object and/or cluster scaling and behavior modification techniques can be employed. One specific example is to scale objects in corners as a function of minimum of scales as defined by respective horizontal and/or vertical positions of the objects relative to the corner. It is to be appreciated that any suitable technique for effecting smooth and natural scaling and/or modification to objects and clusters is contemplated and intended to fall within the scope of the hereto appended claims.

Figure 7:
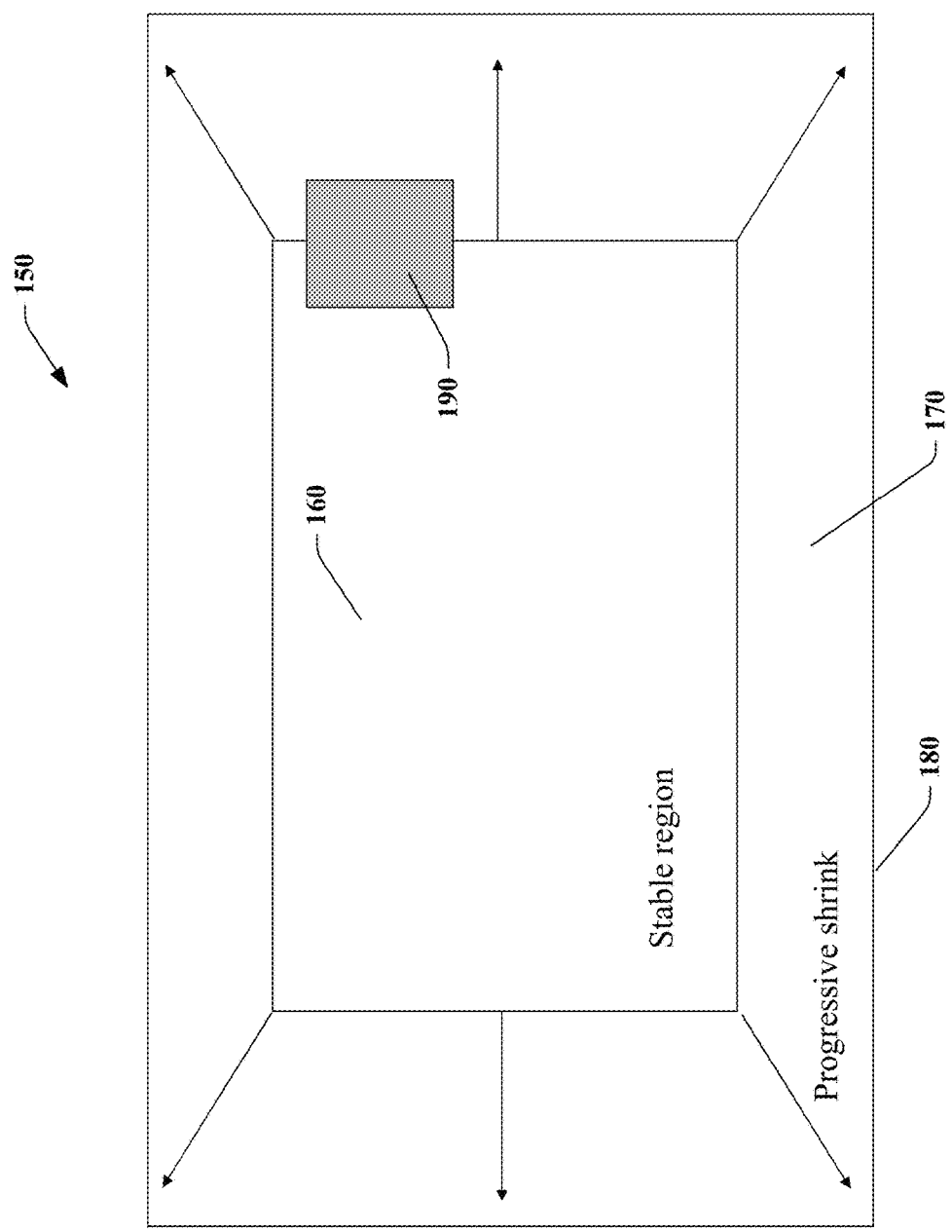
Figure 8:
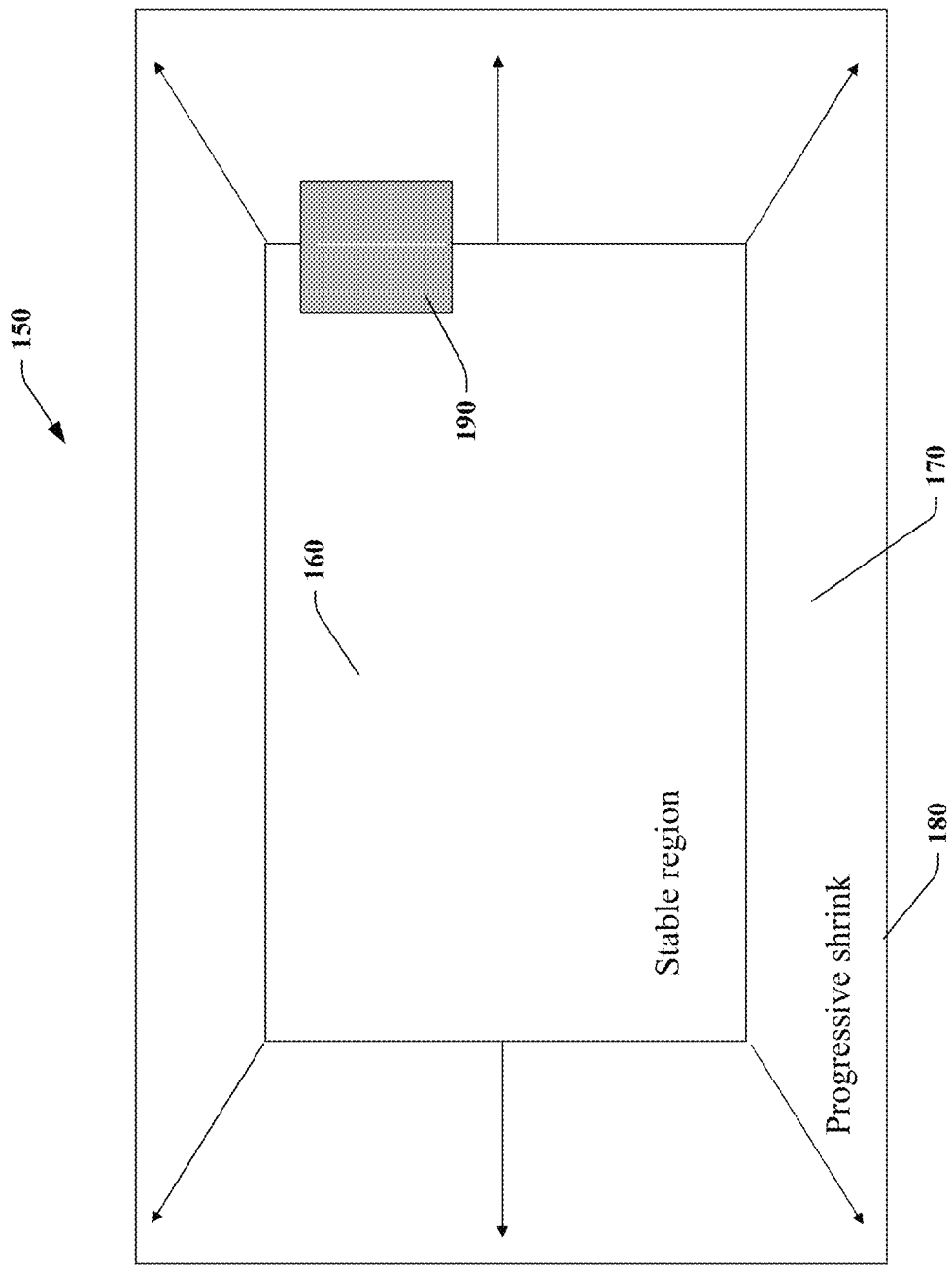
Figure 9:
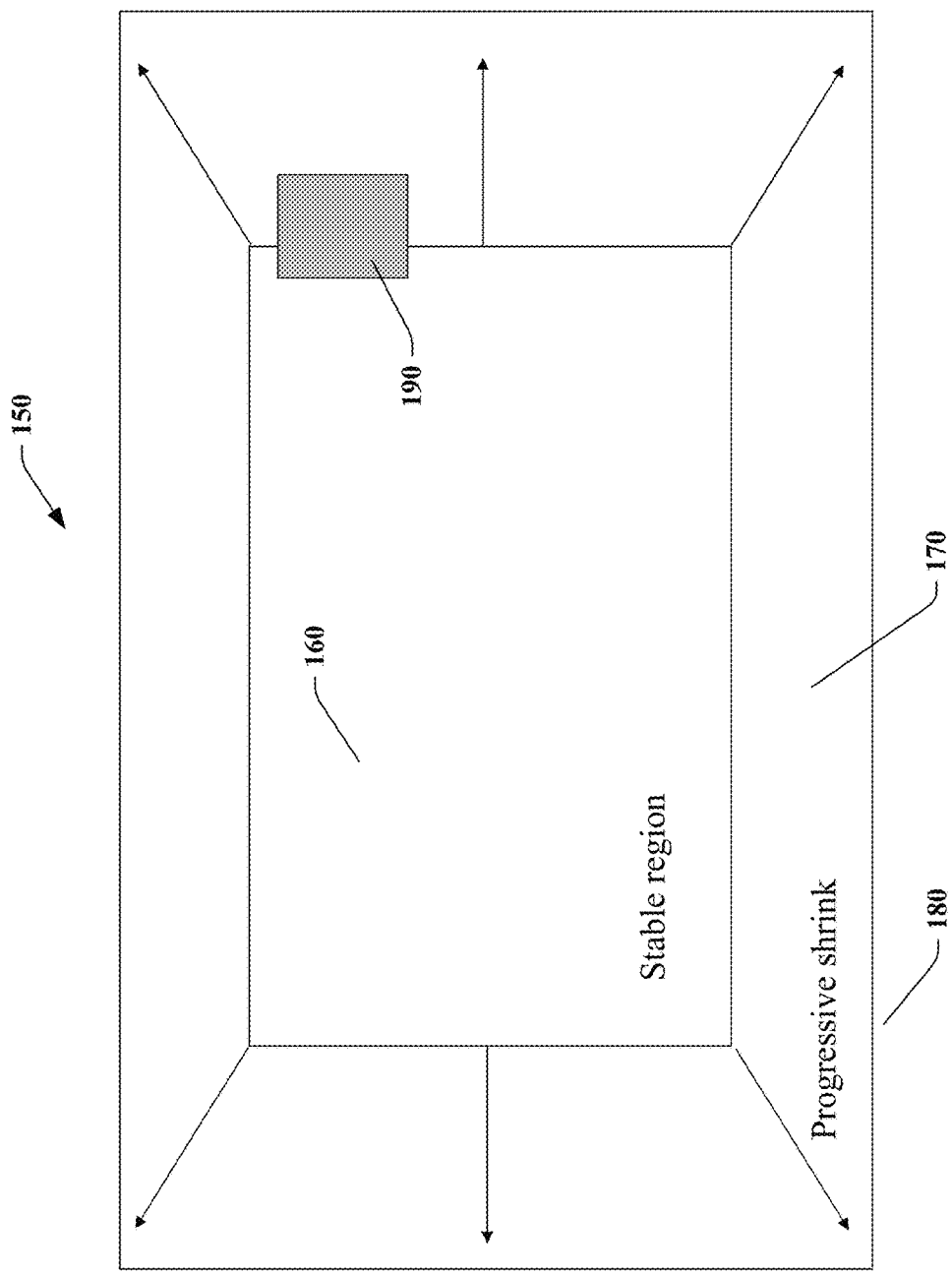
Figure 10:
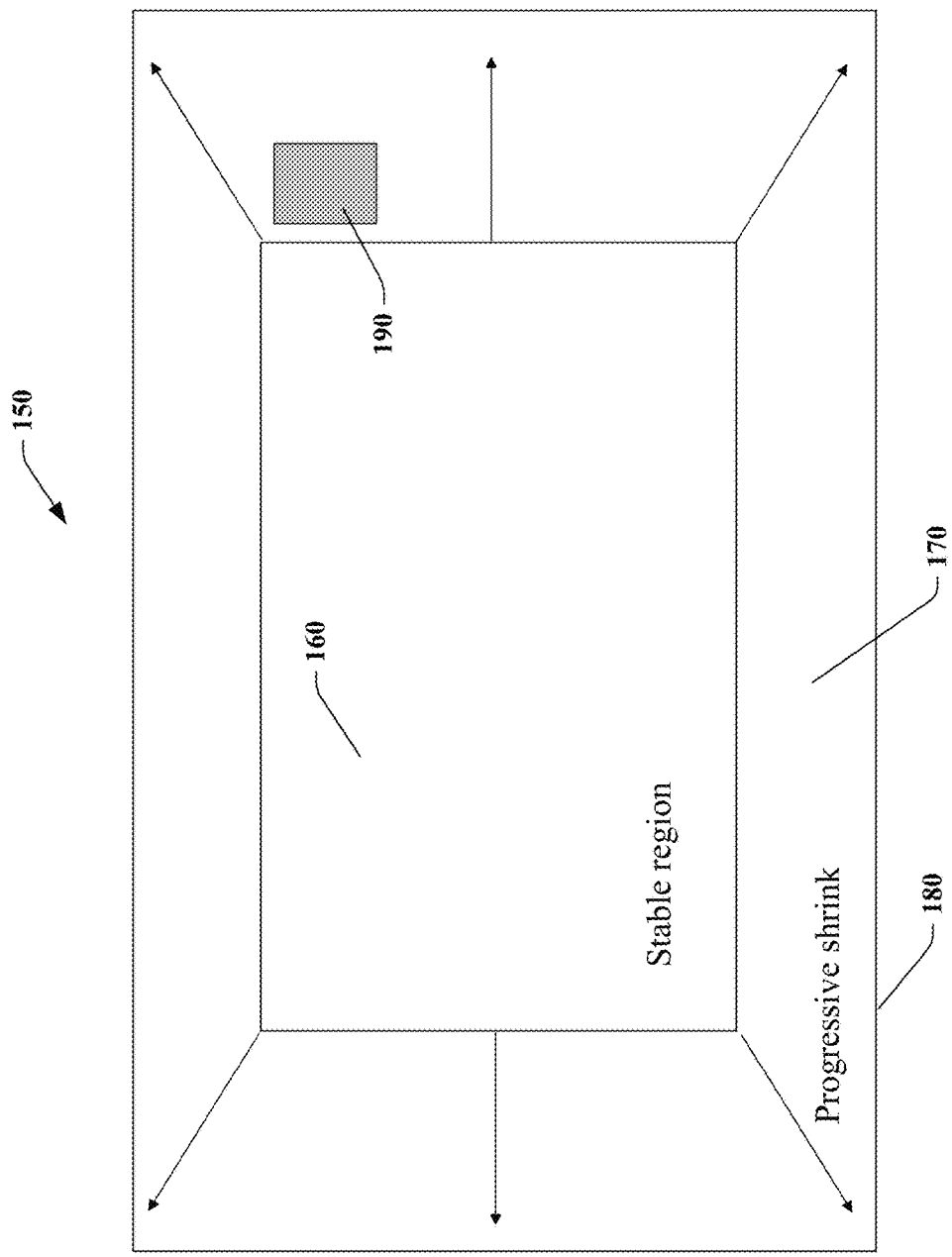
Figure 11:
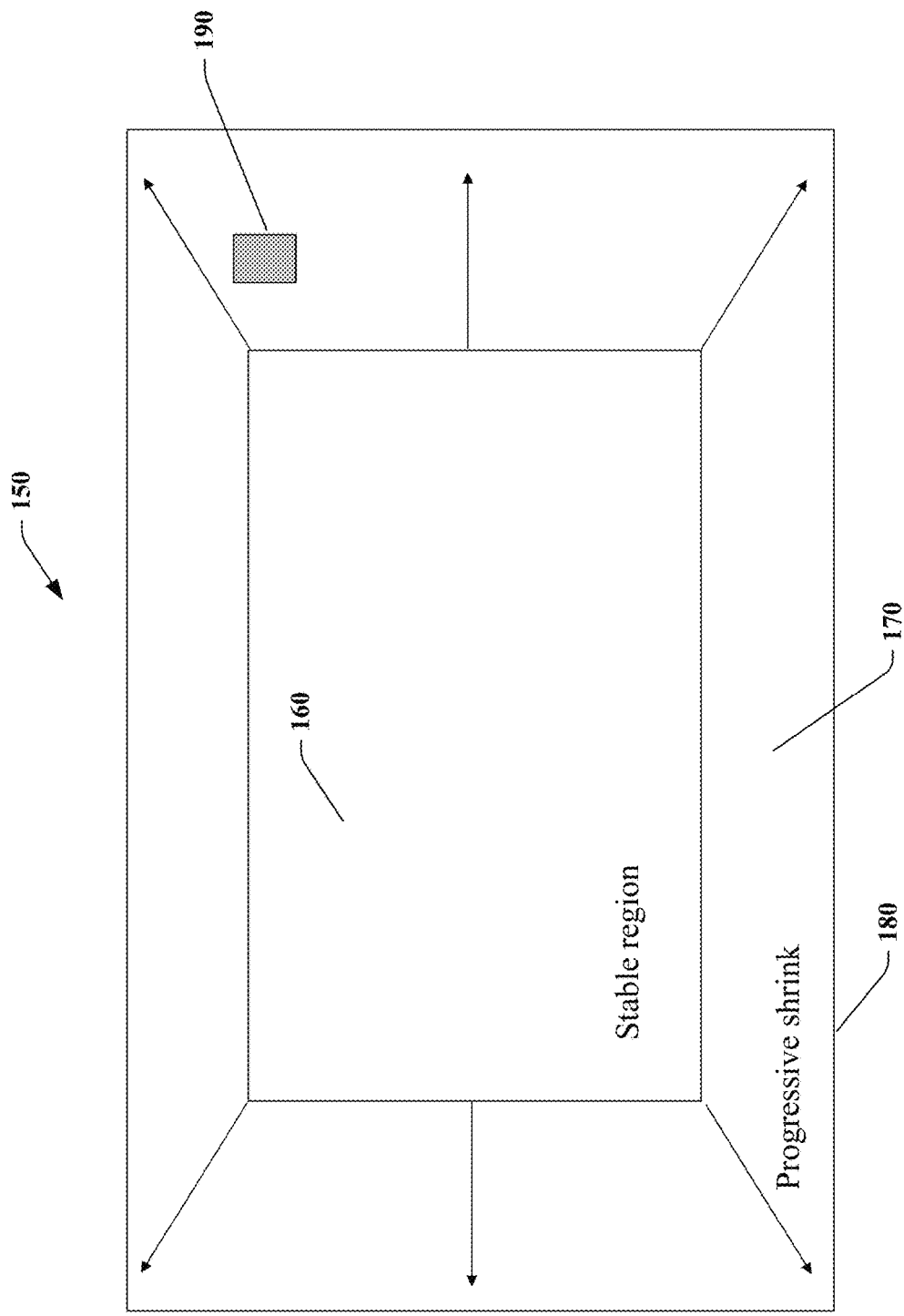
Figure 12:
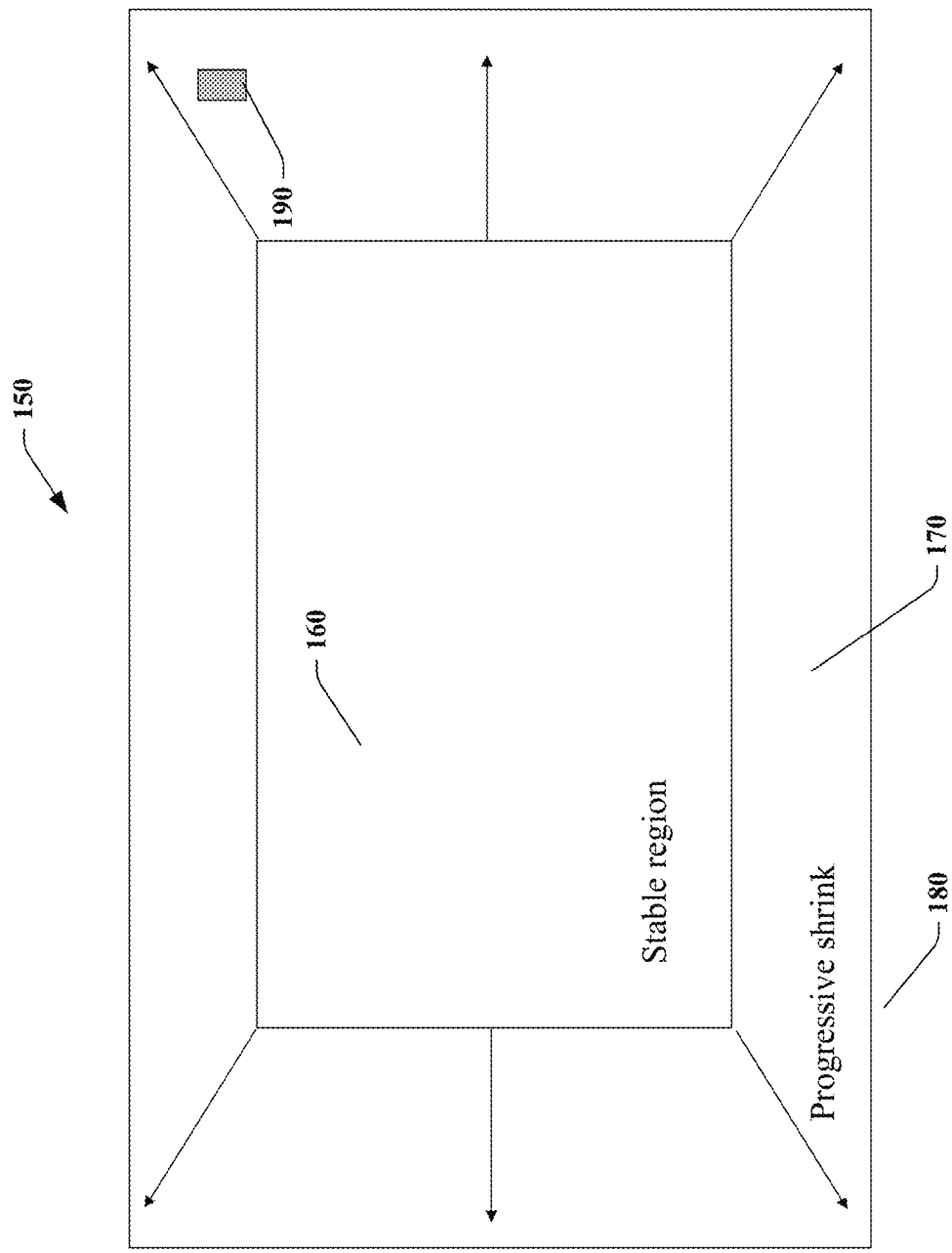
Figure 13:
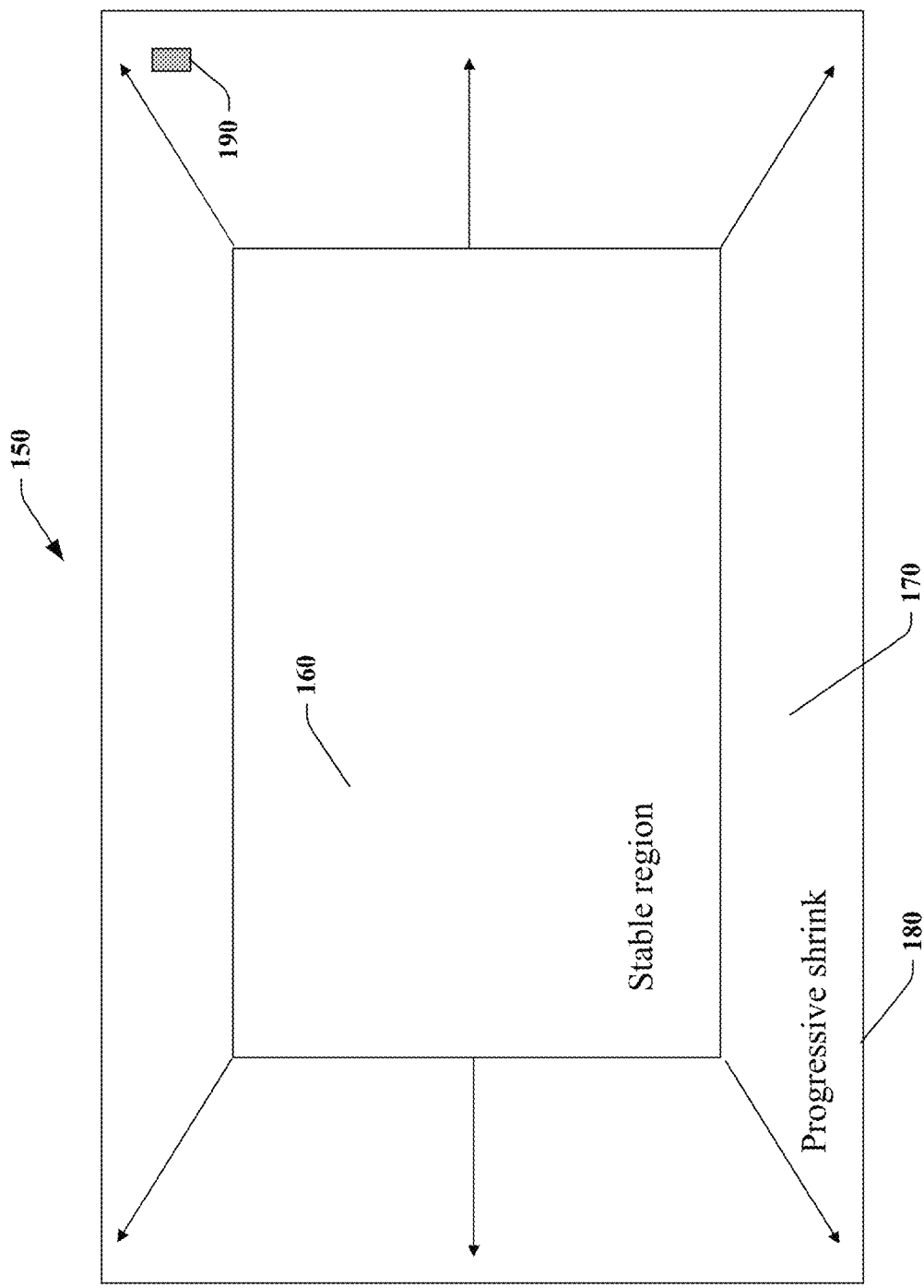
Figure 14:
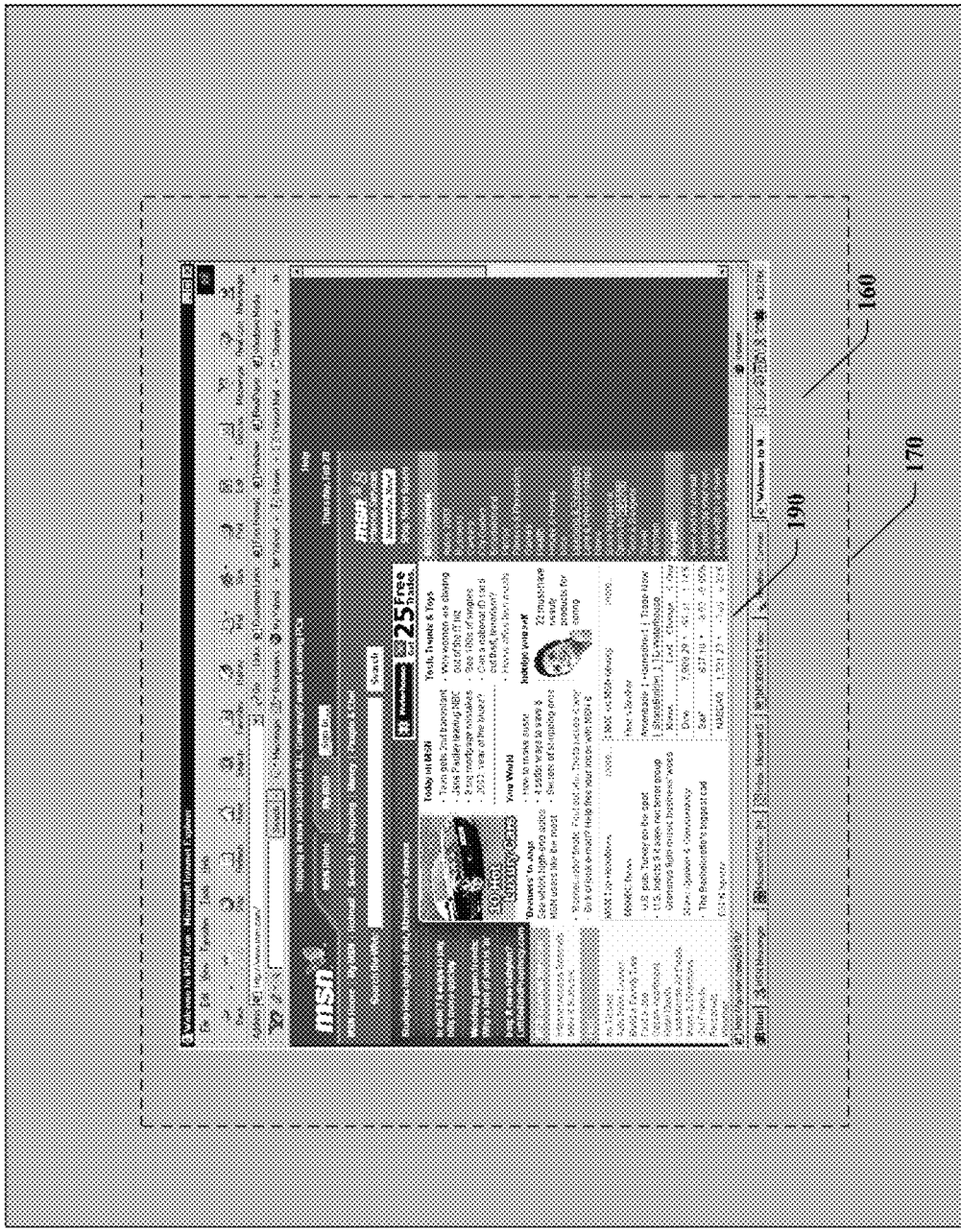
FIGS. 14-17 illustrate a web page window object changing behavior in accordance with the subject invention.
Figure 15:
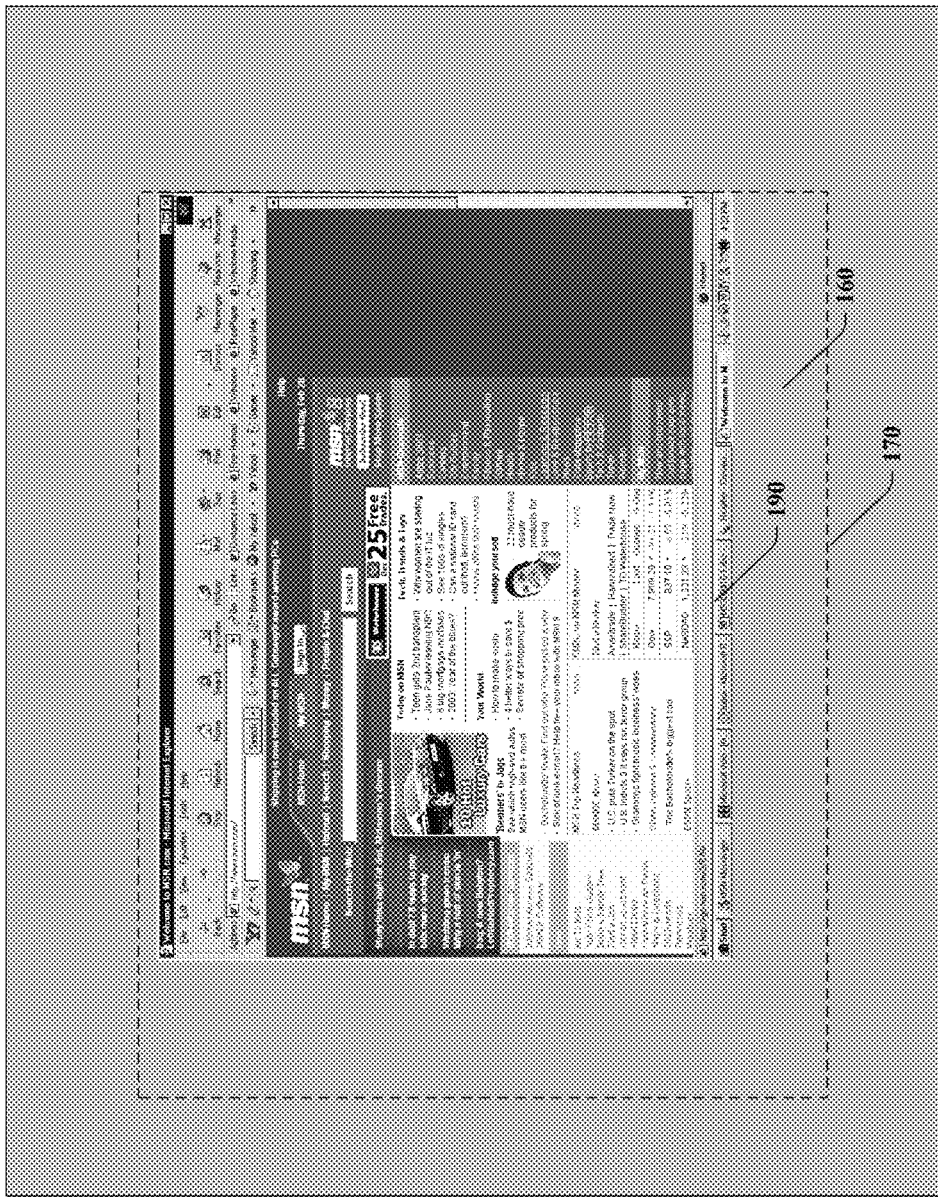
Figure 16:
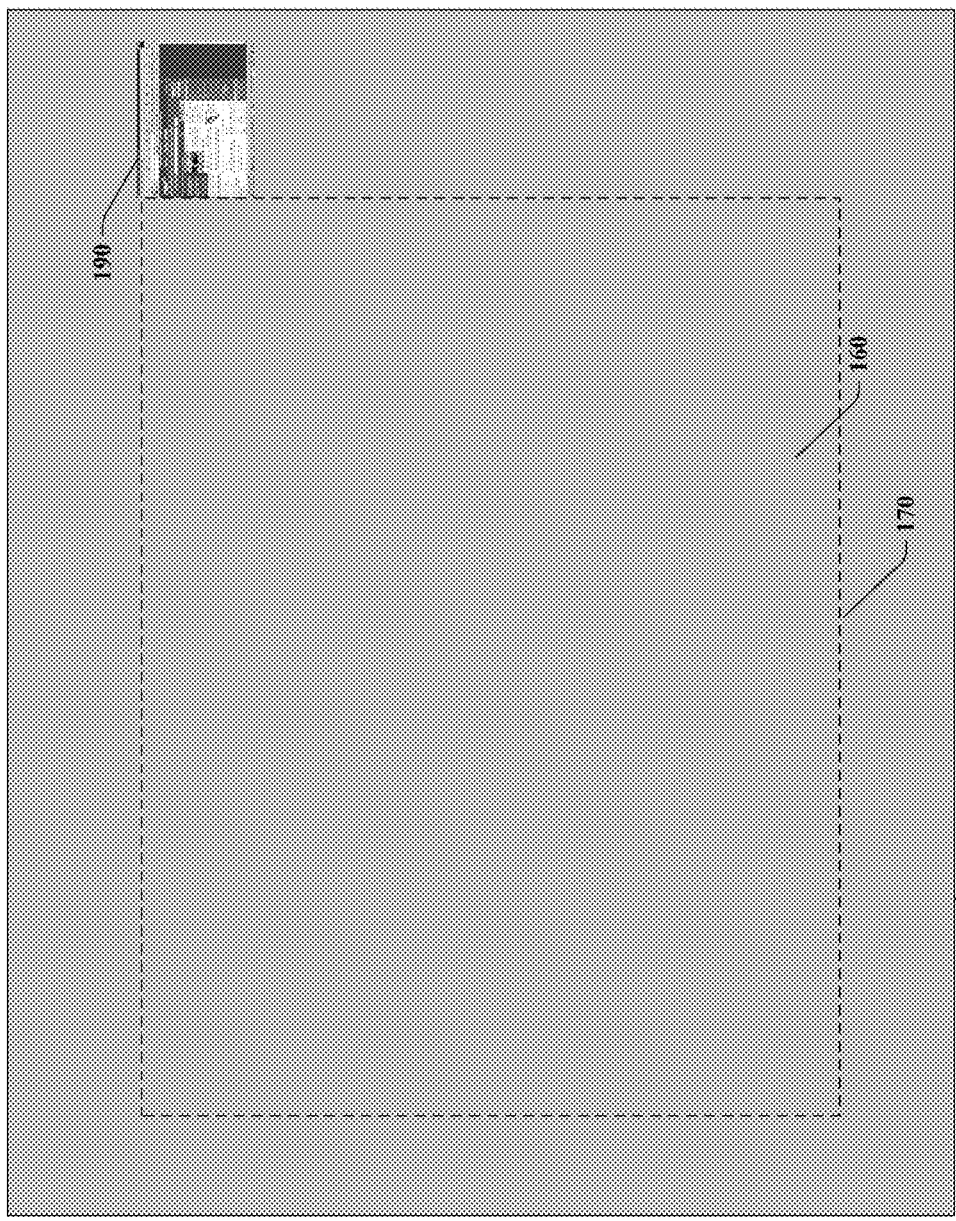
Figure 17:
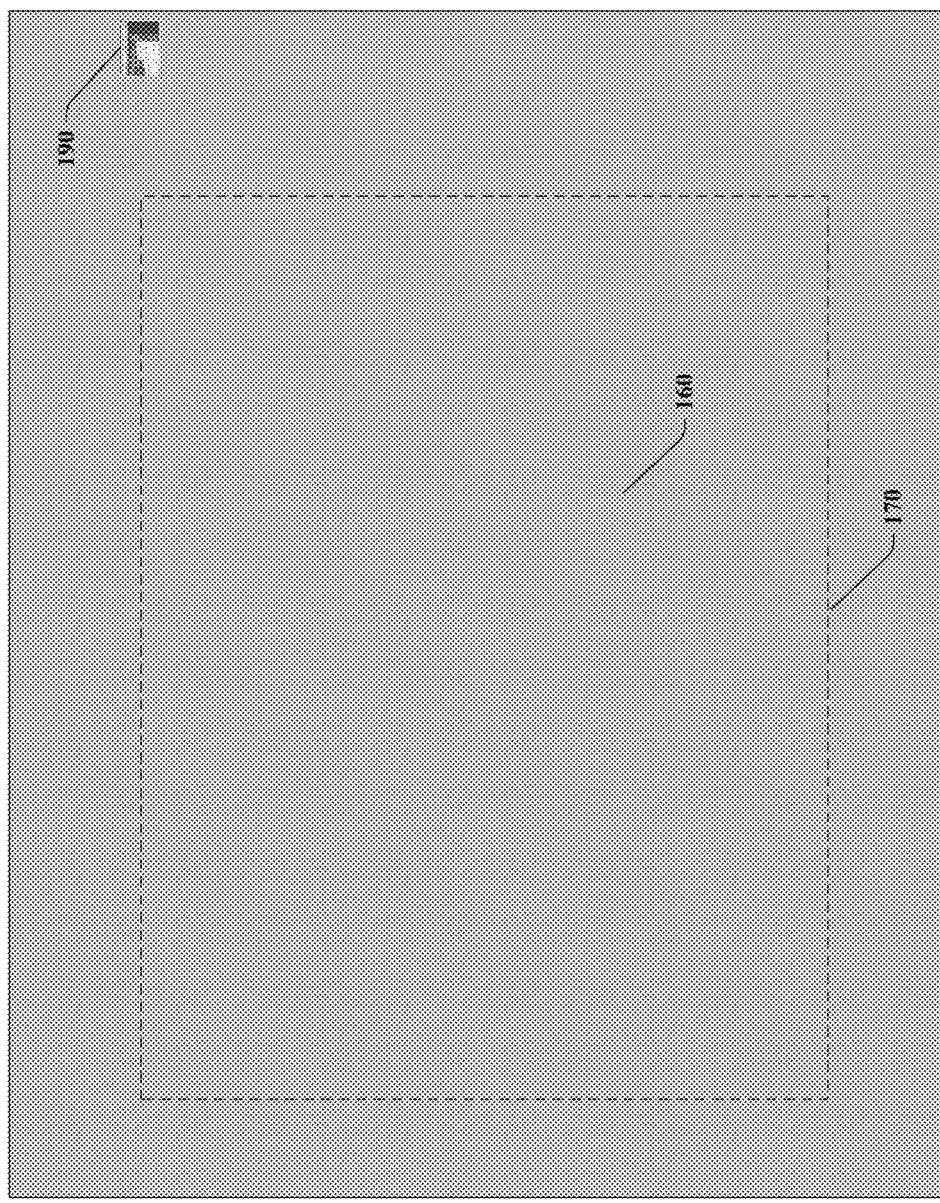

Turning to FIGS. 5-13, a display object is shown initially located in the focus area 160, where the display object 190 exhibits standard behavior with respect to desired size and functionality. As the figures progress, the display object 190 is shown being moved or migrating outside of the focus area 160 toward the progressive shrink space 170. As the object 190 crosses a periphery of the focus area 160, as shown in FIGS. 7 and 8, behavior of the display object is modified (e.g., window shrinks in size, lower refresh rate, displaying more relevant sub-objects over less relevant sub-objects, fading of the display object 190, etc.) as shown in FIG. 9. More particularly with regards to appearance of an object outside of the focus area, the object can be a scaled snapshot of the object as it last appeared in the focus area. Another aspect provides for a scaled object showing continuous changes thereto—it is to be appreciated that application redirection can be employed so that unmodified applications can have their associated display objects modified without need to be aware thereof. Another aspect provides for semantic zooming, which can be based for example, on authored tags (e.g., HTML or XML tags) that indicate what is most important, or an analysis of a resulting image that determines most salient features (e.g., author specified or deduced) would then be primarily displayed whereby nonessential (or too small to read) indicia is attenuated or not displayed.

It is to be appreciated that initiation of resizing and/or behavior modification can be implemented in a variety of manners. More particularly, regarding transition points, when a display object crosses from a focus area to a periphery (e.g., progressive shrink area) or vice versa there is an instant when the object is deemed to have migrated from one area to the other. The choice of transition point should allow for predictable and invertible scaling/behavior modification. The various schemes for implementing such transition point include: (1) using the center of window— such technique is predictable and invertible, but may lead to problems if the periphery is small compared to the size of the display object (e.g., window); in other words, it may be possible to drag a window into parts of the periphery; (2) leading edge of display object entering periphery, and trailing edge leaving—this is quite predictable, but not very obvious to users. At present, one significantly effective scheme for initiating resizing and/or object behavior modification is based on (3) employing location of a cursor being used to drag an object. For example, as the cursor crosses a particular boundary (e.g., focus area periphery) resizing and/or behavior modification can be initiated. As the object 190 progresses toward the edge 180, behavior of the object 190 continues to change—for example, the size of the object continues to reduce. Other behavior can change as discussed supra, for instance, the object can become less active as it moves closer to the edge.

It is to be appreciated that various design choices can be made with respect to certain aspects of the invention. For example, window images can be captured by copying from the desktop window image. Alternatively, window images can be captured by PrintWindow for example, which mitigates black edges and capturing boundary(s) when visible. Likewise, when transitioning from focus to periphery, the focus window can be hidden and the periphery window shown. Alternatively, windows can be transformed in to icons and moved to an alternate location rather than hiding them, which has advantages in periphery windows remain in the task bar and alt-tab, which also mitigates windows disappearing when left in the periphery (e.g., via pop-up blockers that remove such windows). Moreover, quality of scaling can be improved via employment of anti-aliasing techniques.

Furthermore, with respect to refresh rate, the subject invention provides for maintaining live windows in the periphery, but also permitting users to disable such feature for example due to processing and bandwidth overhead. Moreover, the invention provides for automatically refreshing a subset of windows at predetermined frequencies as well as updating respective windows at different frequencies (e.g., based on determined and/or inferred update rate for a user). Accordingly, the AI component can be employed to tune the system over time to optimize refresh rates per windows based on computing capabilities, information priority/content/context, user and/or system context and user desire.

FIGS. 14-17 illustrate an example where the display object 190 is a web page window. As the window moves from the focus area 160 into the progressive shrink area 170, behavior of the window changes (e.g., it shrinks in size and becomes less active (for example, refresh frequency is lower, functionality reduced). It is to be appreciated that the window itself can change so that indicia that is difficult to discern within a small window size is not displayed and more prominent features of the window are displayed. Alternatively or in addition, more relevant objects (e.g., based on priority to a user) within the window can be displayed or made relatively larger and less relevant objects not displayed or made relatively smaller.

When an object is moved into a peripheral region (e.g., progressive shrink area), the object can be scaled as a function of location of a cursor during a movement operation, and that cursor location can be preserved. Once in the periphery, object occlusion avoidance behavior can be employed as discussed below. Moreover, objects can be clustered based on proximity to cluster markers, and cluster occlusion avoidance behavior can be employed. Cluster scaling can include both object scaling and appropriate changes to distance between objects and a cluster center point.

Object behavior can be modified to support task management. For example, when an object is placed in a periphery its former focus position can be preserved—likewise, a last periphery position can be preserved. When a user selects (e.g., clicks) an object in the periphery, it can be returned to its focus position. When a user selects an object in the focus area (or in the case of Windows® desktop, minimizes the window), it is moved to its periphery position. When a user selects a cluster marker for a respective cluster situated in the periphery, all objects presently in the focus area return to their periphery positions and the objects in the cluster move to their focus positions. Selecting a cluster marker for an already focused cluster can return the cluster to its former periphery position. The above examples are merely exemplary as to various techniques to facilitate task switching, and are not intended to limit the subject invention to these noted functionalities but rather they are mentioned to provide context as to various functionalities that can be implemented in accordance with the subject invention.

It is to be appreciated that global controls can be programmed and/or configured to implement controls relative to the background and/or environment of an image space in accordance with the subject invention. For example, global controls relative to the background can change tilt angle or appearance of the background. In addition, the global controls can enable adjustment of viewing options associated with the image space such as for example to switch between a two-dimensional and a three-dimensional representation thereof. The global controls can also include import controls—the import controls, for example, can be employed to import one or more clusters or graphical objects into the image space. Those skilled in the art will understand and appreciate various other types of peripheral devices or applications that can be used in conjunction with a graphical user interface system in accordance with an aspect of the present invention.

The scaling component 130 can be utilized to implement scaling globally across the image space. For example, a reduction in scaling can be implemented to accommodate a greater number of clusters and graphical objects in a desired image space. Further, the scaling component can be used to enlarge clusters and graphical objects relative to the background or environment. In accordance with an aspect of the present invention, such scaling can operate on clusters and objects independently of the environment or surface on which such objects are visually displayed. Further it is to be appreciated that different amounts of scaling can be utilized for cluster indicators than for the objects associated with the respective indicators. In this way, information about a cluster can be maintained slightly larger to facilitate locating the various clusters in the image space.

The behavior modification component 140 can provide for object movement/avoidance that is operative to control movement of an object relative to the image space, such as for example based on user input information. The object movement control further can implement occlusion avoidance during movement of the selected object. For example, a selected graphical object can be maintained in a foreground and display the selected (or active) object in a highlighted condition to visually distinguish it from other objects as it is moved in the image space.

The behavior component 140 and the scaling component 130 can cooperate to implement desired 2D and 3D mapping and scaling of the respective objects. Such mapping and scaling can be implemented based on location of the object and implemented global scaling. The mapping and scaling also can vary depending on whether the image space corresponds to a two-dimensional or three-dimensional representation.

The behavior modification component 140 further can provide an object context control function that is operative to implement various menu options relative to a selected object. The object context can be activated based on user inputs for example. The behavior control can enable a user to annotate a selected object, view details of the object, or send the object to an application or to one or more external devices. Additionally, general editing can be performed relative to the object via an object menu, such as duplicating, cutting, copying, pasting or deleting a selected object. A selected object also can be sent to a desired destination, such as described with respect to the cluster context. Those skilled in the art will understand and appreciate various other operations that can be performed via similar types of menus relative to a graphical object, all of which are contemplated as falling within the scope of the present invention.

FIG. 18 illustrates a plurality of display objects situated with the display space 150. As shown, a display object located within the focus area 160 is shown with standard behavior. Other display objects are shown outside of the focus area with respective behavior modified accordingly.

Another aspect of the invention provides for clustering or grouping display objects and effecting behavior modification to a particular cluster or group en masse. Thus, the display object cluster 210 (related to college) is shown with behavior modified as a group—if the cluster 210 is moved within the focus area 160, all display objects that are part of the cluster will concurrently exhibit behavior consistent with standard respective behavior within the focus area 160. Such aspect of the invention significantly facilitates multi-tasking operations within a computing environment. As any of the clusters 210, 212 or 214 move toward the edge 180, the behavior of the clusters will modify accordingly (e.g., size of windows changes, activity of windows changes, etc.). Typically, when a cluster is scaled, the individual objects that are part of the cluster are scaled as well. However, in such case, if the objects are scaled and their relative positions remain unchanged, they can appear to move away from the center of the cluster—to address this issue, the objects can be moved closer to the center of the cluster as the cluster scale is reduced.

It is to be appreciated that within cluster(s), the behavior of respective display objects can change uniformly and/or uniquely. For example, within a particular cluster one display object can have a higher priority than other display objects within the cluster and thus activity of the one display object can be maintained at a higher level than that of the other display objects. It is to be appreciated that any suitable hierarchical classification of respective behavior modifications to display objects with a cluster or group can be employed in accordance with the subject invention.

Figure 19:
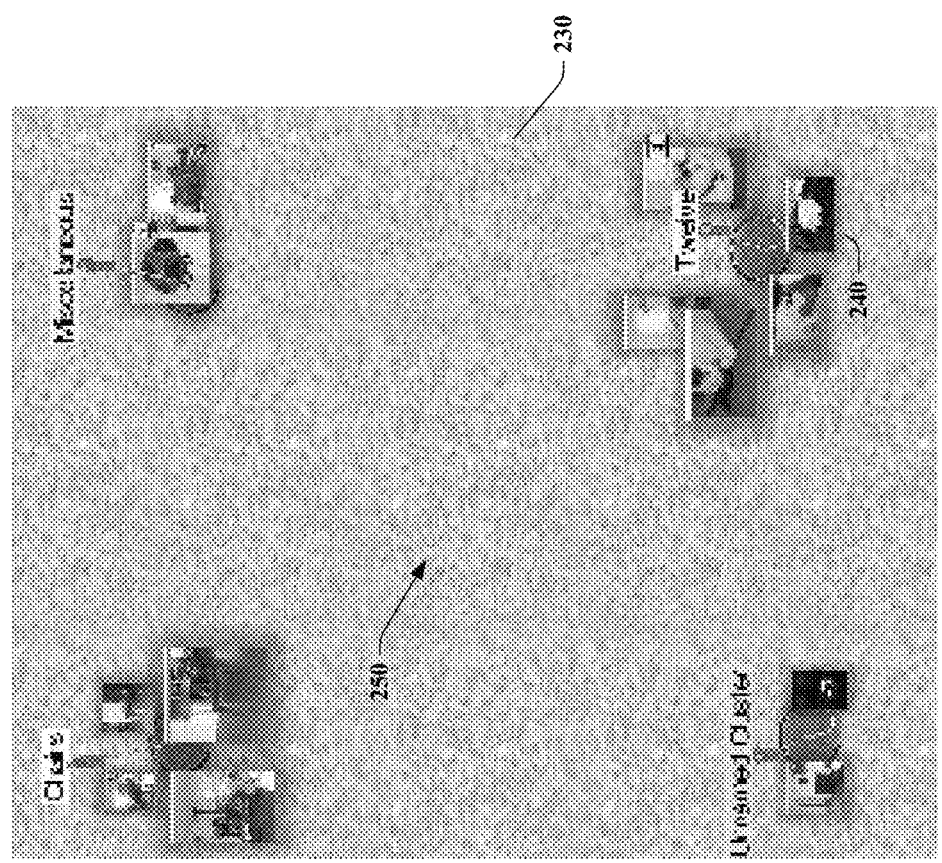
FIGS. 19-20 illustrate a plurality of display objects and behavior thereof in connection with a small device (e.g., PDA) display in accordance with the subject invention.
Figure 20:
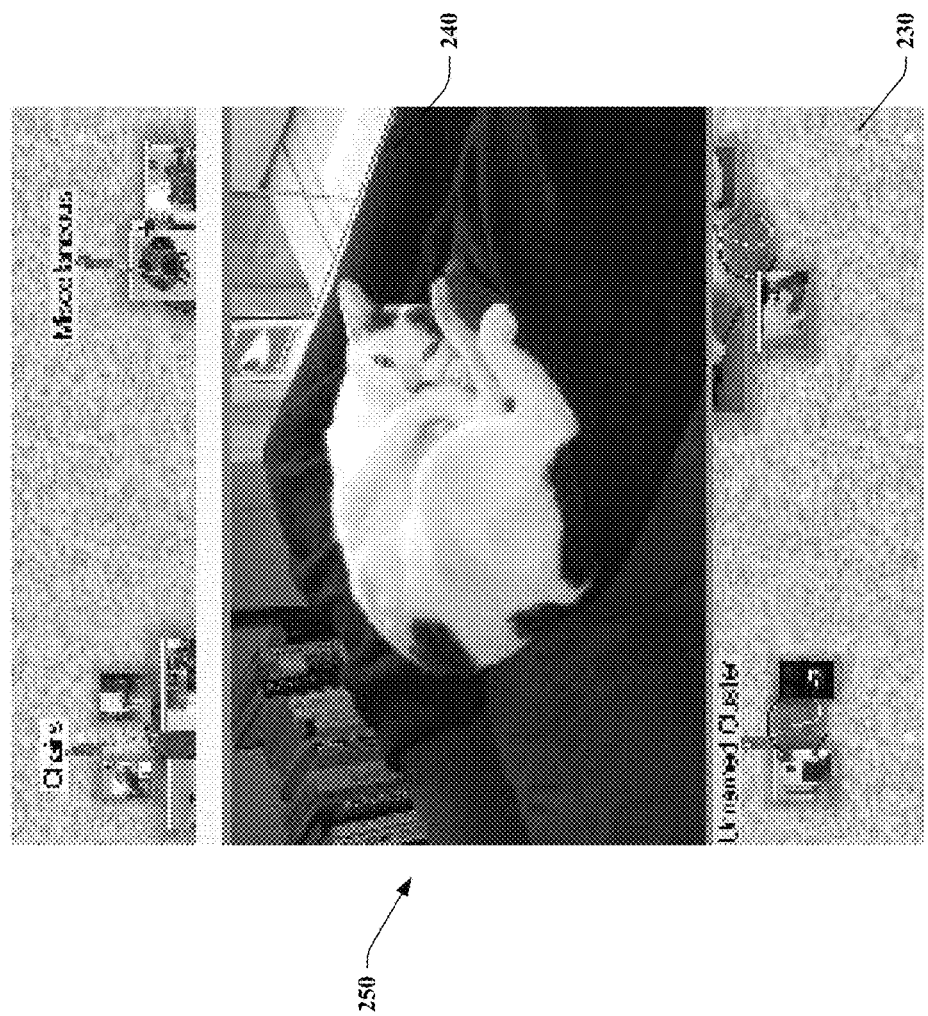
Figure 21:
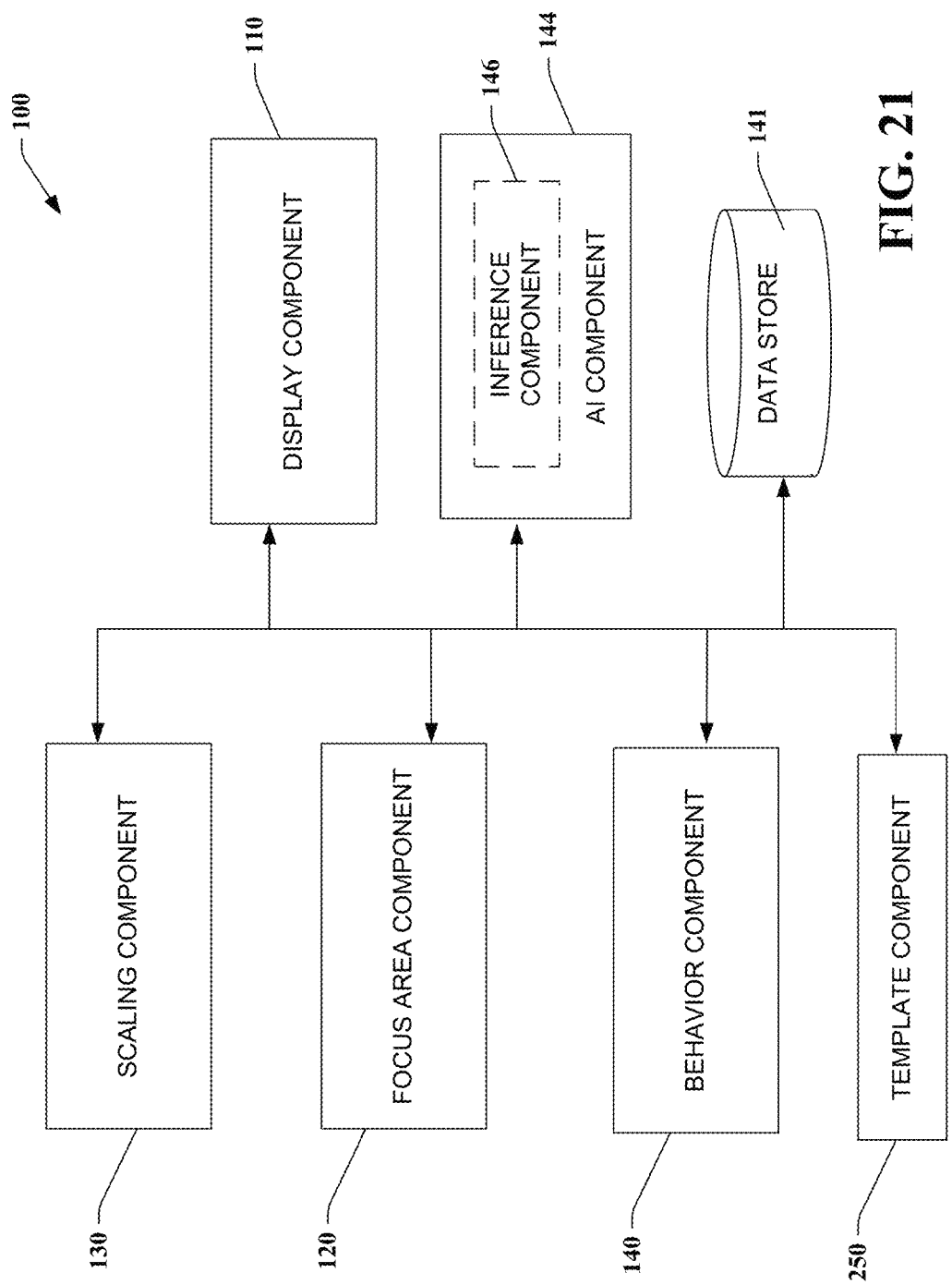
FIGS. 21-37 illustrate various aspects of the invention in connection with a template component.

FIGS. 19-20 illustrate an aspect of the invention as applied to a small display space area 230 (e.g., associated with a portable computing device, personal data assistant or wireless telephone). In FIG. 19, various display objects are shown located outside of a focus area 250. FIG. 20 illustrates display object 240 after being moved into the focus area.

As discussed supra regarding occlusion avoidance, when a display object is moved in the periphery, it is desirable to mitigate the possibility that one object could completely obscure another. Accordingly, various schemes such as those described in U.S. patent application Ser. No. 09/152,712 filed on Sep. 14, 1998 (Now U.S. Pat. No. 6,414,677) entitled METHODS, APPARATUS AND DATA STRUCTURES FOR PROVIDING A USER INTERFACE WHICH EXPLOITS SPATIAL MEMORY IN THREE-DIMENSIONS, TO OBJECTS AND WHICH VISUALLY GROUPS PROXIMALLY LOCATED OBJECTS; and U.S. patent application Ser. No. 10/092,458, filed on Mar. 7, 2002 and entitled GRAPHICAL USER INTERFACE, DATA STRUCTURE AND ASSOCIATED METHOD FOR CLUSTER-BASED DOCUMENT MANAGEMENT, can be employed—the entireties of these two applications are incorporated herein by reference. Accordingly, objects move out of the way when an object is moved past them, and return to their original position when the moved object has passed. This is predictable behavior, since the user can stop at any point and no further movement occurs. It is appreciated that as objects move out of the way, their respective scale can be updated based at least in part upon the object's new location.

FIGS. 21-37 illustrate various aspects of the invention in connection with a template component 250. Although the system 100 is illustrated with the template component 250 as well as other components, it is to be appreciated that the template component 250 can be employed in connection with all the other components as well as simply a subset thereof. A challenge associated with displays relates to overhead in connection with setting up and managing windows associated with tasks. The template component 250 facilitates automating configuration and layout of special tasks; and for describing behaviors and interaction modes, as well as encoding configuration preferences—the template component 250 can include set(s) of rules to provide for such advantages. Moreover, the template component can include a user model (e.g., comprising rules, historical data, preferences, Bayesian networks, neural networks, non-linear training schemes, etc.). Accordingly, the template component provides for automatically configuring clusters, windows, tasks, etc., for example, based on preset, determined and/or inferred user desired configuration.

Figure 22A:
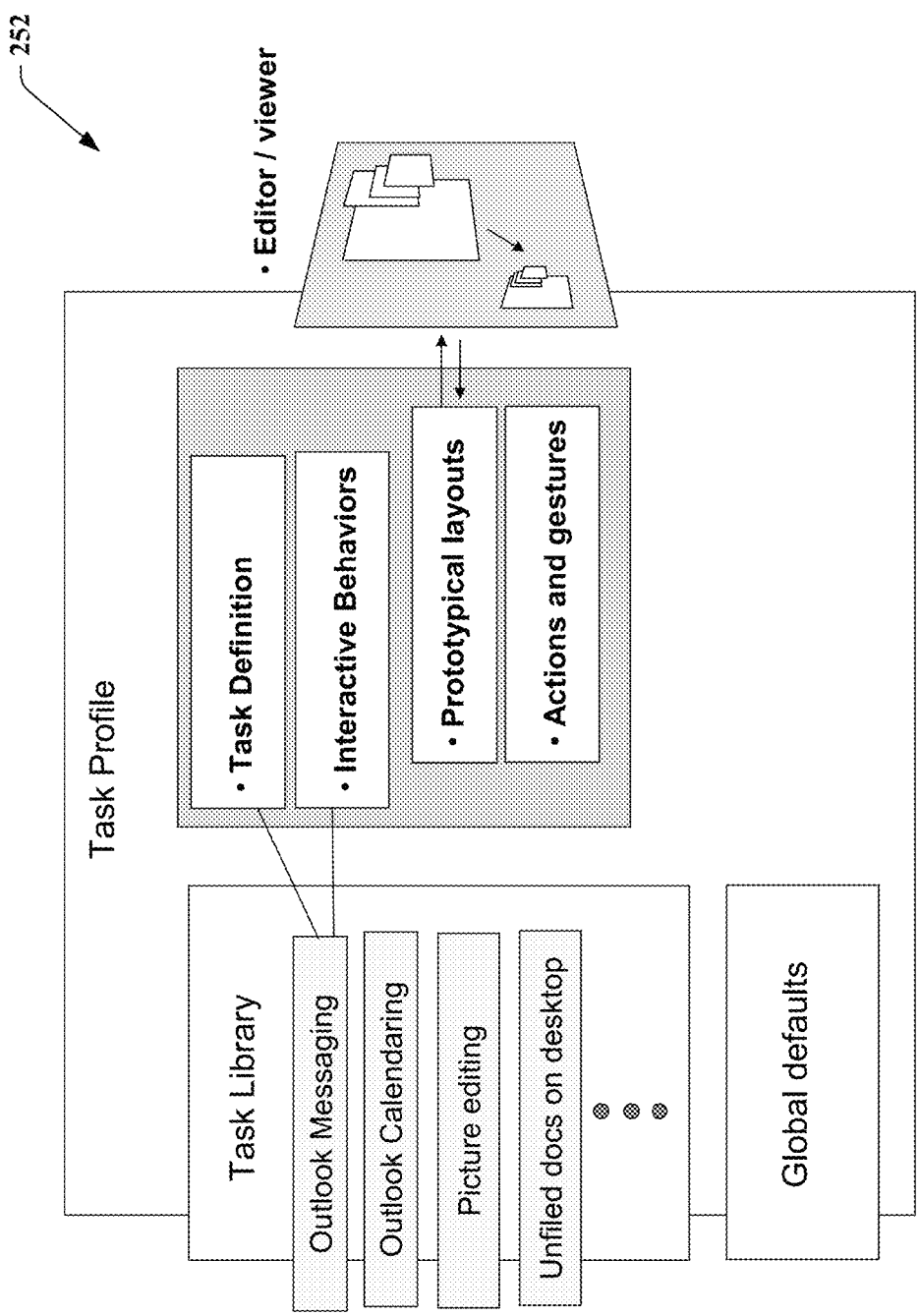
Figure 22B:
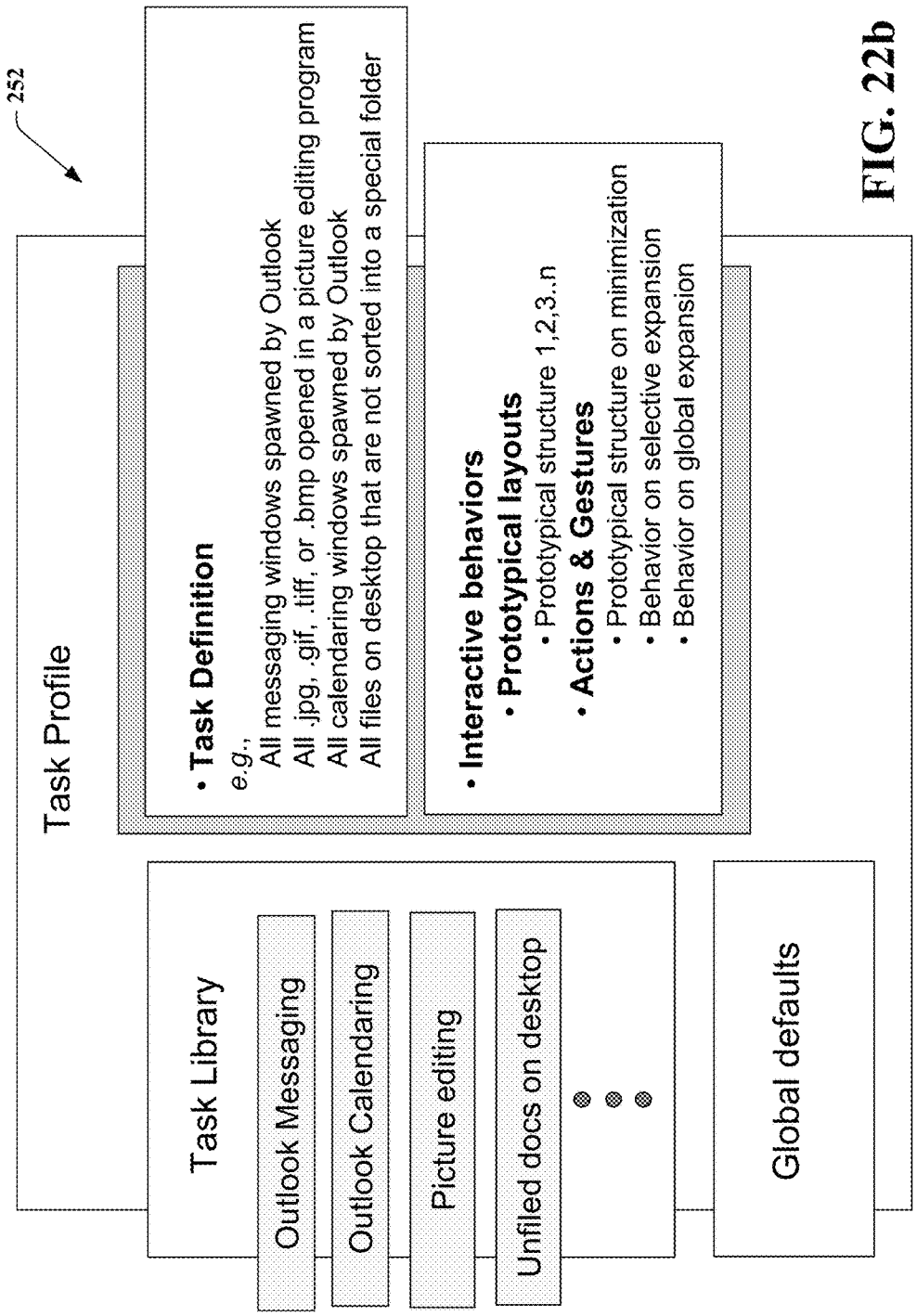

FIGS. 22*a* and 22*b* illustrate an exemplary task profile 252 that can be employed in connection with the template component 250. The task profile can be located within the template component, in a database, or in a location suitable for carrying out the functionality thereof as described herein. The task profile 252 provides for storing encodings of representations of tasks, layouts, and behaviors on gestures. The task profile allows developers and/or users to define global defaults, as well as more specialized canonical tasks. For such specialized tasks, developers and/or users can provide definitions, as well as desired interactive behaviors and layouts/geometric structures associated with the canonical tasks. Providing such a mechanism facilitates an extensible architecture/platform for innovation by providing for specifying rich encodings of tasks, and interactive behaviors on particular tasks, including desired layouts of prototypical structures that might appear, e.g., upon minimization and potentially (per stored preferences and/or real-time gestures) be retained upon expansion, depending on preferences. It is to be appreciated that content in a prototypical task profile can be stored in one or more formats, including XML-centric encodings, or other suitable specialized formats.

FIGS. 23-29 illustrate an exemplary application of the template component 250 in accordance with the subject invention. Consider the case of a special task, "Personal Information Management" or, more specifically, "E-mail Messaging." In the task profile 252, a policy could be encoded, that as a default, for windows spawned via interactions with the e-mail system, unless otherwise specified, on minimization, the template component 250 can automatically "clean things up" and provide a "prototypical structure" for the window, with a layout of a main inbox 254, and opened messages, appearing in a particular way, as described by a master minimization template that can be edited by a user, much as a template might be edited for a PowerPoint® presentation for example. As an example, FIGS. 23-29 illustrate how the inbox 254 and set of scattered windows 256 of an e-mail system might be minimized, when a gesture is received to minimize the e-mail system. The template component 250 can provide gestures that allow for separate components of the "prototypical structure" to be selectively expanded to focus, or to have the entire prototypical structure expanded, either maintaining the cleaned up structure, isomorphic in layout to the minimized structure, or returned to the last state.

Figure 23:
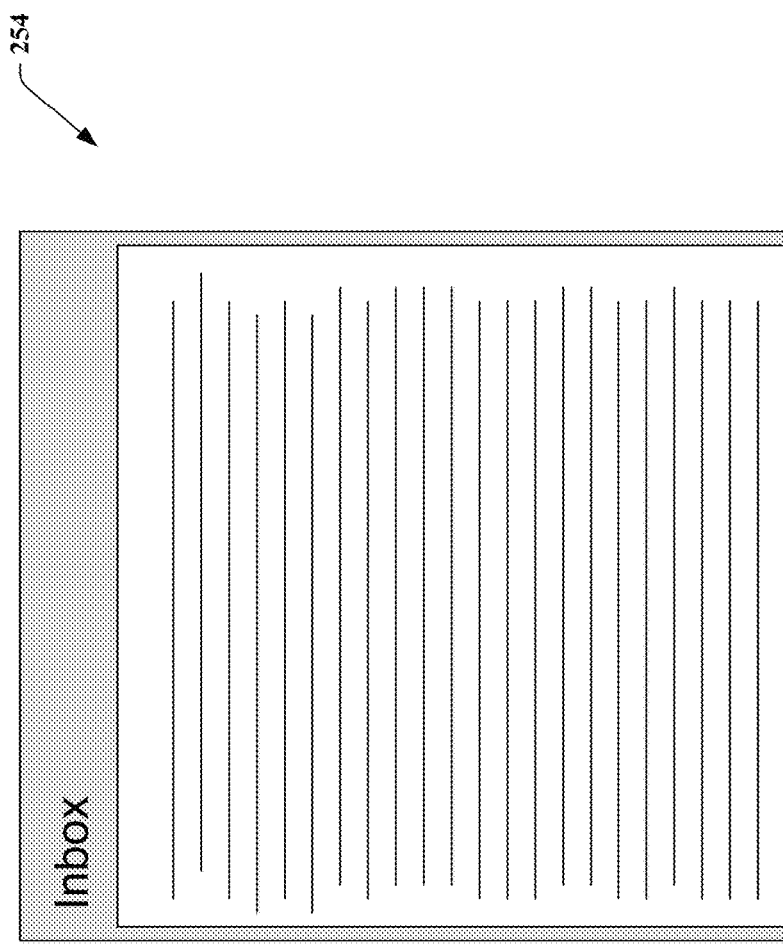
Figure 24:
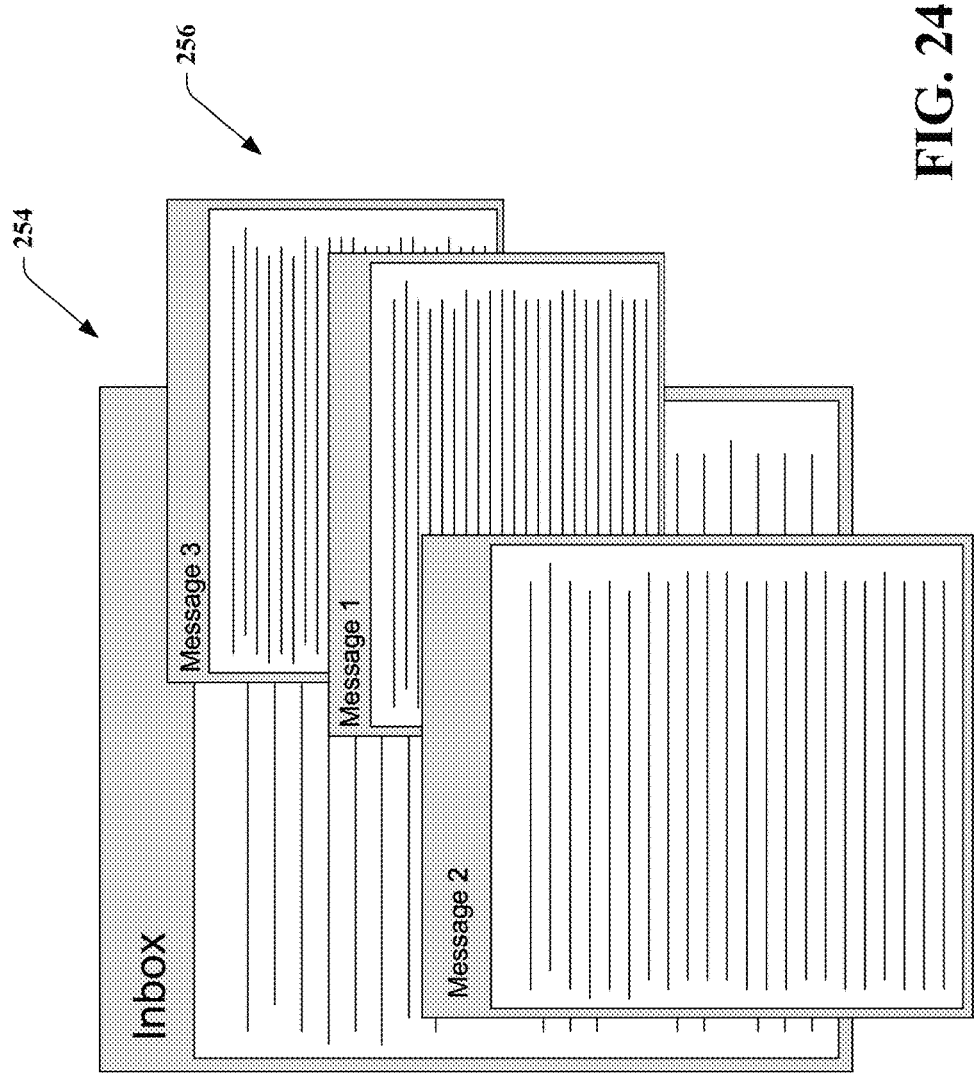
Figure 25:
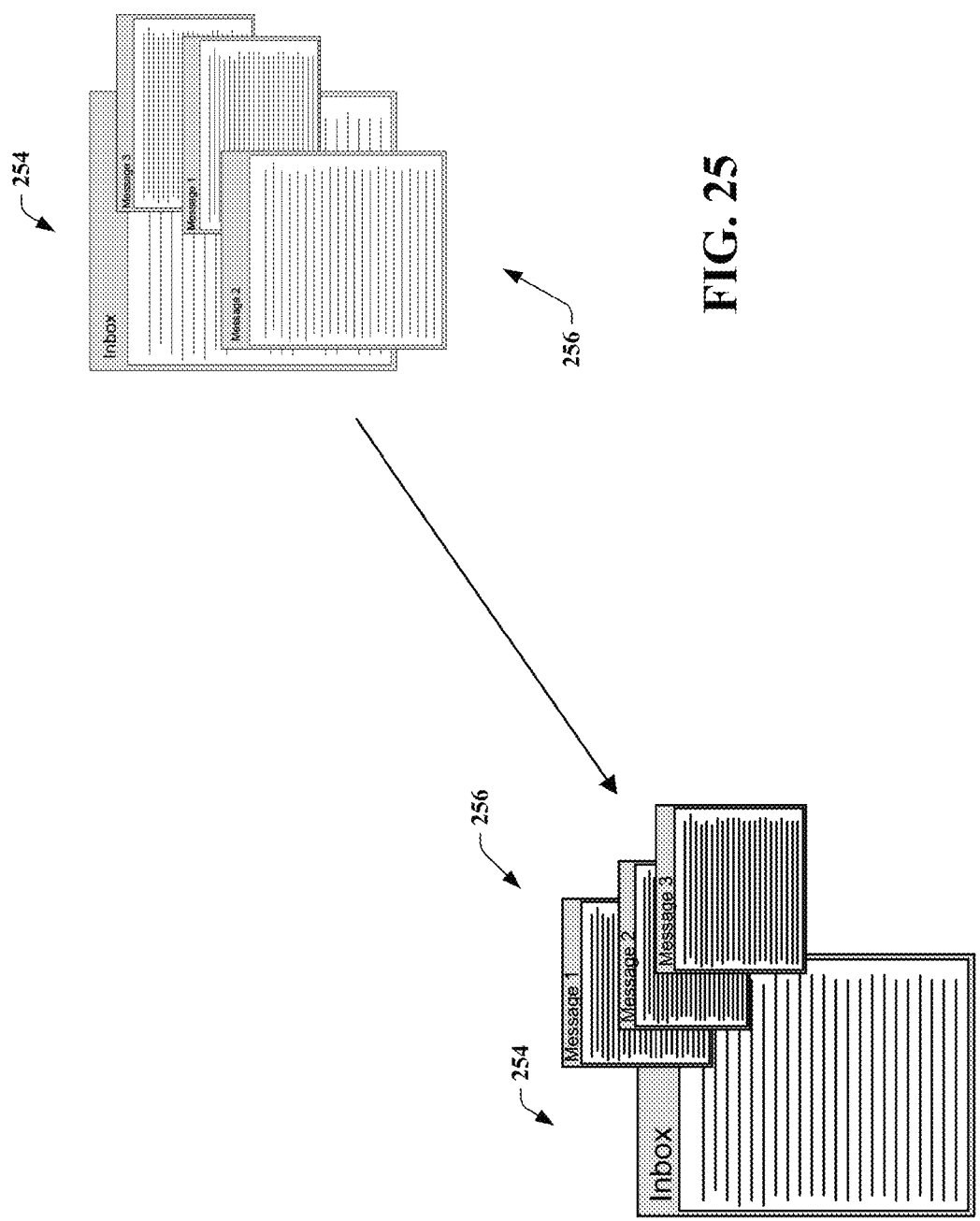

More particularly, FIG. 23 depicts the exemplary e-mail inbox 254. Various messages 256 (e.g., Messages 1-3) associated with the inbox are shown in FIG. 24. The messages 256 are arranged in a particular manner (e.g., ad hoc, user set, etc.). FIG. 25 illustrates the template component 250 automatically organizing the messages 256 so that these messages are resized and arranged in accordance with a template that provides for a desired organization of the files. It is to be appreciated that the invention is not limited to e-mail messages, but rather can be applied to any suitable type of data (e.g., documents, media, web pages, files, messages, etc.) that can be graphically represented on a display. Moreover, as discussed supra, the template component 250 can provide for the organization based upon pre-defined rules, machine learning systems (explicitly and/or implicitly trained), utility-based analysis, probabilistic-based analysis, statistical-based analysis, confidence-based analysis, etc. or any other suitable system that can provide for automated organization of data in accordance with the subject invention. The template component 250 can further provide for organization of data as a function of data types, determined and/or inferred priority/importance, utility given user context, data content, etc.

For example, as shown in FIG. 25, message 3 was moved in front of messages 1 and 2, because it contained content deemed most relevant to the user with respect to the other messages. The messages 256 were also organized to facilitate utilization of display real-estate as well as displaying the messages to facilitate glanceable conveyance of information associated therewith.

Figure 26:
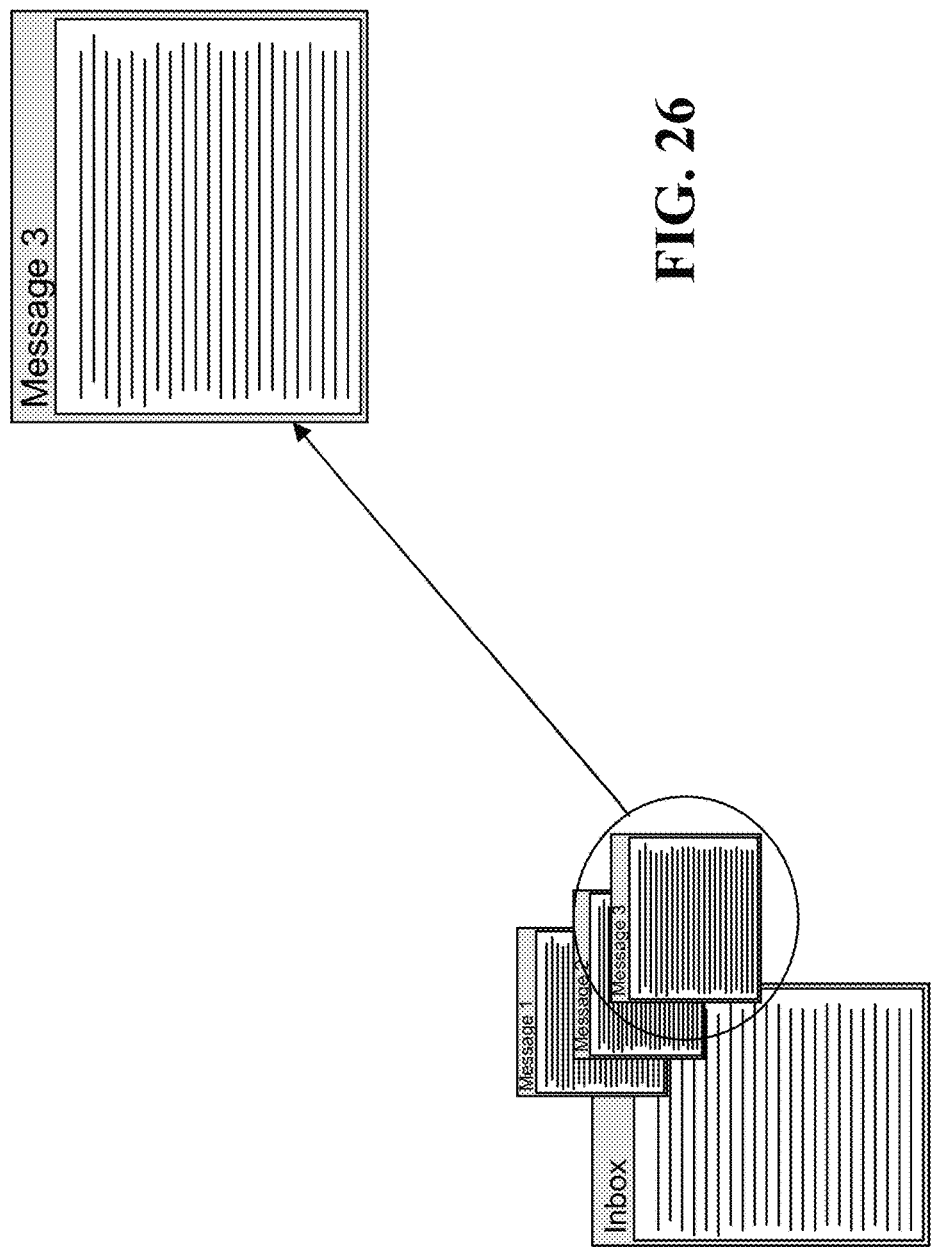
Figure 27:
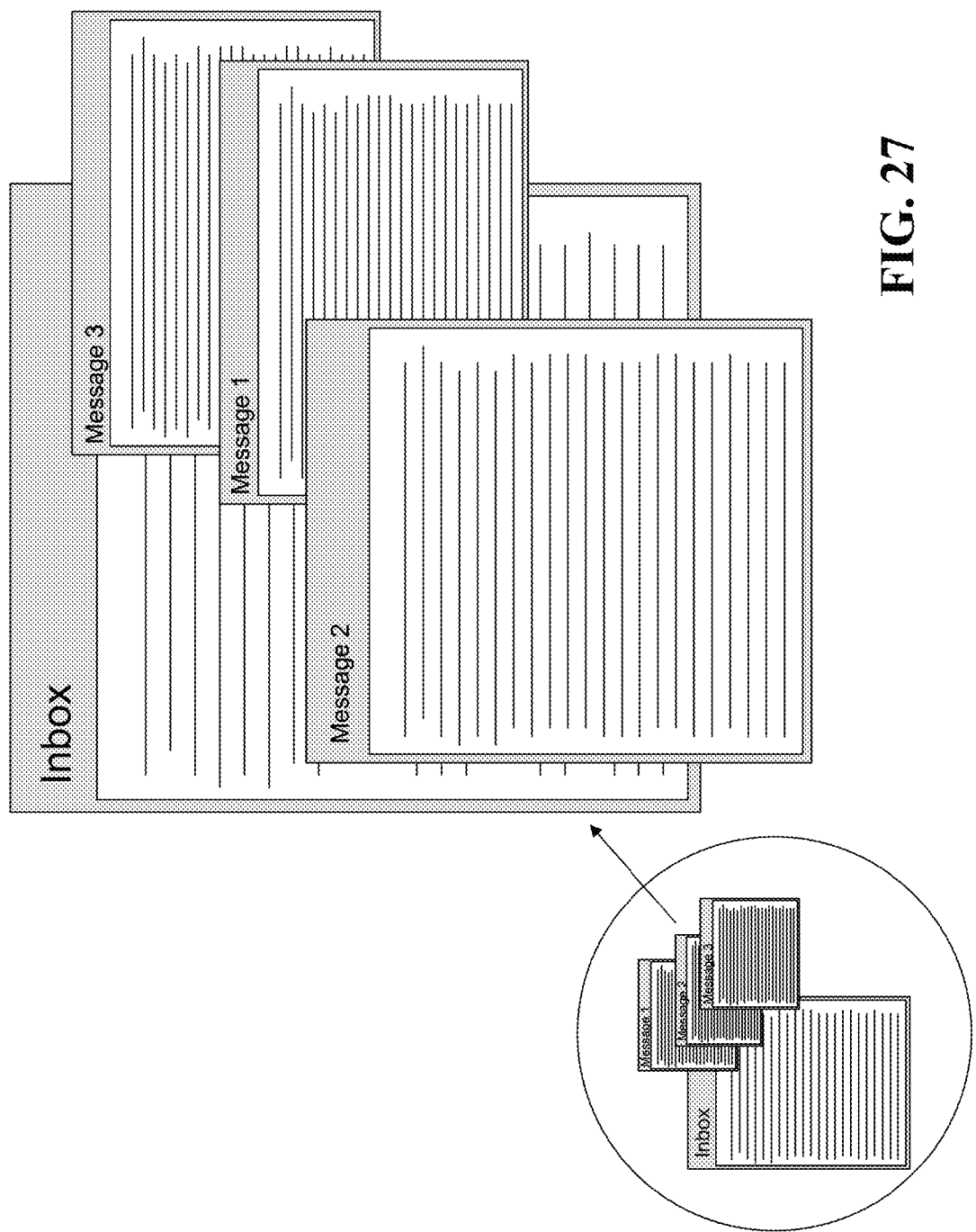
Figure 28:
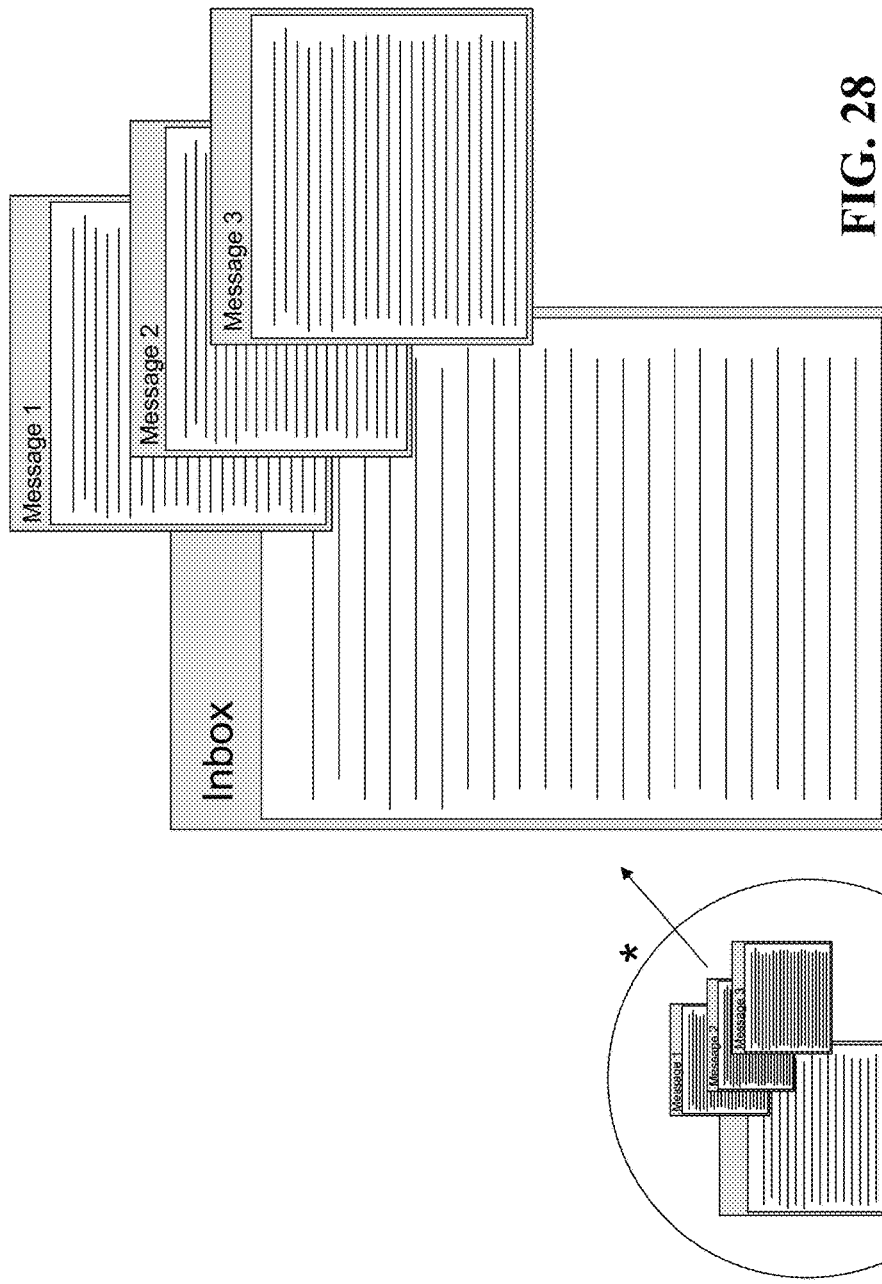
Figure 29:
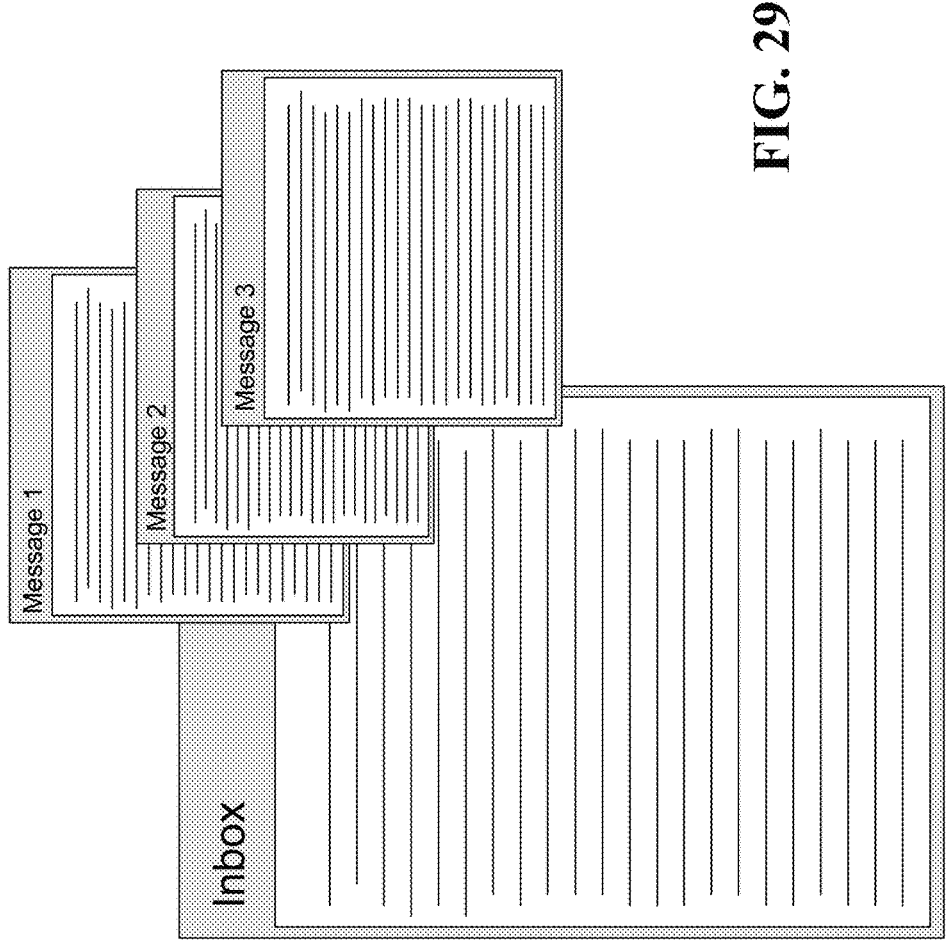
Figure 30:
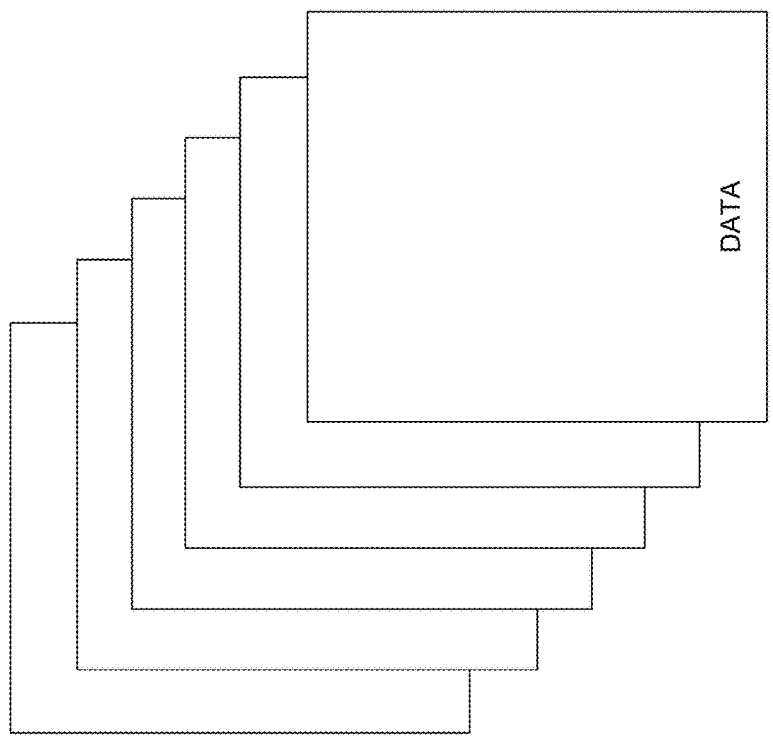
Figure 31:
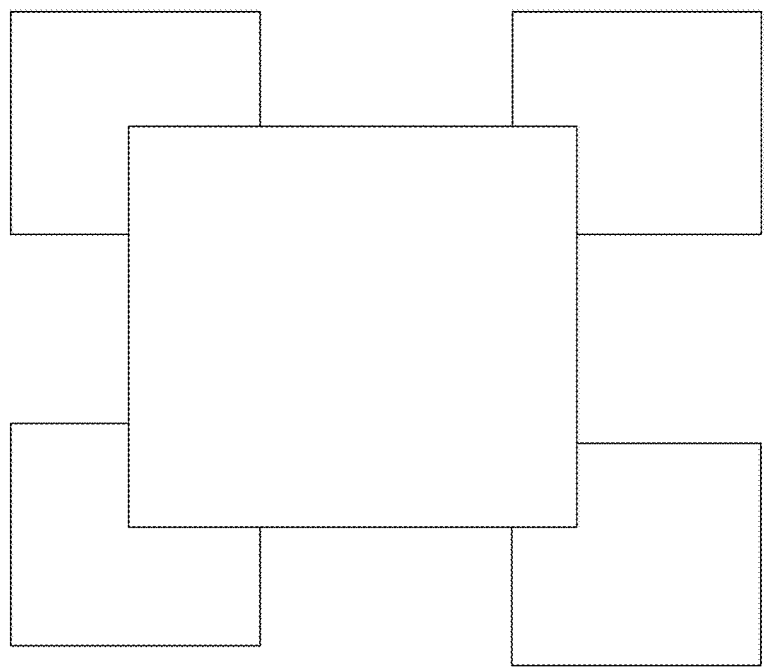
Figure 32:
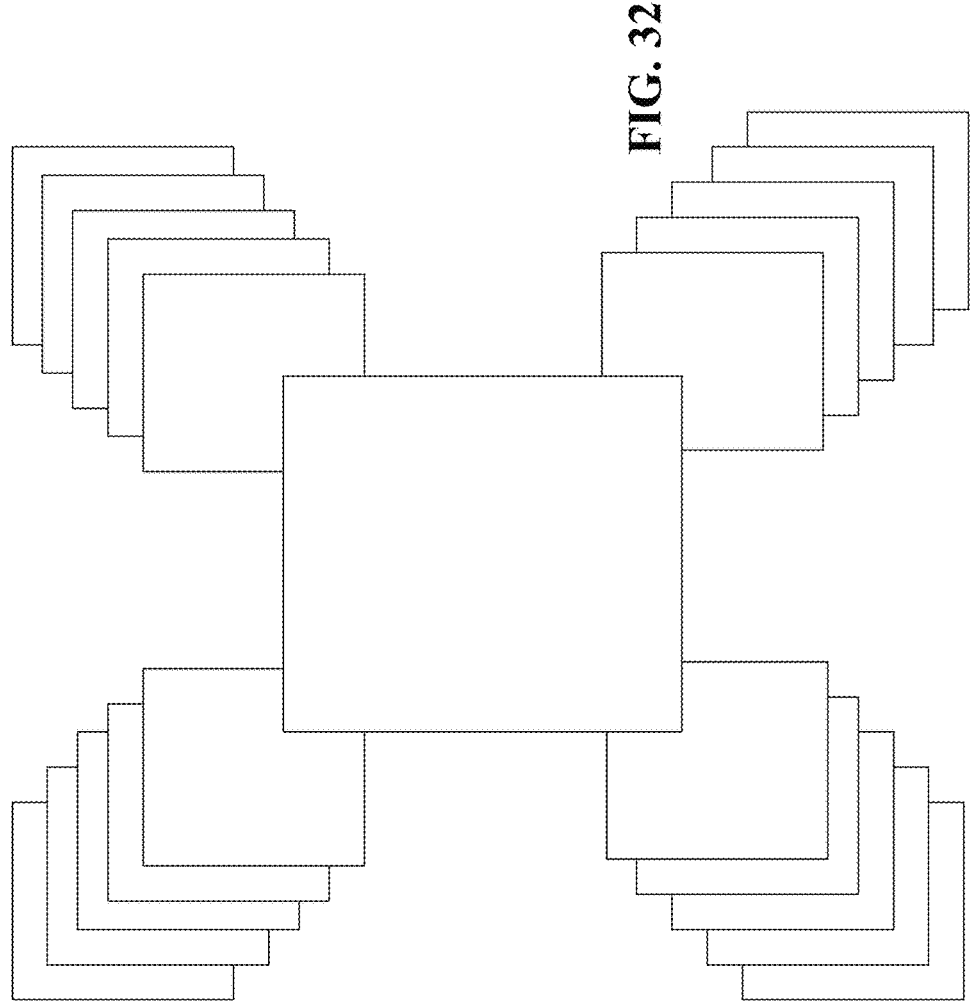
Figure 33:
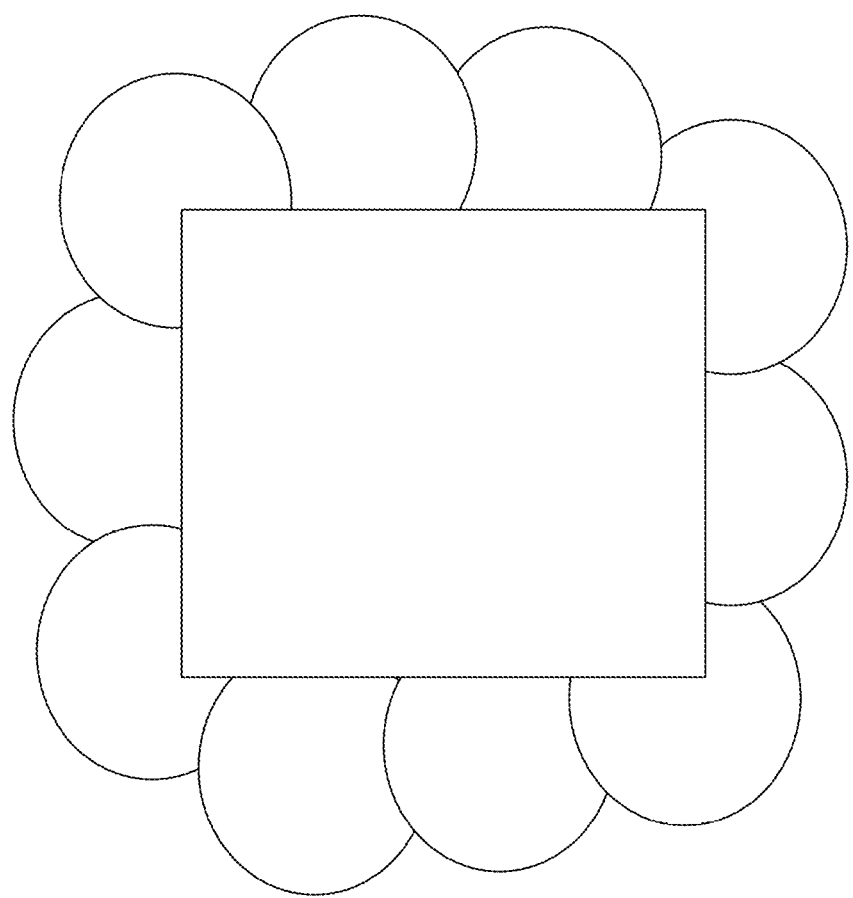

FIG. 26 illustrates that when message 3 is selected it is expanded to facilitate viewing thereof by a user. FIG. 27 illustrates that a user can optionally have the cluster appear as in an initial state when expanded. FIGS. 28 and 29 illustrate an alternative option for having the cluster appear in a same layout upon expansion.

FIGS. 30-33 schematically illustrate that the template component 250 can be employed with a plurality of pre-defined templates and/or dynamically generated templates to facilitate organization and presentation of data in accordance with the subject invention.

Figure 35:
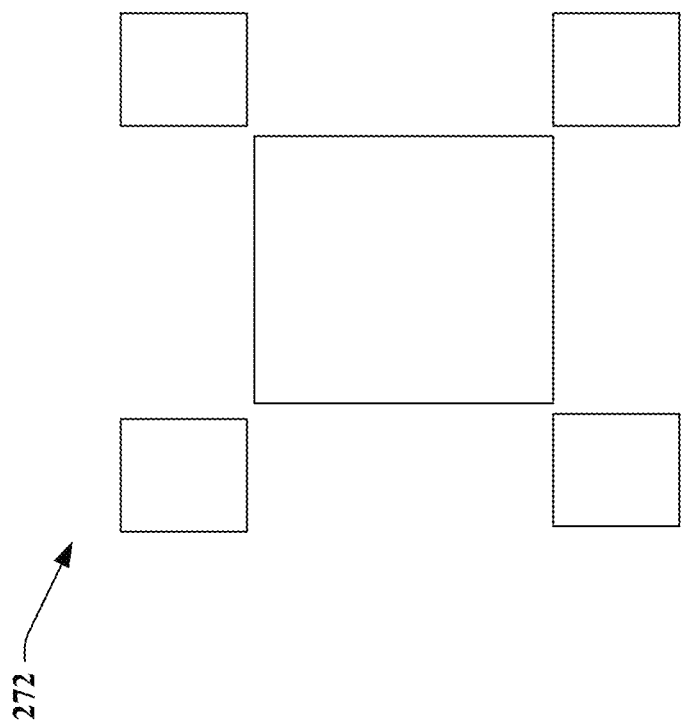
Figure 34:
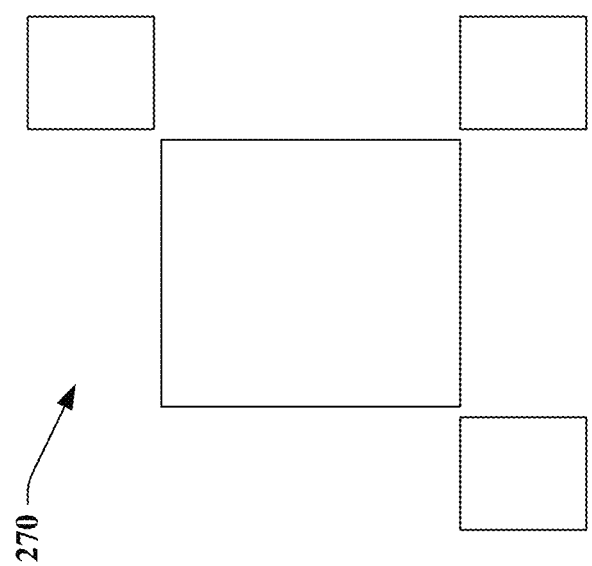
Figure 37:
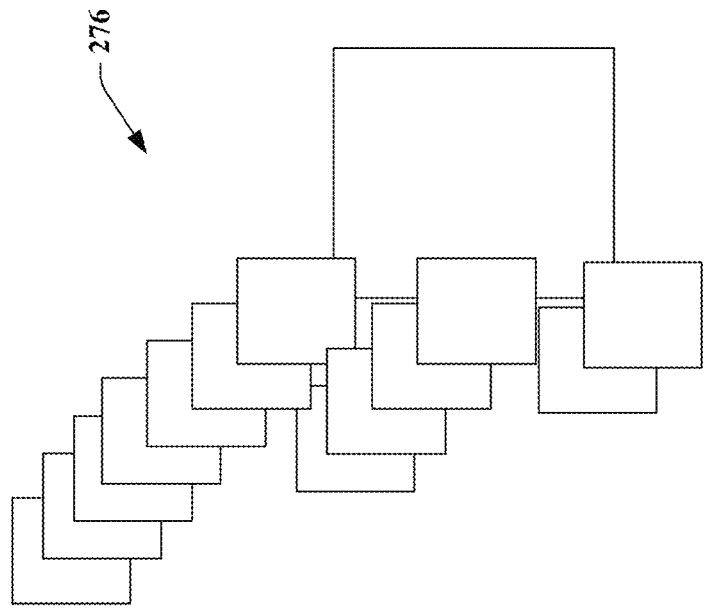
Figure 36:
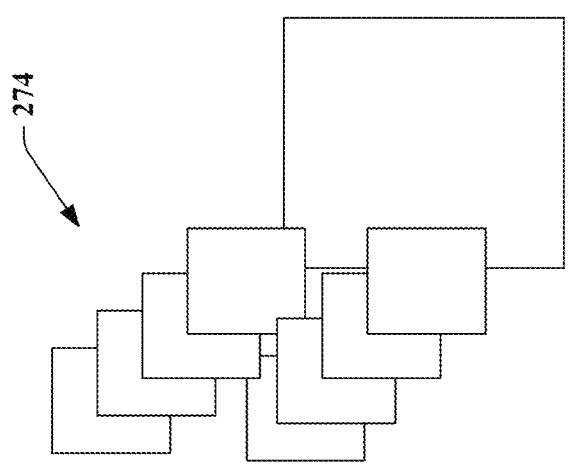

Turning now to FIG. 34, the template component 250 can provide for automatically learning a configuration for a data type and thereafter apply such learned configuration to a new set of data. For example, FIG. 34 illustrates a layout 270 generated by a user in connection with particular data. Thereafter, template component 250 can be directed to learn the layout 270 and apply such layout to a new data set 272 as shown in FIG. 35. Note, that the new data set included more data to be graphically presented, and the template component organized the data in a manner inferred to be most consistent with the learned layout and/or consistent with inferred user desire for the manner in which the data should be presented. FIGS. 36 and 37 further illustrate this aspect of the subject invention with respect to data sets 274 and 276, respectively.

Figure 38:
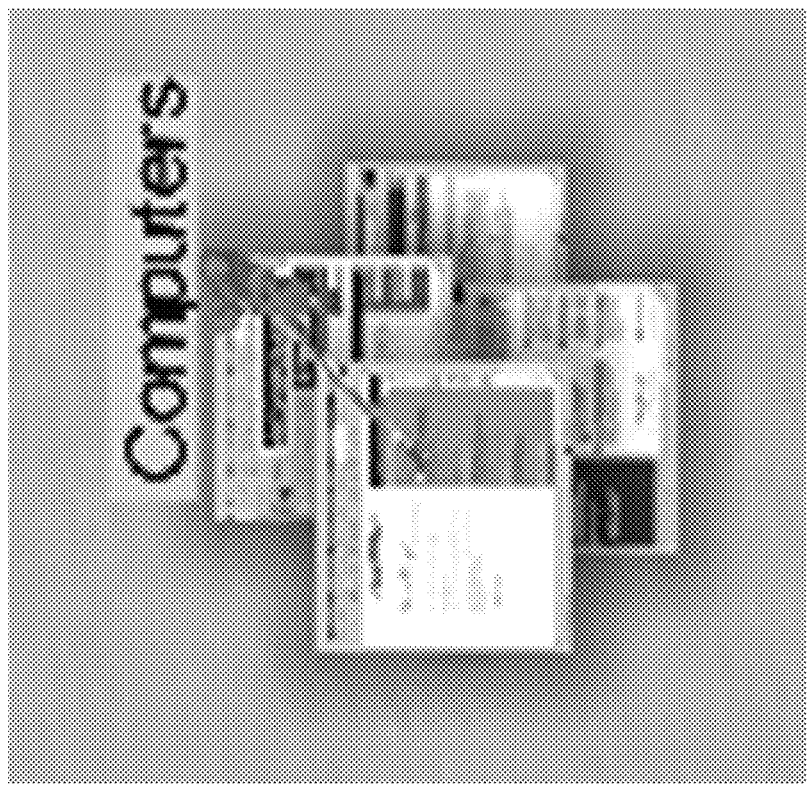
FIGS. 38-42 illustrate various aspects of the invention related to markers for windows and/or clusters, and schemes for differentiating and/or distinguishing windows and/or clusters.
Figure 39:
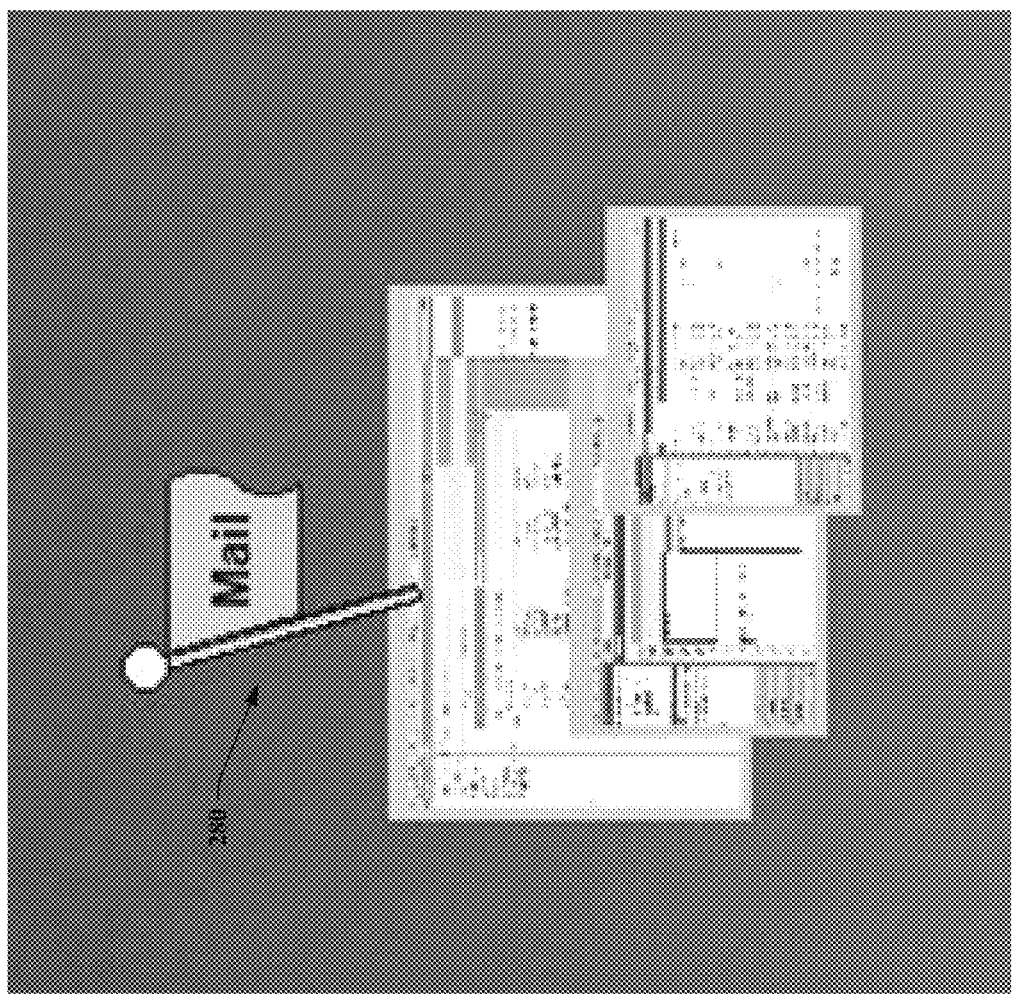
Figure 40:
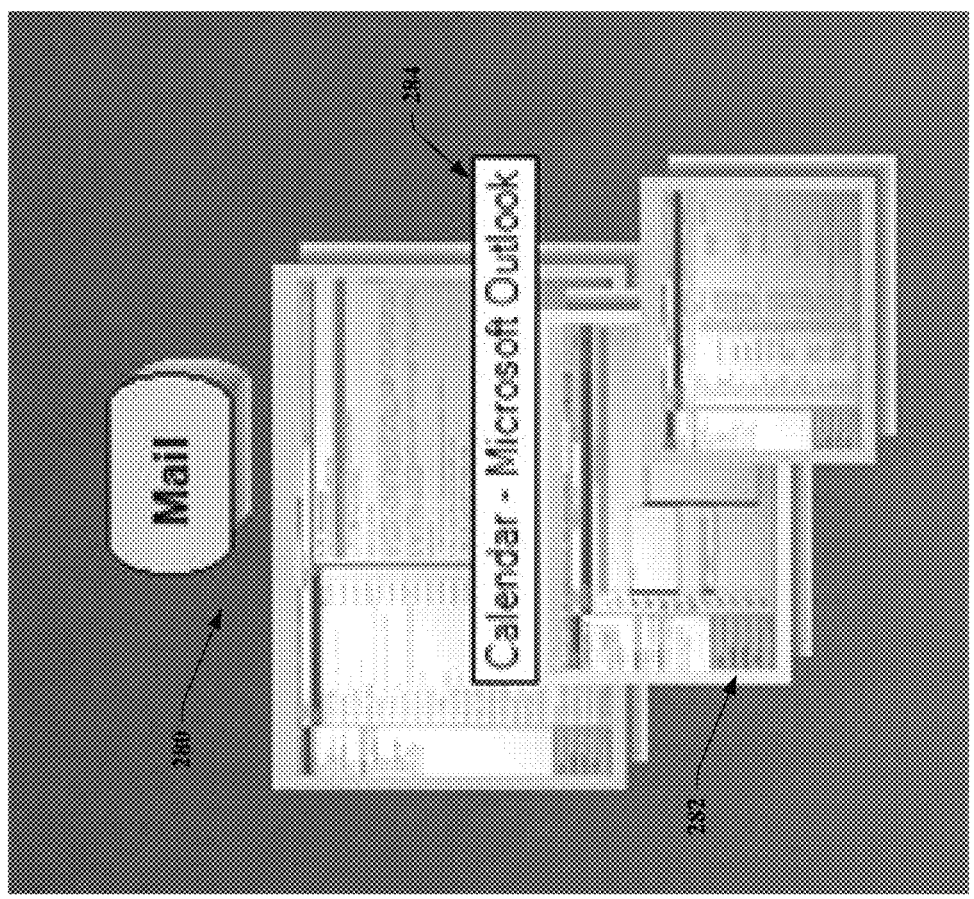

FIGS. 38-42 illustrate various aspects of the invention related to markers for windows and/or clusters, and schemes for differentiating and/or distinguishing windows and/or clusters. FIG. 38 is a screenshot illustrating an embodiment of the invention in connection with an indication of what it is like to drag a window from the focus area to the periphery. FIG. 39 depicts a close-up of a task—note that the windows have a colored banner that matches the color of the task marker 280, and have transparent drop shadows. When a user hovers over a window, a yellow border 282 (FIG. 40) is drawn around the window and a tool tip 284 shows the full window title. The task marker 280 is a 3D image of a place marker with the name of the task on the tag in the clip. Window avoidance behavior with respect to windows being of arbitrary sizes and shapes can be scaled with a preservation of aspect ratios—a scaling algorithm in accordance with such aspect of the invention should facilitate ensuring that some minimum area of any window remains visible.

Persistence of window state poses a number of serious challenges, and in particular window-configuration persistence is a challenge. Determining how to restore an arbitrary application to a same state in Windows® can be prone to uncertainty because internal application state (e.g., which files are open) may not be accessible. In accordance with an aspect of the invention to address this situation window position, size, and title can be saved. When a system in accordance with the invention is restarted, if an open window of a same title is discovered, it will be restored to a last state it was rendered within the system. If the window is not present, the system does not try to start an application and restore its running state. The system can optionally allow for restoring and changing state for multiple monitors and changing display resolutions, for example by preserving window size and position information as percentages of display size. When display resolution changes, windows and tasks are moved to an appropriate location.

Figure 41:
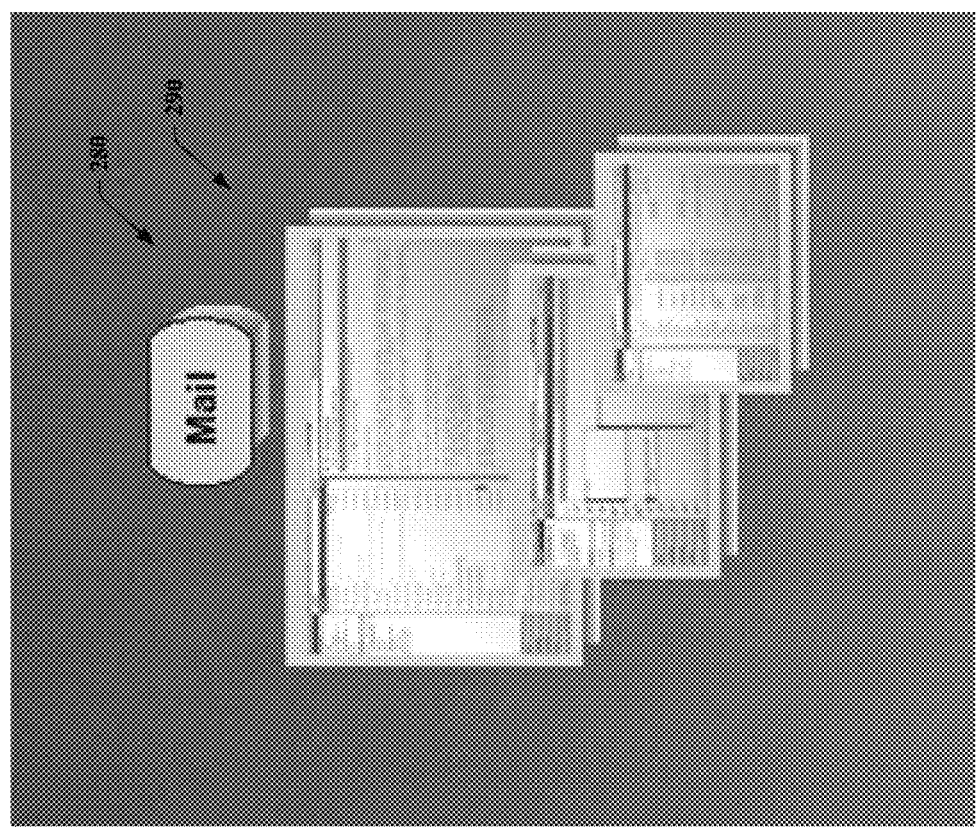
Figure 42:
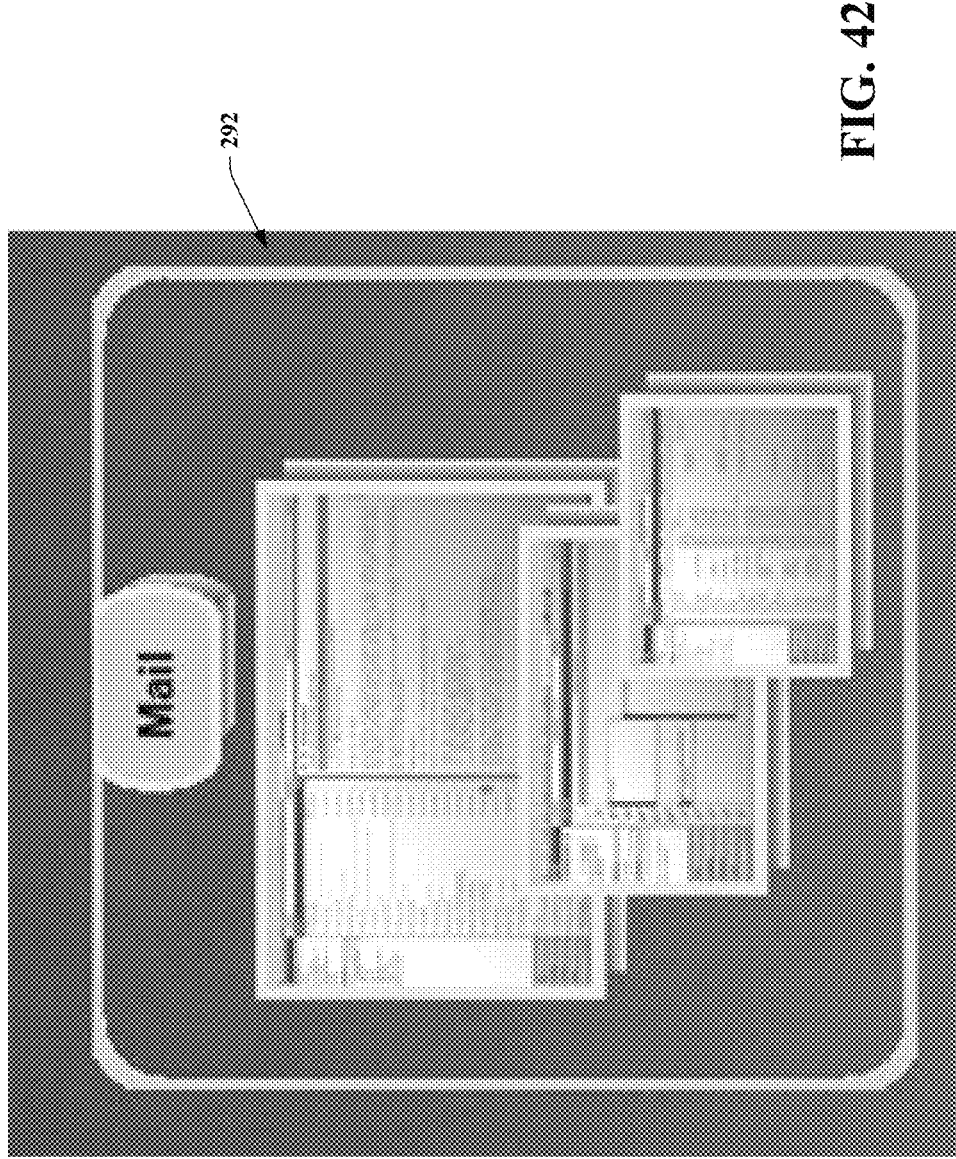
Figure 43A:
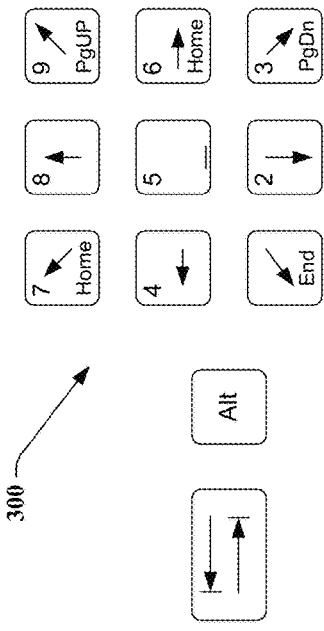
FIGS. 43-45 illustrate various aspects of the invention in connection with navigating among and/or within clusters via keys of a computing device.
Figure 43C:
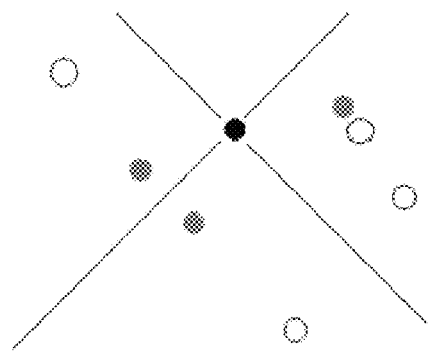
Figure 43B:
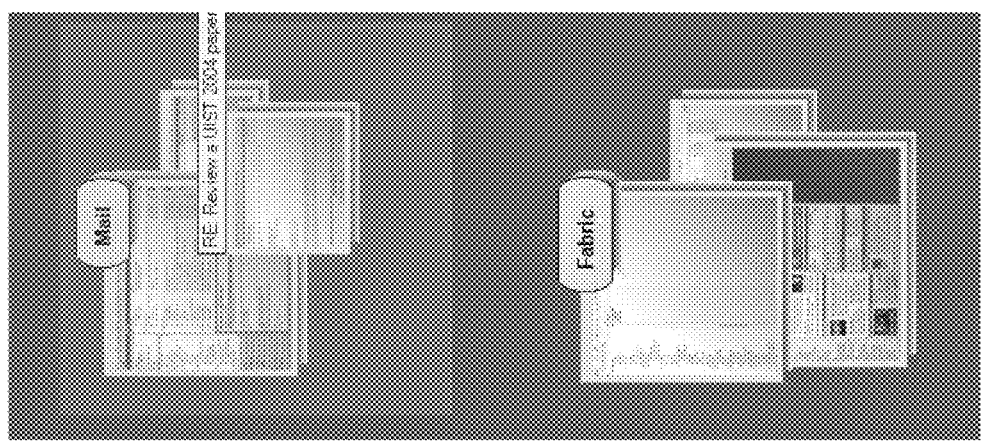

FIG. 41 illustrates a close-up of an alternative design 290 of windows and task markers, in accordance with the invention, where a user can hover over a window (e.g., via a cursor) to cause a title tool tip to appear. Windows are now anti-aliased for more readability, which also mitigates them from flickering while being moved. A shaded gradient was added over the window and drop shadows were added under the window to make the windows more distinguishable. The task marker 280 was simplified to a two-stage marker. Most of the time the task marker appears as displayed in FIG. 41. However, if the user hovers over the marker or moves a window into the task group, a box 292 appears as rendered in FIG. 42.

Turning now to FIGS. 43a-45, many operating systems provide users with keyboard commands that enable them to switch among windows. The subject invention provides users with an analog to these commands to allow for keyboard access to tasks and windows within tasks. Alt-Tab is a standard keyboard shortcut for switching between windows. It displays a list of windows which the user can sequence through by repeatedly hitting Tab, and then releasing Alt to activate the selected window. An aspect of the invention provides for keyboard navigation mechanisms. To start a selection, for example, a user can hold a predefined key (e.g., Windows® key) and tap any arrow key 300. A peripheral object furthest in a selected direction (for example, if the left arrow key is pressed, the leftmost object) is selected. From there, the arrow keys move to the closest object in that direction—closest can for example be defined as "the object located less than 45 degrees from the selected direction which also has the shortest Euclidean distance from a reference object" (see FIG. 43c)—the black dot is the currently selected object, the gray dots represent the next object to be selected when the corresponding arrow key is pressed, and the white dots represent other objects. The lines through the black dot represent the 45 degree lines.

Figure 45:
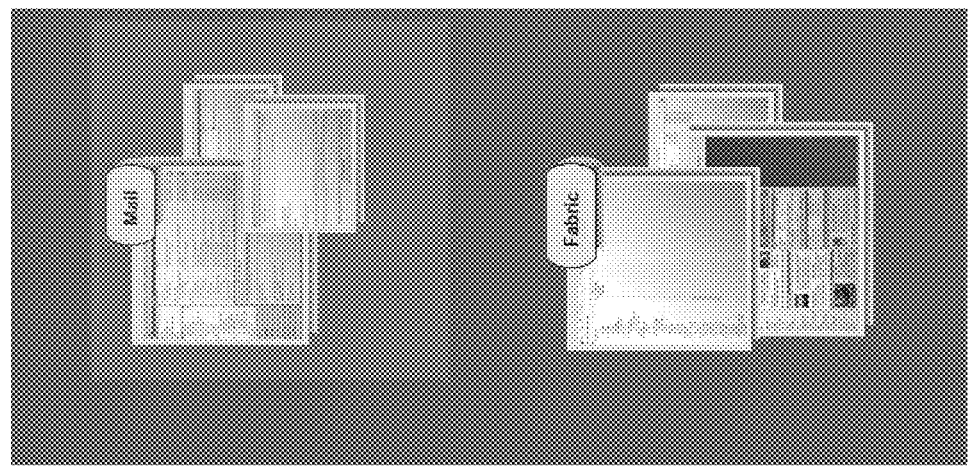
Figure 44:
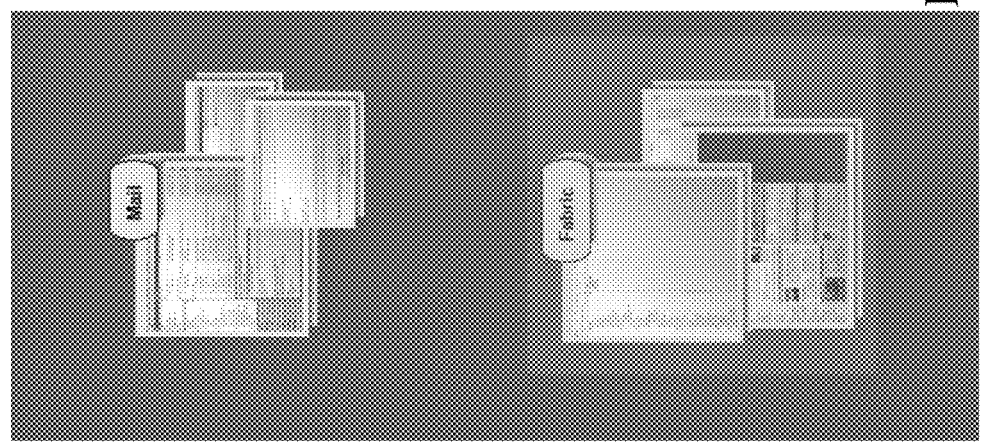

Once inside a group, the user can choose enter to select the entire group, or use the arrow keys (without the Windows® key depressed) to select through individual windows. An additional feature is switching to the previous selected group by pressing another set of predefined key(s) (e.g., Win+G), which is akin to Alt-Tab for focal windows as one tap of this combination results in selecting the previously activated window. In addition, Alt-Tab allows users to cycle through focal windows. The advantage of this style of navigation is that it allows users to use their spatial memory to access objects. The potential disadvantage is that more keystrokes may be needed to access an object than would be required with the standard Alt-Tab mechanism. FIGS. 44 and 45 illustrate navigating between clusters via keyboard strokes in connection with the invention.

It is to be appreciated that a user can pre-define any suitable set of keys to carry out desired navigation functionality in accordance with the subject invention. Moreover, a navigation component (not shown—which can be part of the scaling component, or other suitable component, or even serve as a separate dedicated component), can provide for employing artificial intelligence based techniques in connection with identifying which clusters or display objects within a cluster the user desires to navigate to. The analyses can be a function or utility (cost/benefit), display object content, user context, historical information, extrinsic information, etc. Furthermore, it is to be appreciated that such navigation aspects of the subject invention are not limited to key strokes, but that other instructions schemes are contemplated and intended to fall within the scope of the hereto appended claims. For example, the navigation component can receive audio (e.g., voice) commands from a user and facilitate navigation among clusters and/or display objects based on such audio-type commands. A user can train the navigation component to effect particular navigation functions in accordance with specific commands. More particularly, it is to be appreciated that the subject invention is not limited to mouse/pointer based controls and that various input schemes (e.g., voice control, hand movement, gestures, facial recognition, etc.) can be employed in connection with the invention.

Additionally, it is to be understood that key strokes in accordance with the subject invention are intended to apply to keys of portable computing devices (e.g., telephones, PDAs, etc.) and that the key interface and/or voice command interface can be employed in connection with the herein described navigation functionalities of the subject invention.

FIGS. 46-52 illustrate various aspects of the invention relating to cluster avoidance techniques. As discussed supra, the scaling component 130 can provide for cluster avoidance—it is to be appreciated the invention contemplates employment of a separate dedicated cluster component if desired. The cluster controls can include a clustering algorithm that is applied to implement clustering of objects relative to cluster indicators in accordance with an aspect of the present invention. The clustering algorithm can be operative to determine an appropriate cluster to which an object is to be associated based on a relative location or proximity between the object and the respective cluster indicators. For example, such a determination can be made based on location information associated with the respective cluster indicators and a selected graphical object, such as when the object is moving or when supplied to the image space. The clustering algorithm can be programmed to automatically associate each object with an appropriate cluster based on the distance of determination. Alternatively or additionally, a threshold distance can be utilized, wherein a given object must be within the threshold distance of a respective cluster indicator in order to be associated with that respective cluster.

The clustering algorithm further can be operative to automatically arrange graphical objects in a respective cluster so as to maximize utilization of the image space. Further, in a three-dimensional space, the clustering algorithm can arrange graphical objects in a respective cluster so as to partially occlude other objects, but still provide sufficient visual information to distinguish the graphical objects from each other.

Figure 46:
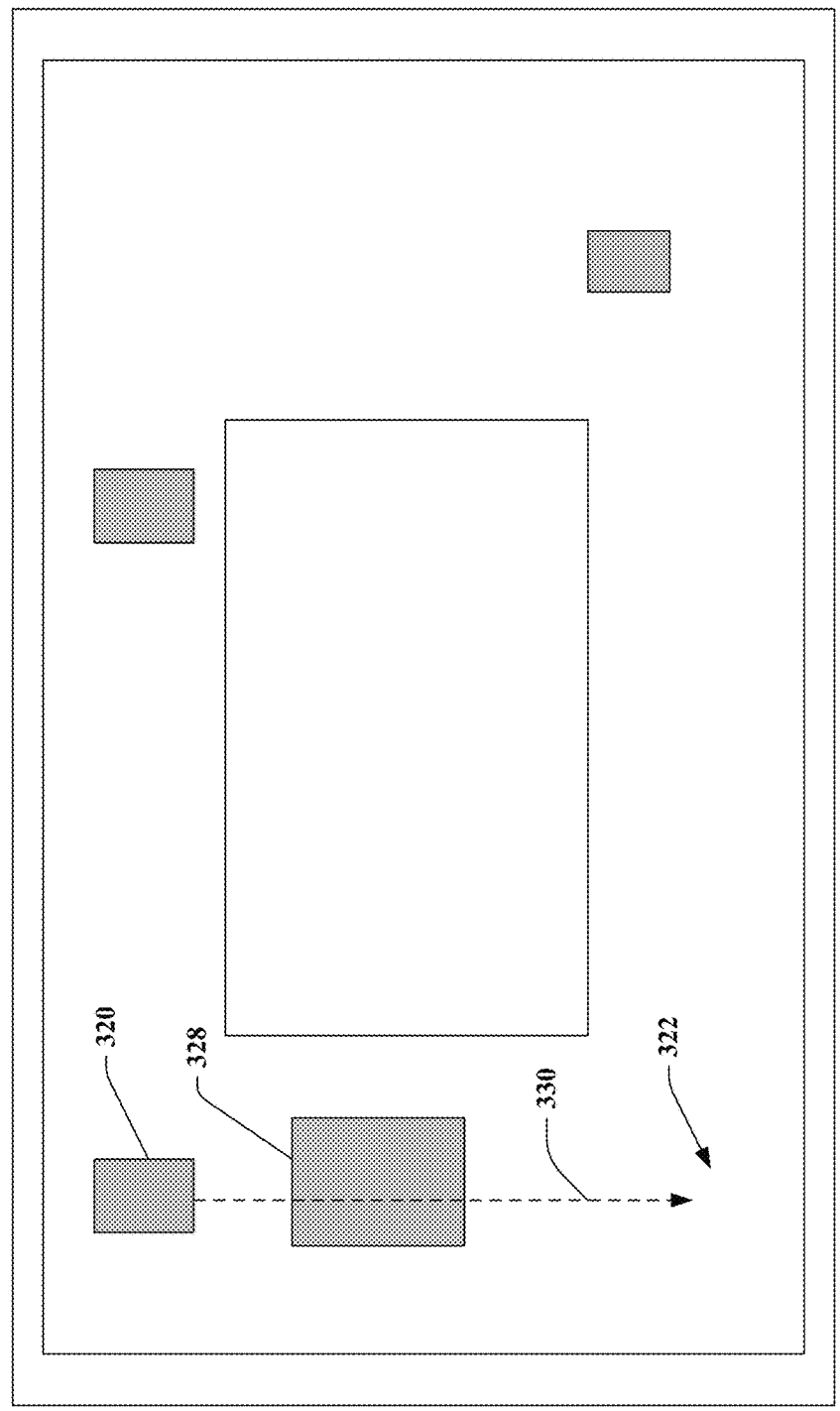
FIGS. 46-52 illustrate various aspects of the invention relating to cluster avoidance techniques.
Figure 47:
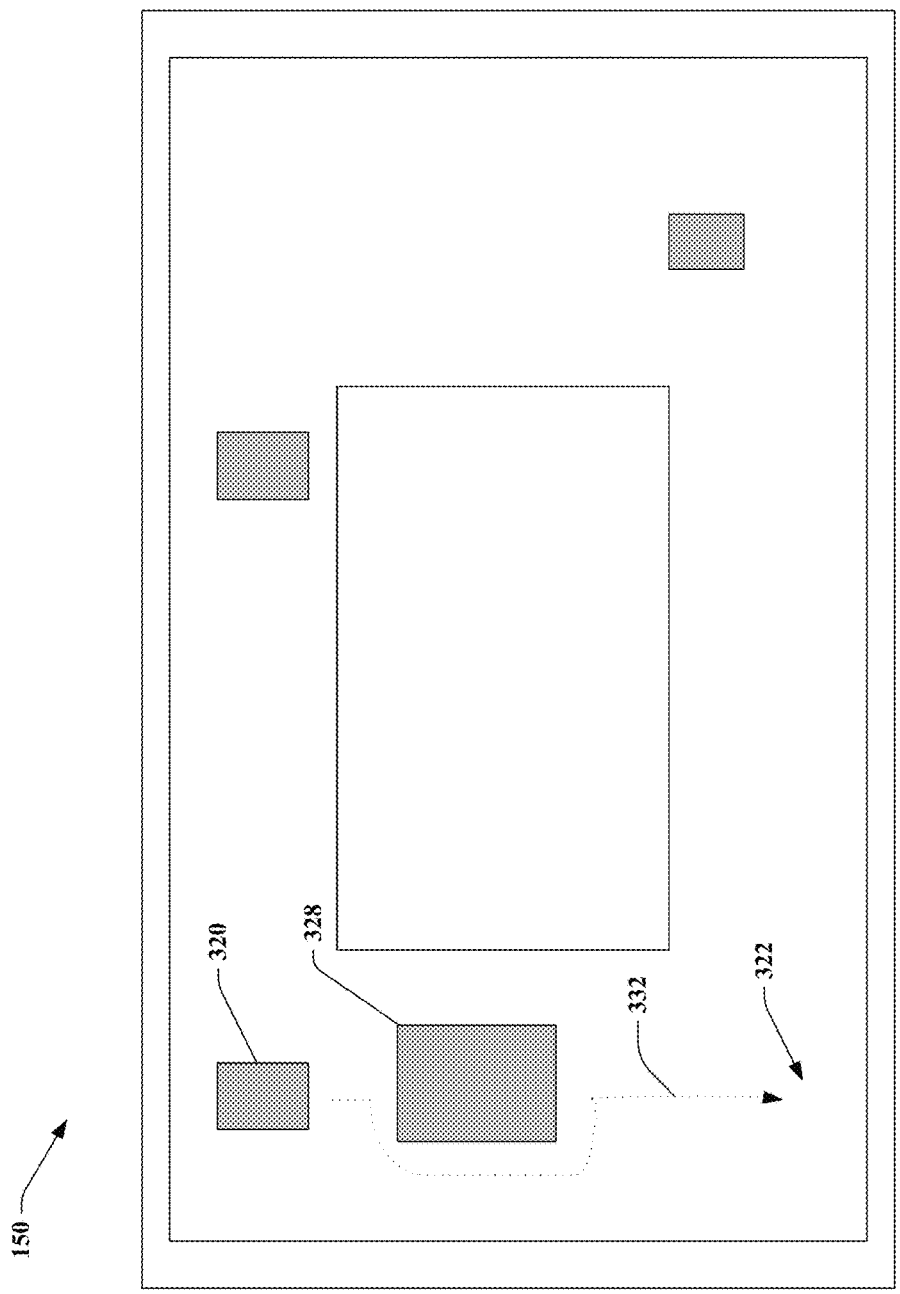
Figure 48:
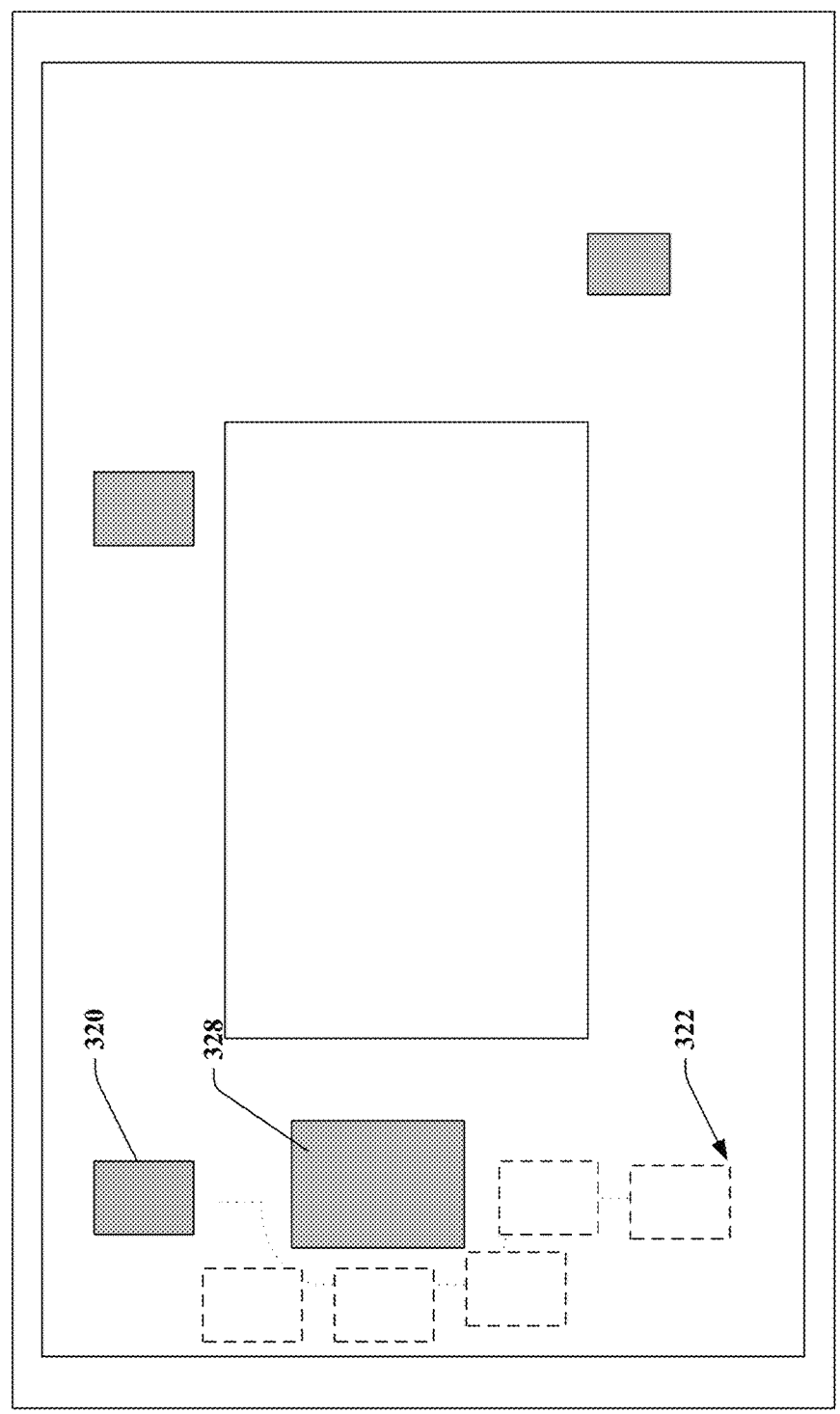
Figure 49:
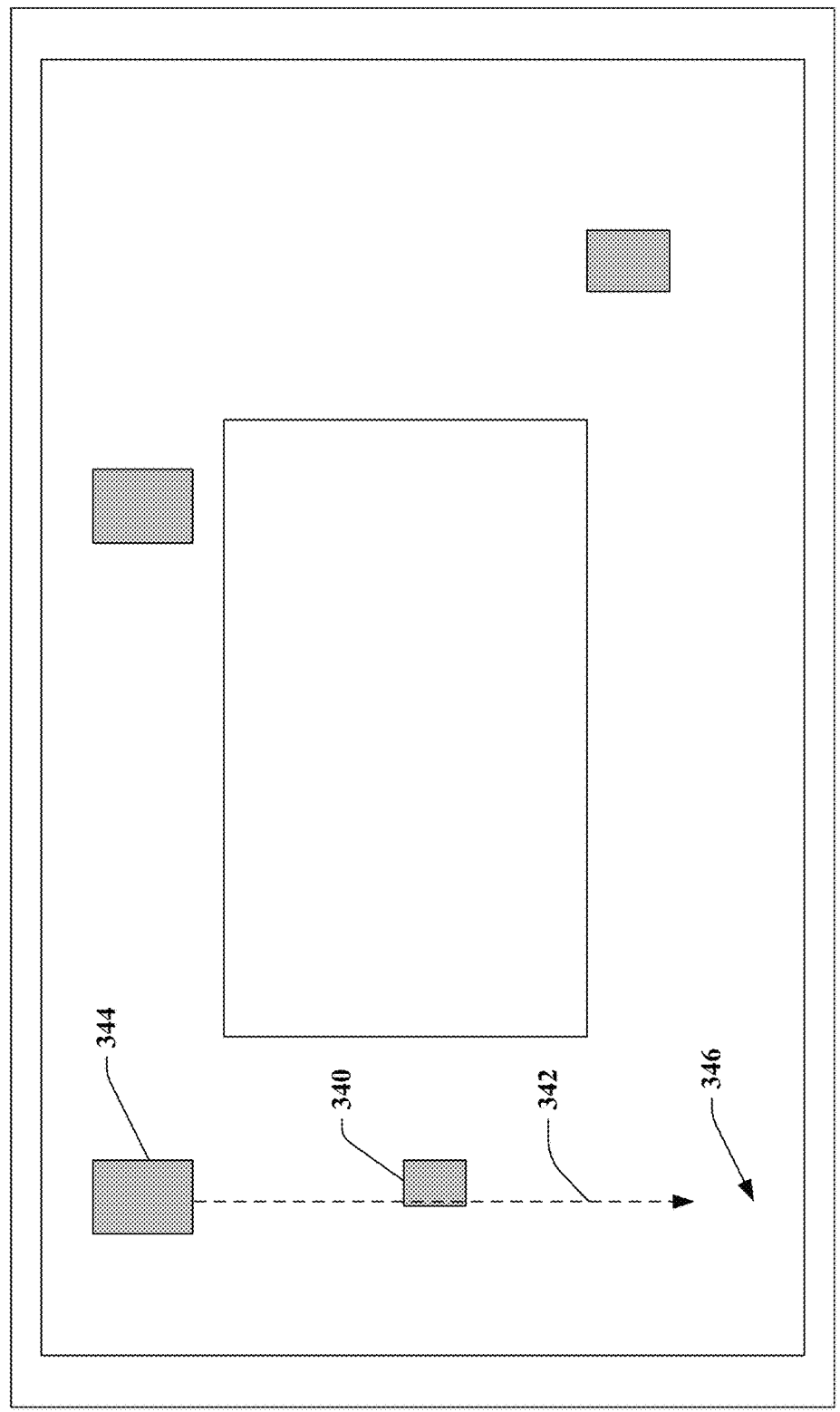
Figure 50:
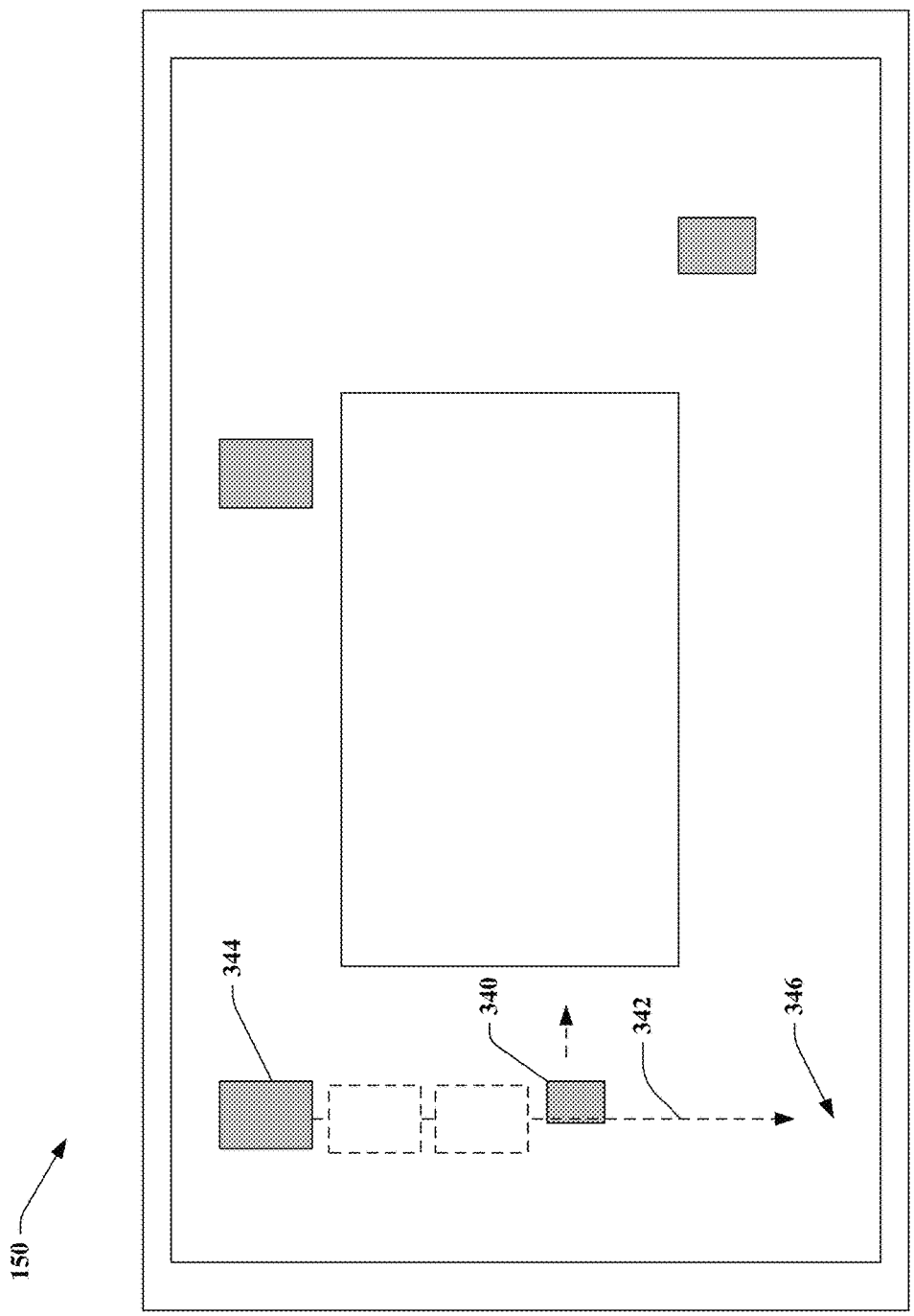
Figure 51:
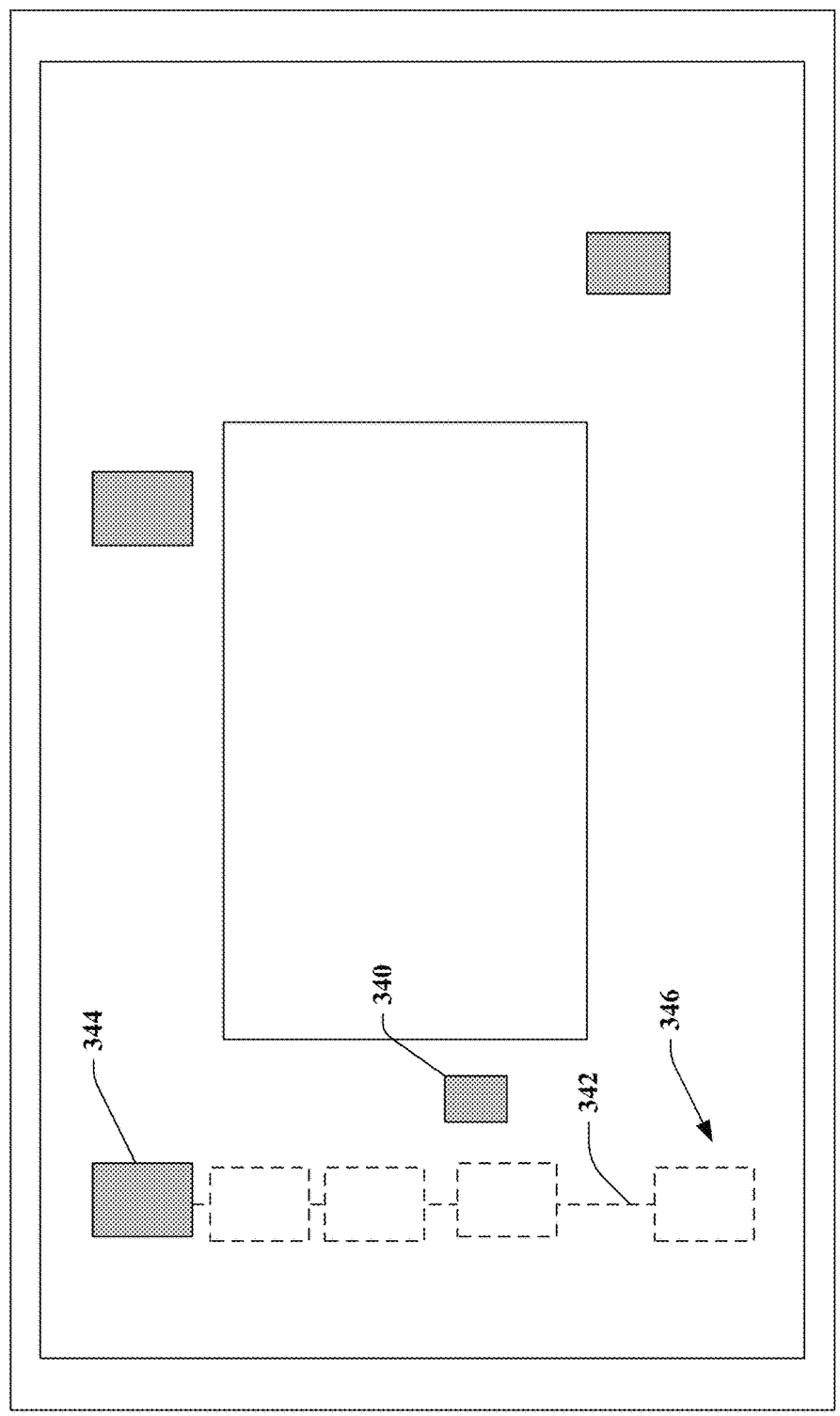
Figure 52:
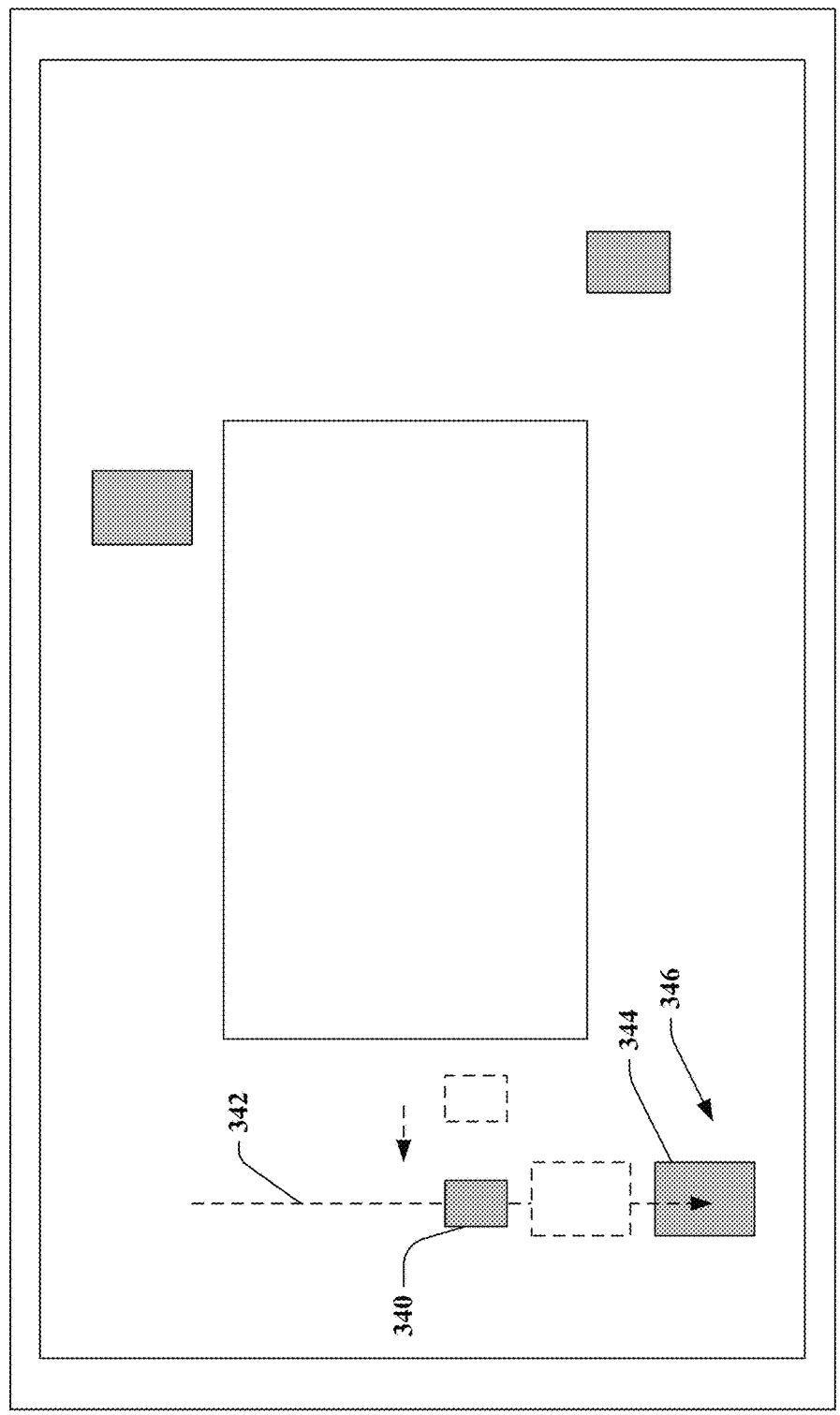

A cluster movement/avoidance scheme can be employed to control movement of a selected cluster in the image space and interactions between clusters in accordance with an aspect of the present invention. FIG. 46 illustrates a cluster 320 that is desired to be moved to a new location 322; however, another cluster 328 lays in the direct path 330 between the cluster 320 and the desired intended final destination 322. In accordance with one particular cluster avoidance technique in accordance with an aspect of the invention, although a user may drag the cluster 320 along path 330, the cluster actually will migrate along new path 332 (to reach destination 322) so as to not cause cluster 328 to be moved as depicted in FIGS. 47 and 48. It is to be appreciated that in the event a path from an original location to a final destination is heavily occupied by multiple clusters the migrating cluster could also ghost through the clusters in its path so that no situated clusters are displaced.

FIGS. 49-52 illustrate another cluster avoidance technique in accordance with the subject invention where a cluster 340 that is in the path 342 of a cluster 344 and its intended destination 346 moves out of the way of the cluster 344 and springs back to its original location after the cluster 344 has passed through. More particularly, it may be desirable for a selected cluster that is being moved to push other clusters when within a predetermined distance of the other cluster. The predetermined distance can be a two-dimensional distance on the screen or a simulated three-dimensional distance according to the simulated three-dimensional image space. Such an avoidance technique can help mitigate occlusion of the objects in the respective clusters as a given cluster (or group of clusters) is being moved in the image space. In addition, after a cluster has been pushed or moved from its original location, such as in response to being bumped or pushed by a selected cluster, the cluster may rebound back to its original pre-push position after the selected cluster has been moved sufficiently away from the pre-push position. The rebounding can be performed so that the cluster returns back to its original position or it can rebound to an alternative location in the image space based on the available locations and the relative size of the particular cluster. Those skilled in the art will understand and appreciate various modes of animation that can be utilized to provide a pleasing transition during the rebound condition.

The cluster controls further can include a cluster context scheme, which provides a menu of available operations that can be performed relative to a selected cluster or group of clusters. The cluster context scheme, for example, can display a pop-up menu of available options, which can include other associated pop-up or drop down menus. Some possible menu options include sending the selected cluster (including all associated objects, e.g., image data, textual data, audio data, video data, associated applications) to a desired destination. The destination can include hardware and/or software, which may reside on, or be coupled to the computer or other device running the GUI. Alternatively, the destination can be a remote destination, such as an email recipient, a Web page, or other device. The options also can allow editing of cluster annotations as well as viewing images as part of a show, which can include annotations. Based on the description herein, those skilled in the art will understand and appreciate other possible operations that can be performed on a cluster in accordance with an aspect of the present invention.

Figure 53:
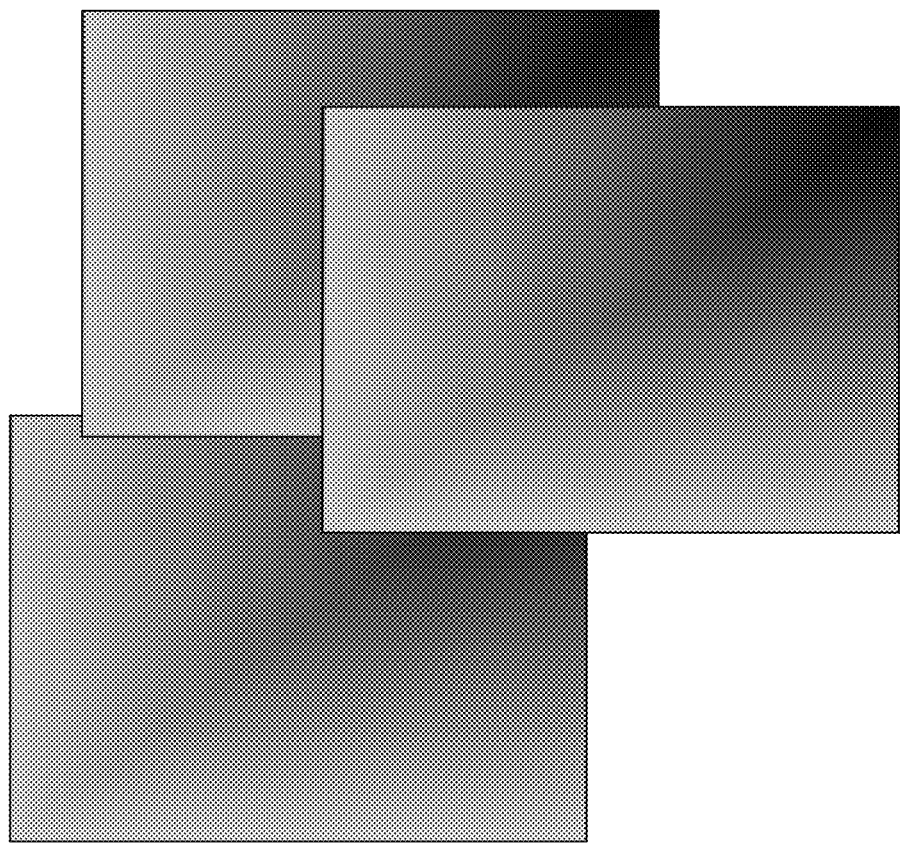
FIGS. 53-60 illustrate various aspects of the invention regarding employment of gradients to facilitate differentiating windows and/or clusters.
Figure 55:
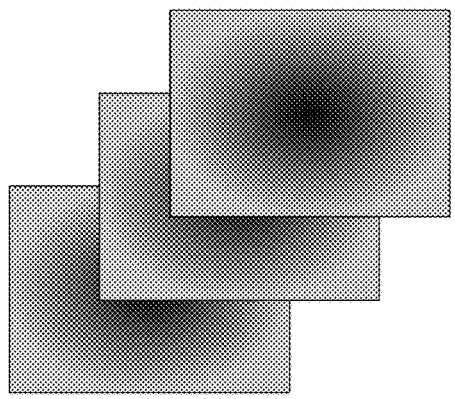
Figure 56:
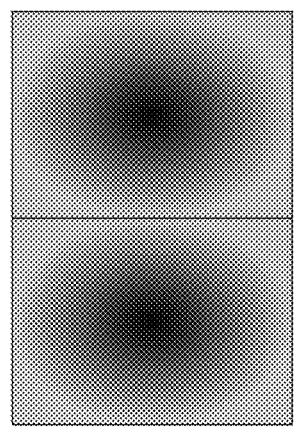
Figure 54:
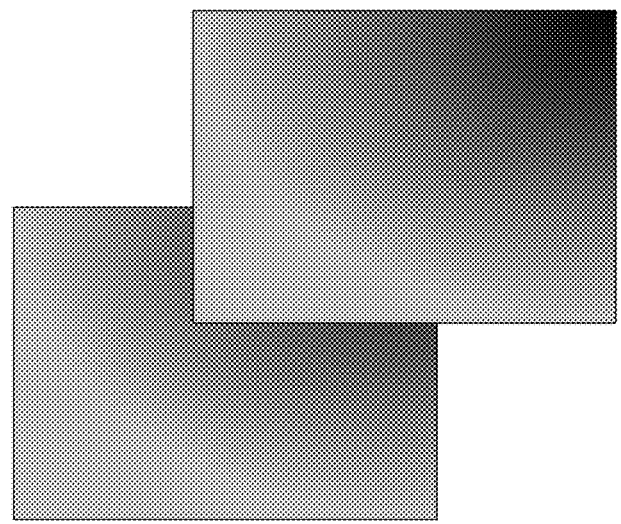
Figure 57:
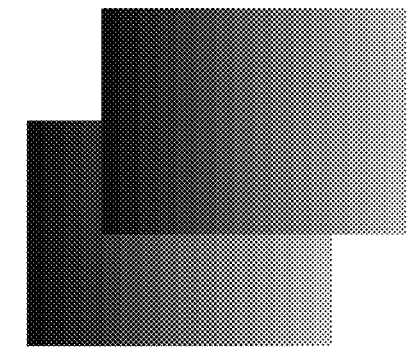
Figure 58:
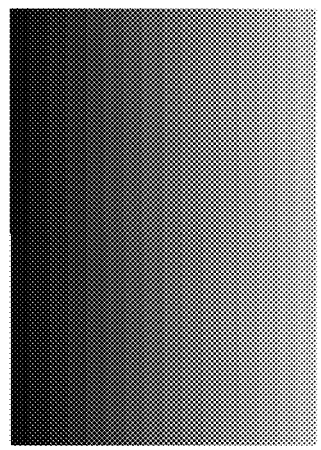
Figure 59:
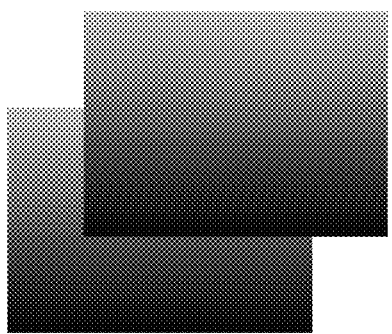
Figure 60:
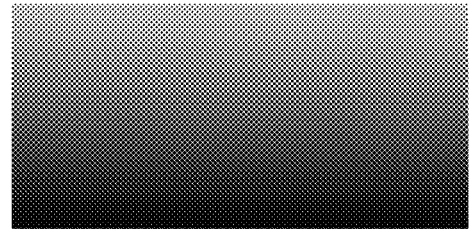

FIGS. 53-60 illustrate employment of gradients within windows to facilitate distinguishing respective windows of a cluster from one another. FIG. 53 illustrates employment of diagonal gradients where color transitions along a diagonal axis of the window. It is to be appreciated that the color can transition from darker to lighter or even variations of color or contrast in either direction as long as the gradient is consistently applied to respective windows. FIGS. 54-56 illustrate alternative gradient types that could be employed in accordance with the subject invention; however, it is appreciated that certain gradients are deficient as compared to the diagonal gradients with respect to particular applications (e.g., two windows are directly adjoining vertically or horizontally). To further emphasize this distinction, FIGS. 57 and 58 illustrate employment of vertical and horizontal gradients, and it is readily apparent (as shown in FIGS. 59 and 60) that the gradients are deficient if the windows are arranged coincident to the respective gradients making differentiation between respective windows difficult.

It is to be appreciated that the gradients can be dynamically changed so as to optimize differentiation of display objects in accordance with the subject invention.

Figure 61:
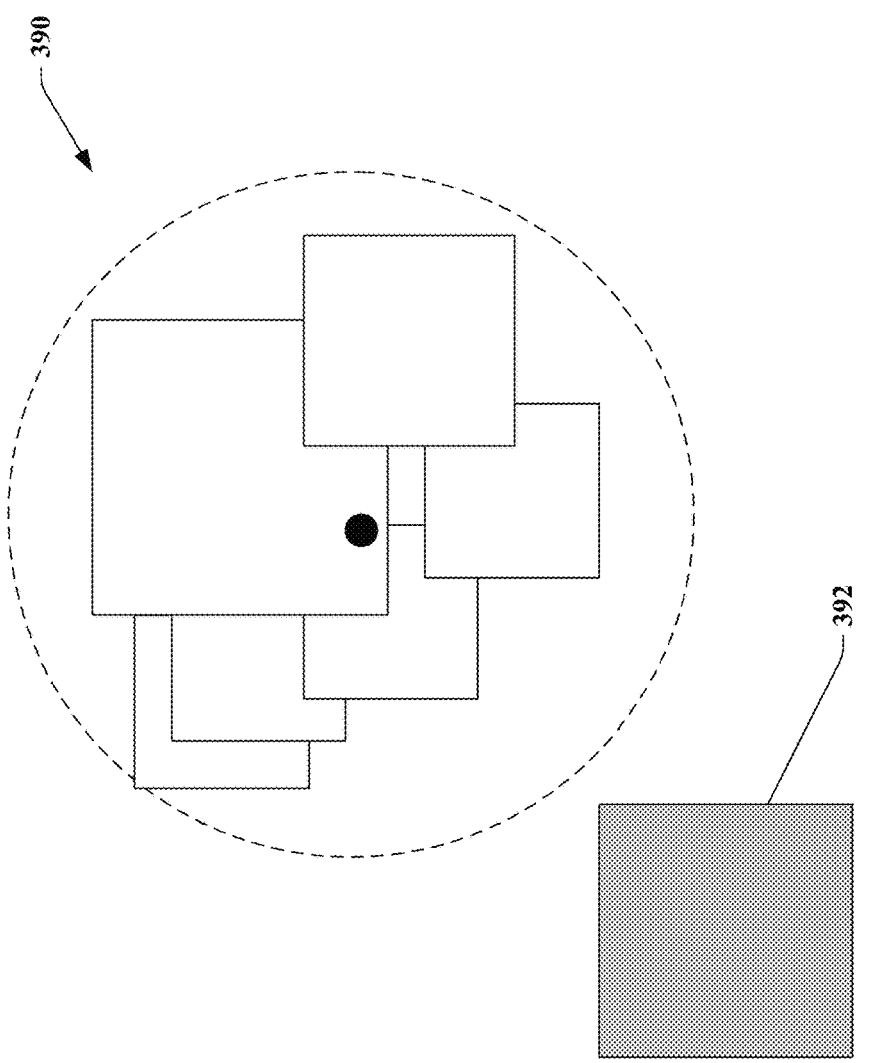
FIGS. 61-63 illustrate various aspects of the invention in connection with window detection and clustering.
Figure 62:
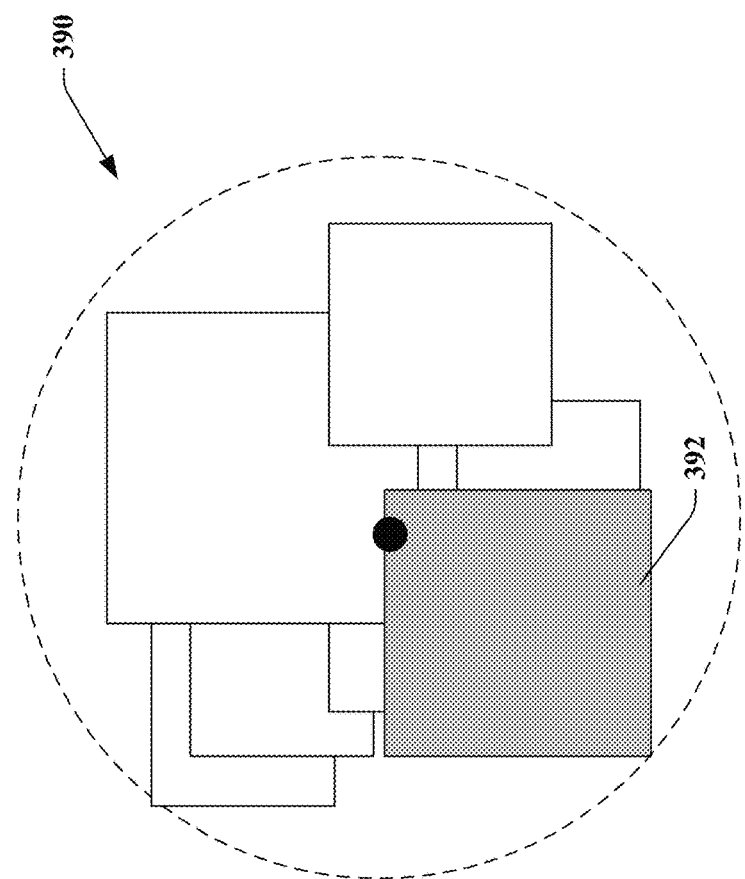
Figure 63:
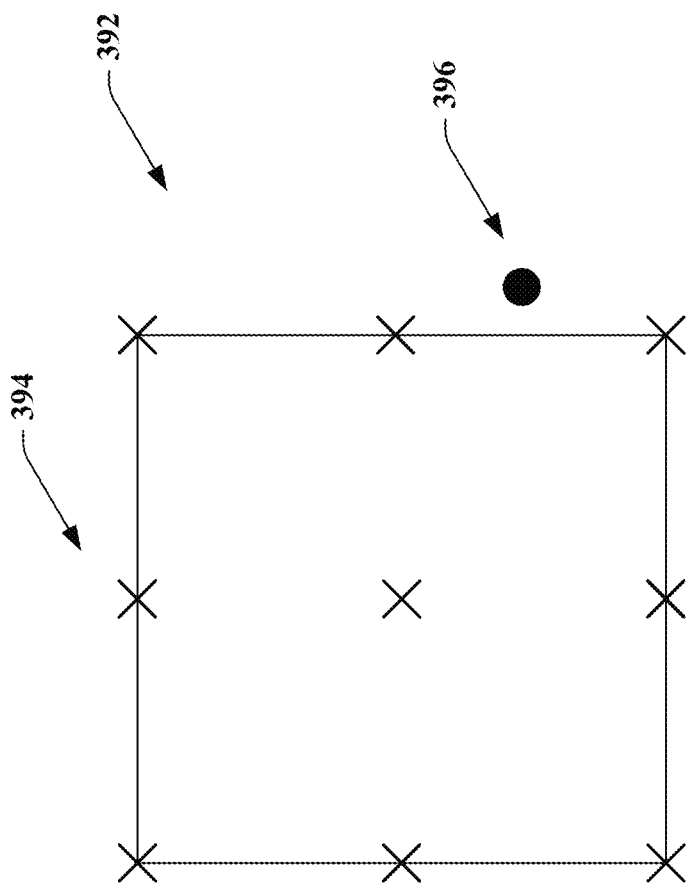

FIGS. 61-63 illustrate various aspects of the invention in connection with window detection and clustering. A problem associated with clustering is determining when a display object 392 (e.g., window) becomes part of a cluster 390 as it moves closer to the cluster 390. The invention provides for employment of a proximity algorithm (that can be incorporated into any suitable component, such as the scaling component, or serve as a separate dedicated component). The proximity algorithm identifies a set of points 394 (e.g., nine different points (4 corners, center and 4 midpoints of edges)) of a display object and determines which of any of the points is closest to a centroid 396 of a cluster, and based on such distance determine whether or not to associate the display object 392 with the cluster 390. The determination can be based in part as a function of display space available. Additionally, the determination could be based in part on absolute distance or relative distance, or if one display objects intersects another display object (or nearest edge to nearest edge). Moreover, such determination could be based on a utility based analysis, inference, user context, display object content, historical data, extrinsic data, etc.

Figure 64:
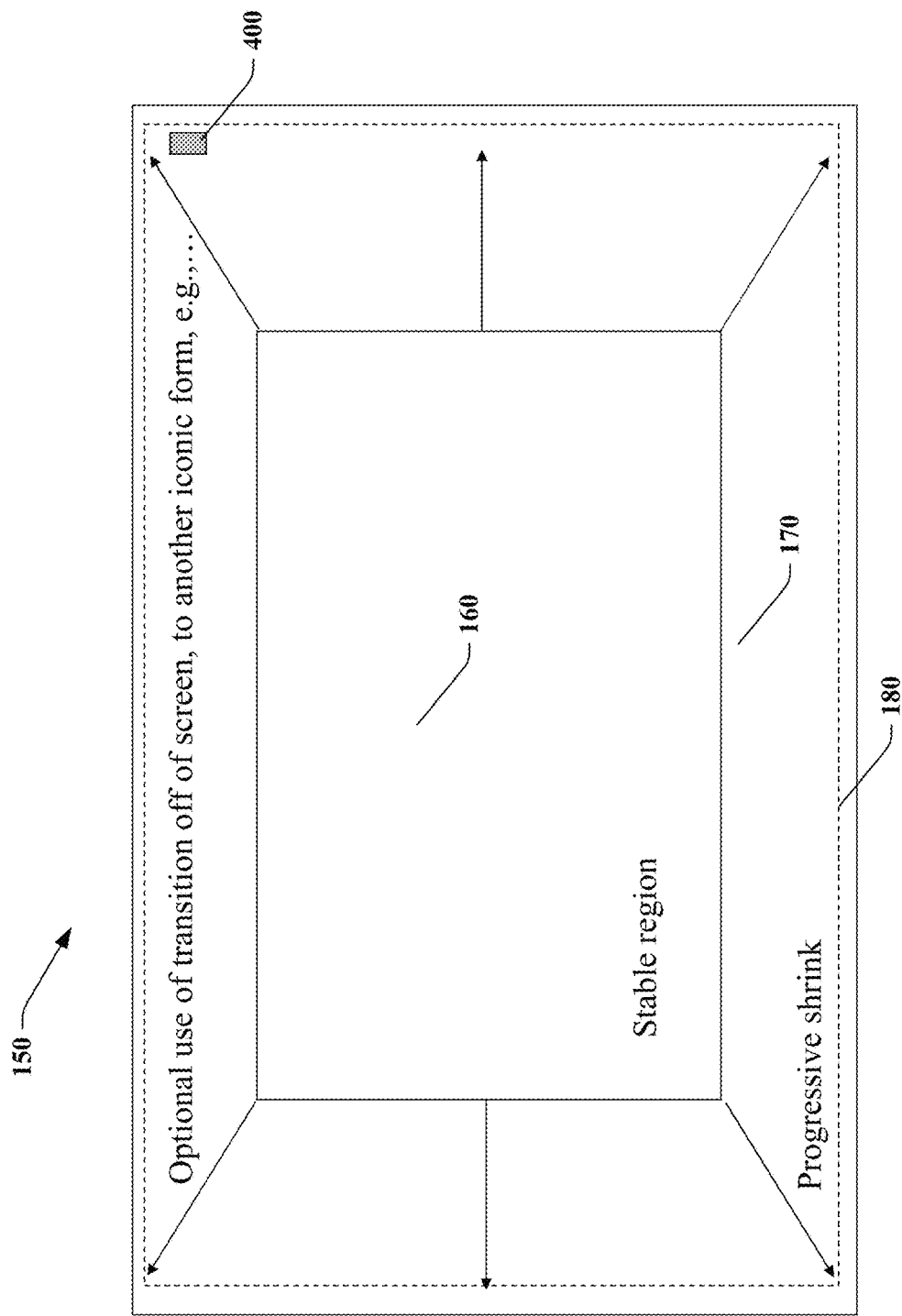
FIGS. 64-82 illustrate an optional aspect of transition of display objects off of screen (e.g., to side bar) to another iconic form in accordance with the subject invention.
Figure 65:
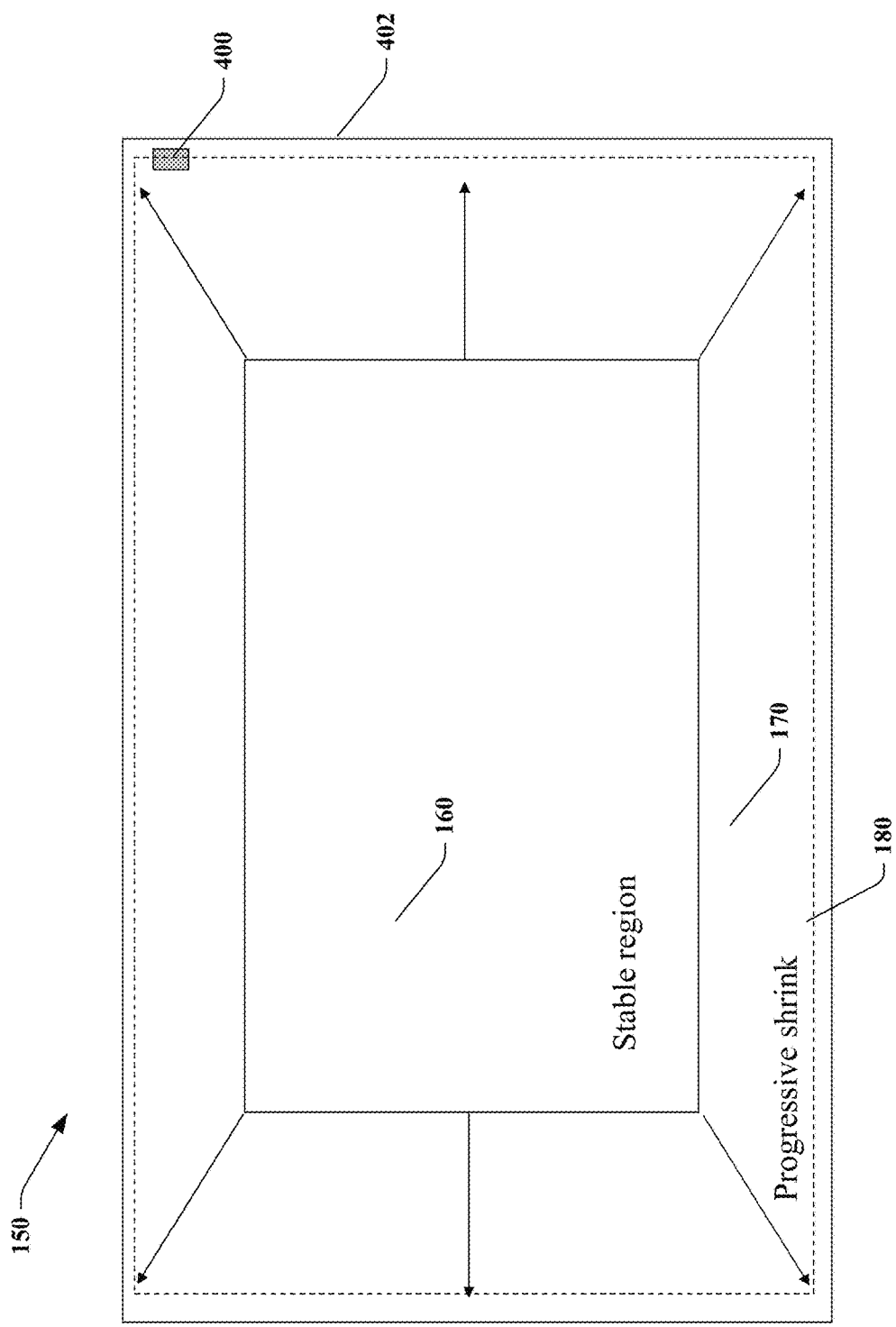
Figure 66:
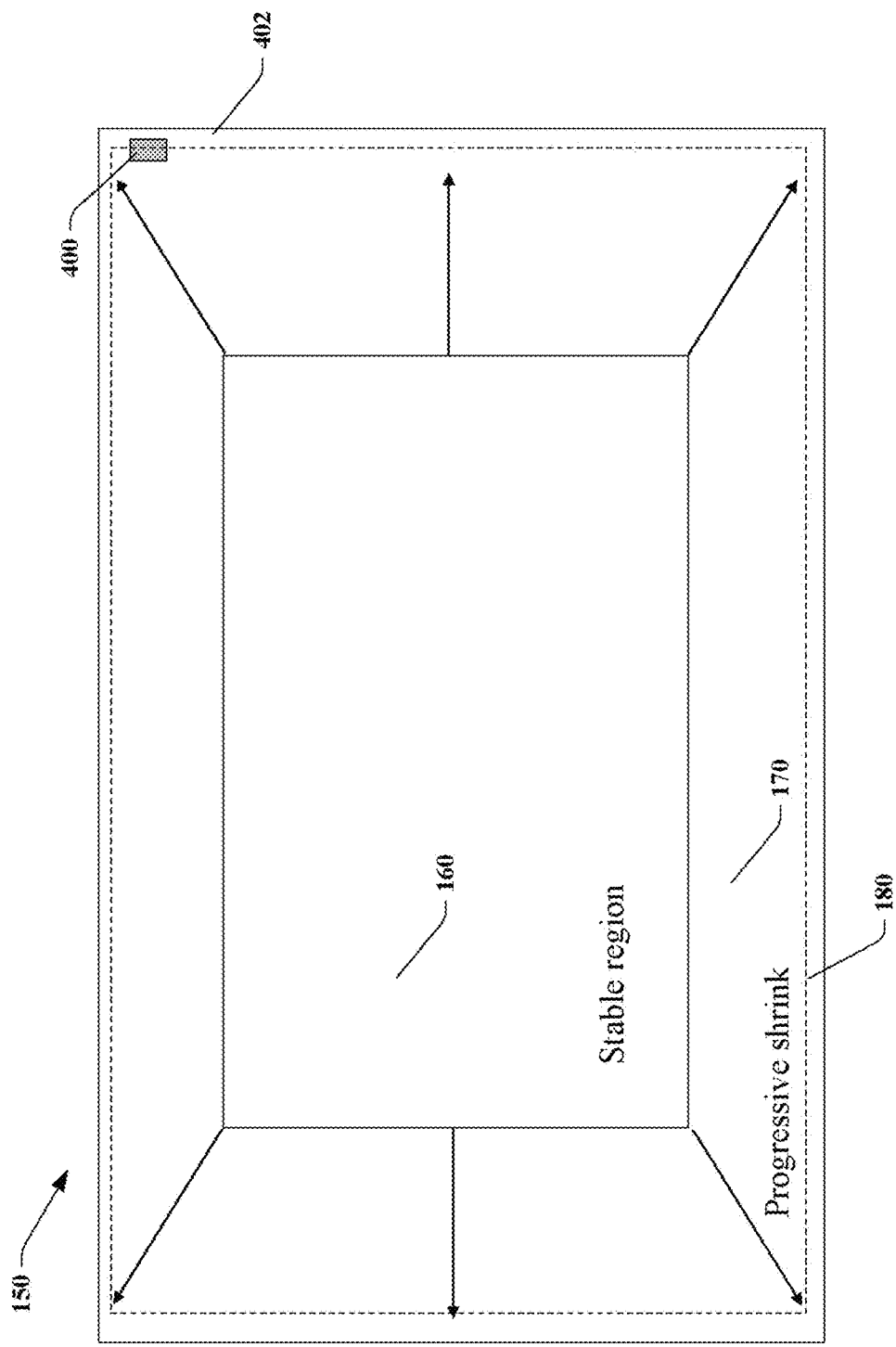
Figure 67:
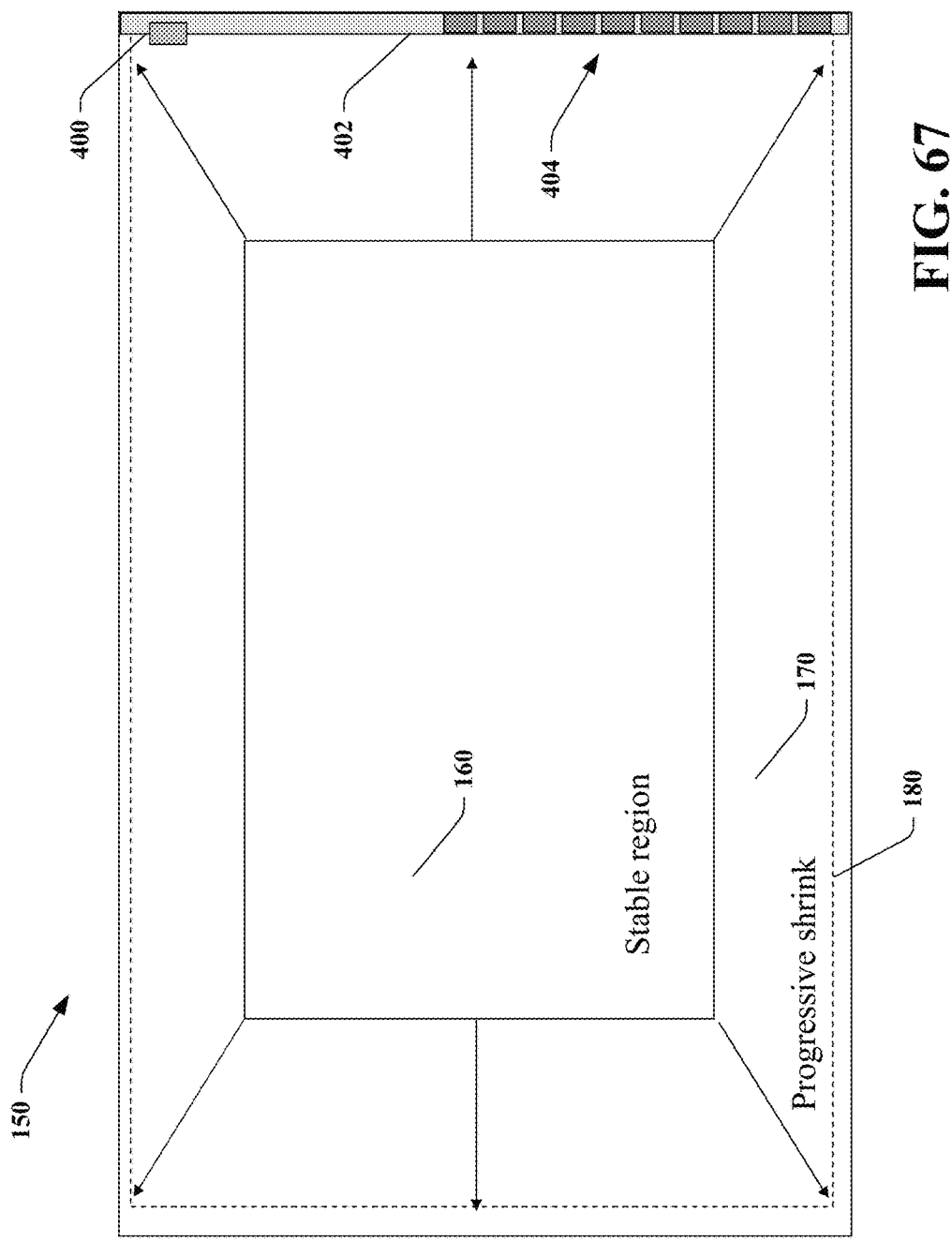
Figure 68:
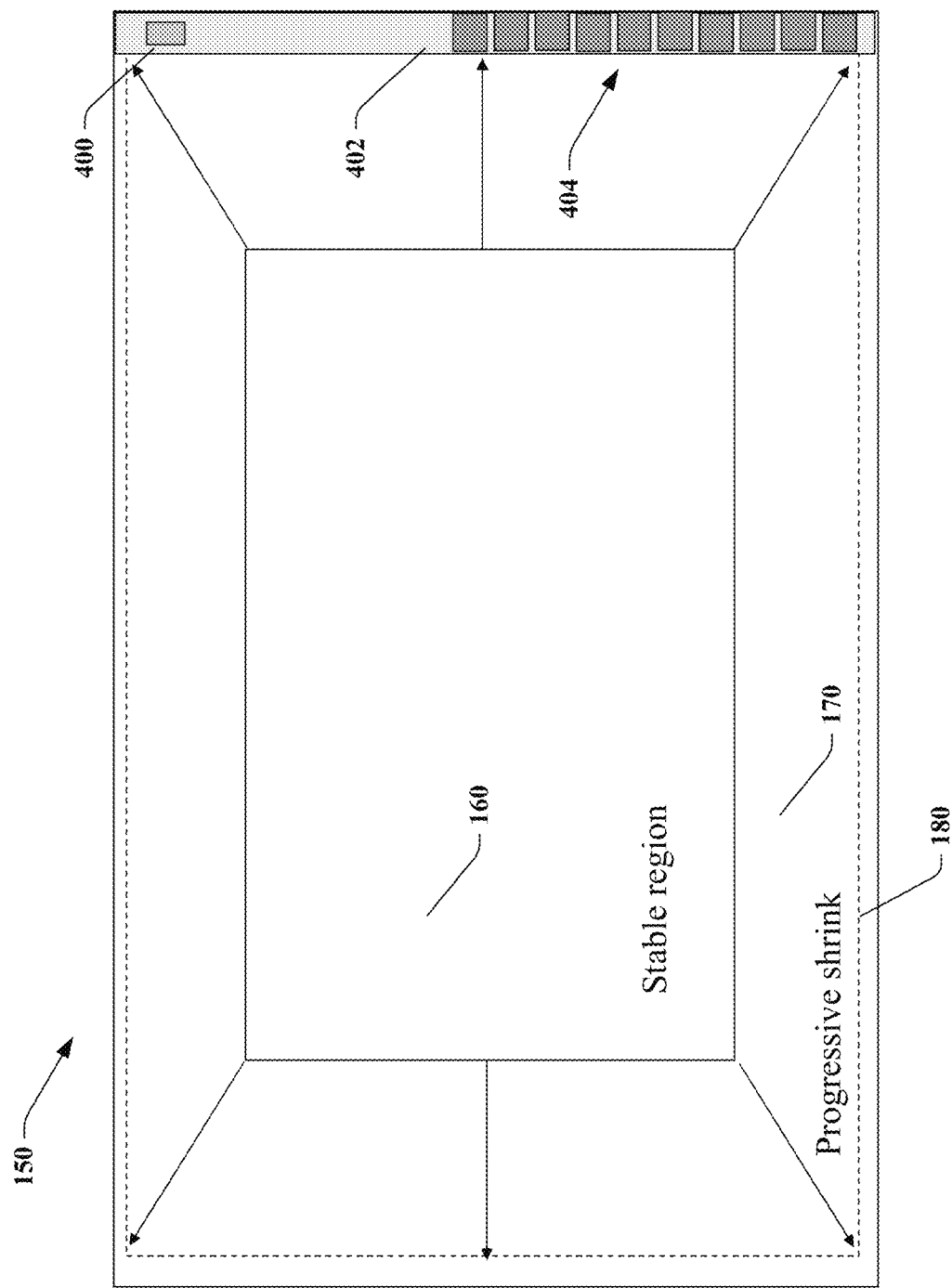
Figure 69:
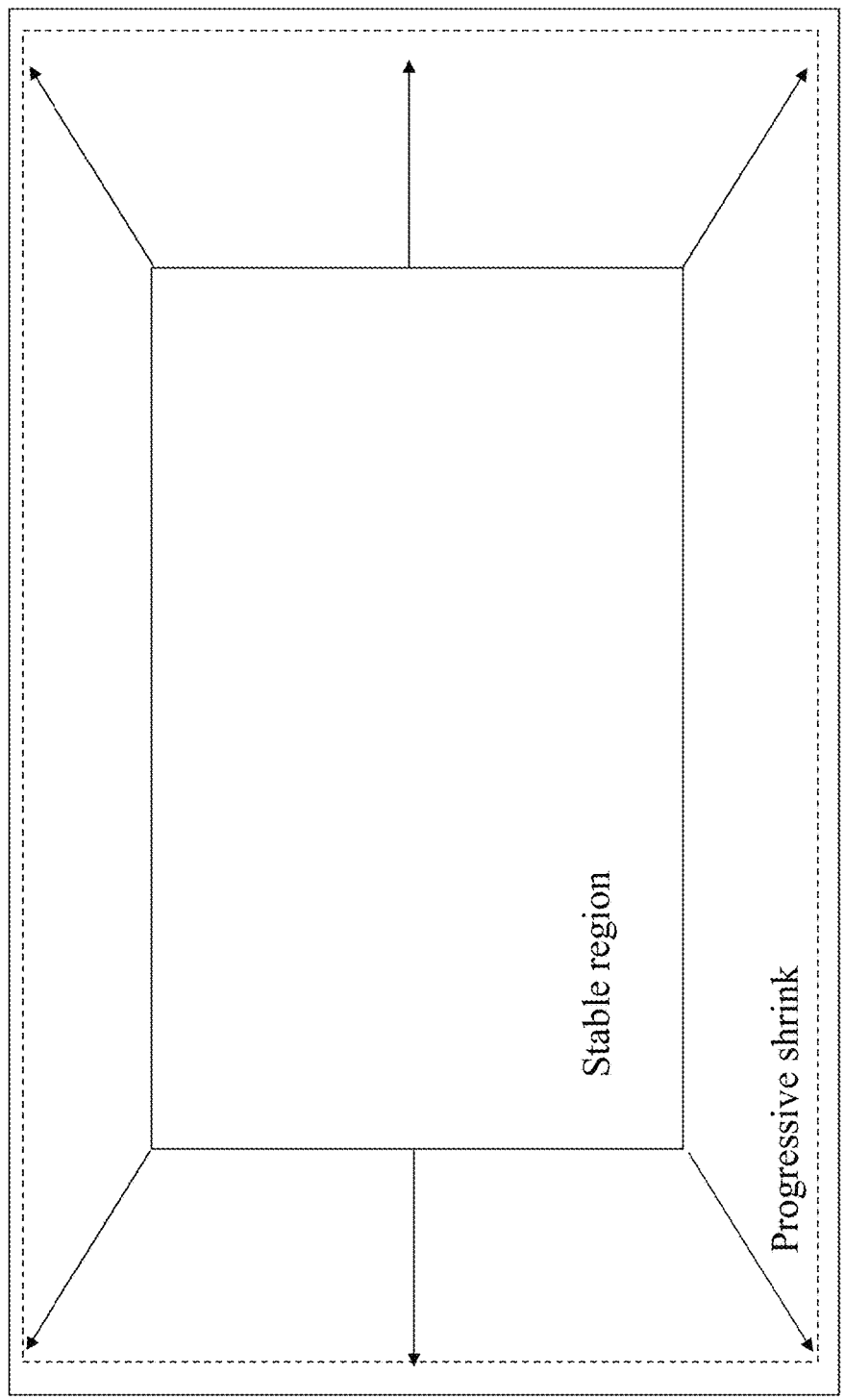
Figure 70:
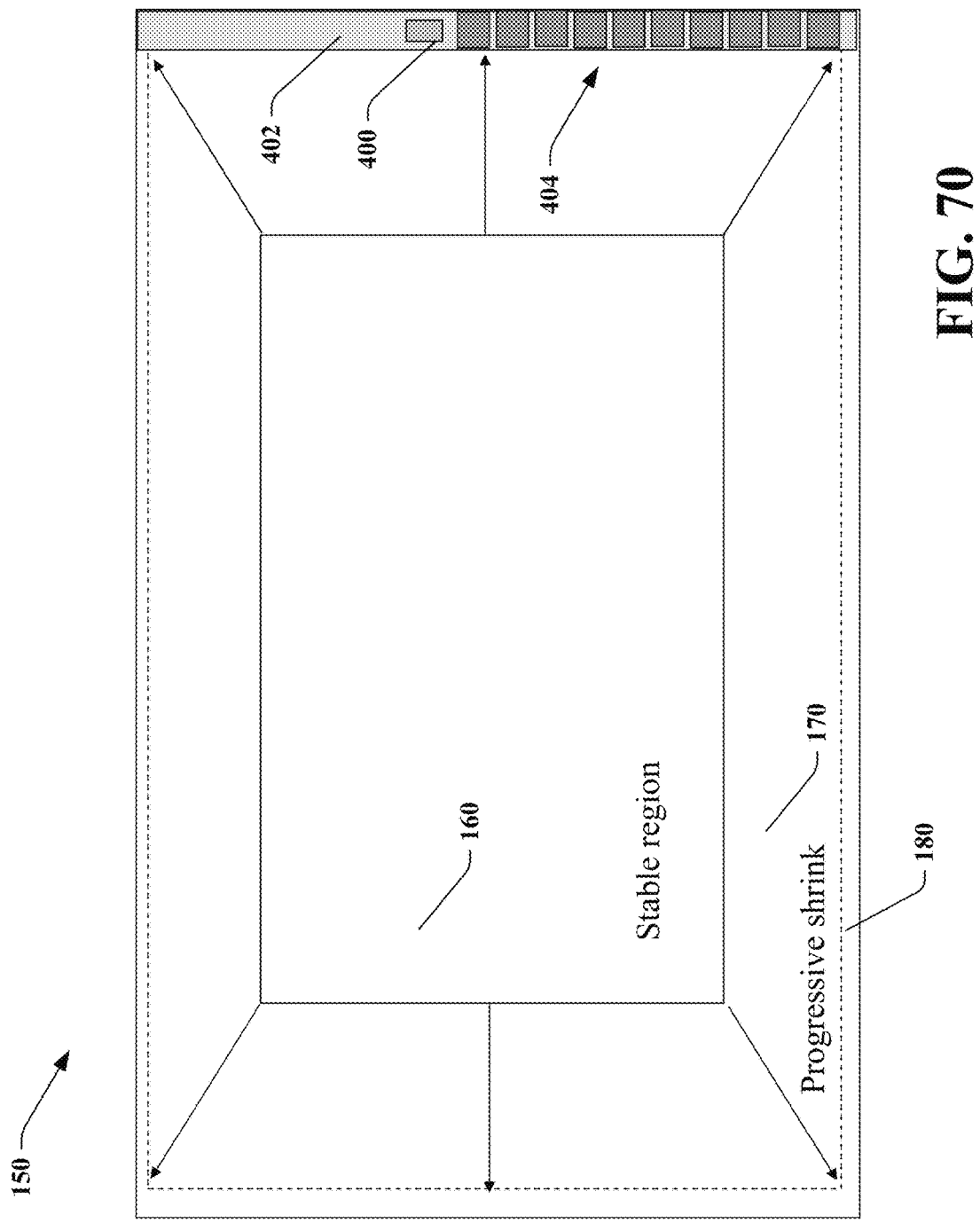
Figure 71:
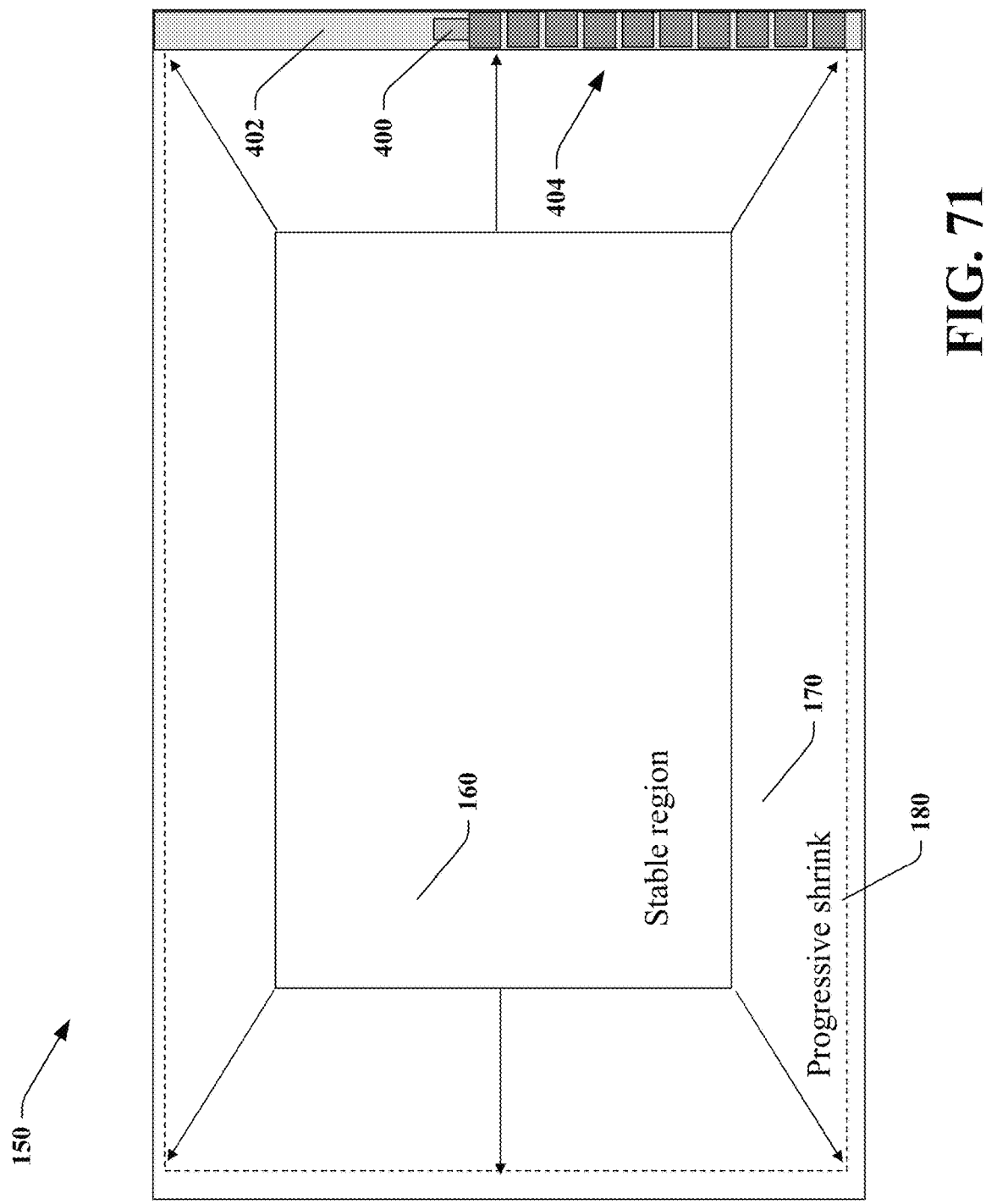
Figure 72:
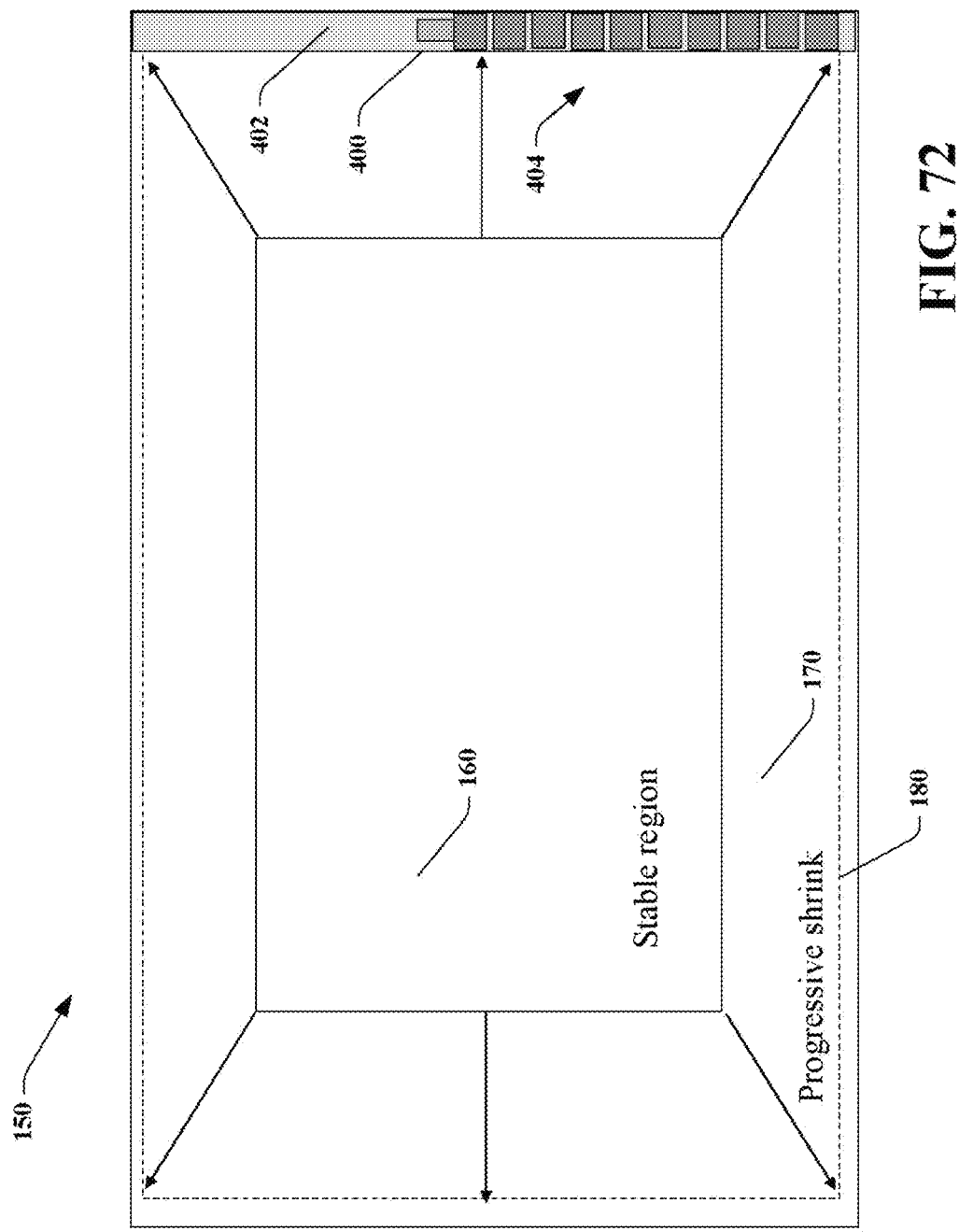
Figure 73:
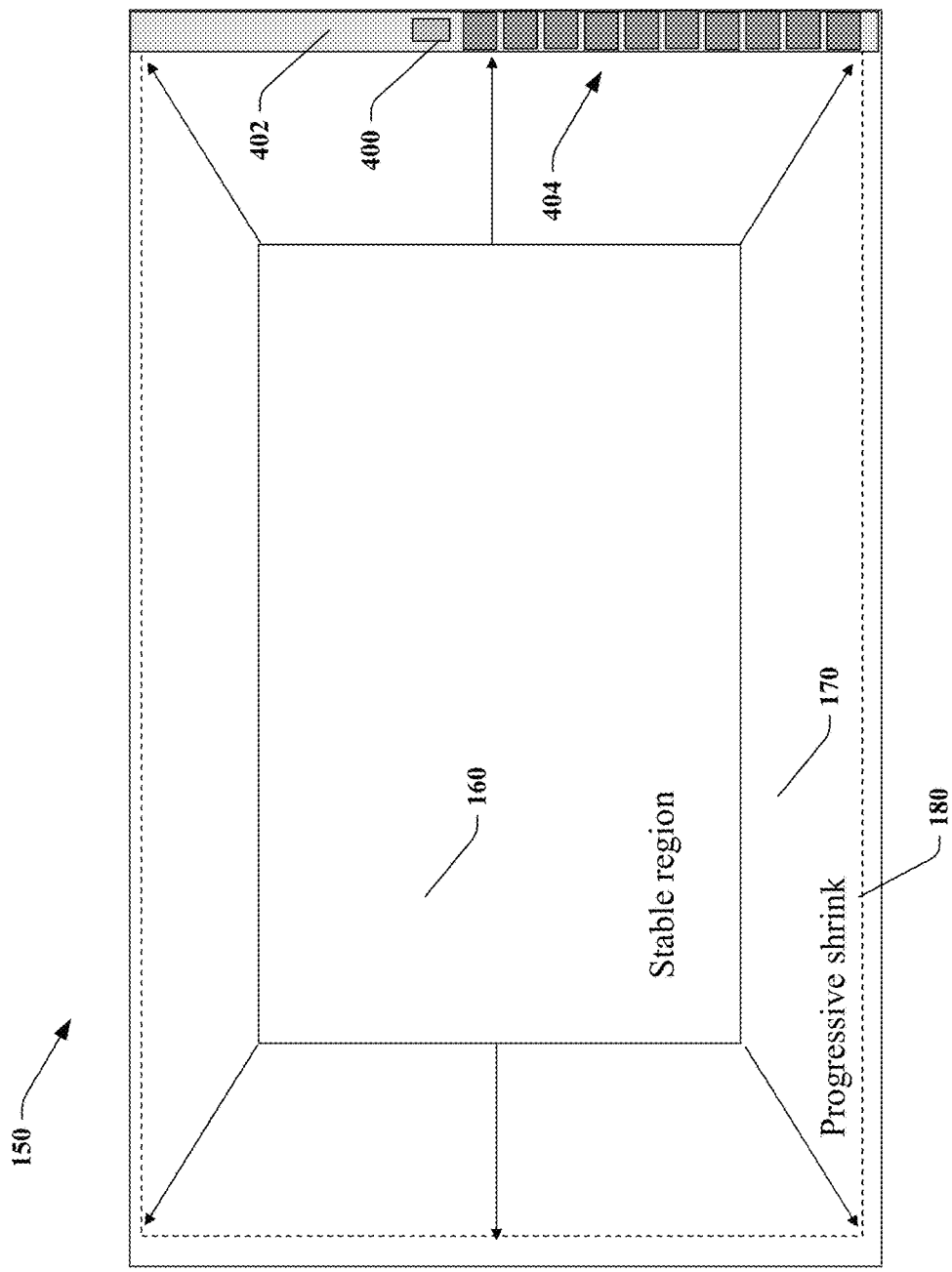
Figure 74:
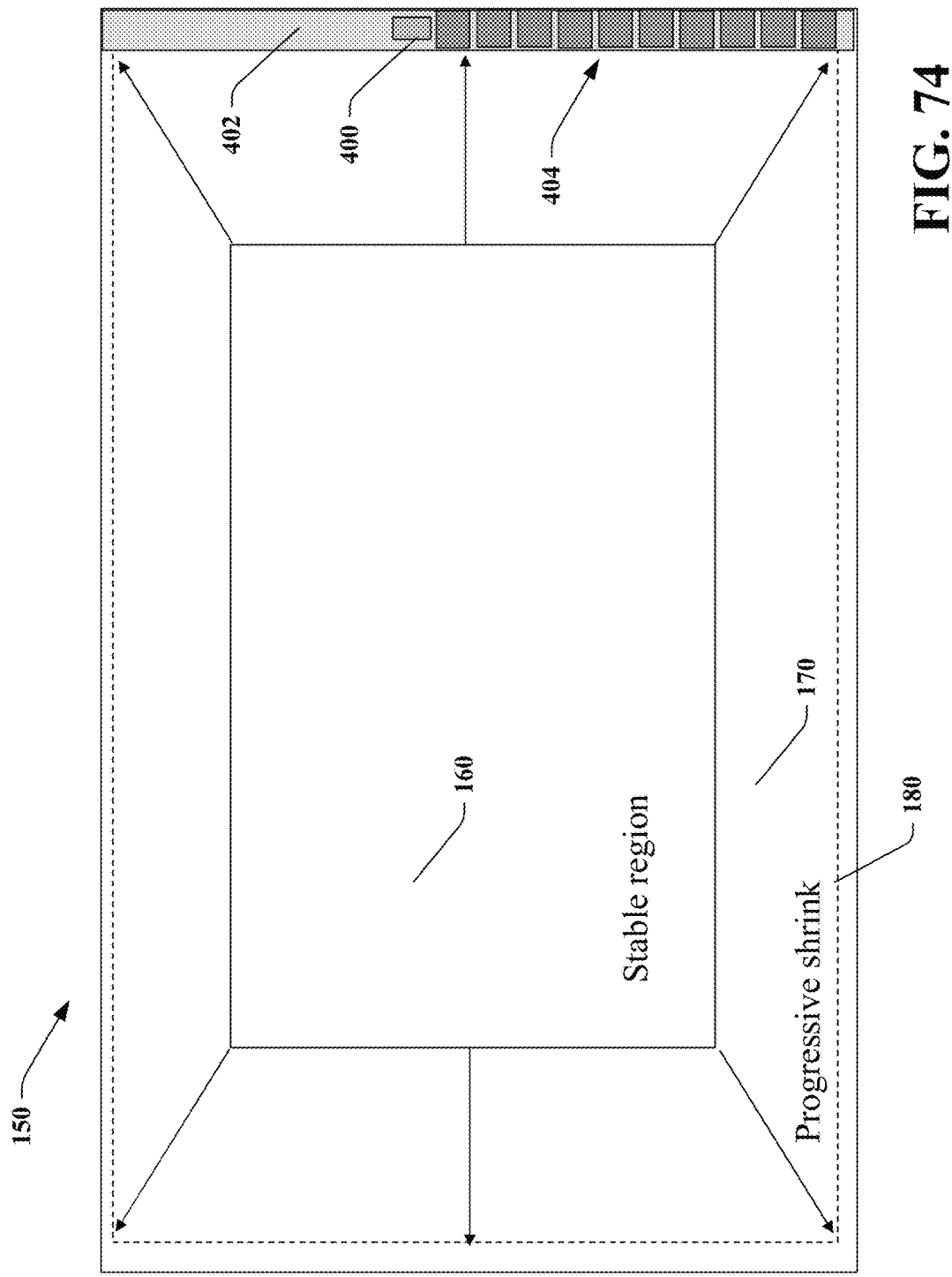
Figure 75:
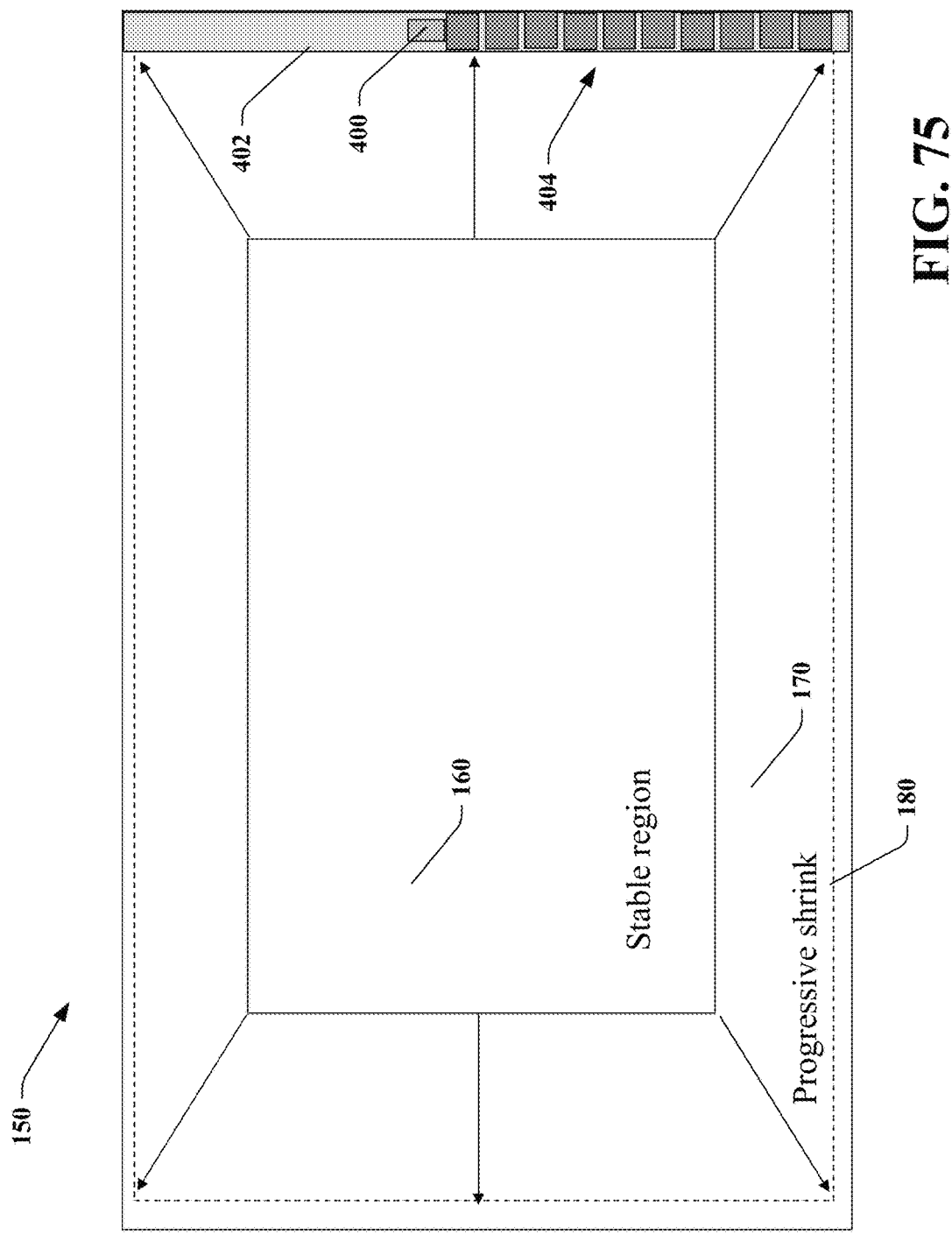
Figure 76:
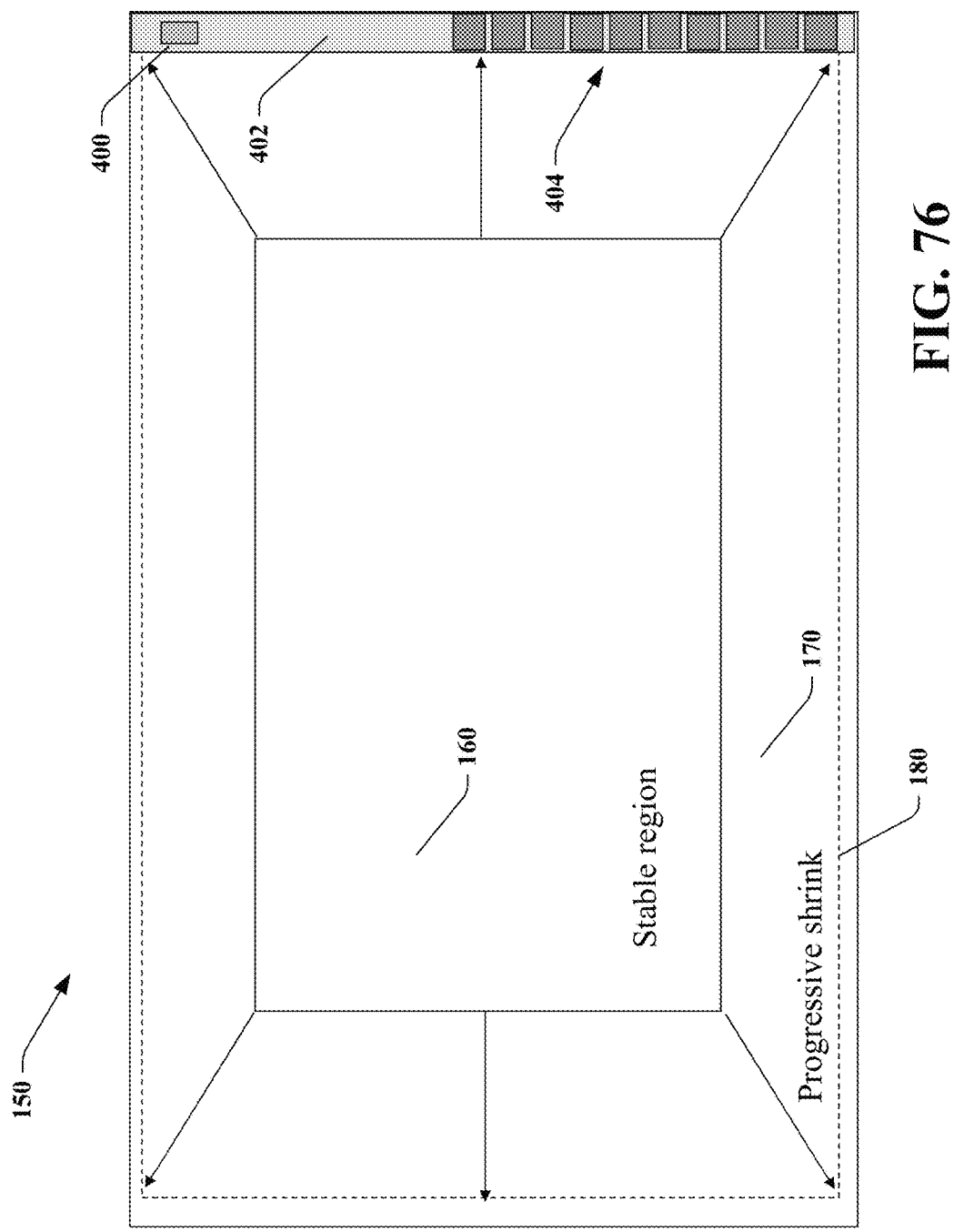

FIGS. 64-82 illustrate an optional aspect of transition of display objects off of a screen (e.g., to side bar) to another iconic form in accordance with the subject invention. In FIG. 64, the display object 400 is shown moving to an edge 180 of the display area 150. As the object reaches the edge 180 in FIGS. 64 and 65, the object 400 migrates into a side bar 402 where a plurality of display objects 404 are shown residing therein. The side bar allows efficient grouping of display object(s) that are not currently being actively used. The display objects can be organized in the side bar 402 in accordance with a variety of manners (e.g., order of entry into side bar, priority, age of use, etc.).

Figure 77:
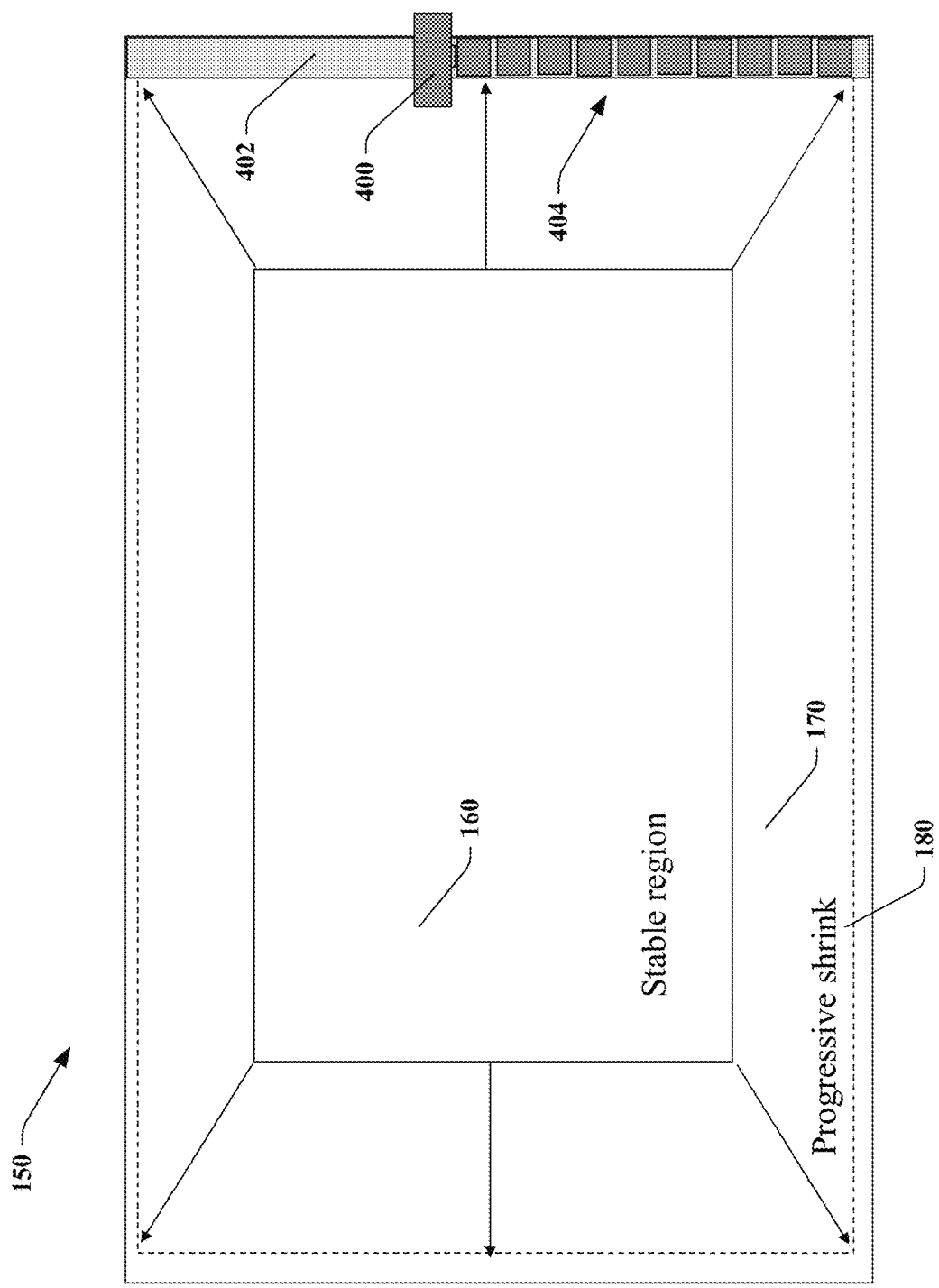
Figure 78:
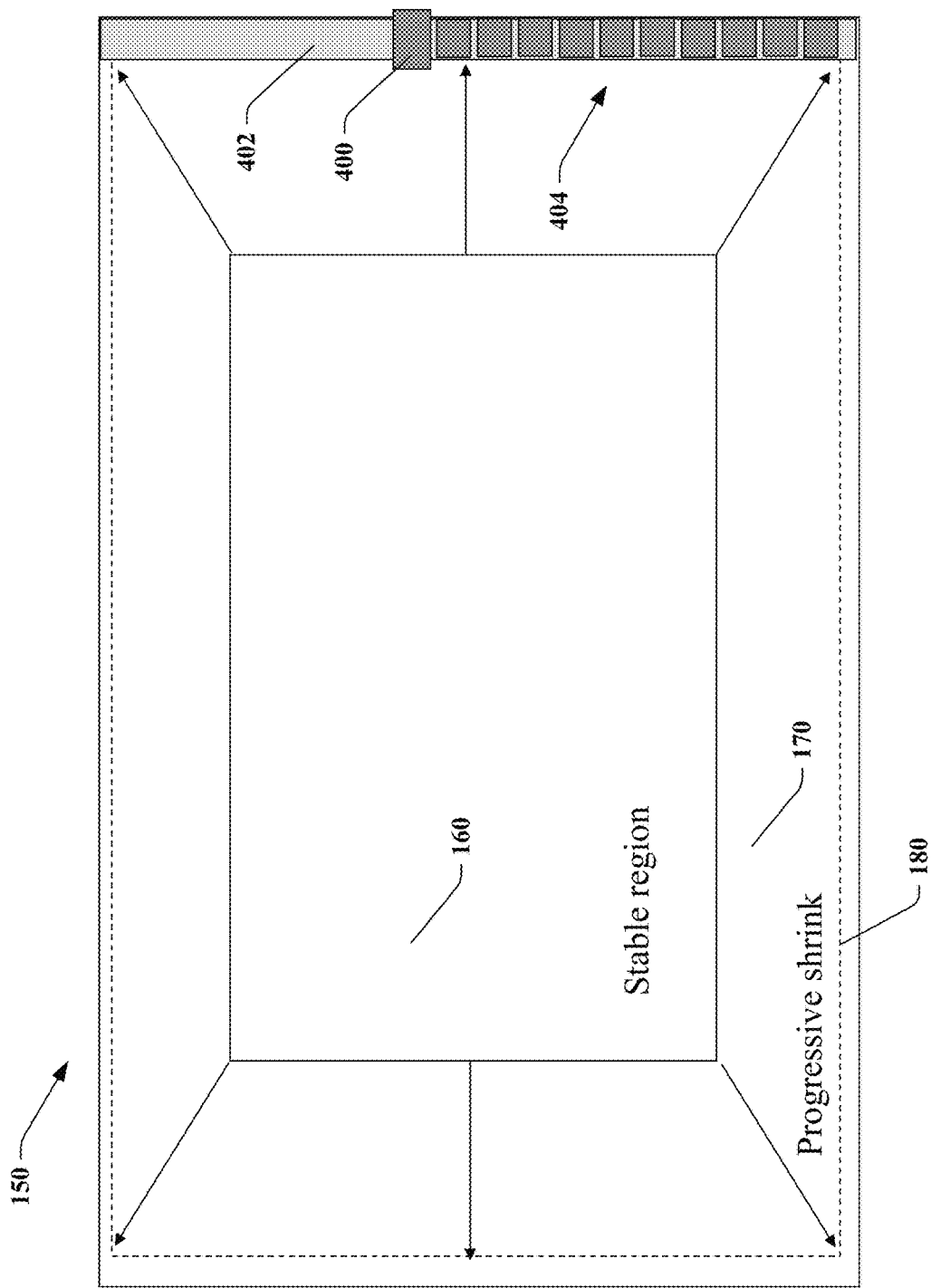
Figure 79:
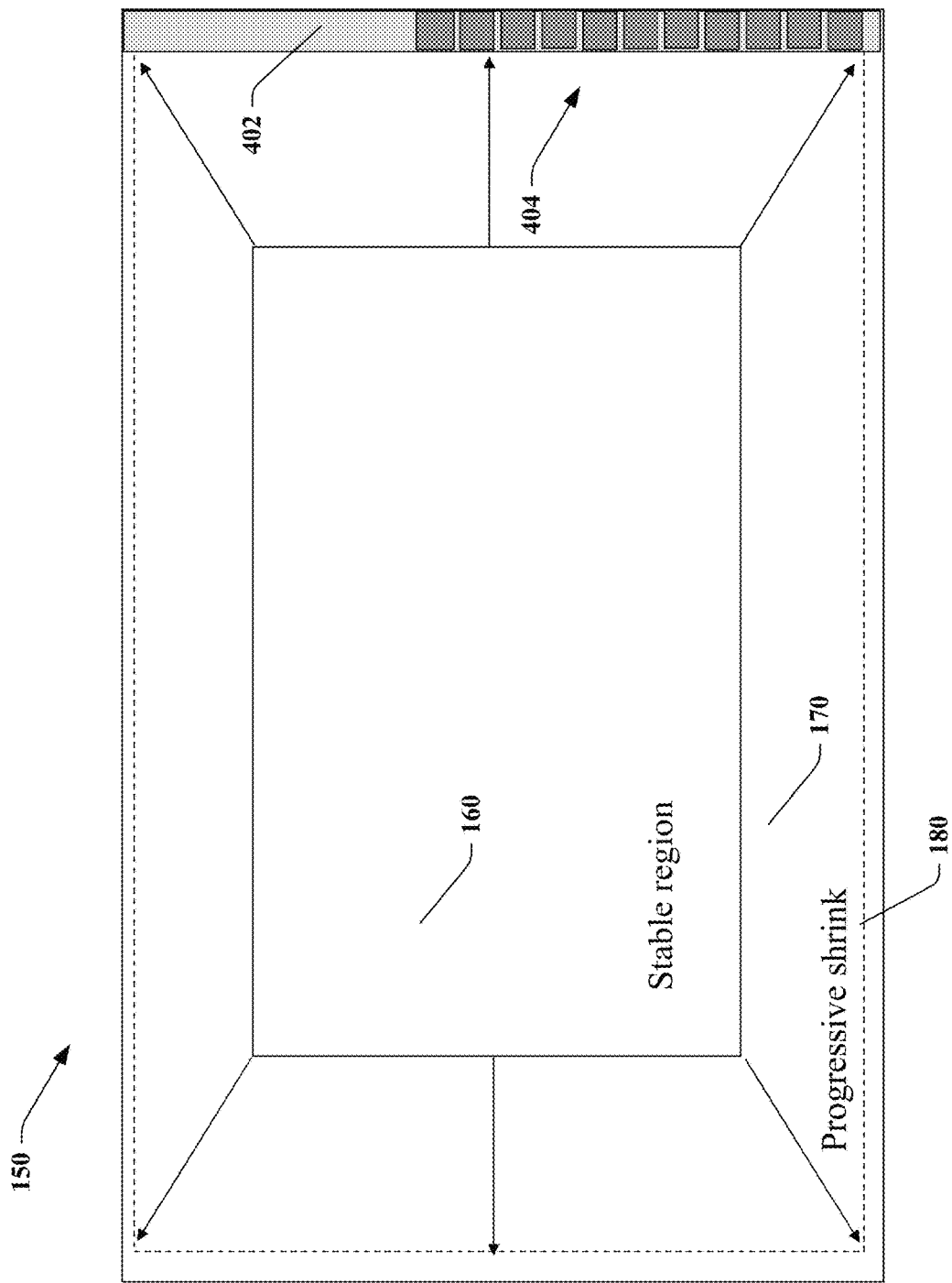
Figure 80:
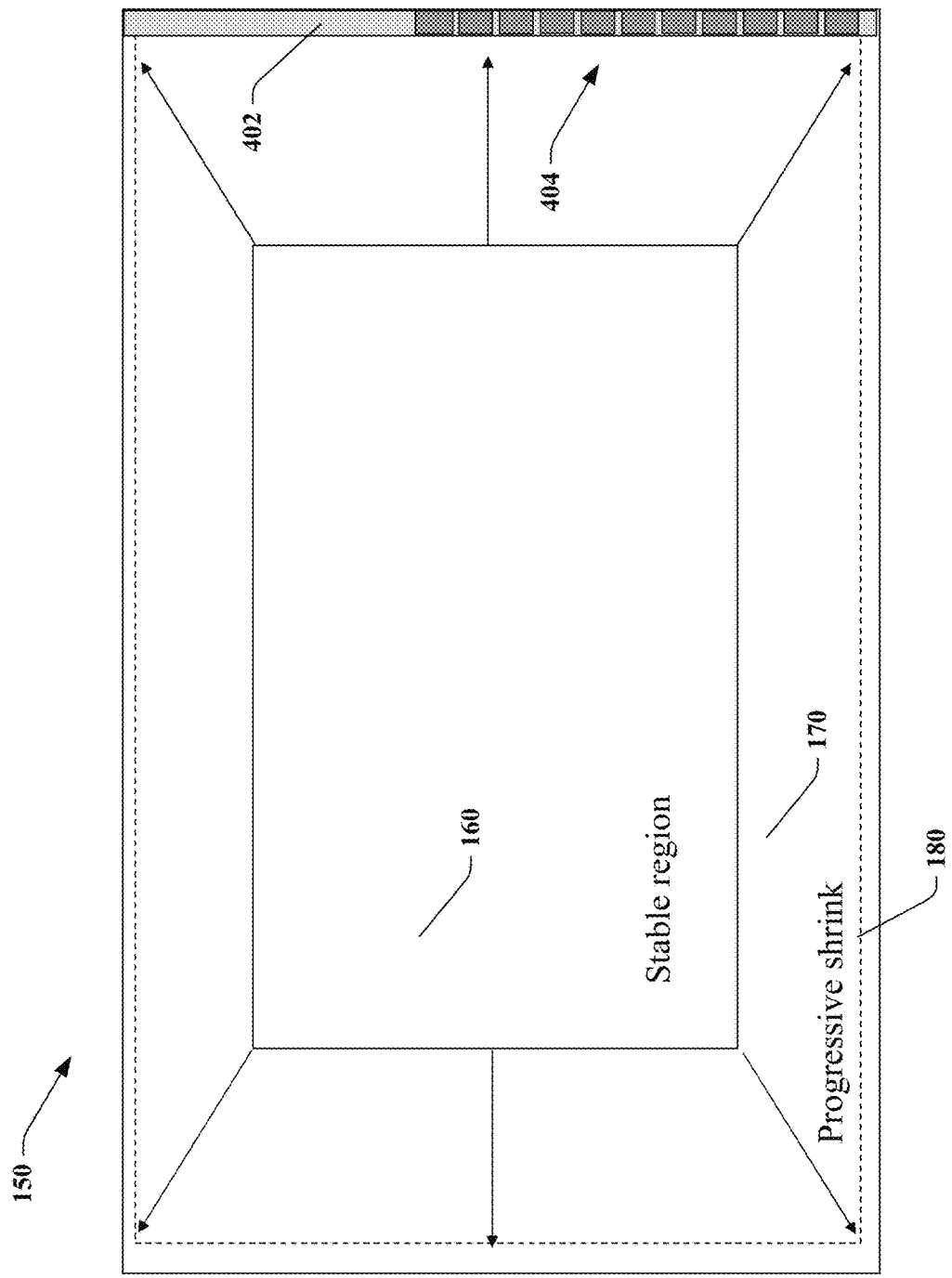
Figure 81:
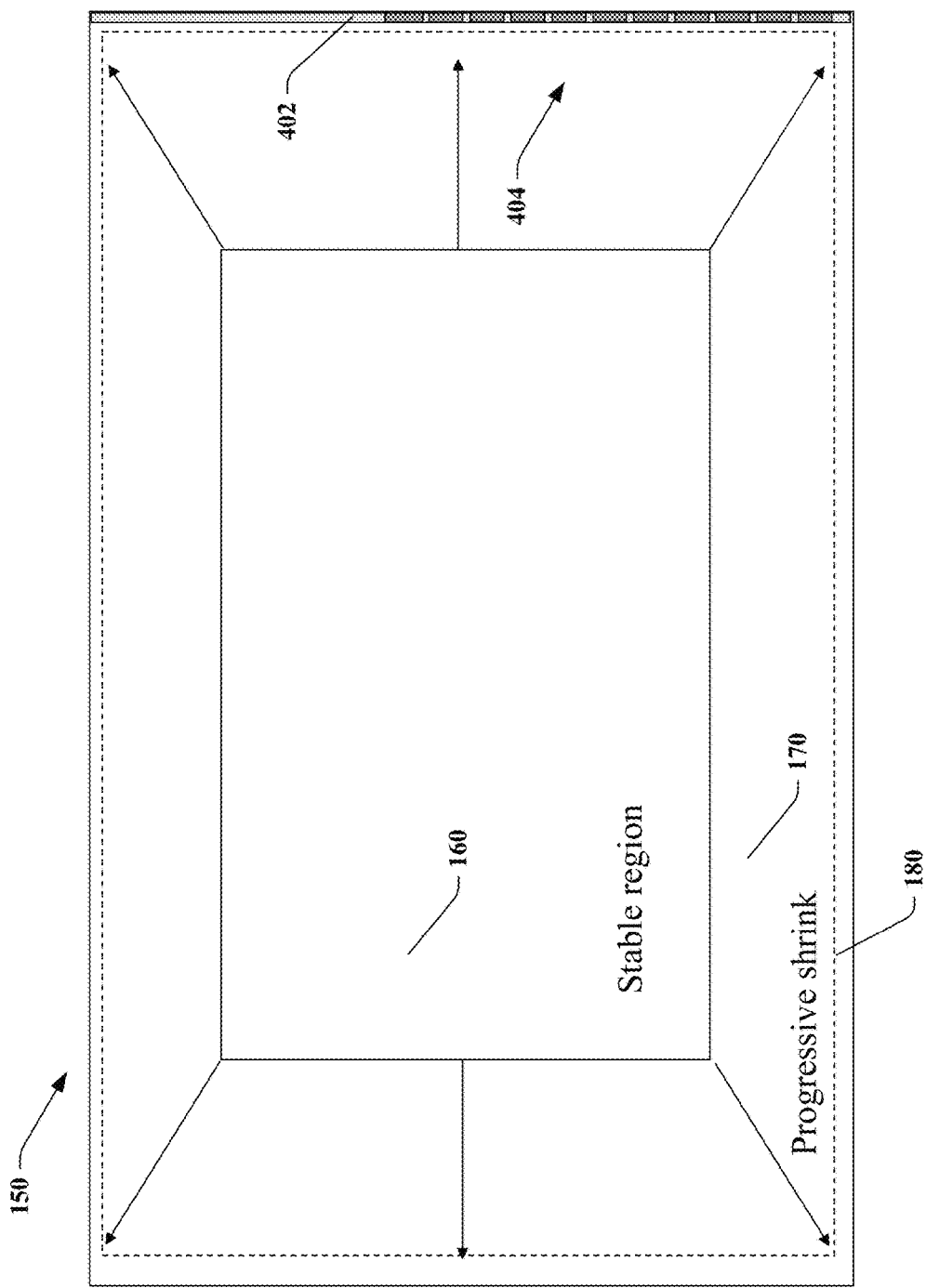
Figure 82:
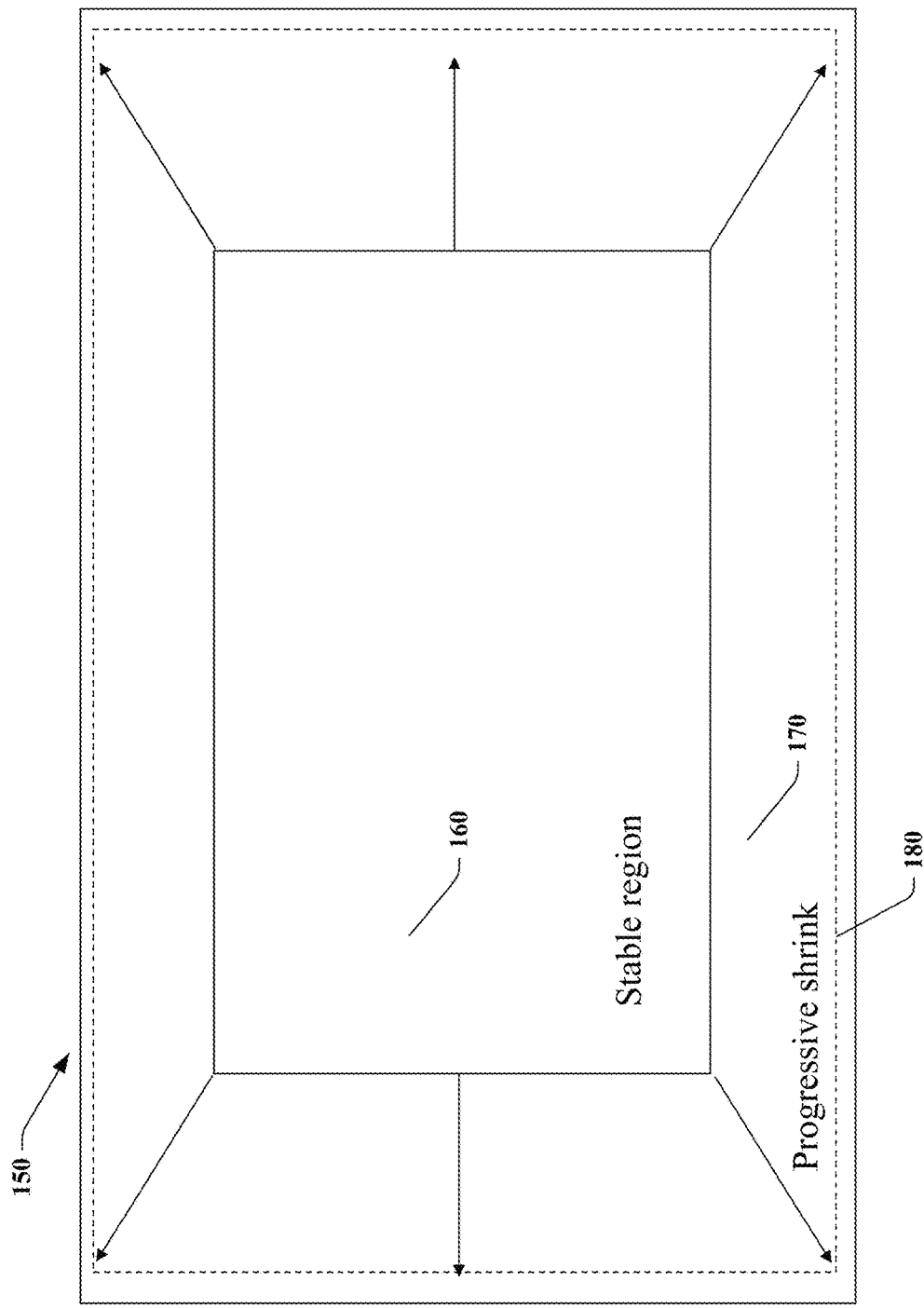

As shown in FIGS. 66-76, the side bar 402 can be modified in size (e.g., width or height) and as is typical with conventional side bars repositioned within a display space as desired. As an object enters the side bar 402, the object can automatically position itself at a suitable location within the side bar. FIGS. 77 and 78 illustrate that particular display object(s) 400 can be modified to have behavior (e.g., size, refresh rate, etc.) different from other display objects within the side bar. FIGS. 79-82 illustrate that the side bar 402 can be hidden (e.g., automatically or manually) from view during periods of non-use.

Figure 83:
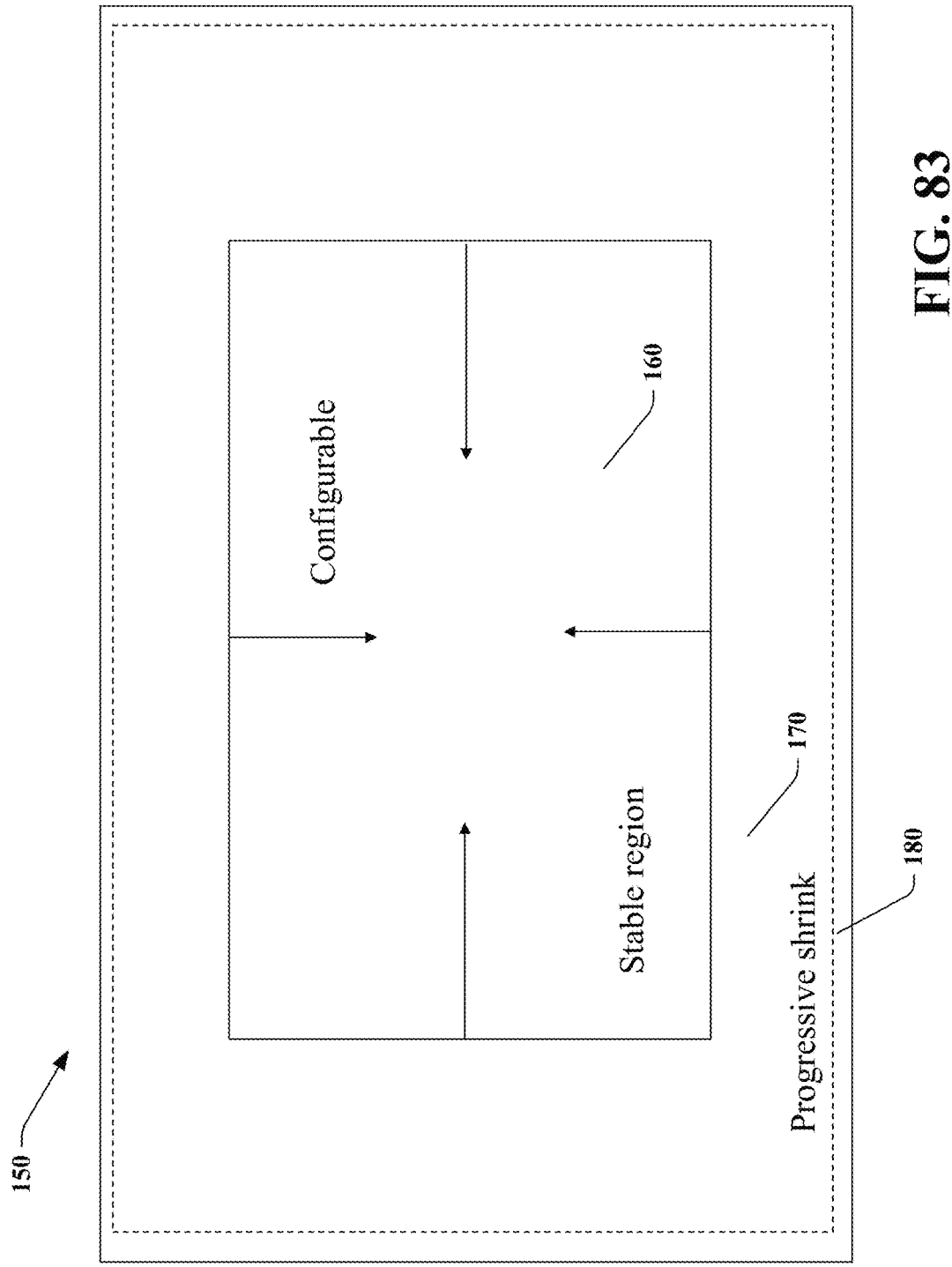
FIGS. 83-90 illustrate a focus region and/or progressive shrink region be configurable in accordance with the subject invention.
Figure 84:
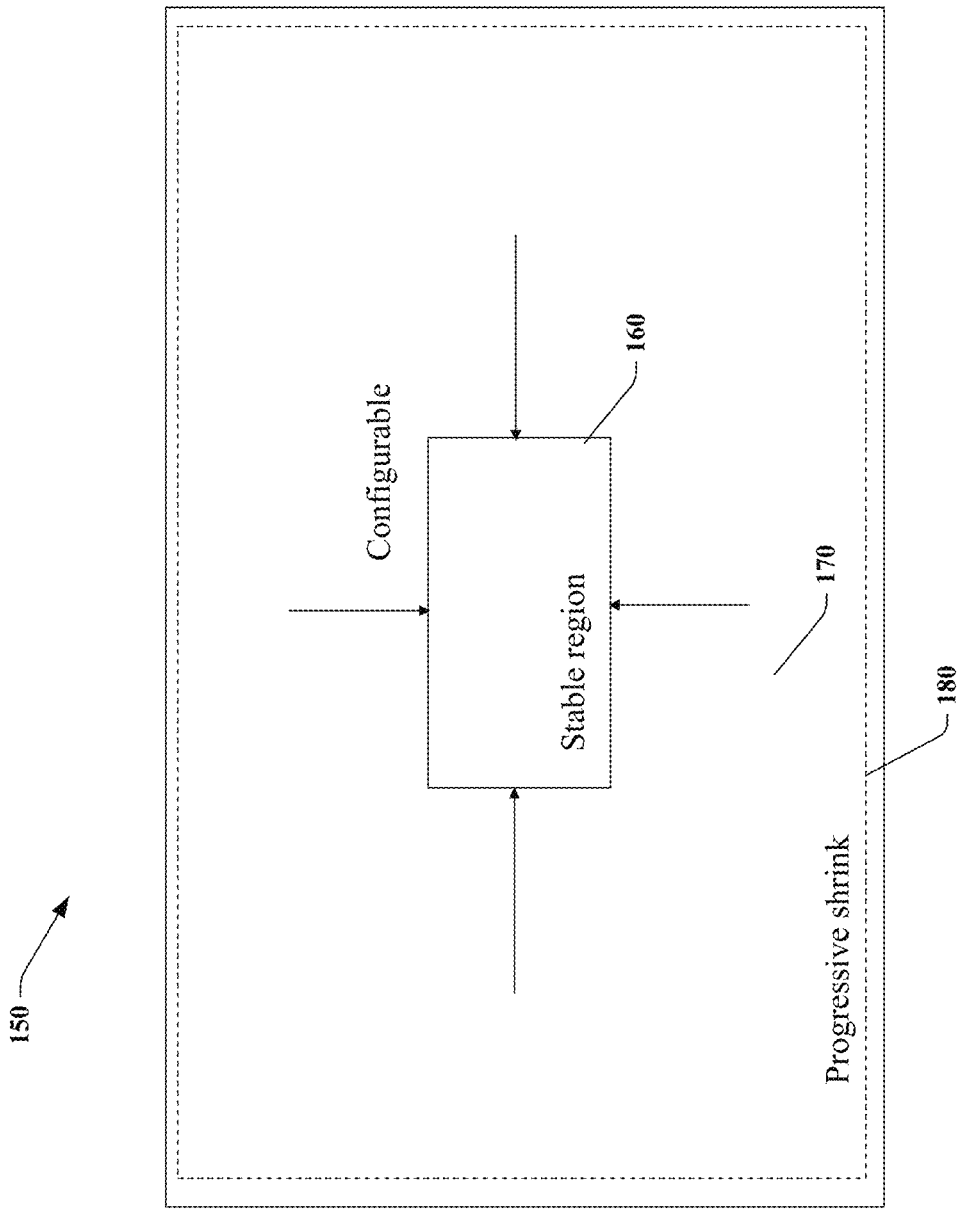
Figure 85:
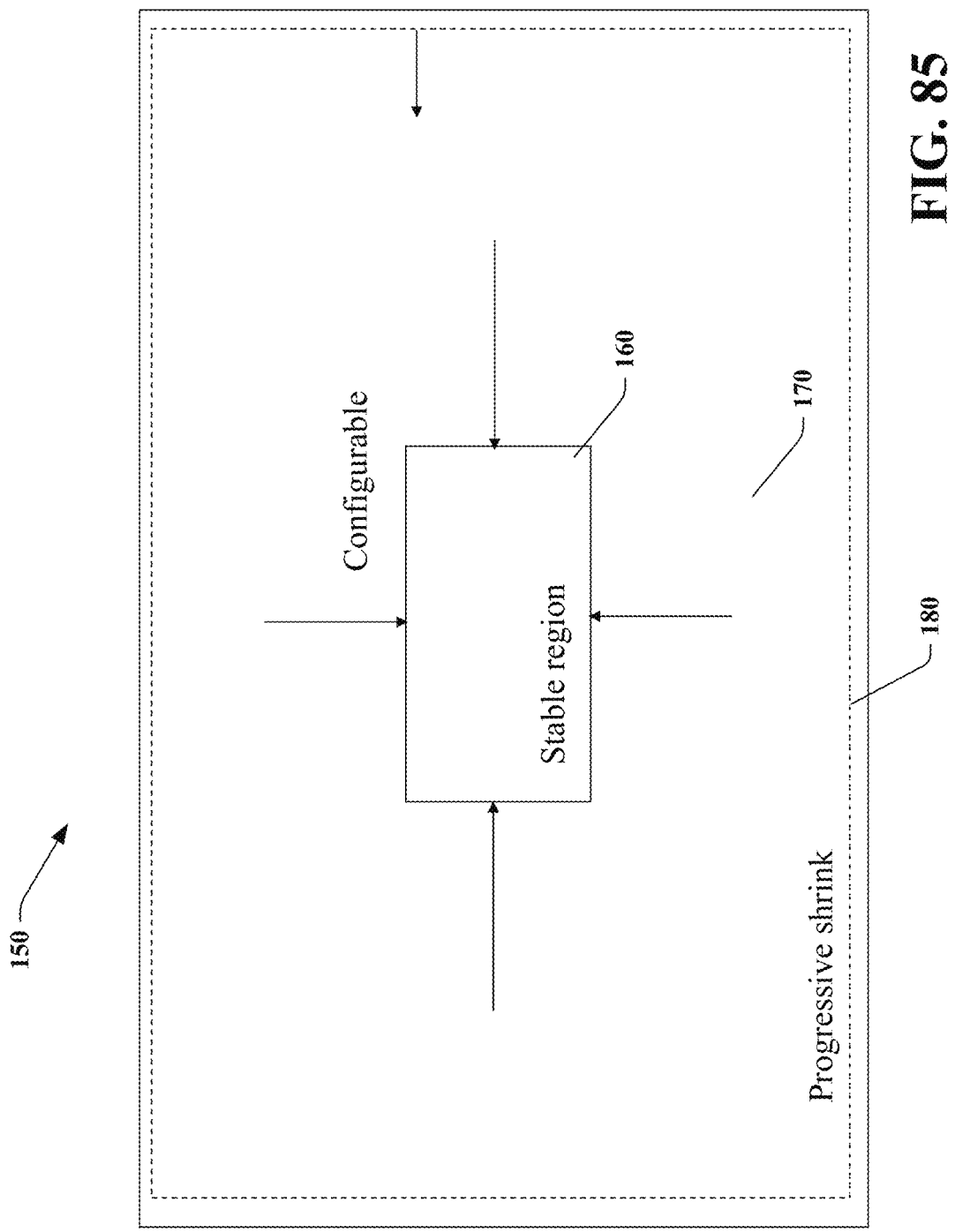
Figure 86:
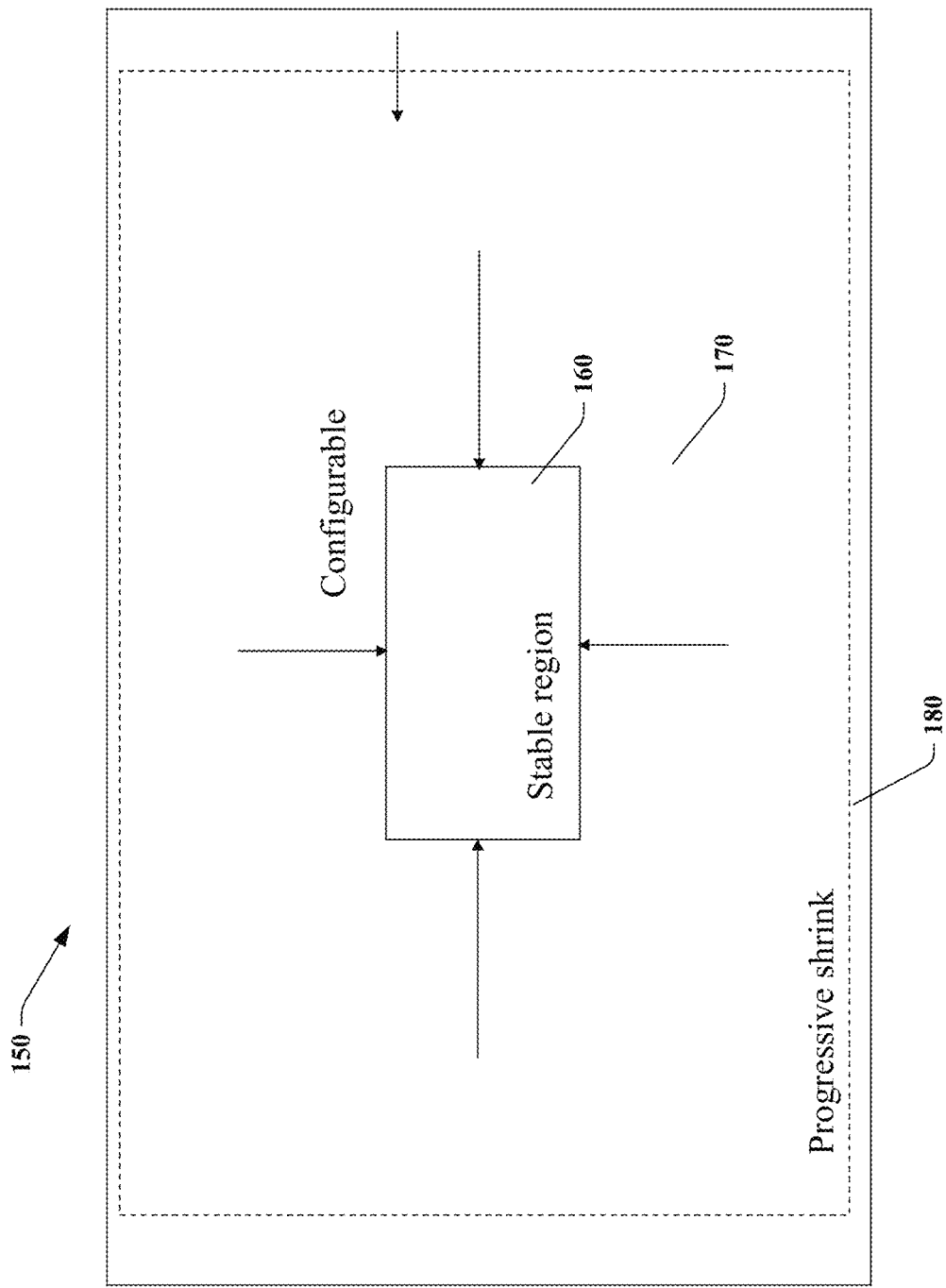
Figure 87:
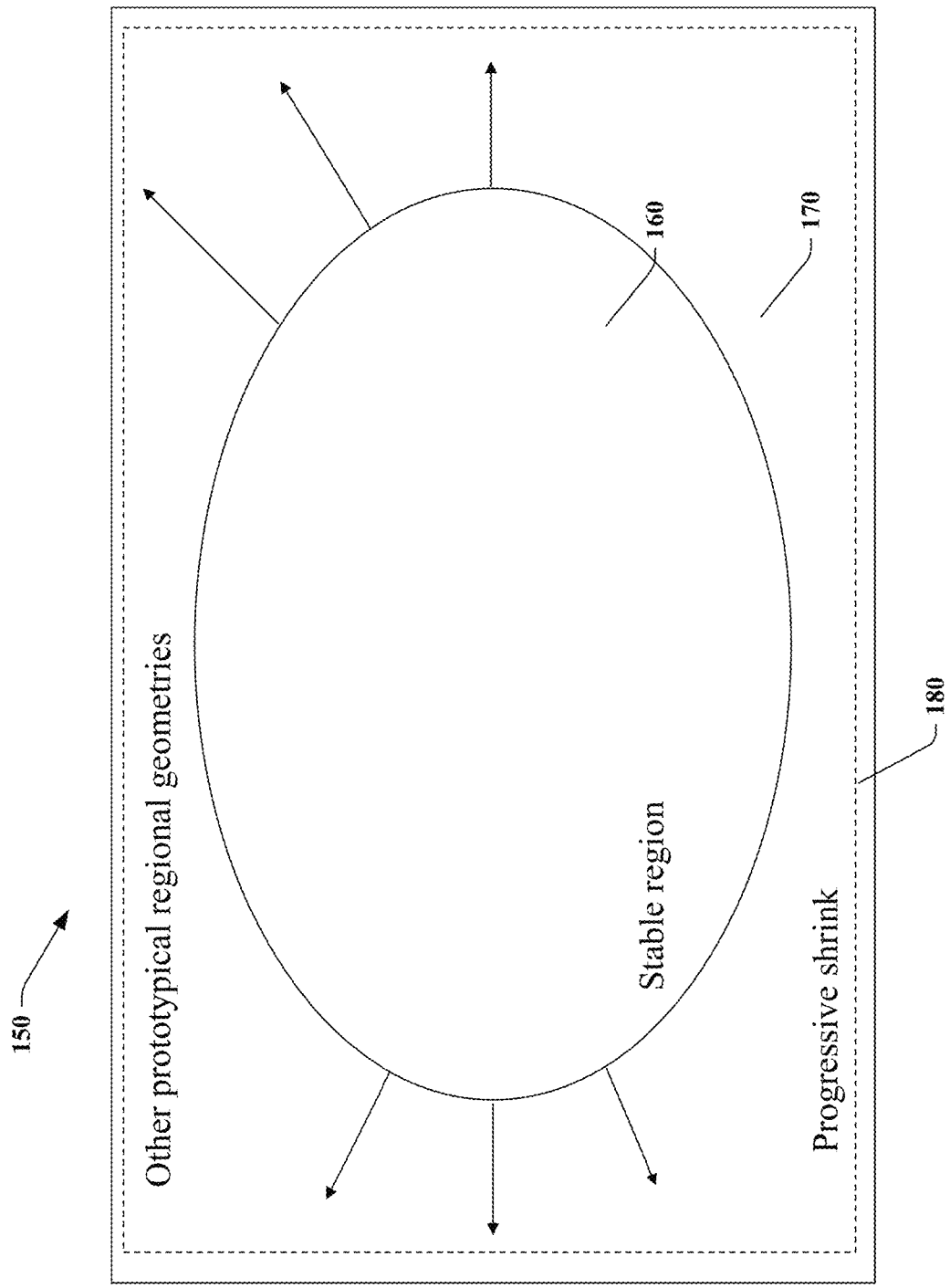
Figure 88:
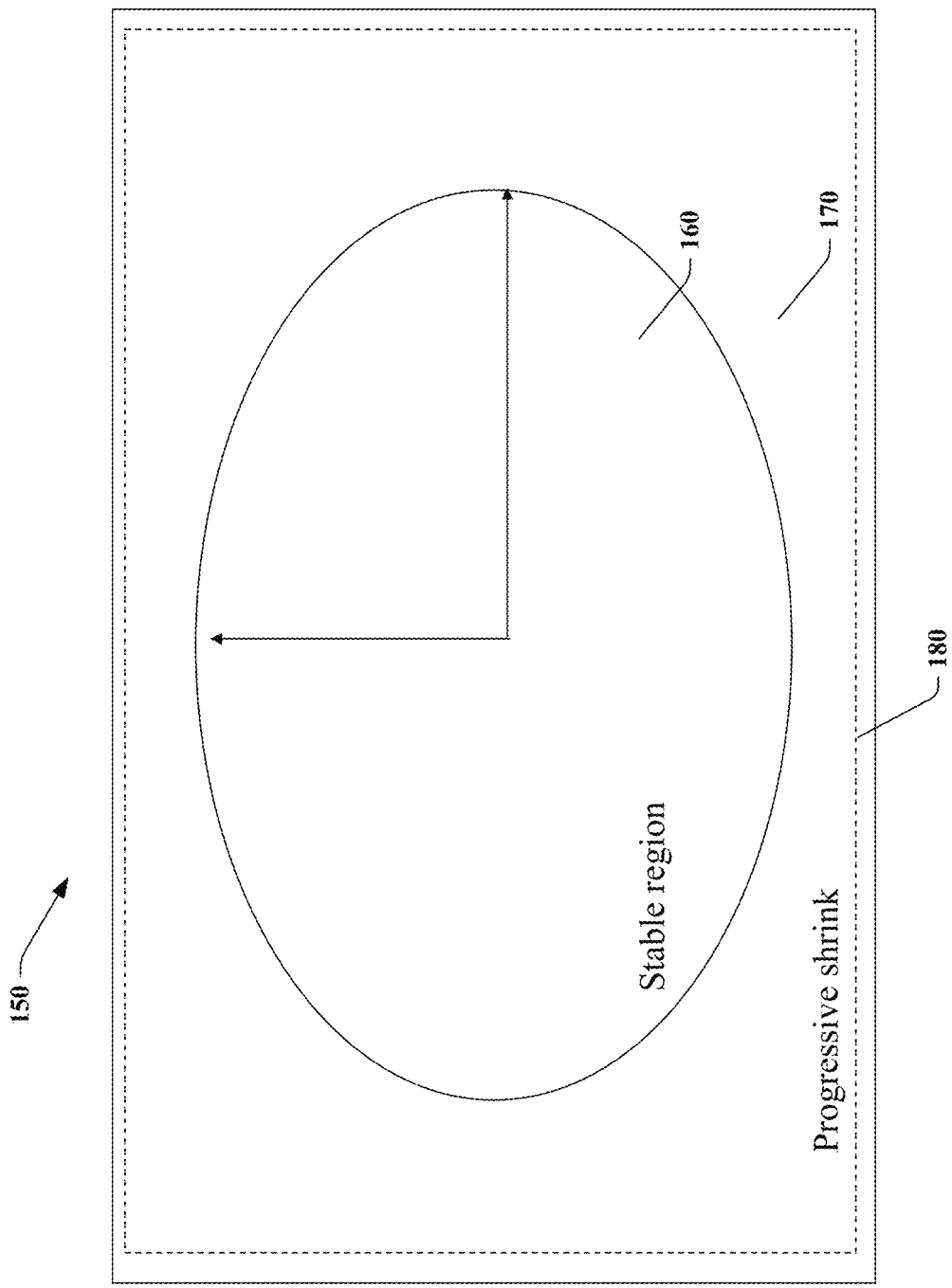
Figure 89:
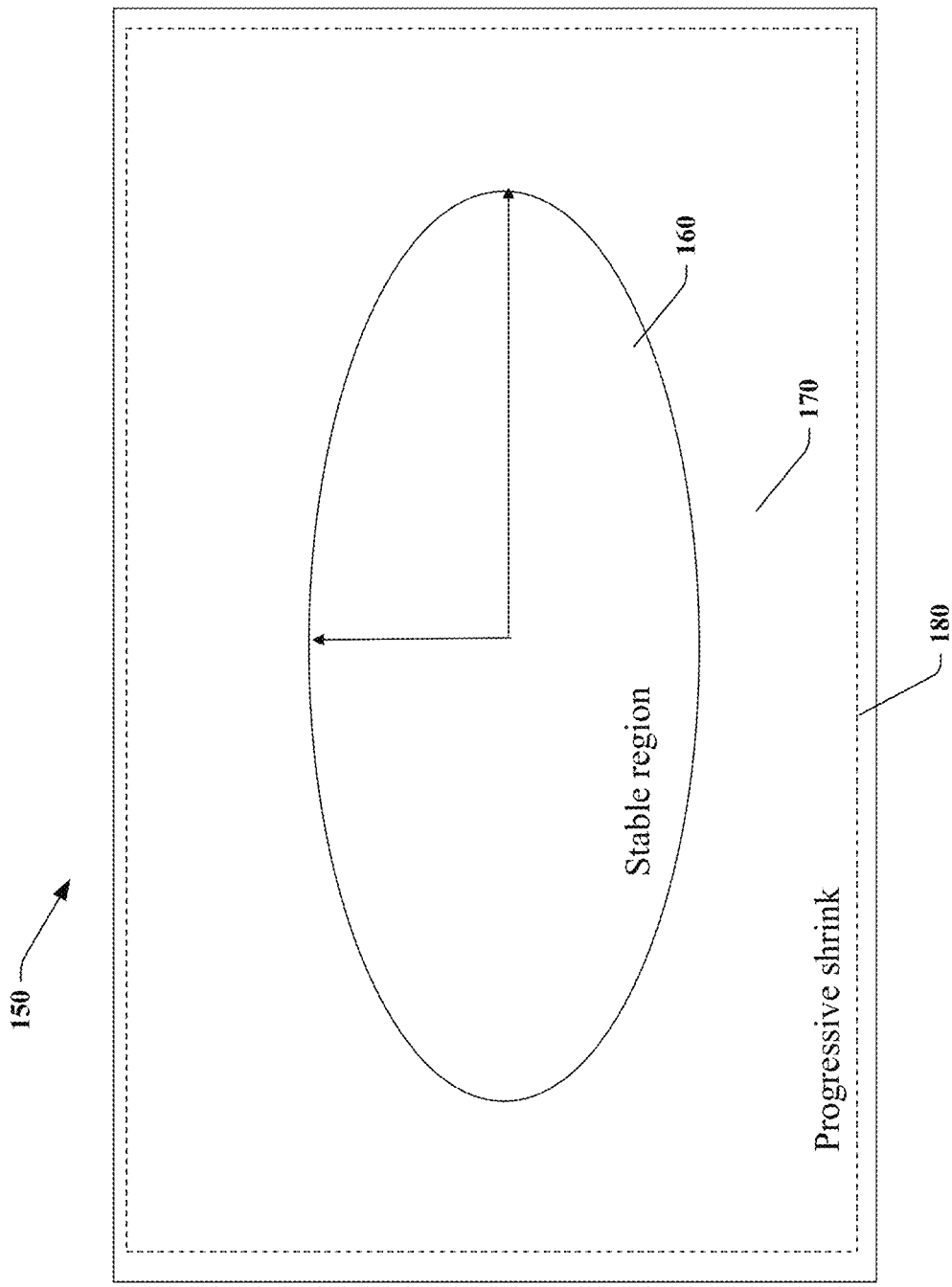
Figure 90:
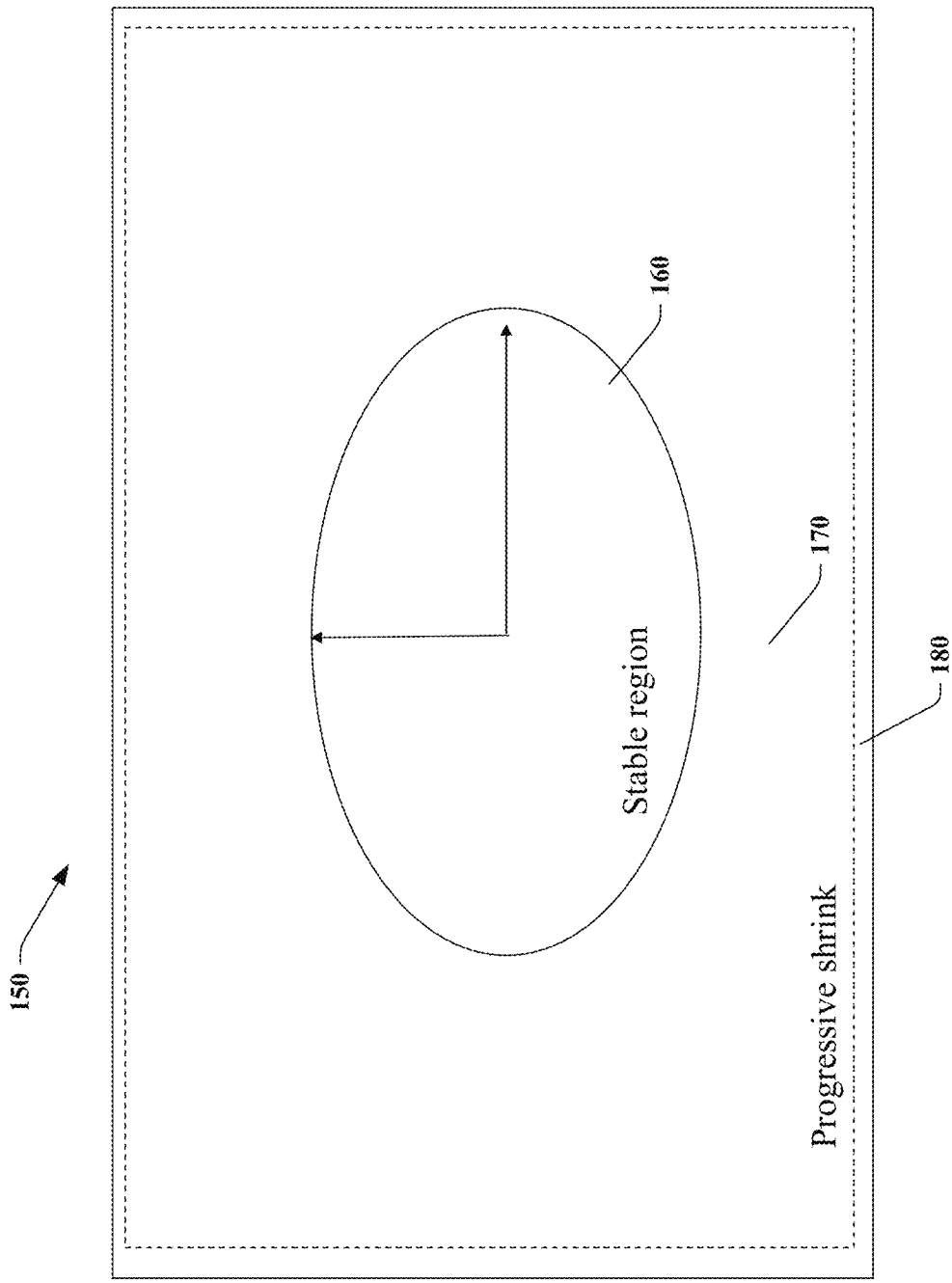
Figure 91:
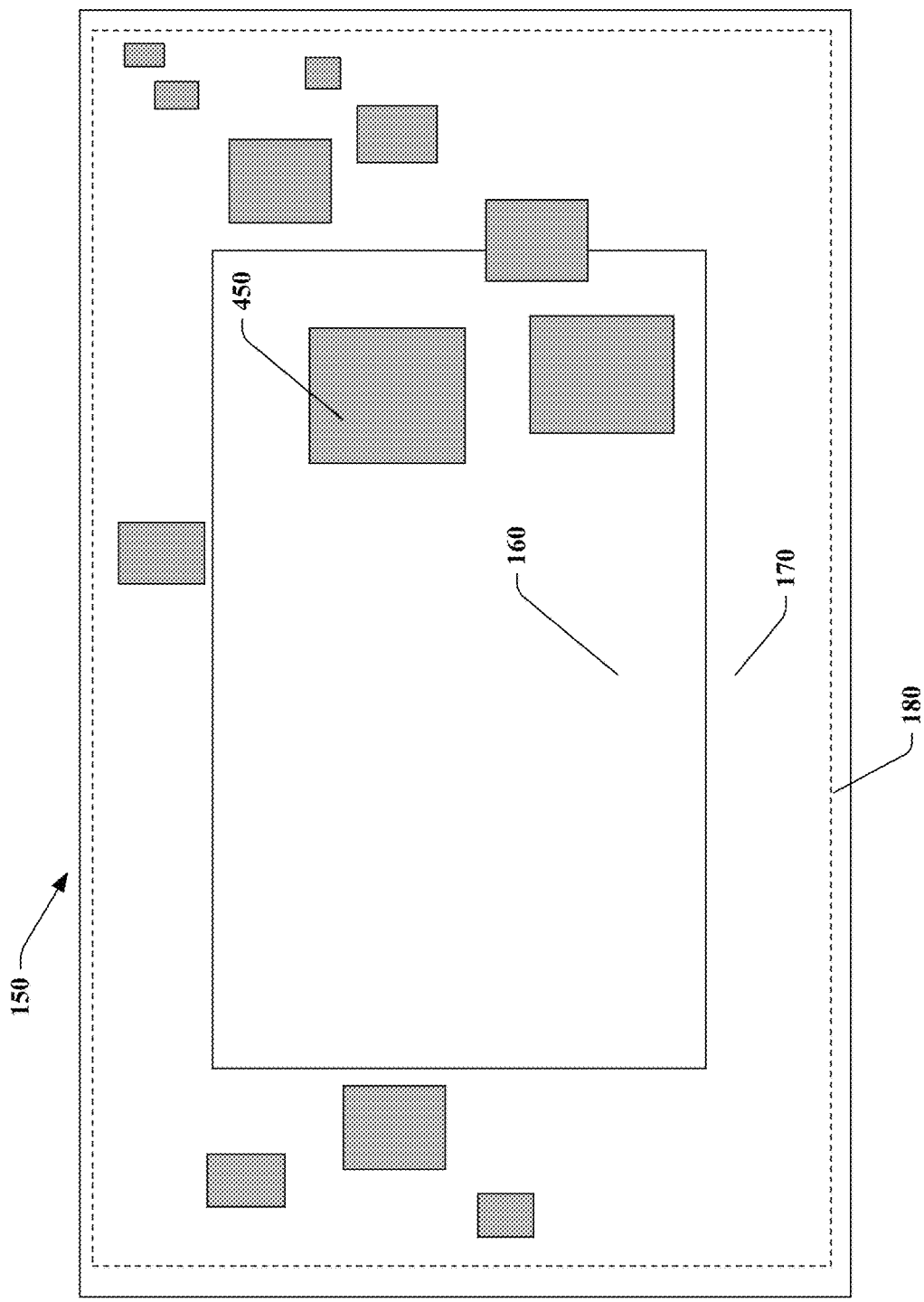
FIGS. 91-111 illustrate various aspects of the invention relating to modifying behavior of certain secondary objects as a function of modification to a primary object, and various embodiments for modifying behavior of display objects to facilitate a user experience in accordance with the subject invention.
Figure 92:
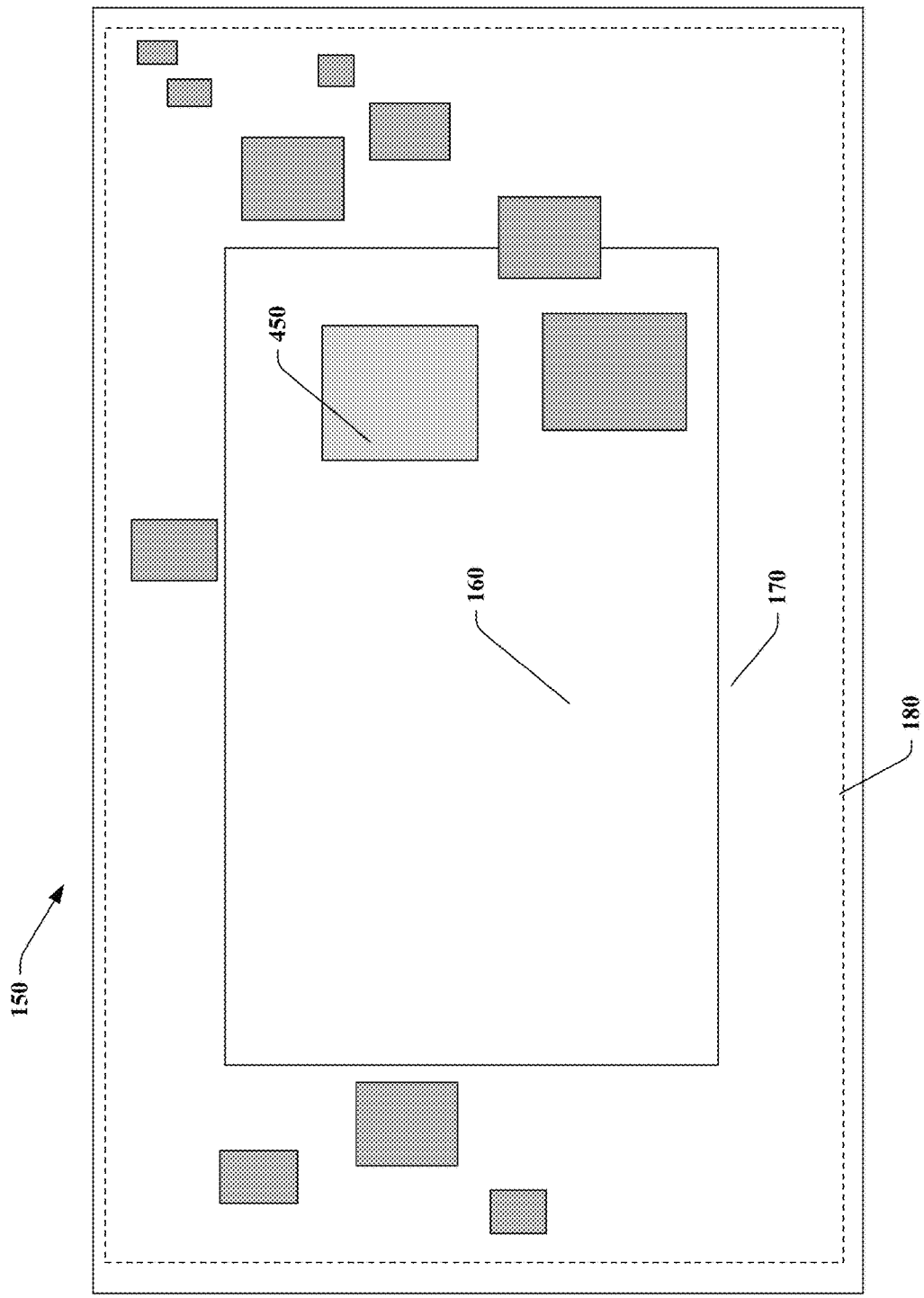
Figure 93:
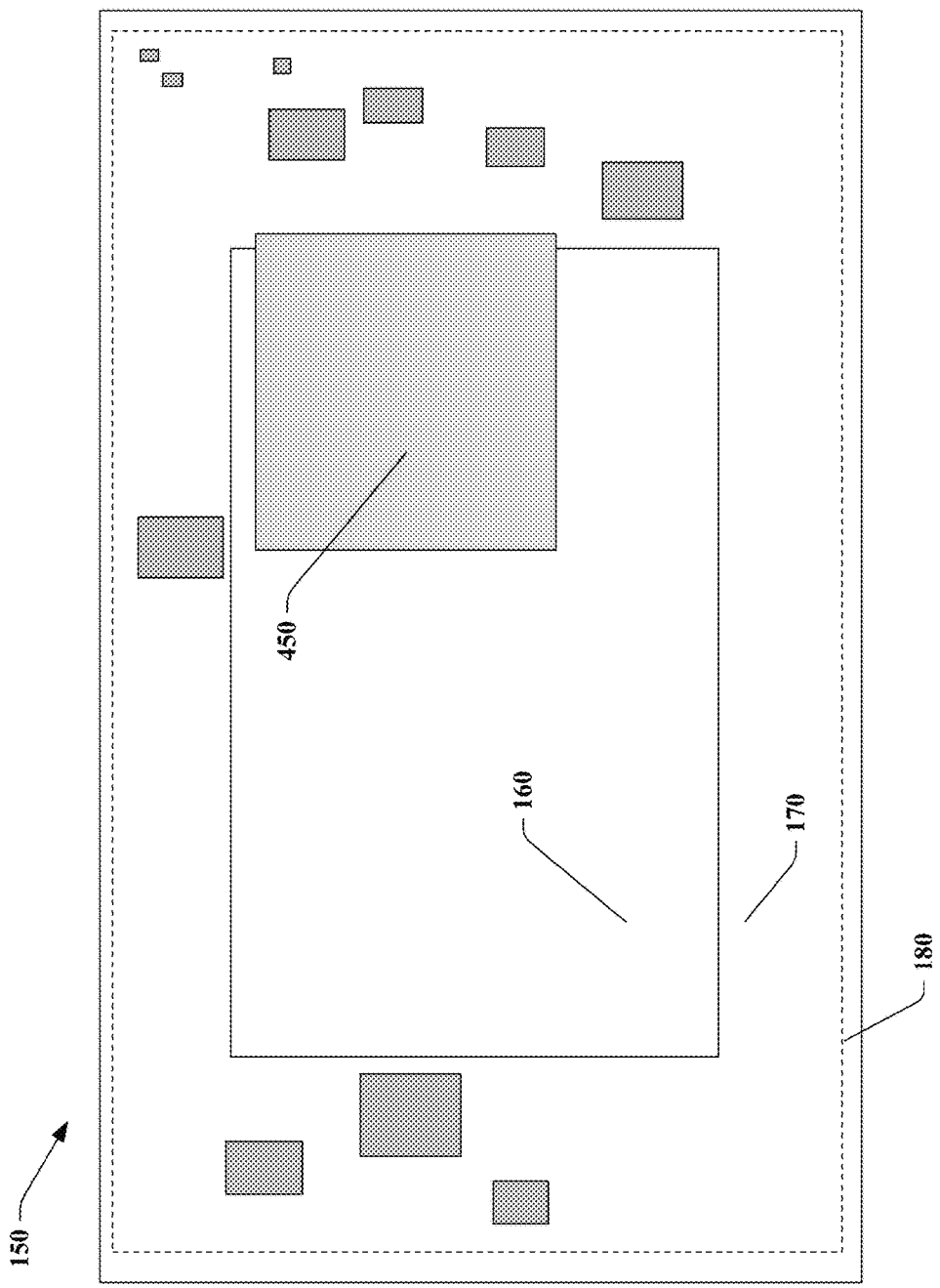
Figure 94:
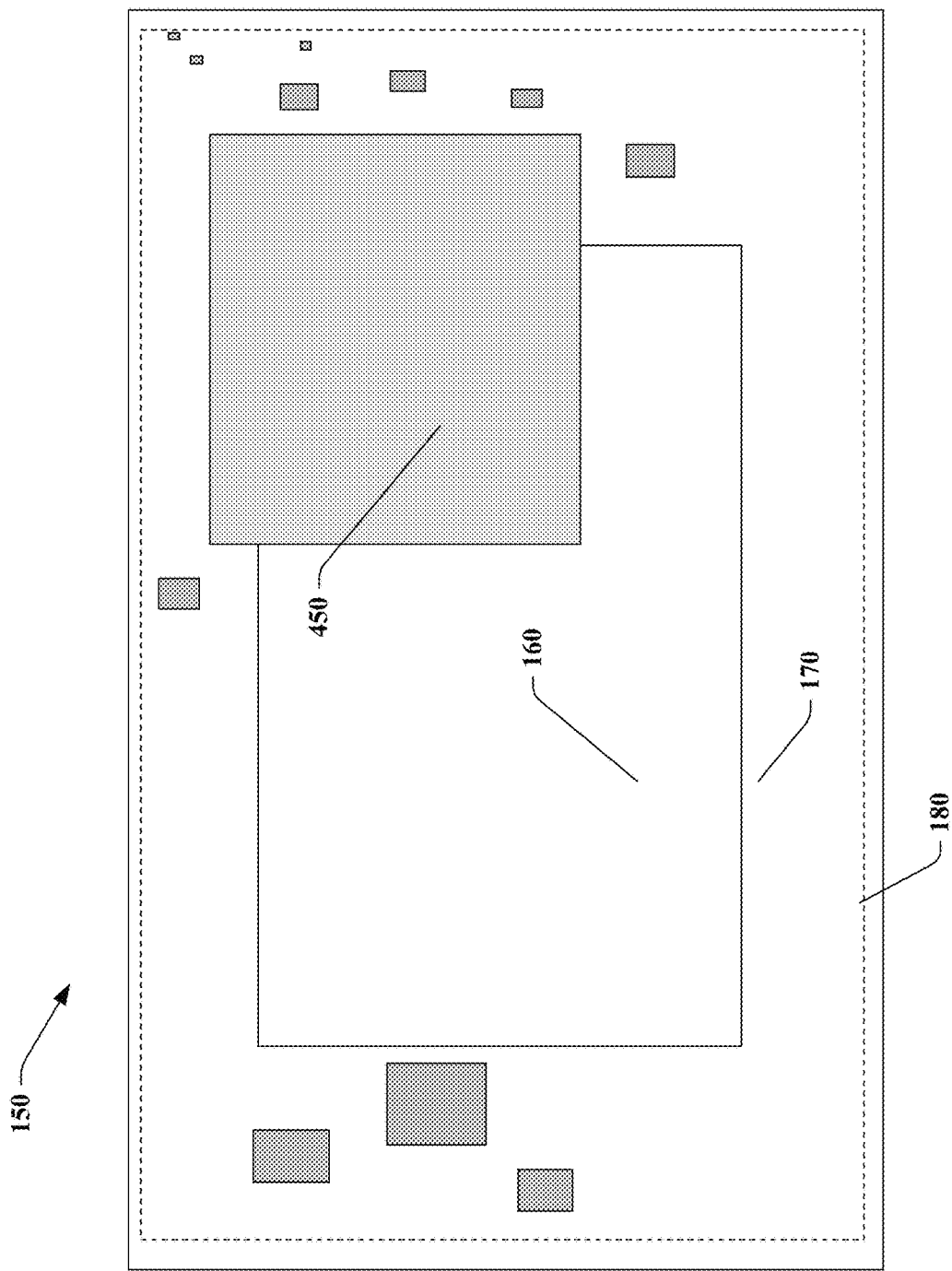

FIGS. 83-90 illustrate that the focus region 160 and/or progressive shrink region 170 as well as display space 150 can be selectively modified in size and/or shape. FIGS. 83 and 84 depict the focus region 160 being scalable in vertical and/or horizontal directions. Likewise, FIGS. 85 and 86 illustrate the progressive shrink region 170 being configurable in vertical and/or horizontal directions. FIGS. 87-90 illustrate that the geometry (e.g., square, rectangle, polygon, circle, ellipse, etc.) of the focus region 160 and/or progressive shrink region 170 and/or display area 150 can be selectively configured in accordance with user preference(s). It is to be appreciated that the various sizes and/or geometries of the respective focus area 160, progressive shrink area 170 and display area 150 can be automatically modified in accordance with a particular state of respective display objects and/or user tasks and/or inferred goals.

FIGS. 91-109 illustrate an aspect of the subject invention such that modification to a primary display object 450 results in modification to various secondary objects so as to make efficient use of the display space and enhance a UI experience via the subject invention. More particularly, and for example, FIGS. 91-94 depict the display object 450 being modified (e.g., increased in size), and by doing so, other secondary display objects are modified (e.g., reduced in size, displaced on screen, change in refresh rate or activity, change in display of sub-objects, etc.) in accordance with the modifications to the primary display object 450. It is to be appreciated that any suitable optimization protocol can be employed so as to define such modification behavior to secondary objects vis-à-vis modifications to a primary object. For example, various metrics can be employed such as for example, state of display objects, state of user, goals of user, prioritization of display objects, historical data relating to prior user activity, inferred goals of a user, utility-based analysis . . . . It is to be appreciated that the aforementioned discussion relating to object and/or cluster occlusion avoidance behavior is applicable to the subject invention as depicted in connection with these figures.

Figure 95:
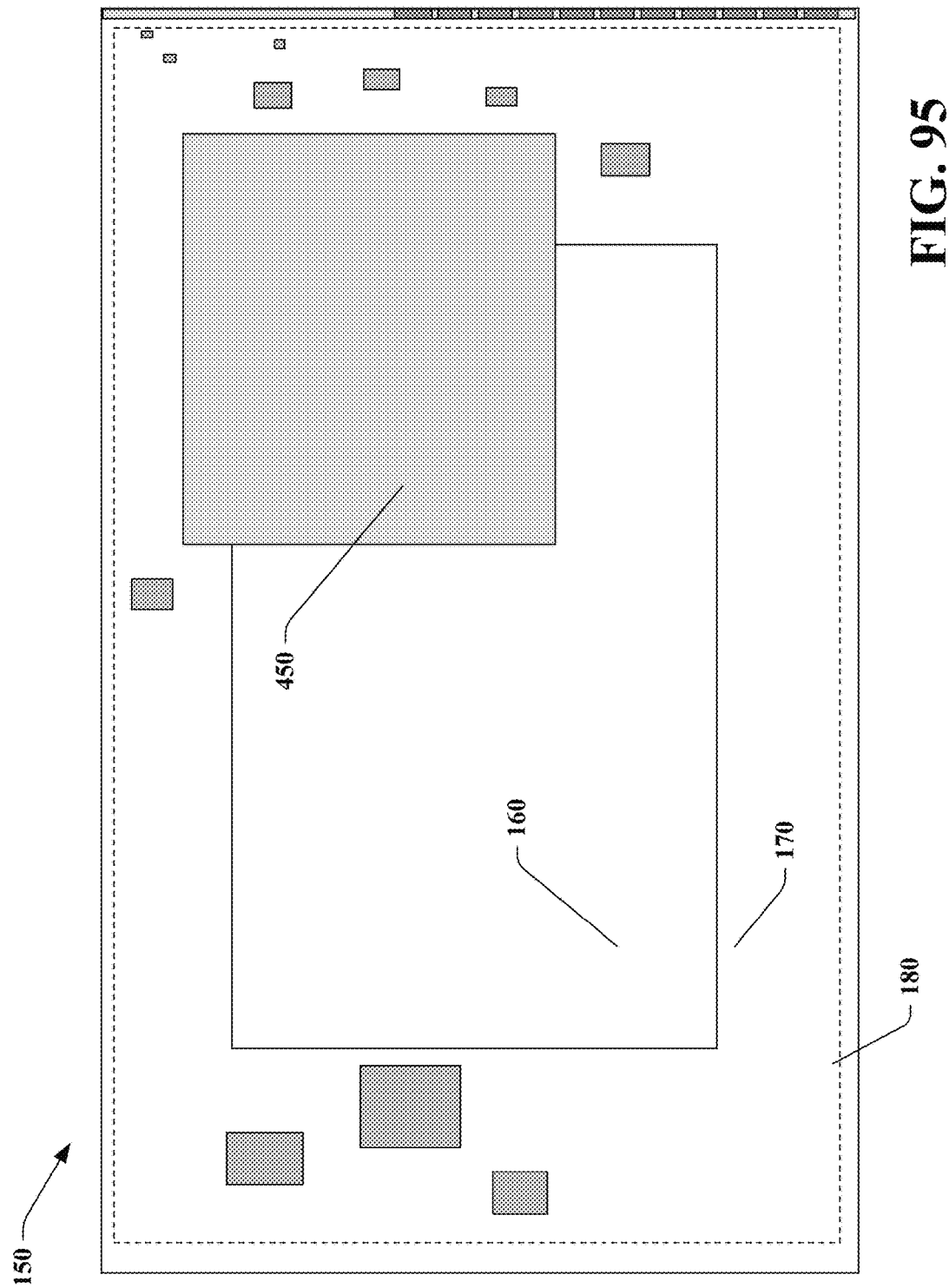
Figure 96:
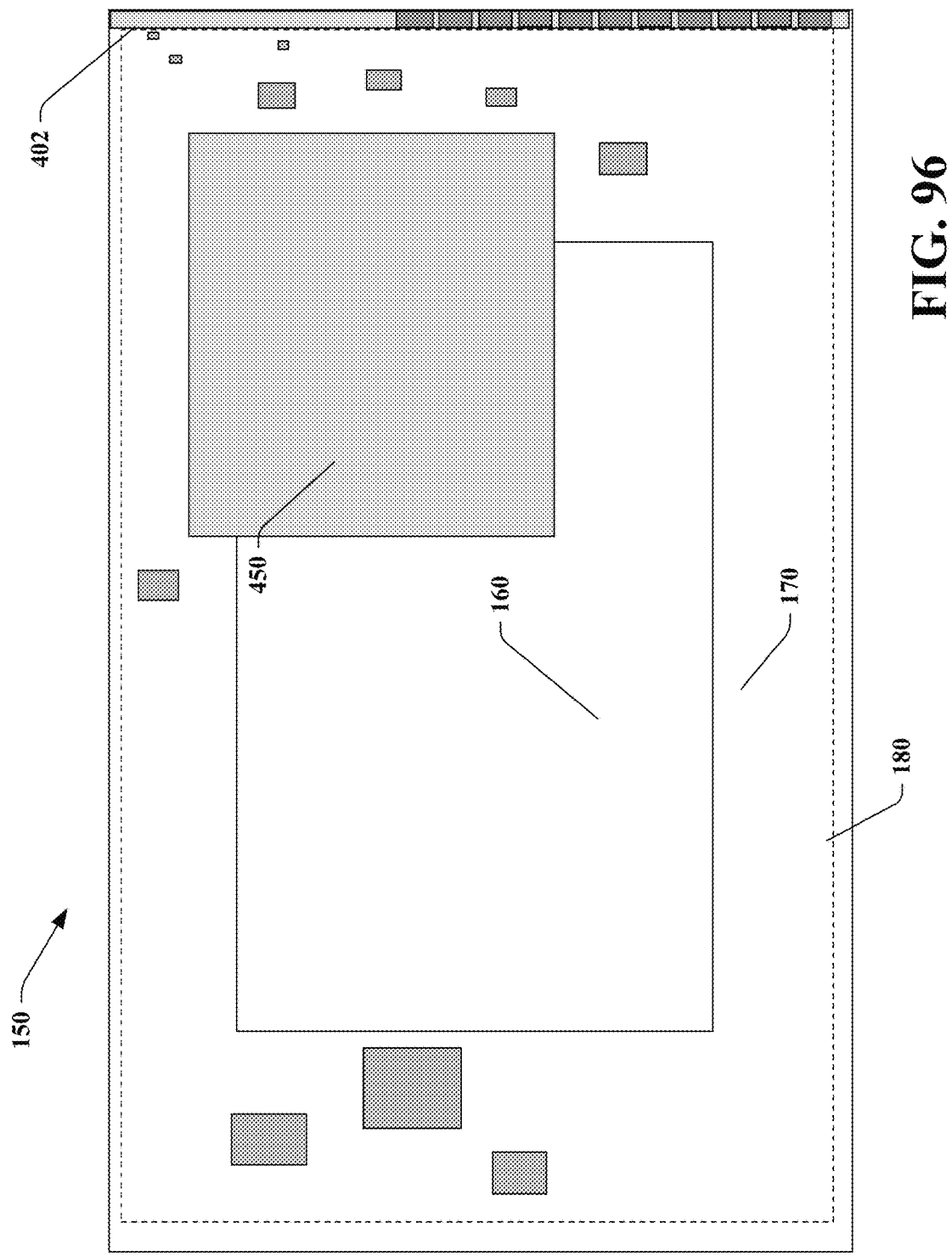
Figure 97:
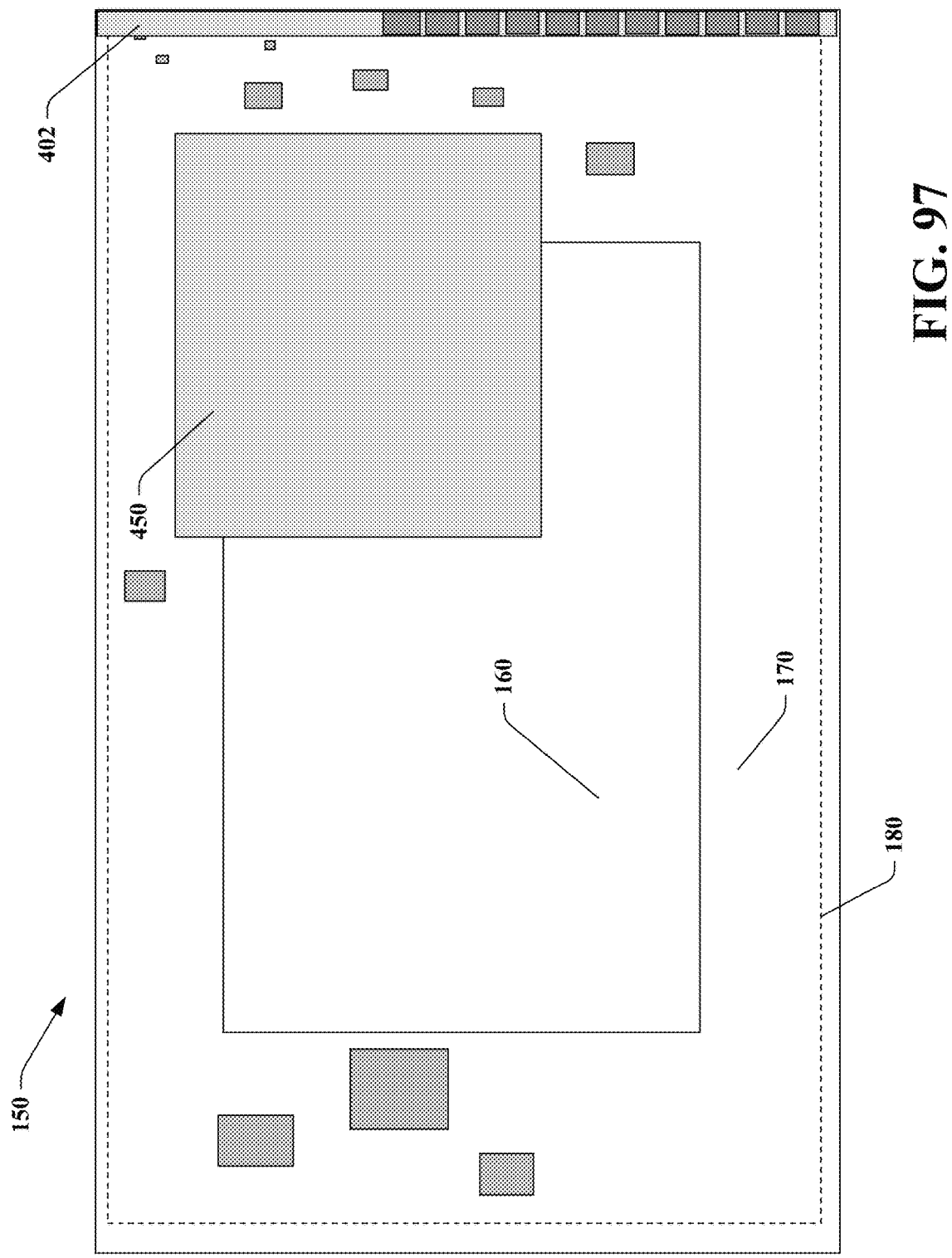
Figure 98:
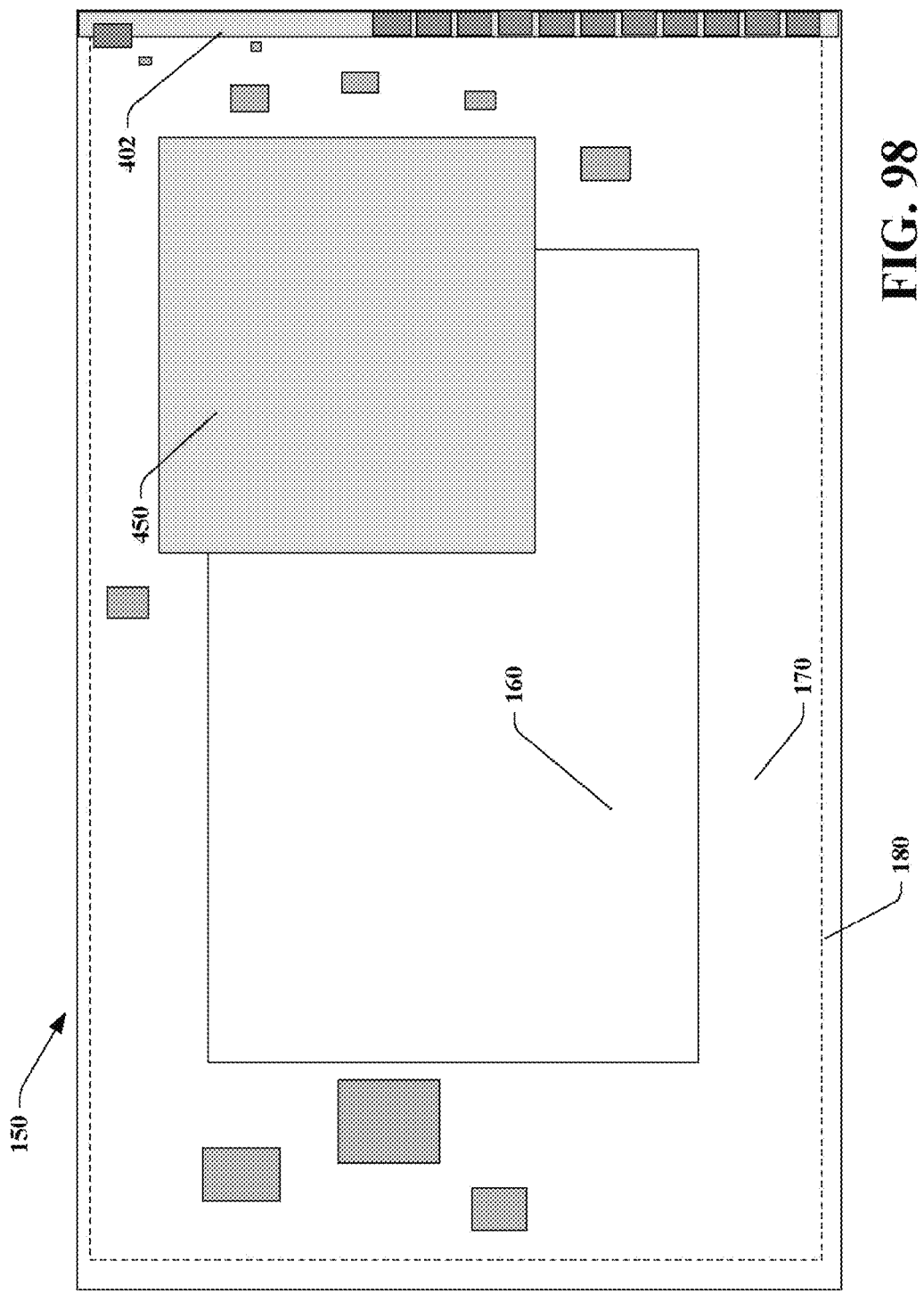
Figure 99:
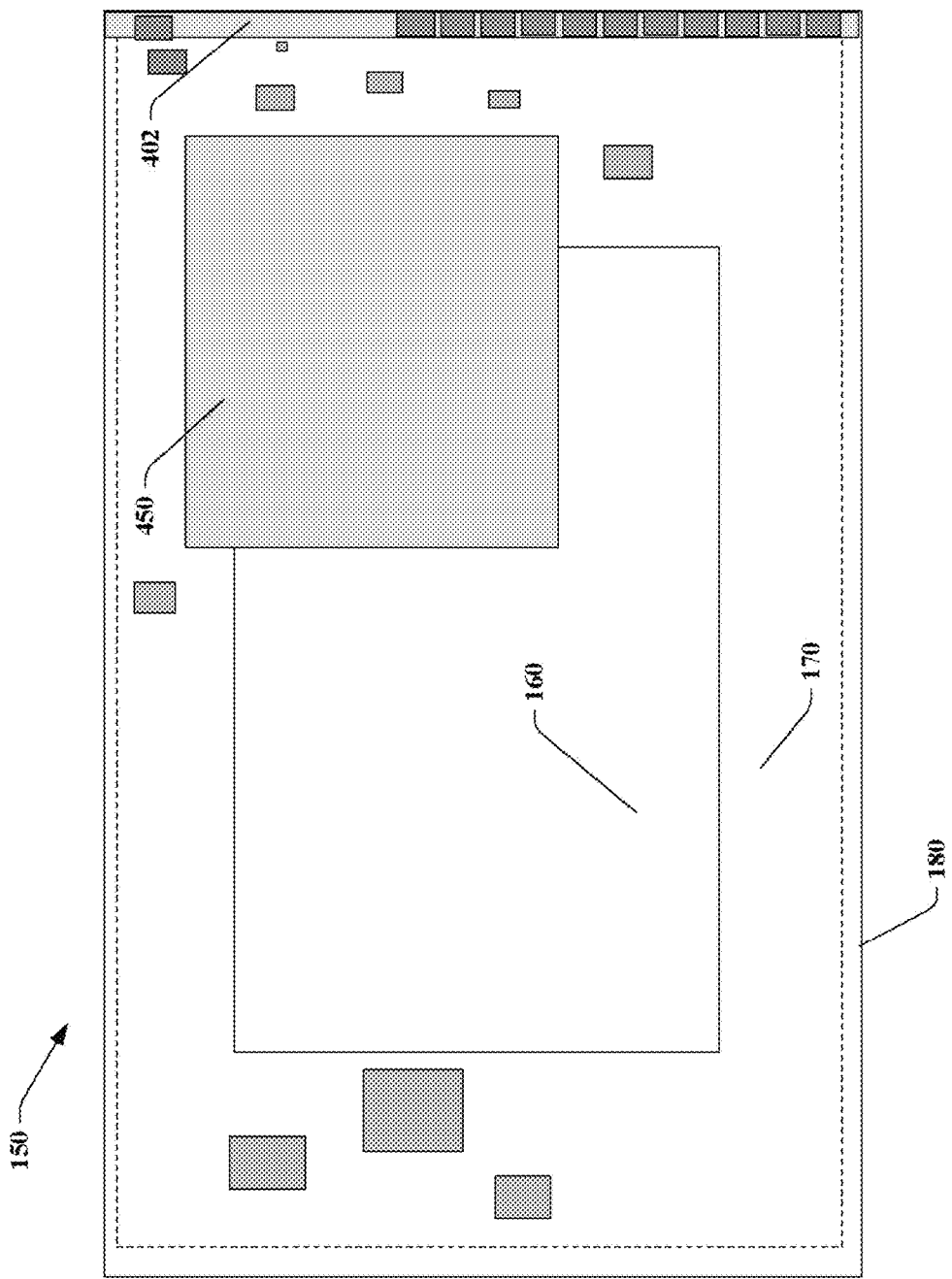
Figure 100:
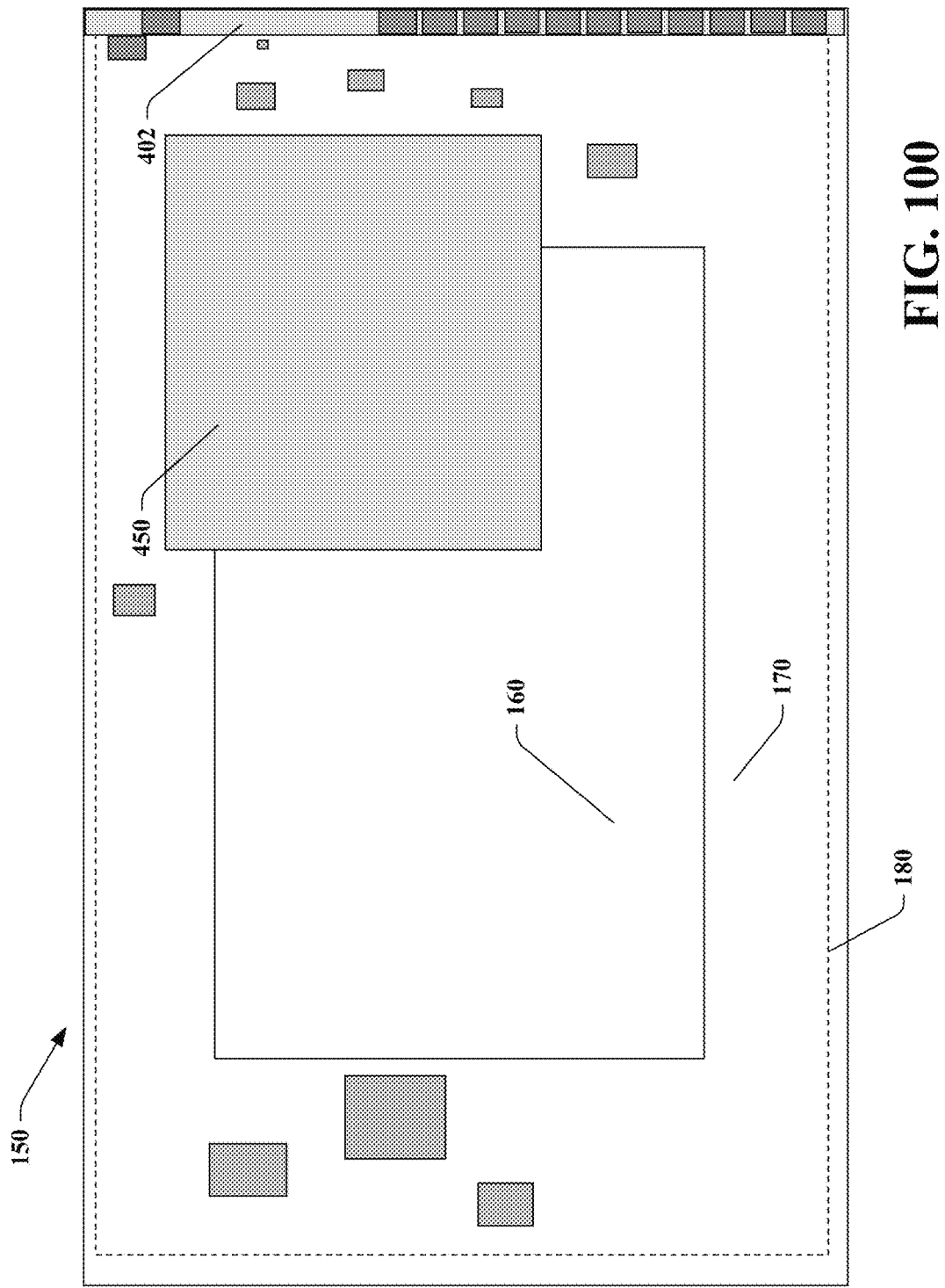
Figure 101:
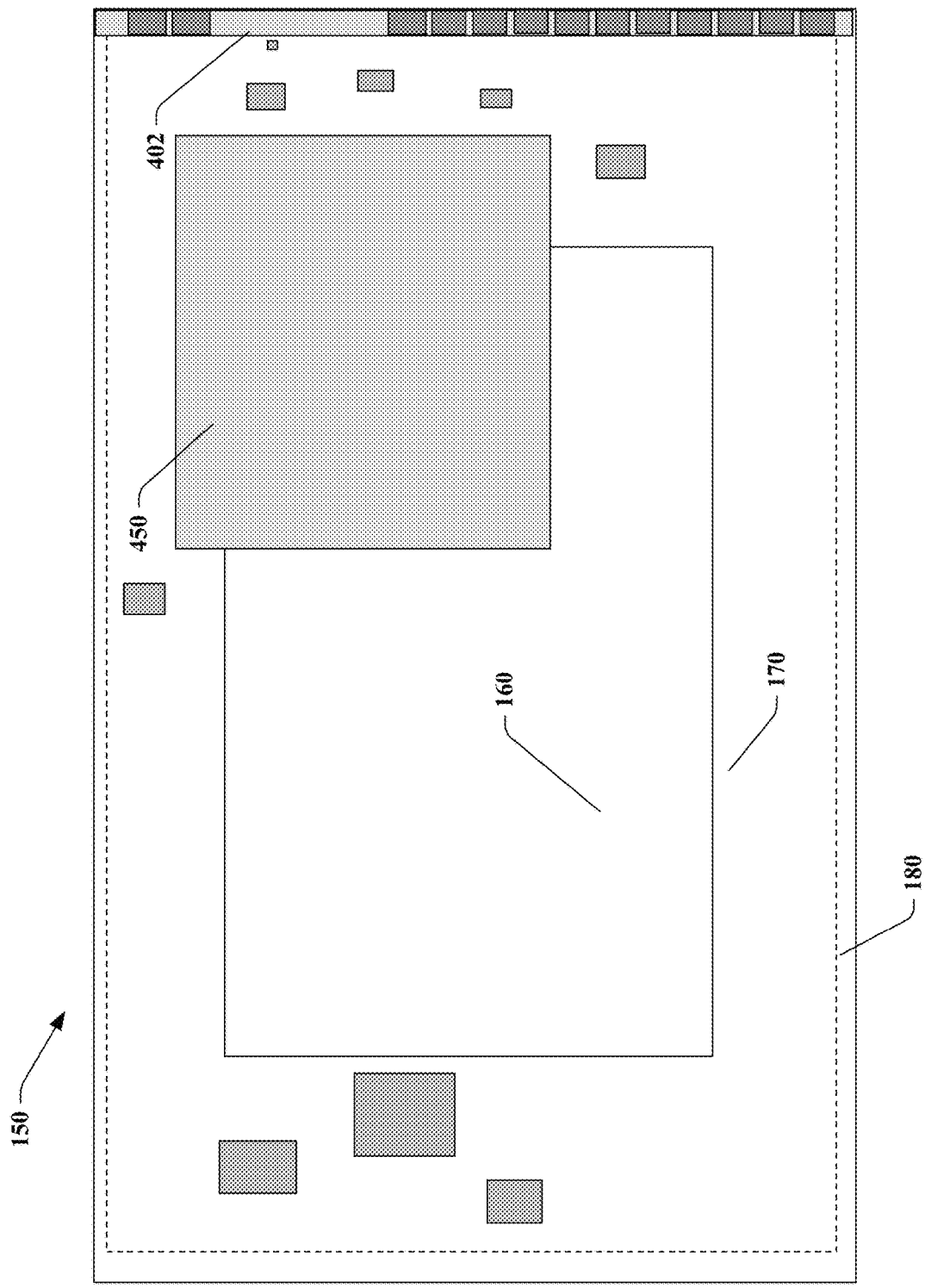
Figure 102:
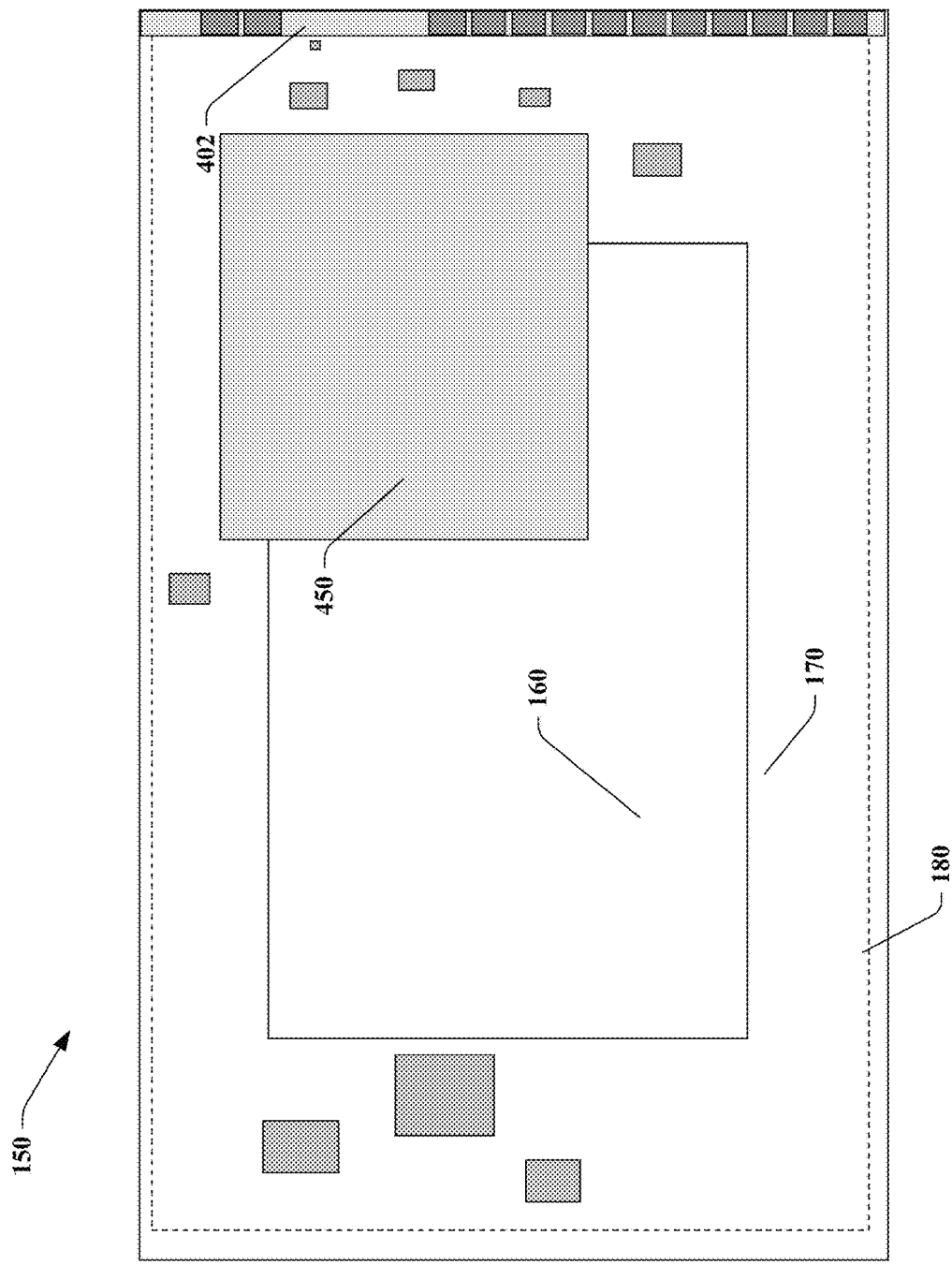
Figure 103:
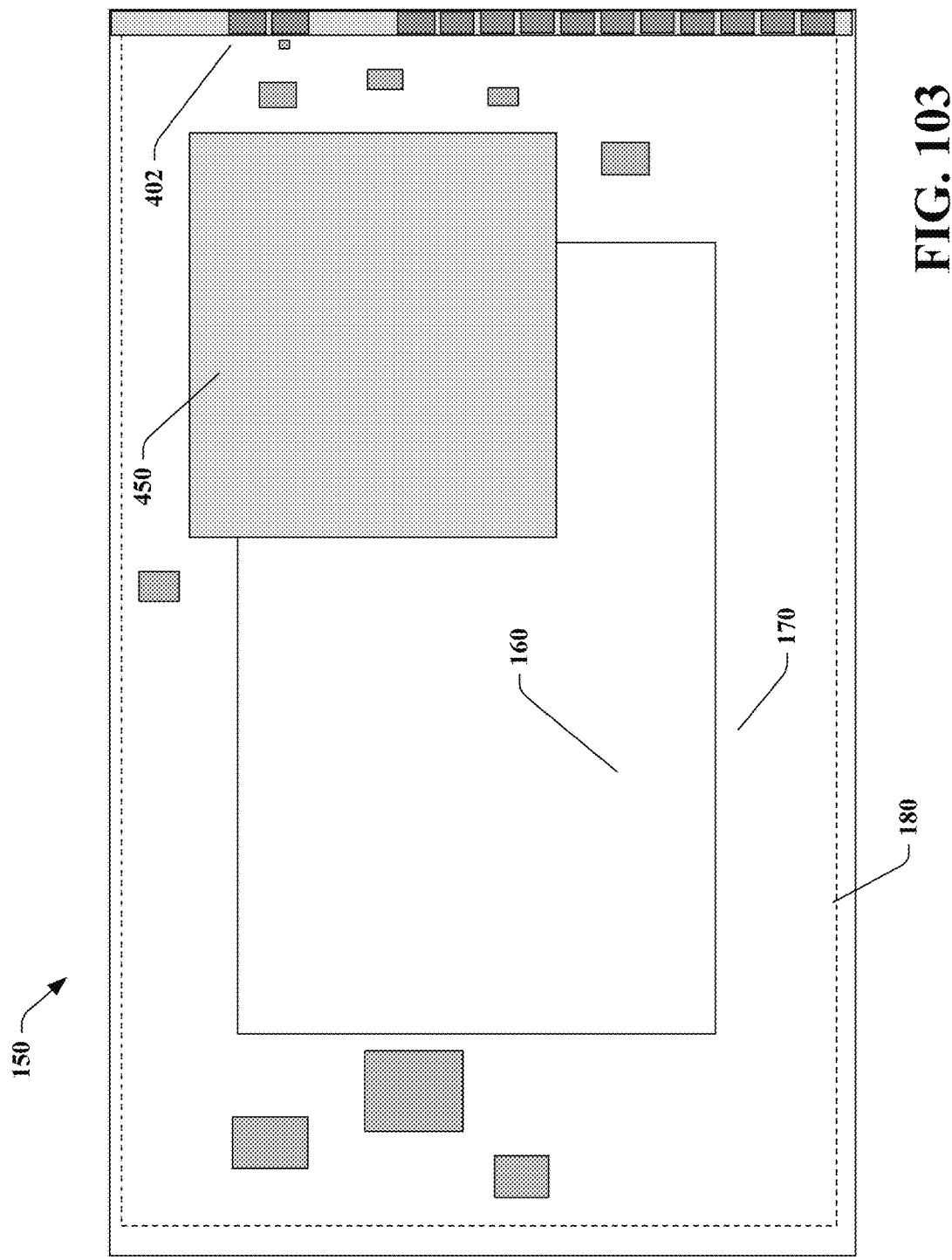
Figure 104:
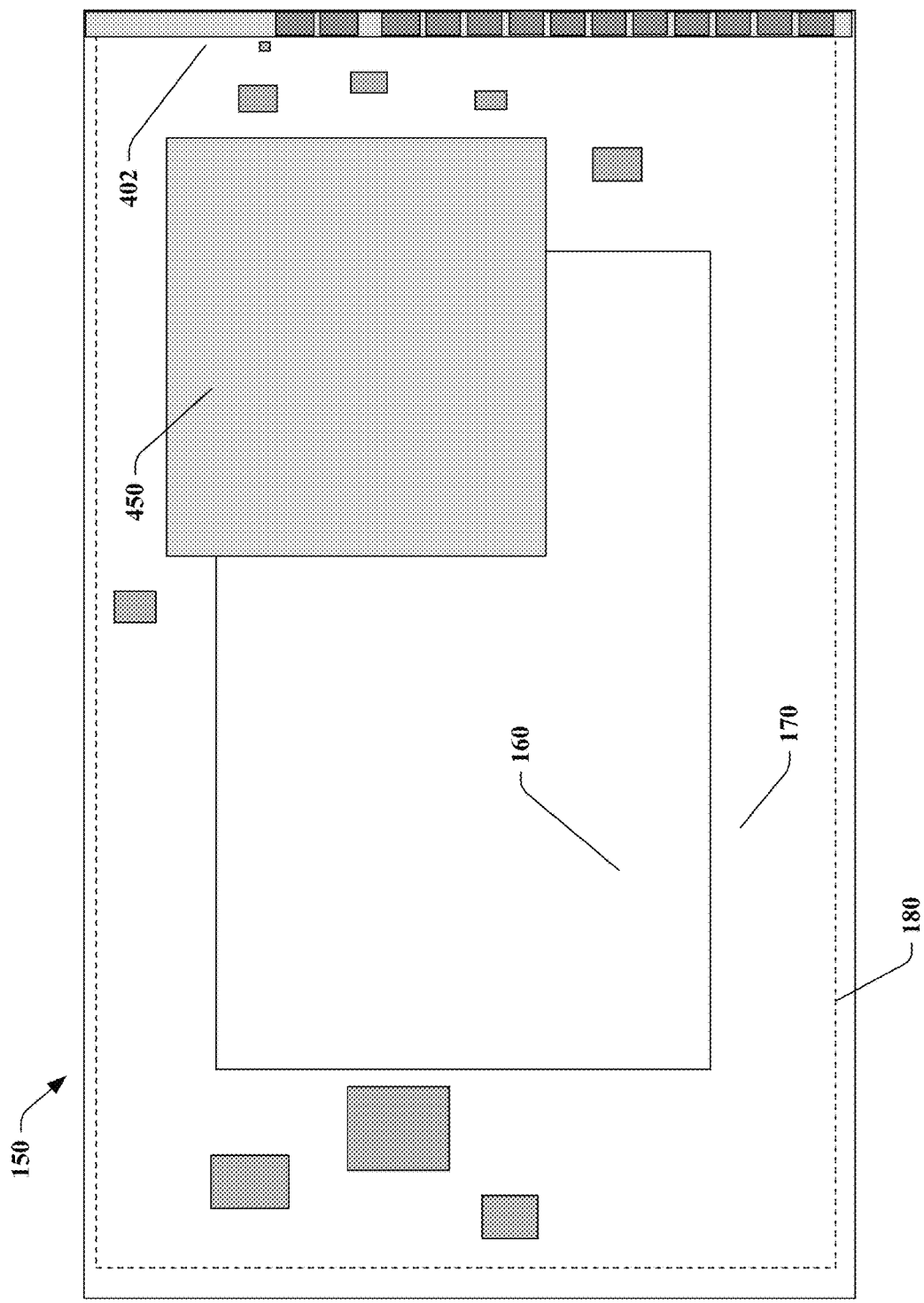
Figure 105:
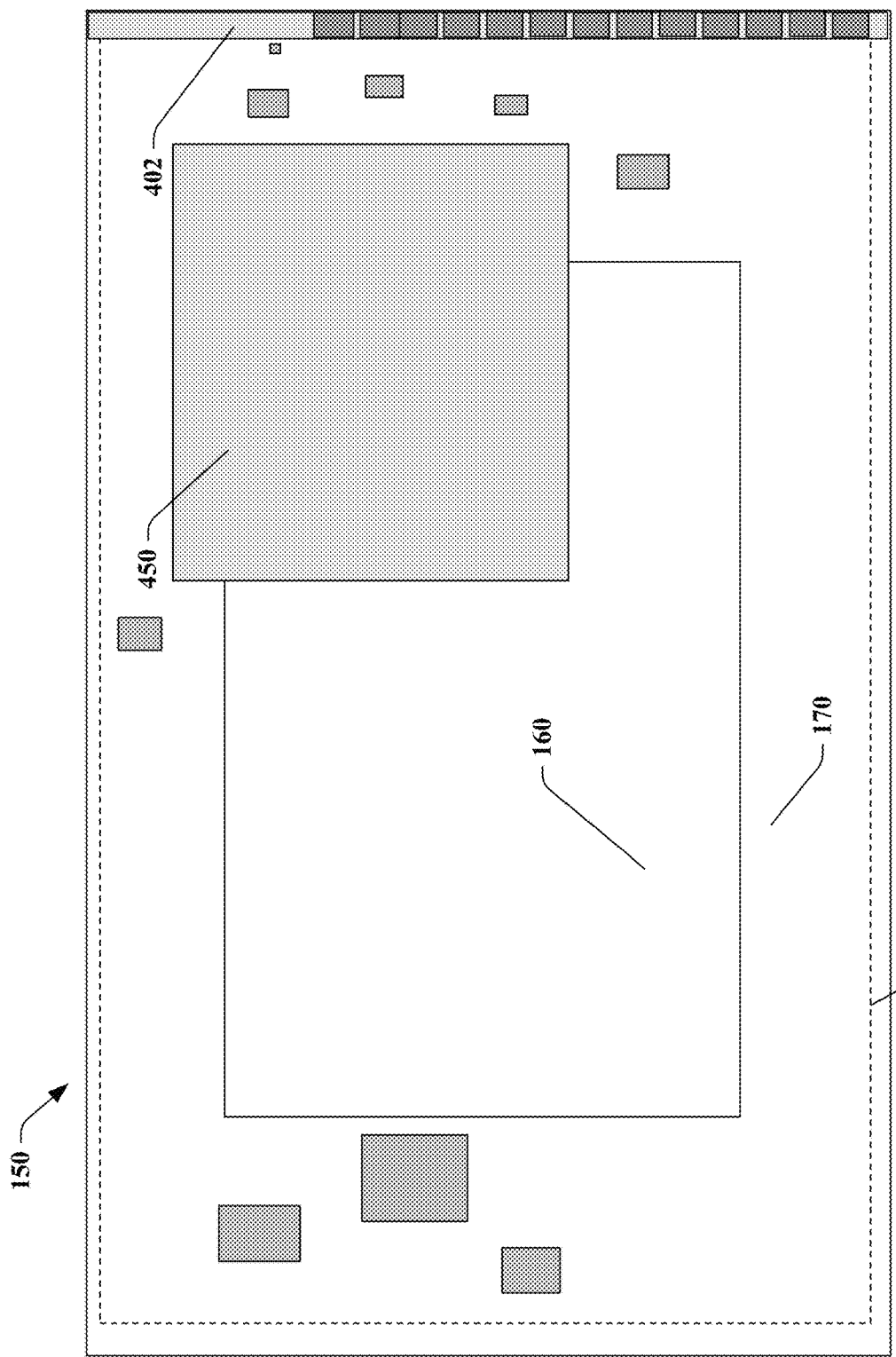
Figure 106:
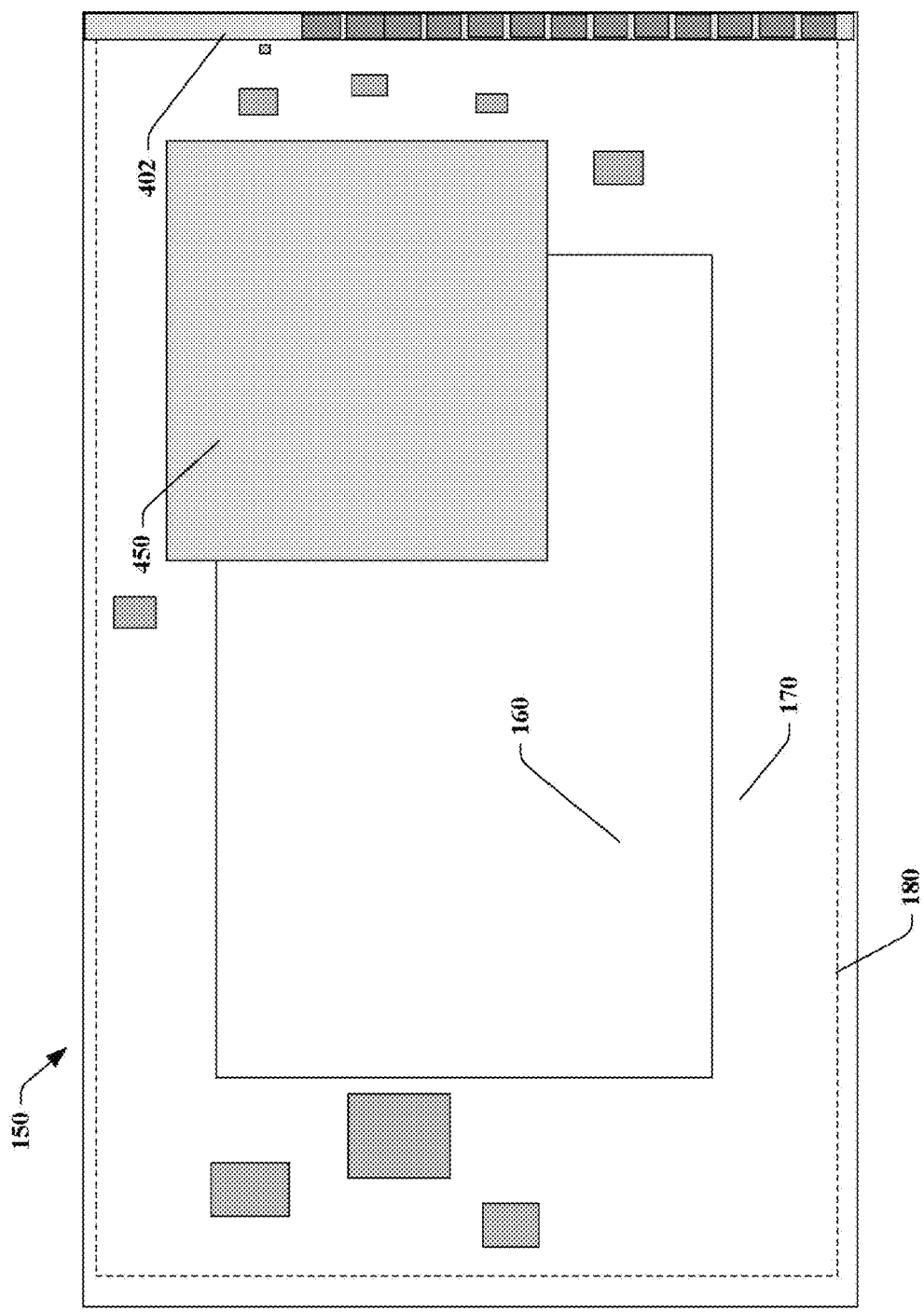
Figure 107:
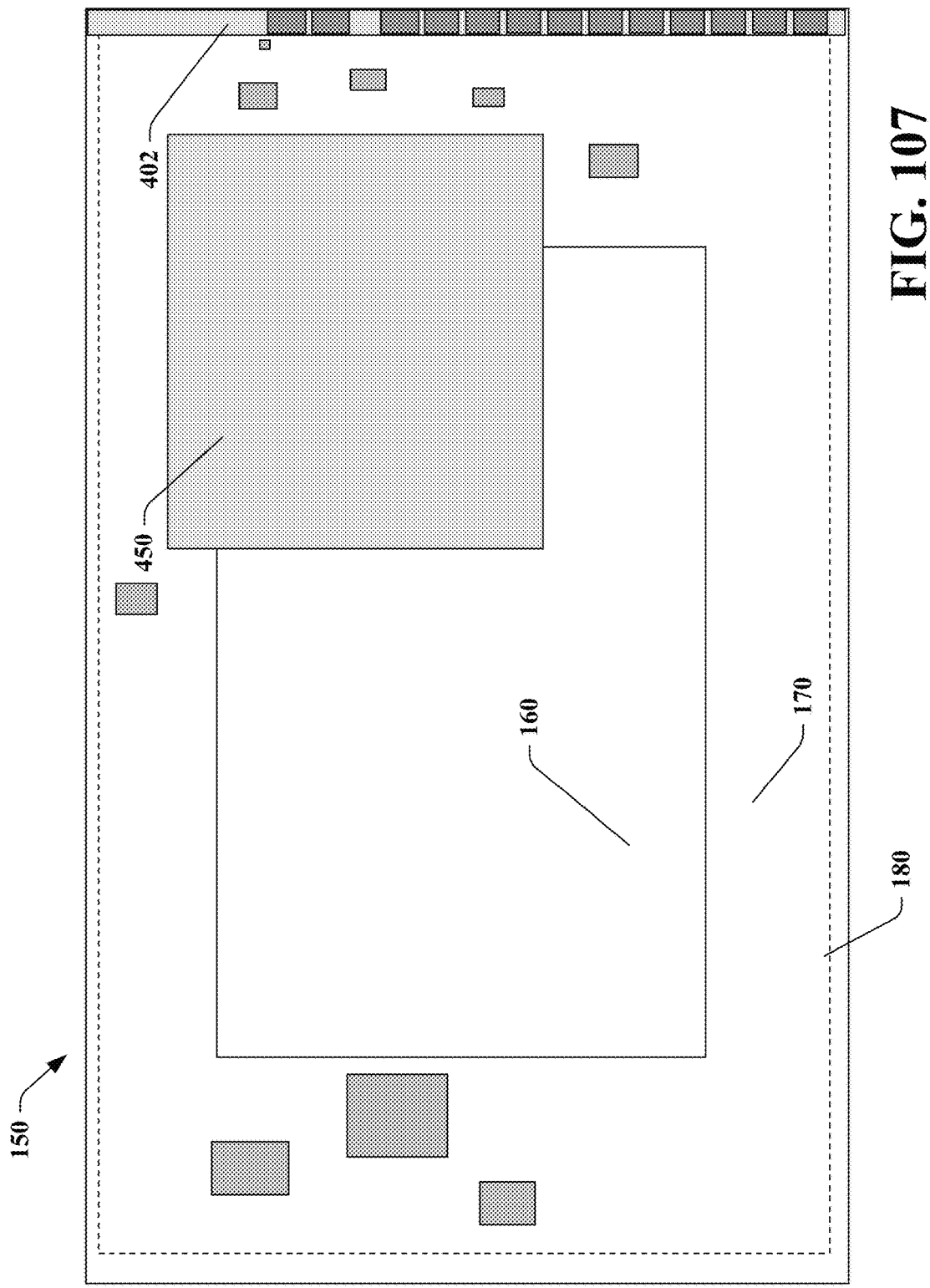
Figure 108:
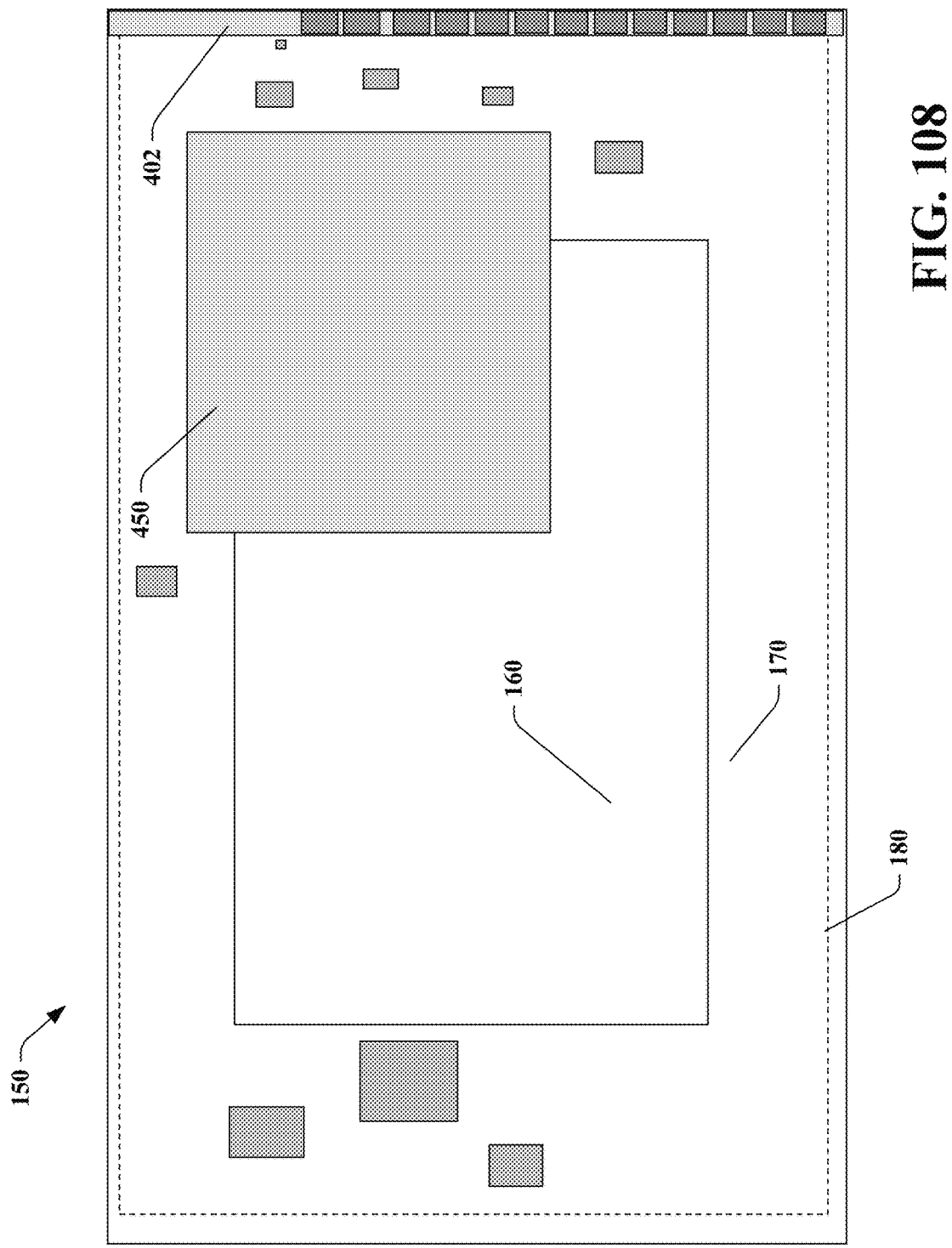
Figure 109:
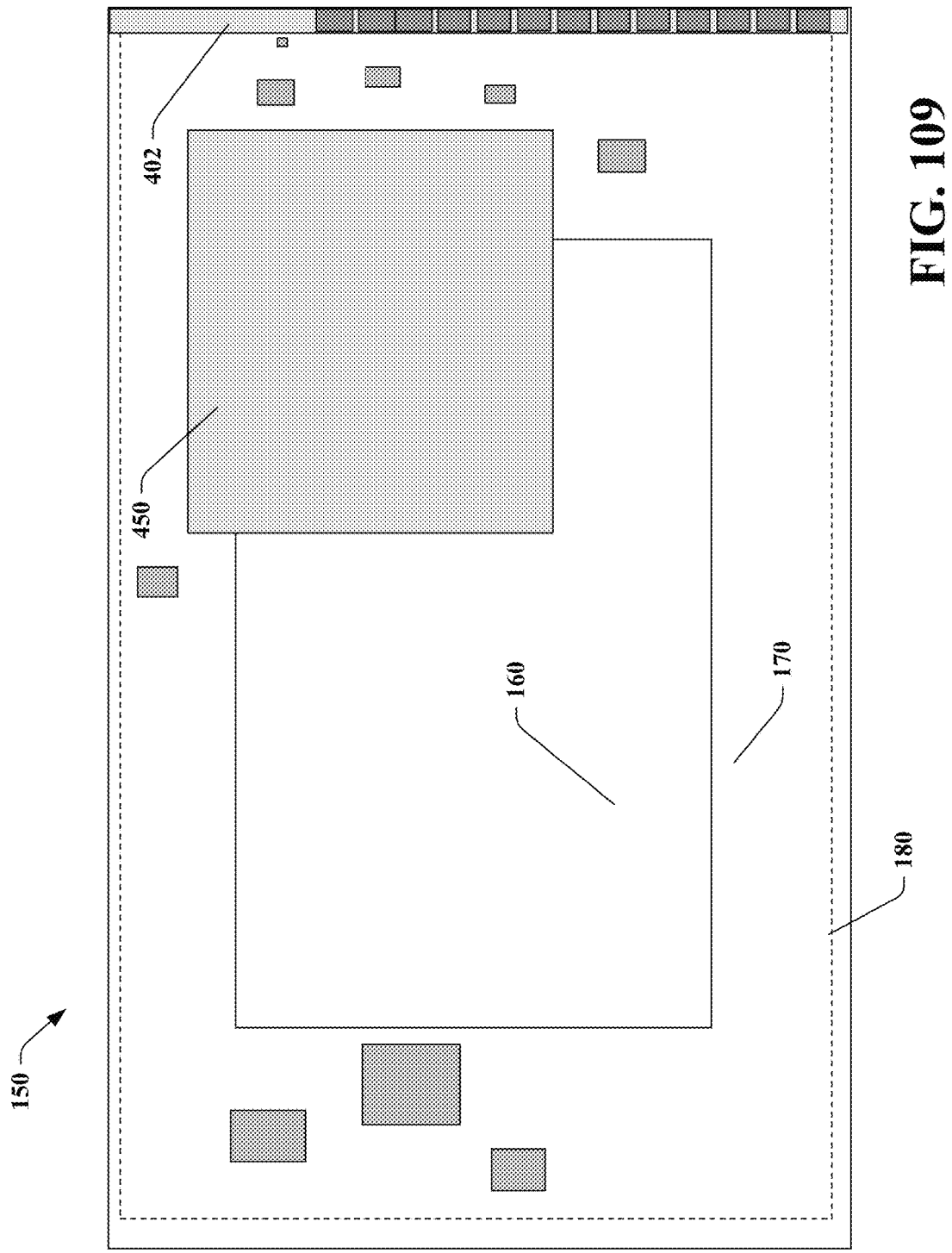
Figure 110:
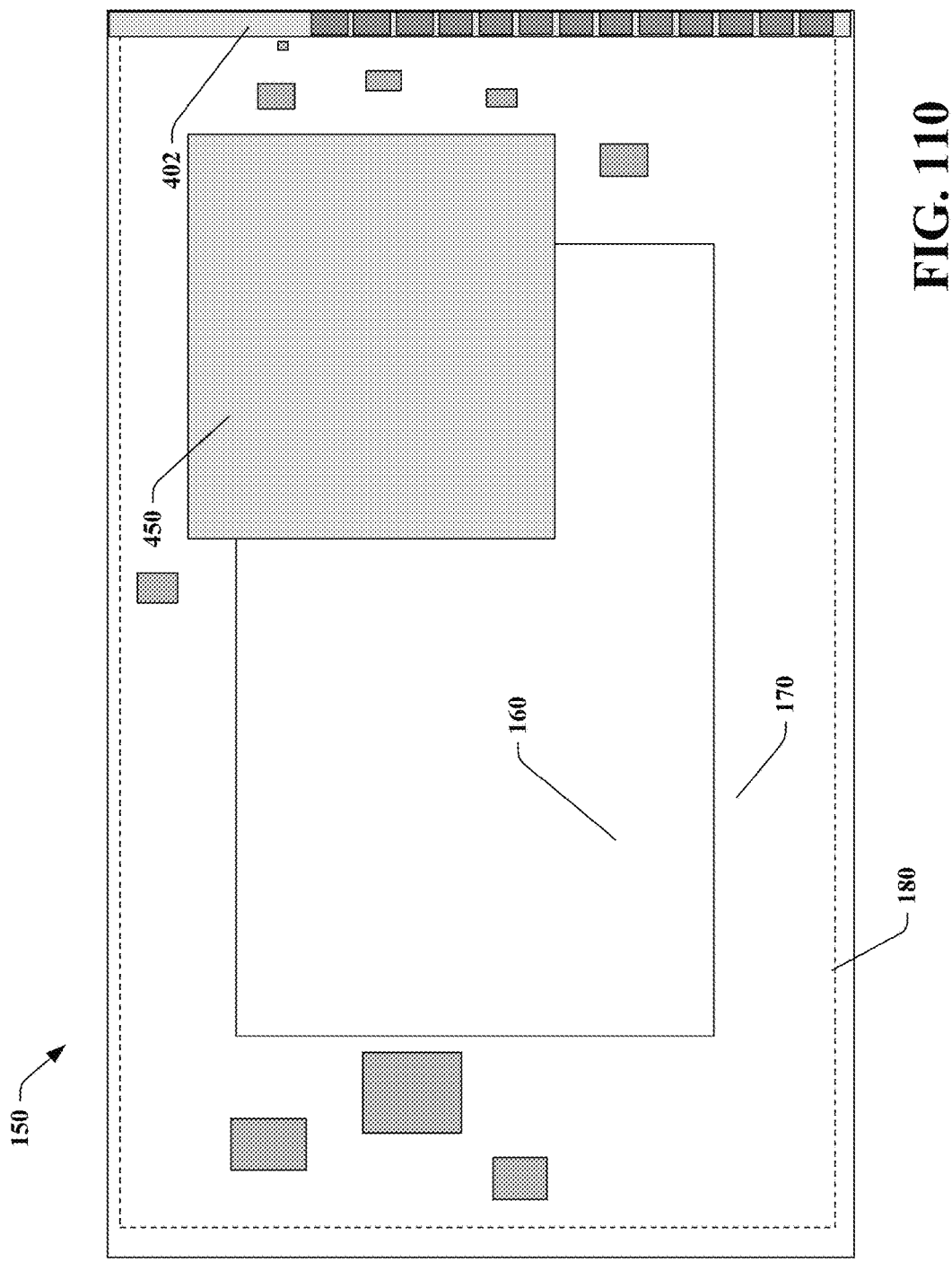
Figure 111:
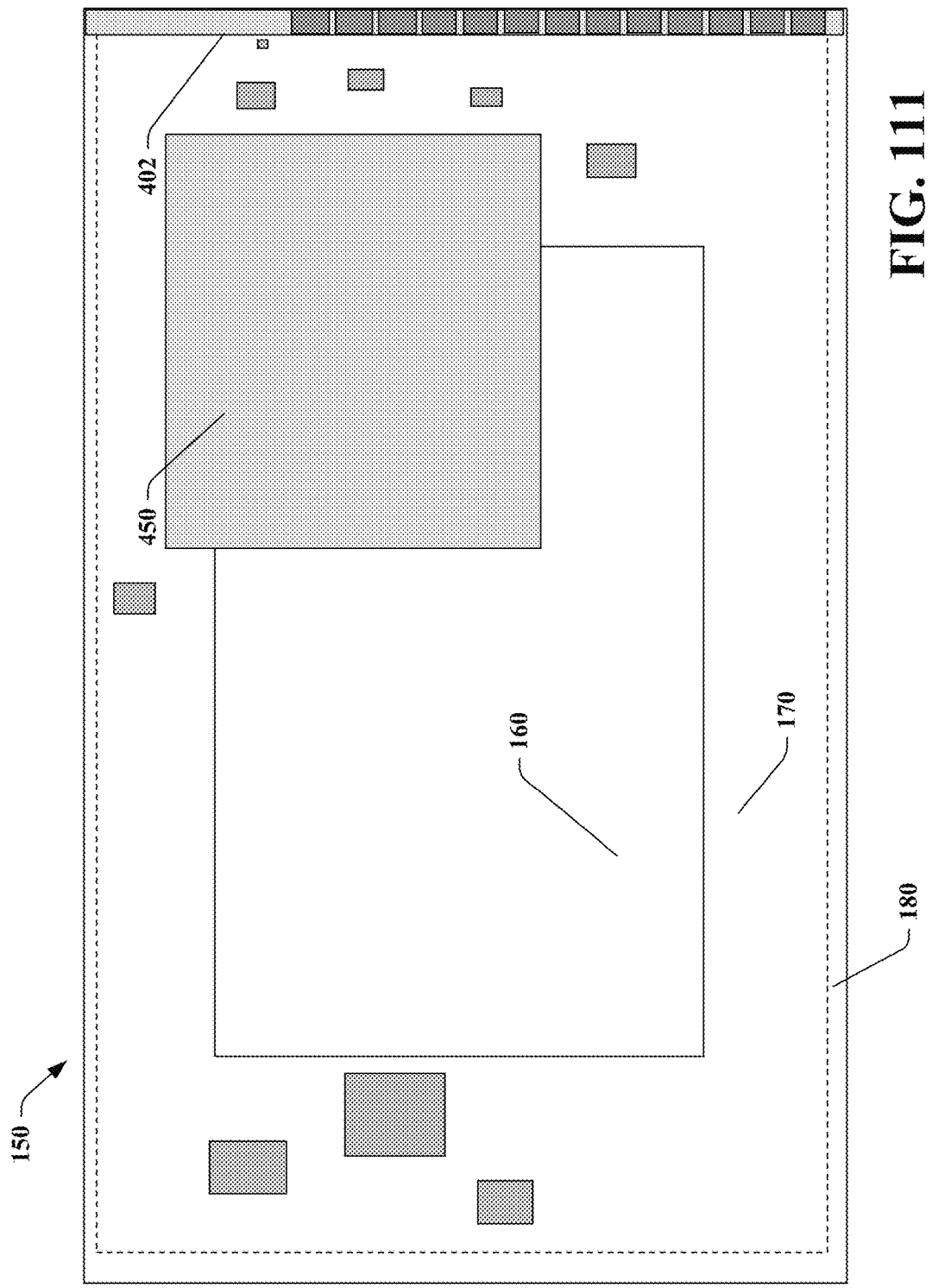

FIGS. 95-97 illustrate that when an object reaches the edge 180, the side bar 402 can automatically reappear (e.g., unhide). FIGS. 98-111 illustrate that as a display object is restored to a previous size and enters the side bar, behavior of the secondary display objects can be modified as well (e.g., reverse modification so as to progressively revert to earlier state). It is also to be appreciated that various animated techniques (e.g., display object rebounding, bouncing . . . ) can be effected via the subject invention so as to enhance a user experience.

Figure 112:
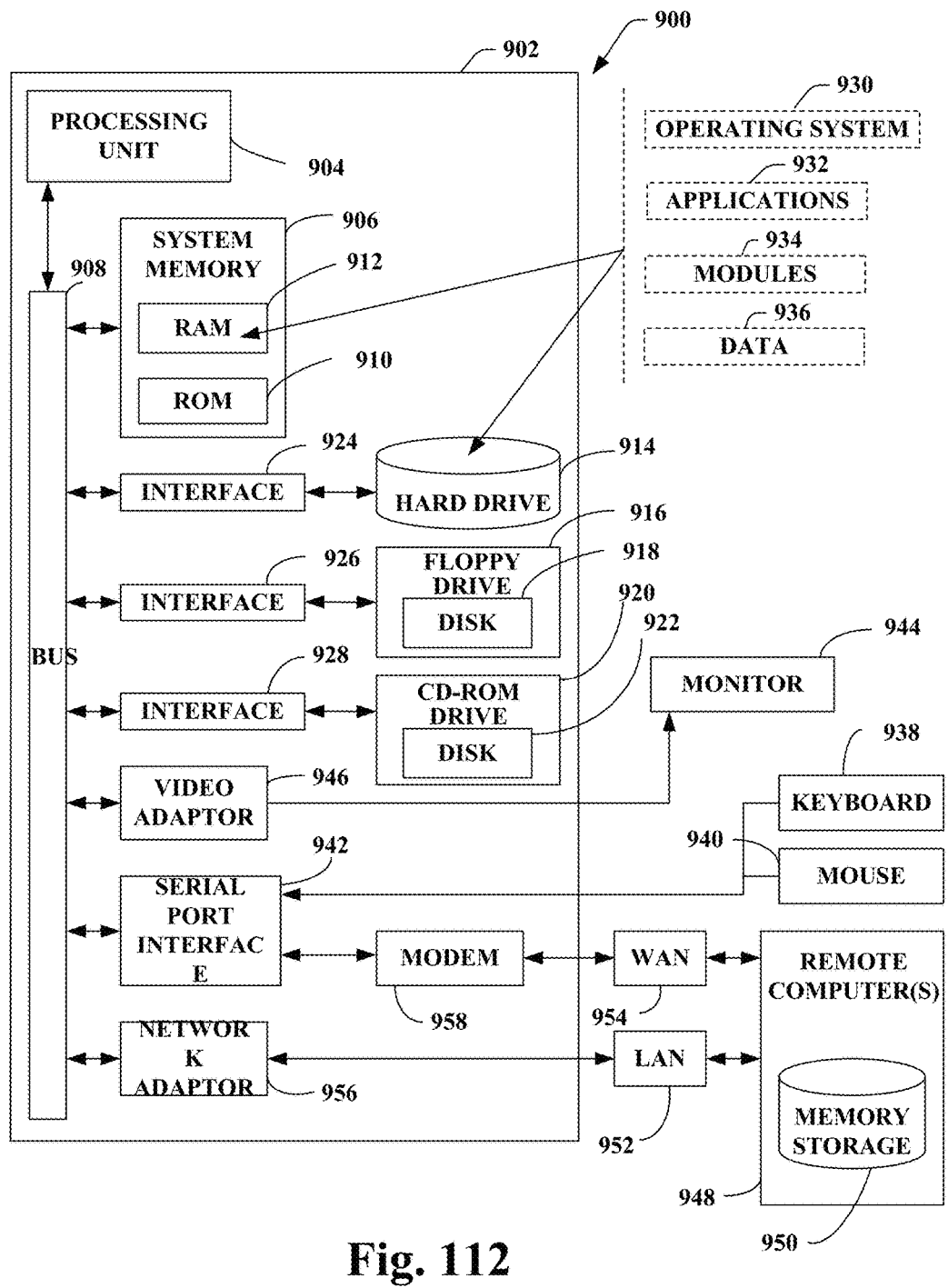
FIG. 112 illustrates a block diagram of a computer operable to execute the disclosed architecture.

Referring now to FIG. 112, there is illustrated a block diagram of a computer operable to execute the disclosed architecture. In order to provide additional context for various aspects of the present invention, FIG. 112 and the following discussion are intended to provide a brief, general description of a suitable computing environment 900 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc., that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference again to FIG. 112, the exemplary environment 900 for implementing various aspects of the invention includes a computer 902, the computer 902 including a processing unit 904, a system memory 906 and a system bus 908. The system bus 908 couples system components including, but not limited to the system memory 906 to the processing unit 904. The processing unit 904 may be any of various commercially available processors. Dual microprocessors and other multi-processor architectures also can be employed as the processing unit 904.

The system bus 908 can be any of several types of bus structure including a memory bus or memory controller, a peripheral bus and a local bus using any of a variety of commercially available bus architectures. The system memory 906 includes read only memory (ROM) 910 and random access memory (RAM) 912. A basic input/output system (BIOS), containing the basic routines that help to transfer information between elements within the computer 902, such as during start-up, is stored in the ROM 910.

The computer 902 further includes a hard disk drive 914, a magnetic disk drive 916, (e.g., to read from or write to a removable disk 918) and an optical disk drive 920, (e.g., reading a CD-ROM disk 922 or to read from or write to other optical media). The hard disk drive 914, magnetic disk drive 916 and optical disk drive 920 can be connected to the system bus 908 by a hard disk drive interface 924, a magnetic disk drive interface 926 and an optical drive interface 928, respectively. The drives and their associated computer-readable media provide nonvolatile storage of data, data structures, computer-executable instructions, and so forth. For the computer 902, the drives and media accommodate the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 912, including an operating system 930, one or more application programs 932, other program modules 934 and program data 936. It is appreciated that the present invention can be implemented with various commercially available operating systems or combinations of operating systems.

A user can enter commands and information into the computer 902 through a keyboard 938 and a pointing device, such as a mouse 940. Other input devices (not shown) may include a microphone, an IR remote control, a joystick, a game pad, a satellite dish, a scanner, or the like. These and other input devices are often connected to the processing unit 904 through a serial port interface 942 that is coupled to the system bus 908, but may be connected by other interfaces, such as a parallel port, a game port, a universal serial bus ("USB"), an IR interface, etc. A monitor 944 or other type of display device is also connected to the system bus 908 via an interface, such as a video adapter 946. In addition to the monitor 944, a computer typically includes other peripheral output devices (not shown), such as speakers, printers etc.

The computer 902 may operate in a networked environment using logical connections to one or more remote computers, such as a remote computer(s) 948. The remote computer(s) 948 may be a workstation, a server computer, a router, a personal computer, portable computer, microprocessor-based entertainment appliance, a peer device or other common network node, and typically includes many or all of the elements described relative to the computer 902, although, for purposes of brevity, only a memory storage device 950 is illustrated. The logical connections depicted include a LAN 952 and a WAN 954. Such networking environments are commonplace in offices, enterprise-wide computer networks, intranets and the Internet.

When used in a LAN networking environment, the computer 902 is connected to the local network 952 through a network interface or adapter 956. When used in a WAN networking environment, the computer 902 typically includes a modem 958, or is connected to a communications server on the LAN, or has other means for establishing communications over the WAN 954, such as the Internet. The modem 958, which may be internal or external, is connected to the system bus 908 via the serial port interface 942. In a networked environment, program modules depicted relative to the computer 902, or portions thereof, may be stored in the remote memory storage device 950. It will be appreciated that the network connections shown are exemplary and other means of establishing a communications link between the computers may be used.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. One or more computer-readable storage media storing computer-executable instructions that, when executed by a computer, cause the computer to perform acts comprising:
   in response to receiving a task switching instruction associated with a program application:
      moving a display object associated with the program application from a focus area to an edge, wherein the display object progressively shrinks as the display object moves toward the edge, wherein the display object has a network communication functionality;
   wherein the display object has a standard behavior prior to receiving the task switching instruction, and wherein the functionality of the display object's network communication functionality is reduced when the display object is shrunk.

2. The one or more computer-readable storage media of claim 1, wherein the display object includes a plurality of windows.

3. The one or more computer-readable storage media of claim 1, wherein the task switching instruction includes a mouse input.

4. The one or more computer-readable storage media of claim 1, wherein the task switching instruction includes a selection of a task marker associated with a task.

5. The one or more computer-readable storage media of claim 1, wherein the task switching instruction includes a keyboard input.

6. The one or more computer-readable storage media of claim 1, wherein the task switching instruction includes a voice input.

7. The one or more computer-readable storage media of claim 1, the acts further comprising moving the display object from the progressive shrink area to the focus area in response to receiving a second task switching instruction.

8. The one or more computer-readable storage media of claim 7, wherein the display object is restored to a former focus position in the focus area.

9. The one or more computer-readable storage media of claim 7, wherein the second task switching instruction includes a selection of a task marker that is displayed in the progressive shrink area.

10. The one or more computer-readable storage media of claim 7, further comprising:
    scaling the display object as a function of proximity to the edge.

11. The one or more computer-readable storage media of claim 10, further comprising displaying a second task marker associated with the second task in proximity to the edge.

12. The one or more computer-readable storage media of claim 10, wherein the display object associated is restored to a former position.

13. A system comprising:
    one or more processors; and
    one or more computer readable media maintaining one or more components executable by the one or more processors, the one or more components comprising:
       a focus area component to:
          define a focus area within a display space, the focus area occupying a subset area of the display space;
          define a progressive shrink area within the display space, the progressive shrink area located outside of the focus area; and
          define an edge;
       an identification component to identify a cluster of windows in the display space that are associated with a task, wherein at least one window of the cluster of windows is a program application;
       a scaling component to:
          move and display the cluster of windows associated with the task from the focus area to the progressive shrink area in response to receiving a task switching instruction, wherein the program application has a standard behavior when the cluster of windows is inside of the focus area, and wherein the program application has a changed behavior when the cluster of windows is moved toward the edge; and
          progressively scale the cluster of windows associated with the task as a function of proximity to the edge in response to receiving the task switching instruction; and
       a behavior component to reduce a network communication functionality of the program application when the cluster of windows is moving toward the edge.

14. The system of claim 13, wherein the behavior component modifies the behavior of each window of the cluster, at least in part, by modifying at least one of a refresh rate, and a transparency value.

15. The system of claim 13, wherein each window of the cluster is static when located in the progressive shrink area.

16. The system of claim 13, wherein each window of the cluster exhibits full functionality when located in the focus area and exhibits reduced functionality when located in the progressive shrink area.

17. The system of claim 13, wherein the scaling component is configured to move the cluster of windows associated with the task from the progressive shrink area to the focus area in response to selection of a task marker that is displayed in the progressive shrink area.

18. A portable computing device comprising:
an input device;
a focus area component to:
  define a focus area within a display space, the focus area occupying a subset area of the display space;
  define a progressive shrink area within the display space, the progressive shrink area located outside of the focus area; and
  define an edge;
an identification component to identify a cluster of windows in the display space that are associated with a task, wherein each window in the cluster of windows is a graphical user interface of a program application;
a scaling component to:
  move and display the cluster of windows associated with the task from the focus area to the progressive shrink area in response to receiving a task switching instruction via the input device, wherein the cluster of windows has a standard behavior when the cluster of windows is in the focus area, and wherein the cluster of windows has reduced functionality to a static behavior when the cluster of windows is outside of the focus area; and
  progressively scale the cluster of windows associated with the task as a function of proximity to the edge in response to receiving the task switching instruction via the input device; and
a behavior component to modify behavior of each window of the cluster as a function of location in the progressive shrink area, wherein each window of the cluster exhibits full functionality when located in the focus area and exhibits a reduced network communication functionality in the progressive shrink area.

19. The portable computing device of claim 18, wherein the portable computing device includes a wireless telephone.

20. The portable computing device of claim 18, wherein:
the input device is configured to detect hand movements; and the task switching instruction is associated with a particular hand movement.

* * * * *